United States Patent
Nishimaki

(10) Patent No.: US 8,671,043 B2
(45) Date of Patent: Mar. 11, 2014

(54) SERVER FOR SUPPORTING AN EXCHANGE TRANSACTION

(71) Applicant: IP Strategy Incorporated, Tokyo (JP)

(72) Inventor: Masanobu Nishimaki, Tokyo (JP)

(73) Assignee: IP Strategy Incorporated, Tokyo (JP)

( * ) Notice: Subject to any disclaimer, the term of this patent is extended or adjusted under 35 U.S.C. 154(b) by 0 days.

(21) Appl. No.: 13/733,028

(22) Filed: Jan. 2, 2013

(65) Prior Publication Data

US 2013/0124385 A1    May 16, 2013

Related U.S. Application Data

(60) Division of application No. 10/738,310, filed on Dec. 17, 2003, now Pat. No. 8,370,231, which is a continuation-in-part of application No. 10/450,993, filed as application No. PCT/JP01/11484 on Dec. 26, 2001, now abandoned.

(30) Foreign Application Priority Data

| Dec. 28, 2000 | (JP) | 2000-400905 |
| Dec. 18, 2001 | (JP) | 2001-384279 |
| Dec. 17, 2002 | (JP) | 2002-364717 |

(51) Int. Cl.
*G06Q 40/00* (2012.01)

(52) U.S. Cl.
USPC .......... 705/35; 705/37; 705/80; 705/40

(58) Field of Classification Search
USPC .......................... 705/35, 37, 80, 40
See application file for complete search history.

(56) References Cited

U.S. PATENT DOCUMENTS

| 5,077,665 | A | 12/1991 | Silverman et al. |
| 6,035,287 | A | 3/2000 | Stallaert et al. |
| 6,421,653 | B1 | 7/2002 | May |
| 7,047,218 | B1 | 5/2006 | Wallman |
| 7,080,050 | B1 | 7/2006 | Himmelstein |
| 7,124,106 | B1 | 10/2006 | Stallaert et al. |
| 7,133,847 | B2 | 11/2006 | Himmelstein |
| 2002/0023034 | A1 | 2/2002 | Brown et al. |
| 2002/0194115 | A1 | 12/2002 | Nordlicht et al. |

FOREIGN PATENT DOCUMENTS

| JP | 2001-306850 | 11/2001 |
| JP | 2001-325470 | 11/2001 |
| JP | 2001-357233 | 12/2001 |
| JP | 2002-024511 | 1/2002 |
| JP | 2002-133272 | 5/2002 |
| JP | 2002-150029 | 5/2002 |
| JP | 2002-157529 | 5/2002 |
| WO | WO 01/11518 A2 | 2/2001 |
| WO | WO 01/88818 A2 | 11/2001 |
| WO | WO 02/11000 A2 | 2/2002 |

OTHER PUBLICATIONS

Hiroshi Yonemura, "Financial and Securities Theory for Investment Engineering," Mar. 29, 2001, pp. 23-37, Toyo Keizai Shimpo-Sha, Tokyo, Japan.

Michael Greener, "Swaps," The Penguin Business Dictionary, 1994, Penguin.

(Continued)

*Primary Examiner* — Daniel Felten
(74) *Attorney, Agent, or Firm* — DLA Piper LLP (US)

(57) ABSTRACT

The present invention is a server for supporting an exchange transaction, in which users can complete exchange transactions between and/or among themselves.

17 Claims, 48 Drawing Sheets

(56) References Cited

OTHER PUBLICATIONS

Reiko Mitsuishi, "EC marketing No. 17—Where the e-commerce competition between industries is going," Card Wave, Apr. 10, 2000, pp. 50-53, vol. 13, No. 5, C Media Company Limited, Tokyo, Japan.

Fumiaki Wada, "American barter business and ITEX Corporation," Card Wave, Feb. 10, 1997, pp. 46-49, vol. 10, No. 3, C Media Company Limited, Tokyo, Japan.

"Bartering surplus goods on the net," Computer Digest Monthly, Oct. 10, 2001, p. 94, vol. 27, No. 10, TAC Kikaku Limited, Tokyo, Japan.

SERVER FOR SUPPORTING AN EXCHANGE TRANSACTION

CROSS-REFERENCE TO RELATED APPLICATIONS

This application is a divisional of U.S. application Ser. No. 10/738,310 filed on Dec. 17, 2003, which is a continuation-in-part of U.S. application Ser. No. 10/450,993 filed on Jun. 18, 2003, which is a national stage entry of PCT/JP01/11484 filed on Dec. 26, 2001, which claims priority to JP applications Nos. 2000-400905 and 2001-384279 respectively filed on Dec. 28, 2000 and Dec. 18, 2001. U.S. application Ser. No. 10/738,310, identified above, also claims priority to JP application No. 2002-364717 filed on Dec. 17, 2002. Each of the above applications is herein incorporated by reference.

BACKGROUND OF THE INVENTION

1. Field of the Invention

The present invention relates to a server for supporting an exchange transaction.

2. Prior Art

The principle of monetary economy is in that an act of purchase is separated from an act of sale. For example, if a person cannot find a product that the person wishes to buy immediately after the person has sold a product, the person normally maintains purchasing power by holding the money and spends time to find a product that the person wishes to buy. Since a conventional financial transaction is premised on this principle, a customer has to pay fees respectively at the time of dissolution of a position and at the time of creation of a position in a financial instrument. Also, in transaction markets today that fluctuate intensely, a time lag between an act of dissolution and an act of creation instead increases market risks.

Incidentally, land, buildings, and compound real estate properties that are defined as combinations of both, are originally asset management products whose nature is different from that of financial instruments. However, as securitization of real estate utilizing special purpose vehicles and investment trusts prevails, their status as jointly managed products divisible into small lots is established. In line with this trend, opportunities for arbitrage transactions, with securitized products such as real estate-backed securities and real estate investment trusts as media, have been created in asset management between said real estate asset management products and such financial asset management products as loan assets, bonds and equities. Thus, there has been less meaning in discussing on an unequal footing real estate asset management products and financial asset management products.

Also, in the real estate markets as well, indicators that show fluctuation of the entire markets like equity indices do have been developed, and derivative transactions with these real estate indices as underlying numerical values are expected to grow.

On the other hand, commodity futures, commodity options, commodity futures options, commodity price swaps and the like, with commodity products such as precious metals, nonferrous metals, energy-related products and primary industry products as underlying products, have already established their status as quasi-financial instruments due to their nature of transactions that virtually allows net settlement. Also, commodity funds as well, with these commodity derivative products and financial derivative products as objects of their investment, are positioned as fund-type financial products similar to securities investment trusts and the like.

However, the transaction markets today are largely segmented into markets for financial instruments, markets for real estate products and markets for commodity derivative products, and the respective markets are further segmented by each product. Consequently, this deprives the respective products of liquidity, distorts their value at the time of dissolution of positions, and thus disadvantages customers.

Accordingly, it is an object of some embodiments of the present invention, in order to solve the above-described problems, to provide a computer-readable storage medium storing an exchange transaction program for financial and/or related instruments and an exchange transaction system for financial and/or related instruments that create one or more exchange transaction markets for at least one of financial instruments and quasi-financial instruments via at least one computer network and mutually match a demand to dissolve a position and a demand to create a position of customers such as asset managers, capital raisers and/or capital transactors, and to provide an exchange transaction method for products.

Moreover, it is a further object of some embodiments of the present invention to provide a computer-readable storage medium storing an exchange transaction program for financial and/or related instruments, an exchange transaction system for financial and/or related instruments, and an exchange transaction method for products that offer an environment in which an act of dissolution and an act of creation can be simultaneously performed and thus enable a customer to save fees payable to an intermediary or the like, that eliminate the time lag between an act of dissolution and an act of creation and thus minimize market risks between the acts, and that establish a marketplace for cross-transactions which transcends excessively segmented transaction markets and thus make it possible to improve the liquidity of respective products.

Furthermore, it is yet another object of some embodiments of the present invention to enable new types of arbitrage transactions and leveling of cash flows regarding asset management products, capital raising products and/or capital transaction products, to increase efficiency of reestablishment of portfolios and asset/liability management, and to provide new methodologies of asset management regarding control of businesses, cross-equityholding, credit accommodation, selection of parties to be entrusted with asset management, and/or the like.

SUMMARY OF THE INVENTION

According to an aspect of the present invention, a transaction server for supporting transactions executed by a plurality of client terminals of a plurality of users is characterized in that:

(a) said transaction server is connected to each of said plurality of client terminals;
(b) said transactions are exchange transactions;
(c) the transaction server is connected to an exchange transaction database that stores data regarding the exchange transactions;
(d) a user exchange order x is stored in the exchange transaction database, the user exchange order x being sent from a client terminal of a user X that desires to perform an exchange transaction, and having order information specified by the client terminal that includes a desired exchange difference XA minus XB, of the user X, arithmetically determined from:
(1) a desired offer value XA of an exchange object A serving as a desired offer item of the user X, and (2) a desired procurement value XB of an exchange object B serving as a desired procurement item of the user X;

(e) a user exchange order y is stored in the exchange transaction database, the user exchange order y being sent from a client terminal of a user Y that desires to perform an exchange transaction, and having order information specified by the client terminal that includes a desired exchange difference YA minus YB, of the user Y, arithmetically determined from: (1) a desired procurement value YA of the exchange object A serving as a desired procurement item of the user Y, and (2) a desired offer value YB of the exchange object B serving as a desired offer item of the user Y;

(f) the transaction server compares the user exchange order x and the user exchange order y as objects of matching in the exchange transaction database, and determines whether or not a match exists between the desired exchange difference XA minus XB and the desired exchange difference YA minus YB, to thereby execute the exchange transaction between the user exchange order x and the user exchange order y; and (g) the transaction server deletes the user exchange order x and the user exchange order y from the objects of matching in the exchange transaction database in a case where it is determined that the match exists, to thereby execute the exchange transaction.

DETAILED DESCRIPTION OF THE PREFERRED EMBODIMENTS

Figure 1:
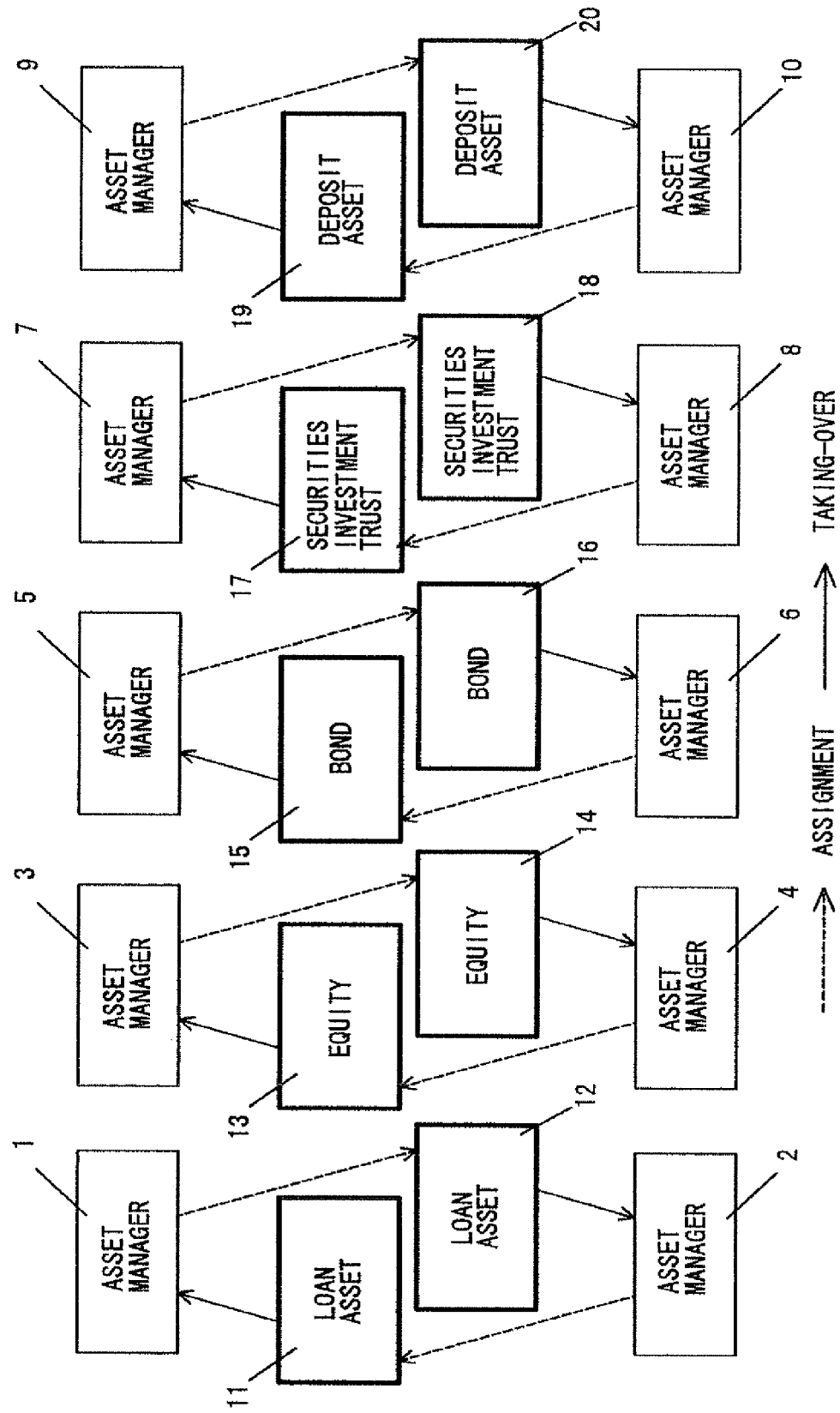
FIG. 1 is an embodiment in accordance with the present invention illustrating direct exchanges of asset management products.

The present invention relates to a server for supporting an exchange transaction.

As used in some embodiments of the present invention, the term 'exchange transaction between users' or 'exchange transaction between customers' shall mean any exchange transaction between or among asset managers, any exchange transaction between or among capital raisers, any exchange transaction between or among capital transactors, any exchange transaction between an asset managers and a capital transactor, and/or the like, and shall include cases as well in which a conduit such as a special purpose vehicle, a trust or a partnership is involved between or among the users on actual transactions.

Also, as used in some embodiments of the present invention, the term 'asset manager' shall mean any domestic or foreign individual or entity that performs asset management through lending, deposits or savings, trading of equities, bonds, commercial papers, beneficiary rights or real estate products, transactions of foreign exchange products, financial derivative products, real estate derivative products or commodity derivative products, and/or the like. The term 'capital raiser' shall mean any domestic or foreign individual or entity that performs capital raising through borrowings, deposits or savings, issuance of equities, bonds or commercial papers, transactions of foreign exchange products or financial derivative products, and/or the like. Moreover, as used in some embodiments of the present invention, any domestic or foreign individual or entity that functions as both an asset manager as above and a capital raiser as above shall be referred to as a 'capital transactor.'

Furthermore, as used in some embodiments of the present invention, any underlying product to be an object of asset management such as a financial asset management product and a real estate asset management product shall be referred to as an 'asset management product,' while any underlying product to be an object of capital raising such as a financial capital raising product shall be referred to as a 'capital raising product.' Thus, a bond, an equity, a commercial paper or the like that a capital raiser utilizes as a capital raising product is regarded as an asset management product from the standpoint of an asset manager that purchases it. Also, if the means for capital raising is a loan, the underlying product for the capital raising side, i.e. the capital raising product is a borrowed liability, while the underlying product for the asset management side, i.e. the asset management product is a loan asset. Moreover, if the means for capital raising is a deposit, the underlying product for the capital raising side, i.e. the capital raising product is a deposit liability, while the underlying product for the asset management side, i.e. the asset management product is a deposit asset.

On the other hand, as used in some embodiments of the present invention, various products such as foreign exchange products, financial derivative products, real estate derivative products and commodity derivative products, which are utilized differently from the asset management products or from the capital raising products, shall be referred to as 'capital transaction products.'

Now, in some embodiments of the present invention, exchange transactions of financial instruments and quasi-financial instruments are, by attribute of exchange items and style of transactions, categorized as follows:

(a) Direct exchanges of asset management products;
(b) Cash flow exchanges of asset management products;
① General cash flow exchanges of asset management products
② Cash flow exchanges of asset management products on the basis of their unrealized profits
③ Cash flow exchanges of asset management products on the basis of their unrealized losses
(c) Exchange transactions of asset management products by the comprise method between the direct exchange and the cash flow exchange;
(d) Cash flow exchanges of capital raising products;
(e) Cash flow exchanges of capital transaction products;
① Cash flow exchanges of capital transaction products on the basis of their unrealized profits
② Cash flow exchanges of capital transaction products on the basis of their unrealized losses
(f) Cash flow exchanges between asset management products and capital transaction products;
① Cash flow exchanges between asset management products and capital transaction products on the basis of their unrealized profits
② Cash flow exchanges between asset management products and capital transaction products on the basis of their unrealized losses
(g) Various exchange transactions by tie-in, which are applied styles of the above (a)-(f); and (h) Exchange transactions among three or more parties, which are also applied styles of the above (a)-(f).

As used herein, the term 'cash flow' shall mean any cash inflow and any cash outflow. More specifically, it shall mean any cash inflow and outflow arising from principal parts of asset management products, capital raising products and/or capital transaction products, and any cash inflow and outflow arising from fruit parts such as interest, dividends, and rent including land rent and house rent accruing from the principal parts.

Hereinafter, as an embodiment of the present invention, an example of an auction mode, in which an exchange transaction is completed through the processes from exhibition to bidding and then successful bid making, will be described.

Although the description provides much specificity, the present invention is a server for supporting an exchange transaction, and these enabling details should not be construed as limiting the scope of the invention. Also, it will be readily understood by those persons skilled in the art that the present invention is susceptible to many modifications, adaptations, and equivalent implementations without departing from this scope and without diminishing its attendant advantages. It is therefore intended that the present invention is not limited to the disclosed embodiments but should be defined in accordance with the appended claims.

Additionally, since a negotiation mode makes it easier to mutually match a demand to dissolve a position and a demand to create a position depending on the type and attribute of a desired exchange product, an example of the negotiation mode will also be described:

First, the system operator entitles asset managers, capital raisers and/or capital transactors who desire to use the service. These users can, in the present system, execute exhibition, bidding, successful bid making, transaction confirmation, preparation and signing of a letter of intent, communication with an appraiser regarding due diligence of an exchange transaction product and/or appraisal of an exchange transaction value, preparation and signing of an exchange contract, settlement of an exchange difference, delivery and receipt of an actual, payment and receipt of a cash flow during an exchange period, payment and receipt of various service charges, and/or the like.

Prospective exchange transactors in the present transaction markets comprise two types, i.e. exhibitors and bidders. The exhibitor, in the present system, exhibits a product that it desires to offer, and at the same time, presents a product that it desires to procure. On the other hand, the bidder participates in bidding after confirming that the desired offer product of the exhibitor is the desired procurement product of the bidder and that the desired procurement product of the exhibitor is the desired offer product of the bidder, and is called a successful bidder at the stage where the exchange transaction is completed.

Additionally, in various exchange transactions, an exhibitor or bidder may present a position that it is already carrying as its desired offer product, or may alternatively present a position that it is planning to create anew for the purpose of an exchange transaction as its desired offer product.

At the stage where a desired offer product of an exhibitor coincides with a desired procurement product of a bidder, while a desired procurement product of the exhibitor coincides with a desired offer product of the bidder and then an exchange transaction is completed, from the viewpoint of an equivalent exchange, a disparity of values between the two products is settled as a form called an exchange difference.

That is, in the case in which an exchange transaction between actuals of asset management products or between cash flows of whole asset management products is completed, the case in which an exchange transaction between unrealized profits of asset management products is completed, and the case in which an exchange transaction between unrealized profits of capital transaction products is completed, 'the party that has taken over the product of a higher value, i.e. that has assigned the product of a lower value' pays the disparity as an exchange difference to 'the party that has taken over the product of the lower value, i.e. that has assigned the product of the higher value,' whereby the offer and the procurement by both the parties are balanced. If the latter party agrees, the former party can substitute another product of equal appraisal value for the exchange difference.

On the other hand, in the case in which an exchange transaction between capital raising products is completed, the case in which an exchange transaction between unrealized losses of asset management products is completed, and the case in which an exchange transaction between unrealized losses of capital transaction products is completed, 'the party that has passed on the product of a higher value, i.e. that has assumed the product of a lower value' pays the disparity as an exchange difference to 'the party that has passed on the product of the lower value, i.e. that has assumed the product of the higher value,' whereby the offer and the procurement by both the parties are balanced. If the latter party agrees, the former party can substitute another product of equal appraisal value for the exchange difference.

If a plurality of bidders appear in one exhibition of an actual of an asset management product or of a cash flow of a whole asset management product, in one exhibition of an unrealized profit of an asset management product, or in one exhibition of an unrealized profit of a capital transaction product, the desired offer value of the exhibiting party increases and/or the desired procurement value of the exhibiting party decreases as the principle of competition works. As a result thereof, the exchange transaction is completed at the desired offer value after the increase and/or at the desired procurement value after the decrease, and then the exchange difference is settled between the successful bidder, who has accepted the desired offer value and/or the desired procurement value, and the exhibitor, whereby the offer and the procurement by both the parties are balanced.

On the other hand, if a plurality of bidders appear in one exhibition of a capital raising product, in one exhibition of an unrealized loss of an asset management product, or in one exhibition of an unrealized loss of a capital transaction product, the desired offer value of the exhibiting party decreases and/or the desired procurement value of the exhibiting party increases as the principle of competition works. As a result thereof, the exchange transaction is completed at the desired offer value after the decrease and/or at the desired procurement value after the increase, and then the exchange difference is settled between the successful bidder, who has accepted the desired offer value and/or the desired procurement value, and the exhibitor, whereby the offer and the procurement by both the parties are balanced.

As used in the present embodiment, the term 'letter of intent' shall mean an agreement provisionally entered into by the system operator and an exhibitor as well as an agreement provisionally entered into by the operator and a successful bidder at the stage where transaction confirmation on the successful bid is finalized, while the term 'exchange contract' shall mean an agreement finally entered into by the operator and the exhibitor as well as an agreement finally entered into by the operator and the successful bidder at the stage where the due diligence of the product and/or the appraisal of the transaction value is finalized. The reason for the operator to enter into the letter of intent and the exchange contract separately with the exhibitor and with the successful bidder is to maintain the anonymity of the exchange transaction between the exhibitor and the successful bidder.

Additionally, if both the parties reach agreement, the exhibitor and the successful bidder may directly enter into a letter of intent and an exchange contract, while alternatively, they may enter into the exchange contract immediately after the transaction confirmation is finalized omitting the processes of entering into the letter of intent, of the due diligence and of the appraisal.

The operator establishes, on the screen displayed on client terminals, separate sections for various transaction styles as described below:

(a) Section for direct exchanges of asset management products:
In this section, bidding is executed for exhibition of asset management products such as financial asset management products including loan assets, equities, bonds, trusts of money, deposit assets and/or the like, as well as real estate asset management products including land, buildings, compound real estate properties, real estate-backed securities, real estate investment trusts and/or the like, and then the actuals of the products are exchanged between exhibitors and successful bidders.

(b) Section for cash flow exchanges of asset management products:
In this section, bidding is executed for exhibition of the above-described asset management products, and then the cash flows of the products are exchanged between exhibitors and successful bidders.

(c) Compromise section between the direct exchange and the cash flow exchange of asset management products:
In this section, bidding is executed for exhibition of the above-described asset management products, and then the products are exchanged between exhibitors and successful bidders by the compromise method between the direct exchange and the cash flow exchange.

(d) Section for cash flow exchanges of capital raising products:
In this section, bidding is executed for exhibition of capital raising products such as borrowed liabilities, equities, bonds, commercial papers, deposit liabilities and/or the like, and then the cash flows of the products are exchanged between exhibitors and successful bidders.

(e) Section for cash flow exchanges of capital transaction products:
In this section, bidding is executed for exhibition of capital transaction products such as foreign exchange products, financial derivative products, real estate derivative products, commodity derivative products and/or the like, and then the cash flows of the products are exchanged between exhibitors and successful bidders.

(f) Section for cash flow exchanges between asset management products and capital transaction products:
In this section, bidding is executed for exhibition of the above-described asset management products and for exhibition of the above-described capital transaction products, and then the cash flows of the products are exchanged between exhibitors and successful bidders on the basis of their unrealized profits or losses.

(g) Section for asset/liability management:
In this section, bidding is executed for exhibition of various combinations of the direct exchange of asset management products, the cash flow exchange of asset management products, the cash flow exchange of capital raising products and the cash flow exchange of cash transaction products, and then the actuals and/or the cash flows of the products are exchanged between exhibitors and successful bidders.

The operator displays, in the above-described separate sections for various transaction styles on a real time basis, names and issues, types and attributes, terms and conditions, exchange periods, and completed exchange values of various products for which exchange transactions have been recently completed, completed exchange volumes in cases of unit price products, and/or the like, as well as outlines or details of products scheduled to be exhibited afterwards. Asset managers, capital raisers and/or capital transactors grasp, based on such information, market levels and balance of supply and demand of various exchange transactions, and wait for opportunities for their participation in bidding. Additionally, the details regarding completed exchange transactions are disclosed for the purpose of showing the market levels and balance of supply and demand of exchange transactions to users of the present system, and yet individual names and/or corporate names of exchange completers and such confidential information as special provisions of exchange contracts are basically not disclosed.

Also, the operator may display on a real time basis contractual values, indicative values, theoretical values and/or the like as well of various financial and/or quasi-financial instruments as reference data for users to perform arbitrage transactions between the present system and the conventional financial and/or quasi-financial markets.

A system user that has confirmed market levels of exchange transactions on the screen and has decided to make an exhibition, informs the operator of a name or issue, a type and attribute, and terms and conditions of a desired offer product, a name or issue, a type and attribute, and terms and conditions of a desired procurement product, acceptable creditworthiness of an exchanging counterparty, desired exchange values, desired exchange volumes in cases of unit price products, a desired exchange period, a desired exhibition period as well as acceptability of an automatic extension or an early termination thereof, various requests for bidders, and/or the like. As used in the present embodiment, the disclosure of information on a desired offer product at this stage shall be referred to as 'primary information disclosure by an exhibitor.'

The operator confirms that there is no problem in the creditworthiness of the exhibitor, that there is no deceit in the notification regarding the desired offer product, and that the desired exchange value is a fair appraisal value based on an optimal appraisal approach, and then accepts the exhibition. Concealing the individual name and/or corporate name of the exhibitor, the operator displays the above-described information on the products in the appropriate section for the transaction style. Among the information related to the desired offer product, there may be confidential information that the exhibitor wishes to avoid disclosure of until the last stage, and yet basically, the more replete the primary information disclosure is, the more comfort bidders are given, and the more bidders can be attracted. Additionally, in the case in which the exhibitor utilizes prospectuses to invite bidders, the individual name and/or corporate name of the exhibitor is disclosed from the beginning.

The exhibitor transfers a clearing margin to the operator, and then the operator maintains custody thereof in a separate funds account opened for the exhibitor. The amount of the clearing margin is determined by the operator taking into account the desired exchange products as well as their desired exchange values in the current exchange transaction, the desired exchange period, the creditworthiness of the exhibitor, the operator's previous transaction records with the exhibitor, and/or the like.

A system user that has confirmed the above-described exhibition on the screen and has decided to make a bid, informs the operator of a name or issue, a type and attribute, and terms and conditions of his or her desired offer product, desired exchange values as well as a desired amount of the exchange difference, desired exchange volumes in cases of unit price products, a desired exchange period, desired timing for participating in the bidding, various requests for the exhibitor, and/or the like. As used in the present embodiment, the disclosure of information on a desired offer product at this stage shall be referred to as 'primary information disclosure by a bidder.'

The operator confirms that there is no problem in the creditworthiness of the bidder, that there is no deceit in the notification regarding the desired offer product, and that the desired exchange value is a fair appraisal value based on an optimal appraisal approach, and then accepts the bidding. Concealing the individual name and/or corporate name of the bidder, the operator feeds back the above-described information on the product to the exhibitor. Among the information related to the desired offer product, there may be confidential information that the bidder wishes to avoid disclosure of until the last stage, and yet basically, the more replete the primary information disclosure is, the more comfort the exhibitor is given, and the more likely the exchange is completed.

The bidder transfers a clearing margin to the operator, and then the operator maintains custody thereof in a separate funds account opened for the bidder. The amount of the clearing margin is determined by the operator taking into account the desired exchange products as well as their desired exchange values in the current exchange transaction, the desired exchange period, the creditworthiness of the bidder, the operator's previous transaction records with the bidder, and/or the like.

In the present embodiment, depending on the magnitude of the appraisal value of a desired exchange product, on the type and attributes of a desired exchange product and/or on the like, a plurality of bidders may be matched to one exhibitor, one bidder may be matched to a plurality exhibitors, or a plurality of bidders may be matched to a plurality of exhibitors. That is, in these cases, exchange transactions are simultaneously completed among three or more users.

Also, if a desired exchange product is a plurality of asset management products, a plurality of capital raising products or a plurality of capital transaction products, is a tie-in of an asset management product and a capital transaction product, a tie-in of a capital raising product and a capital transaction product or a tie-in of an asset management product and a capital raising product, and/or is a tie-in of an asset management product, a capital raising product and a capital transaction product, there is a method of unbundling each tie-in into its constituents to execute bidding, and a method of bundling cash flows arising from a plurality of products and then utilizing the net cash flow to execute bidding.

In the case in which prospective exchange transactors [A], [B] and [C] desire to offer products [a], [b] and [c] respectively, while the prospective exchange transactors [A], [B] and [C] desire to procure products [b], [c] and [a] respectively, and thus desires to offer and desires to procure circulate among the prospective exchange transactors, the system operator may arrange a simultaneous exchange transaction among the three parties. Also, in the case as well in which desires to offer and desires to procure circulate among four or more prospective exchange transactors, the operator may arrange a simultaneous exchange transaction.

In the auction mode, if negotiation is necessary between an exhibitor and a bidder regarding a method of calculating a desired exchange value, an amount of an exchange difference, a desired exchange period, bundling or unbundling of a desired exchange product, additional conditions for completing an exchange, an exhibition period, timing for participating in bidding, and/or the like, the negotiation is substituted for by the negotiation between the exhibitor and the operator as well as by the negotiation between the bidder and the operator, whereby the anonymity of the transaction is basically maintained.

If an exchange transaction is not completed, the exhibitor can exhibit the same desired offer product at a different time. On this occasion, the quantity of information in the primary information disclosure, the acceptable creditworthiness of an exchanging counterparty, the desired exchange values, the desired exchange volumes in the case of unit price products, the desired exchange period, the method of bundling or unbundling the desired offer product, the conditions for completing the exchange, the name or issue, type and attribute, terms and conditions of the desired procurement product, and/or the like are reviewed in advance.

If an exchange transaction is completed, the operator causes both the exhibitor and the successful bidder to confirm the transaction. At the stage where the transaction is confirmed, the operator prepares a letter of intent between the operator and the exhibitor as well as a letter of intent between the operator and the successful bidder, and then the respective parties sign the letters of intent. The operator stores separate master letters of intent for various transaction styles to be amended according to completed exchange transactions, thereby preparing actual letters of intent.

In the letter of intent, the names or issues, types and attributes, and terms and conditions of both the completed exchange products, the style of the exchange transaction, the special provisions of the exchange contract, the exchange period, the completed exchange values, the completed exchange volumes in the case of unit price products, the amount of the exchange difference, the schedule until the entry into the exchange contract, the method of the due diligence of the products as well as the appraisal of the transaction values, the information regarding the appraiser in charge of the due diligence and appraisal, the effect that the exchange contract will be amended or invalid depending on the result of the due diligence and appraisal, the term of validity of the letter of intent, and/or the like are input.

After the letter of intent is signed, the due diligence of completed exchange products and the appraisal of completed exchange values are executed. These are executed by appraisers that do not have conflicts of interest with the exhibitor or with the successful bidder, and it is confirmed, for example, that the desired exchange values of both the parties, based on which the auction started, can be regarded as fair, and that the completed exchange products do not include legal, ethical, economic, physical or environmental problems. In order to increase the precision of the due diligence and appraisal, the exchange completers are required to submit to the appraisers all the information related to the products that they have offered such as the calculation grounds of the desired exchange values, and the existing contracts. As used in the present embodiment, the disclosure of information on a completed exchange product at this stage shall be referred to as 'secondary information disclosure by an exhibitor and a successful bidder.' Additionally, in the case in which a completed exchange product is a general product and the fairness of its completed exchange value can be easily recognized, the system operator may also serve as an appraiser or may omit the process of the due diligence and appraisal.

At the stage where it is confirmed, as a result of the due diligence and appraisal on the basis of the secondary information disclosure, that no defects are found in the completed exchange products and that the desired exchange values were fair appraisal values, an exchange contract between the operator and the exhibitor as well as an exchange contract between the operator and the successful bidder are respectively entered into. On this occasion, the exhibitor and the successful bidder swear that they will not manage the completed exchange products carelessly until the delivery and receipt of the actuals of the products, the settlement of the exchange difference, and/or the cash flow exchange during the exchange period are finalized. Additionally, the entered-into letter of intent is amended to be used as the exchange contract.

As a result of the due diligence and appraisal, if any defect is found in a completed exchange product, or if it is found that a desired exchange value was an unfair appraisal value, the appraiser feeds back the content of the defect or the result of the appraisal to the original offerer of the product, to the exchanging counterparty of the original offerer and/or to the system operator, and then the completed exchange values, the amount of the exchange difference, the exchange period, the special provisions of the exchange contract, and/or the like are reviewed between the original offerer and the operator, and/or between the exchanging counterparty and the operator respectively. As a result thereof, with the operator as an intermediary, if the offerer and the exchanging counterparty have reached agreement, the contents of the letter of intent are amended to enter into an exchange contract, while if the parties have failed to reach agreement, the completion itself of the exchange transaction becomes null and void.

After an exchange contract is signed, the operator performs administration of the following items and the like:

(a) The operator intermediates between the delivery and the receipt of actuals of completed exchange products.

(b) The operator executes the settlement of an exchange difference between exchange completers through an inter-account funds transfer in the system.

(c) During an exchange period, the operator executes the payment and the receipt of cash flows between and among exchange completers through inter-account funds transfers in the system.

Additionally, with respect to a service charge and/or a line charge that the operator itself receives from exchange completers, there are a method in which the charge is deducted in the process where a cash flow is paid and received between and among the exchange completers via the present system, and a method in which the charge is collected from the exchange completers on separate occasions. Also, if the payment and receipt of a cash flow coincides with the receipt and payment of another cash flow in timing between exchange completers, the operator offsets the cash flows and then executes the inter-account funds transfer on a net basis.

(d) When various rights such as jus disponendi are exercised and various obligations are fulfilled on the basis of an exchange contract, the operator executes administrative procedures arising between the exchange completers.

(e) With reference to an exchange transaction, the operator inspects each of exchange completers to determine whether there is proper compliance with laws and/or regulations, appropriate filing of transaction reports with authorities, appropriate disclosure of information to the general public, and/or the like. Also, the operator files its own reports with authorities and/or discloses information to the general public as necessary.

(f) With reference to an exchange transaction, the operator provides exchange completers with software or other tools that can be used in risk management and/or cash flow management.

(g) During an exchange period, since exchanging parties mutually take their credit risks directly or indirectly, the operator, which intermediates between the parties, grasps their creditworthiness on the basis of their credit ratings, financial variables, size or prospect of business, name recognition in the market and/or the like. In the case in which the operator finds their creditworthiness insufficient, depending on the style of exchange transaction and/or the amount of the collected clearing margin, the operator can demand cash collateral or securities collateral such as bonds, equities, beneficiary securities, certificates of deposit, commercial papers or the like, and/or can demand guarantee by a bank, an insurance company or another guarantor.

Also, during an exchange period, if the exposure to a credit risk associated with an exchanging counterparty increases or decreases according to the fluctuation of the appraisal values of exchange transaction products or to the state of progress of the payment and receipt of principal and fruits, the operator adjusts the degree of collateral or guarantee each time by demanding additional collateral or additional guarantee, by refunding excess collateral or releasing excess guarantee, and/or by the like, thereby maintaining the appropriate creditworthiness. Additionally, depending on the case, the insufficiency in creditworthiness may be reflected on the amount of a cash flow to be paid and received, If, notwithstanding this, an exchange completer falls into default, the operator fulfills a guidance role in the preservation and recovery of credits and in the institution of legal proceedings on behalf of the exchanging counterparty of the exchange completer.

(h) In a case in which an exchange completer cancels an exchange contract, a case in which an exchange completer assigns it to a third party, and other cases, the operator executes administrative procedures arising therefrom.

(i) The operator executes the payment and the receipt of an advertisement fee of the case in which a user of the present system inserts thereto a banner ad or a pop-up ad related to an exchange transaction targeting other users, an appraisal fee and/or the like through an inter-account funds transfer between and among the parties.

Any desired exchange value that an exhibitor and a bidder inform the operator of should be a fair appraisal value, so that the completion of an exchange transaction can be smoothly processed. In the case of a priceable product equipped with liquidity, a fair appraisal value shall mean a market value, which is a contractual value and/or an indicative value announced in a securities exchange, a derivatives exchange, an over-the-counter market, an inter-financial institution market, an inter-realtor market and/or the like.

On the other hand, in the case of an illiquid priceable product or a non-priceable product, a fair appraisal value shall mean a theoretical value that is rationally calculated excluding arbitrariness. The methodologies of rationally calculating a theoretical value comprise a method in which the value is calculated by incorporating a fluctuation factor such as an interest rate, maturity, a credit risk and the like as well as individual characteristics of a product into a market value of a similar product, a method in which a present value is calculated by discounting a future cash flow arising from a product by an interest rate or the like, a method in which a theoretical pricing model recognized in the market is utilized, and other methods. Also, in the case of a hybrid product or the like whose constituents respectively have market values, there is a method in which its value is calculated by summing up the respective market values.

If a plurality of fair appraisal values are applicable to one product regardless of whether it is a priceable product or a non-priceable product, its desired exchange value is determined by a method in which the plurality of approaches are adopted and then their weighted average or the like is calculated, or by a method in which a value regarded as the fairest from among the plurality of values is adopted.

The system operator guides exhibitors and bidders to adopt appraisal approaches with the same base so that a plurality of desired exchange values to be presented can be easily compared, and also plays a leading role in unifying calculation bases as to whether or not such expenses as exchange transaction fees payable to the operator at the time of the exchange transaction, expenses required during the exchange period for the maintenance of a position, the exercise of rights and the fulfillment of obligations, and expenses required at the expiry of the exchange should be included beforehand in a desired exchange value. Additionally, the operator can provide prospective exchange transactors with software or other tools via the present system for calculation of appraisal values.

In an exchange transaction in accordance with the present embodiment, a desired exchange value of an individual financial instrument or quasi-financial instrument is required to be recognized or calculated by, for example, the following methods:

With respect to a loan asset, if it is traded in a secondary market as is a bond, its market value is applied to the desired exchange value. With respect to an illiquid loan asset, its acquisition value can be applied to the desired exchange value. However, if there is a problem in a business operation or financial standing of the borrower, the value of the possible bad loan asset is estimated on the basis of the ranking of the credit risk, the forecast of the future cash flows and the like, and then the amount found by deducting the estimated value from said acquisition value is applied to the desired exchange value.

With respect to various deposits such as ordinary deposits, time deposits and certificates of deposit, their deposited amount can be applied to the desired exchange value. However, if the deposited amount exceeds the upper limit of the principal and interest amount guaranteed and there is a problem in a business operation or financial standing of the financial institution servicing the deposit, the value of the possible bad deposit asset is estimated on the basis of the ranking of the credit risk, the forecast of the future cash flows and the like, and then the amount found by deducting the estimated value from said deposited amount is applied to the desired exchange value.

With respect to a fund-type asset management product, in the case of a priceable product that is found in securities investment trusts, real estate investment trusts, commodity funds and the like, its market value is applied to the desired exchange value. In the case of a product that can be called a quasi-deposit product due to a guarantee of its principal and interest amount, its asset management policy or the like from among a loan trust, a money trust in a narrow sense, a bond investment trust and the like, its acquisition value of a beneficiary right can be applied to the desired exchange value. Also, with respect to an investment vehicle, the composition of products in a portfolio together with the appraisal values of the individual products is basically disclosed, and then the sum total of the appraisal values of the managed assets is applied to the desired exchange value.

With respect to a private equity, in the case of an issue equipped with liquidity, its contractual value or indicative value announced in a transaction system or the like that at any time allows the trading is applied to the desired exchange value, while in the case of an illiquid issue, its theoretical value that can be calculated by a net asset value methodology, an earning power methodology, a market price comparison methodology or the like is applied to the desired exchange value.

The net asset value methodology comprises a book value net asset approach in which a net asset value on a book is utilized, a present replacement value net asset approach in which liabilities are deducted from the sum total of present replacement prices of assets, and a liquidation value net asset approach in which liabilities are deducted from the sum total of present sellable prices of assets, and other approaches. Also, the earning power methodology comprises a capitalized earning approach in which an estimated future profit is divided by a capitalization rate or the like, a capitalized dividend approach in which an estimated future dividend is divided by a capitalization rate or the like, a discounted cash flow approach in which liabilities are deducted from the sum total of present values, which are found by discounting estimated future cash flows with a capitalization rate or the like, and other approaches. Moreover, the market price comparison methodology comprises a similar industry comparison approach in which an equity price of a target company is calculated on the basis of an average equity price of a plurality of listed companies in similar industries as compared with their dividends, profits and net asset values, and a similar company comparison approach in which an equity price of a target company is calculated on the basis of an average equity price of a plurality of similar companies as compared with revenues, profits and net asset values, and other approaches.

With respect to land, buildings, and compound real estate properties (including condominiums) that are combinations of both, the desired exchange value is calculated by an appraisal approach such as a cost approach, a transacted precedent comparison approach, a capitalized earning approach or the like. The cost approach is a method in which the replacement cost of real estate is applied to the appraisal value, while the transacted precedent comparison approach is a method in which a value found in a transaction case of another property is utilized as a reference for the appraisal value. Also, the capitalized earning approach used in this context is a method in which the sum total of present values found by discounting future cash flows such as rents and sale proceeds is applied to the appraisal value.

On the other hand, with respect to a loan asset secured by real estate, a real estate-backed security, a beneficiary right in a real estate investment trust, or a subscription certificate and investment-corporate bond issued by a real estate investment corporation, its desired exchange value can be calculated in line with that of a financial asset management product.

With respect to a capital raising product, its present value found by discounting future cash flows with an interest rate or the like that has considered its credit risk can be applied to the desired exchange value.

With respect to a foreign exchange product, a financial derivative product, a real estate derivative product or a commodity derivative product, in the case of a listed product, its unrealized profit or loss calculated using a contractual value or an indicative value announced in a derivatives exchange or a securities exchange is applied to the desired exchange value. In the case of an unlisted product, its unrealized profit or loss calculated by a method in which a contractual value or an indicative value announced in an inter-financial institution market, an inter-realtor market or the like is utilized, a method in which its present value is found by discounting future cash flows of the product with an interest rate or the like that has considered its credit risk, a method in which a theoretical pricing model recognized in the market is utilized, or other methods, is applied to a desired exchange value.

The embodiments of the present invention will be explained in more detail by using the accompanying drawings:

First, FIG. 1 is an embodiment of the direct exchange of asset management products illustrating cases in which the same types of financial asset management products are exchange items.

Herein, an asset manager 1 was holding a loan asset 12, while an asset manager 2 was holding a loan asset 11. As a result of completing a direct exchange, the asset manager 1 has been able to take over the loan asset 11 in exchange for assigning the loan asset 12, while at the same time, the asset manager 2 has been able to take over the loan asset 12 in exchange for assigning the loan asset 11.

Similarly, an asset manager 3 and an asset manager 4, an asset manager 5 and an asset manager 6, an asset manager 7 and an asset manager 8, and an asset manager 9 and an asset manager 10 have directly exchanged respectively, an equity 14 and an equity 13, a bond 16 and a bond 15, a securities investment trust 18 and a securities investment trust 17, and a deposit asset 20 and a deposit asset 19.

Figure 2:
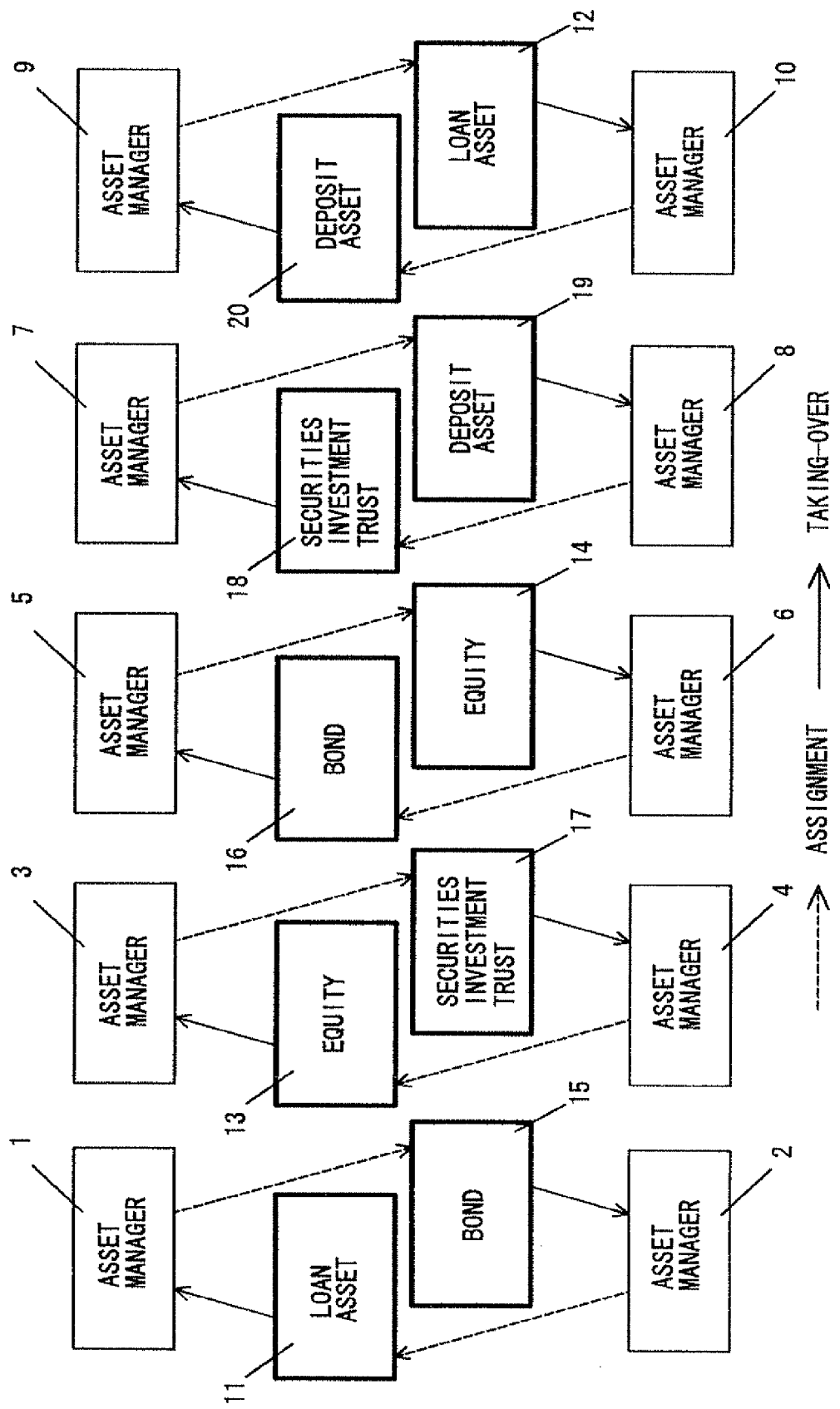
FIG. 2 is another embodiment in accordance with the invention illustrating direct exchanges of asset management products.

FIG. 2 is another embodiment of the direct exchange of asset management products illustrating cases in which different types of financial asset management products are exchange items.

Herein, an asset manager 1 was holding a bond 15, while an asset manager 2 was holding a loan asset 11. As a result of completing a direct exchange, the asset manager 1 has been able to take over the loan asset 11 in exchange for assigning the bond 15, while at the same time, the asset manager 2 has been able to take over the bond 15 in exchange for assigning the loan asset 11.

Similarly, an asset manager 3 and an asset manager 4, an asset manager 5 and an asset manager 6, an asset manager 7 and an asset manager 8, and an asset manager 9 and an asset manager 10 have directly exchanged respectively, a securities investment trust 17 and an equity 13, an equity 14 and a bond 16, a deposit asset 19 and a securities investment trust 18, and a loan asset 12 and a deposit asset 20.

Figure 3:
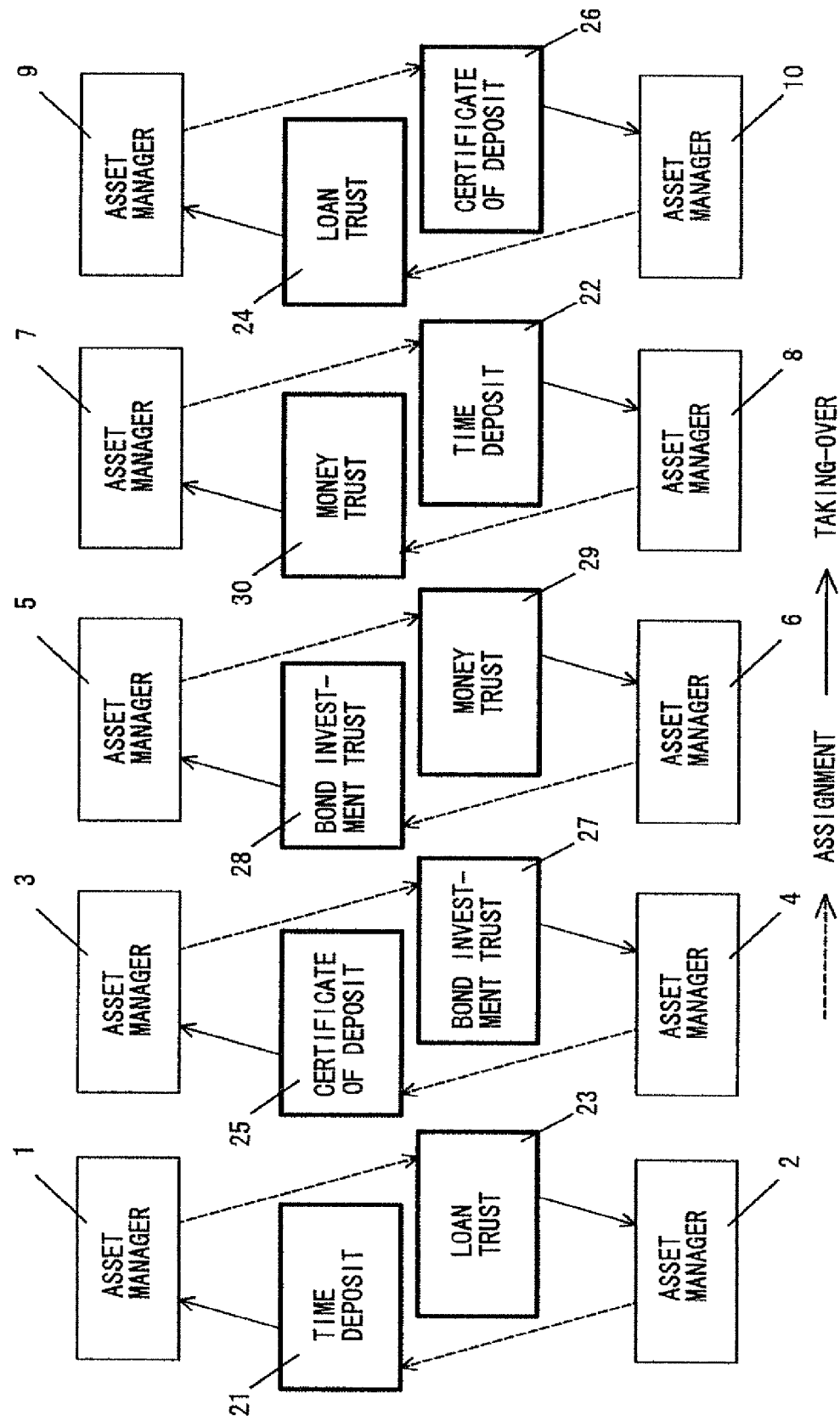
FIG. 3 is another embodiment in accordance with the invention illustrating direct exchanges of asset management products.

FIG. 3 is another embodiment of the direct exchange of asset management products illustrating cases in which different deposit types of financial asset management products are exchange items.

Herein, an asset manager 1 was holding a loan trust 23, while an asset manager 2 was holding a time deposit 21. As a result of completing a direct exchange, the asset manager 1 has been able to take over the time deposit 21 in exchange for assigning the loan trust 23, while at the same time, the asset manager 2 has been able to take over the loan trust 23 in exchange for assigning the time deposit 21.

Similarly, an asset manager 3 and an asset manager 4, an asset manager 5 and an asset manager 6, an asset manager 7 and an asset manager 8, and an asset manager 9 and an asset manager 10 have directly exchanged respectively, a bond investment trust 27 and a certificate of deposit 25, a money trust 29 and a bond investment trust 28, a time deposit 22 and a money trust 30, and a certificate of deposit 26 and a loan trust 24.

Figure 4:
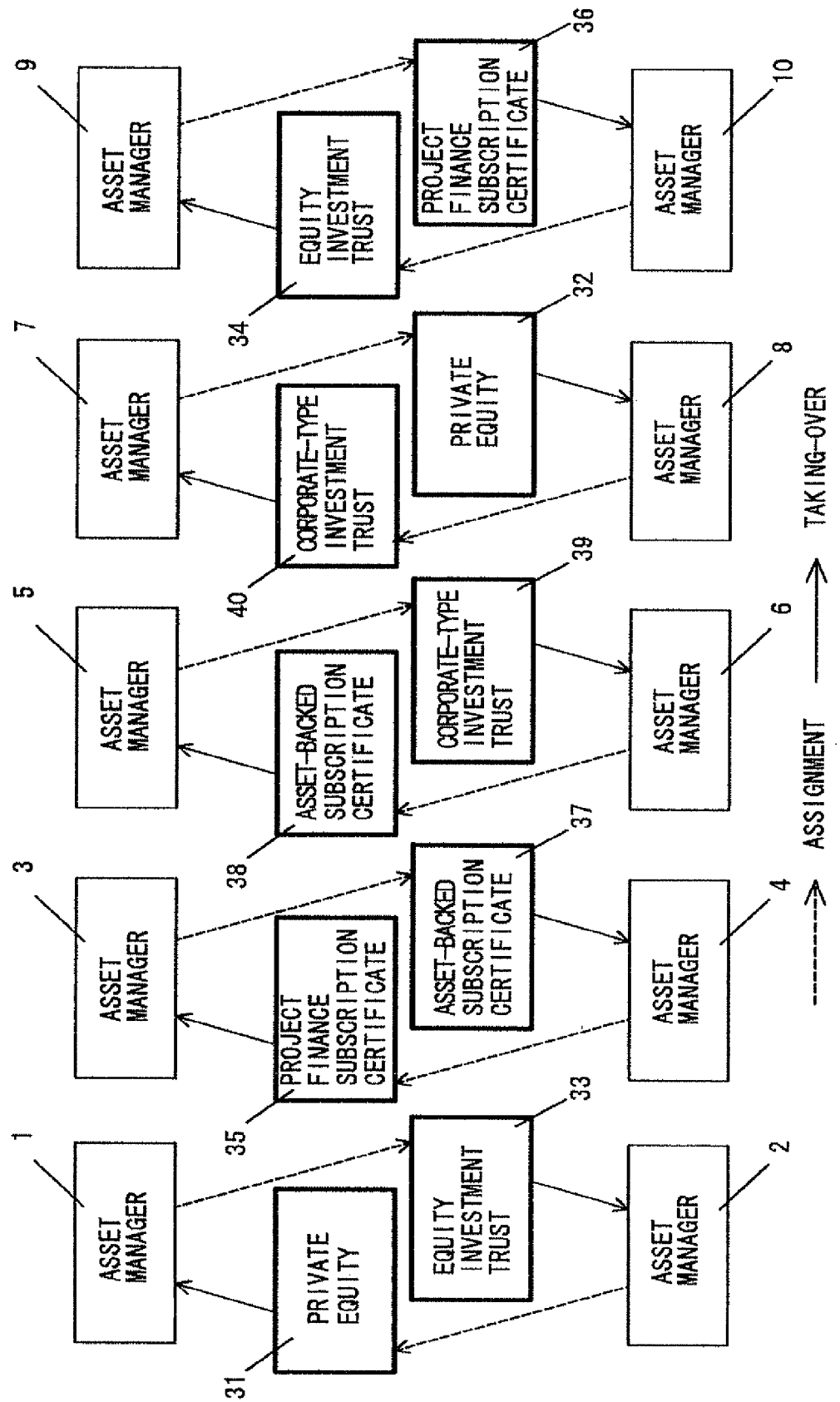
FIG. 4 is another embodiment in accordance with the invention illustrating direct exchanges of asset management products.

FIG. 4 is another embodiment of the direct exchange of asset management products illustrating cases in which different equity types of financial asset management products are exchange items.

Herein, an asset manager 1 was holding a beneficiary right in an equity investment trust 33, while an asset manager 2 was holding a private equity 31. As a result of completing a direct exchange, the asset manager 1 has been able to take over the private equity 31 in exchange for assigning the beneficiary right in the equity investment trust 33, while at the same time, the asset manager 2 has been able to take over the beneficiary right in the equity investment trust 33 in exchange for assigning the private equity 31.

Similarly, an asset manager 3 and an asset manager 4, an asset manager 5 and an asset manager 6, an asset manager 7 and an asset manager 8, and an asset manager 9 and an asset manager 10 have directly exchanged respectively, an asset-backed subscription certificate 37 and a project finance subscription certificate 35, a subscription certificate of a corporate-type investment trust 39 and an asset-backed subscription certificate 38, a private equity 32 and a subscription certificate of a corporate-type investment trust 40, and a project finance subscription certificate 36 and a beneficiary right in an equity investment trust 34.

Figure 5:
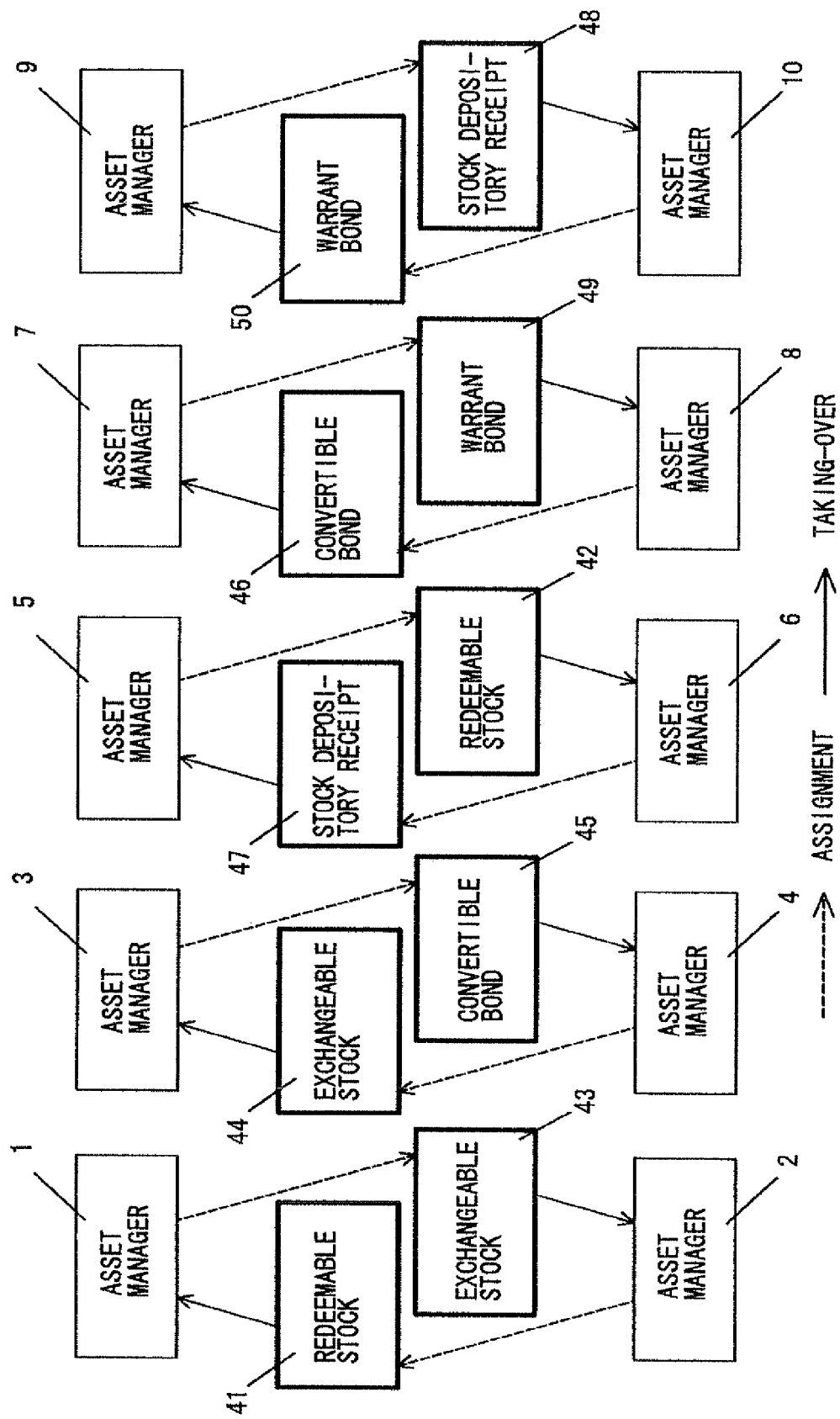
FIG. 5 is another embodiment in accordance with the invention illustrating direct exchanges of asset management products.

FIG. 5 is another embodiment of the direct exchange of asset management products illustrating cases in which different types of equity-linked asset management products being serviced by an identical capital raiser are exchange items, Herein, an asset manager 1 was holding an exchangeable stock 43, while an asset manager 2 was holding a redeemable stock 41. As a result of completing a direct exchange, the asset manager 1 has been able to take over the redeemable stock 41 in exchange for assigning the exchangeable stock 43, while at the same time, the asset manager 2 has been able to take over the exchangeable stock 43 in exchange for assigning the redeemable stock 41.

Similarly, an asset manager 3 and an asset manager 4, an asset manager 5 and an asset manager 6, an asset manager 7 and an asset manager 8, and an asset manager 9 and an asset manager 10 have directly exchanged respectively, a convertible bond 45 and an exchangeable stock 44, a redeemable stock 42 and a stock depository receipt 47, a warrant bond 49 and a convertible bond 46, and a stock depository receipt 48 and a warrant bond 50.

Figure 6:
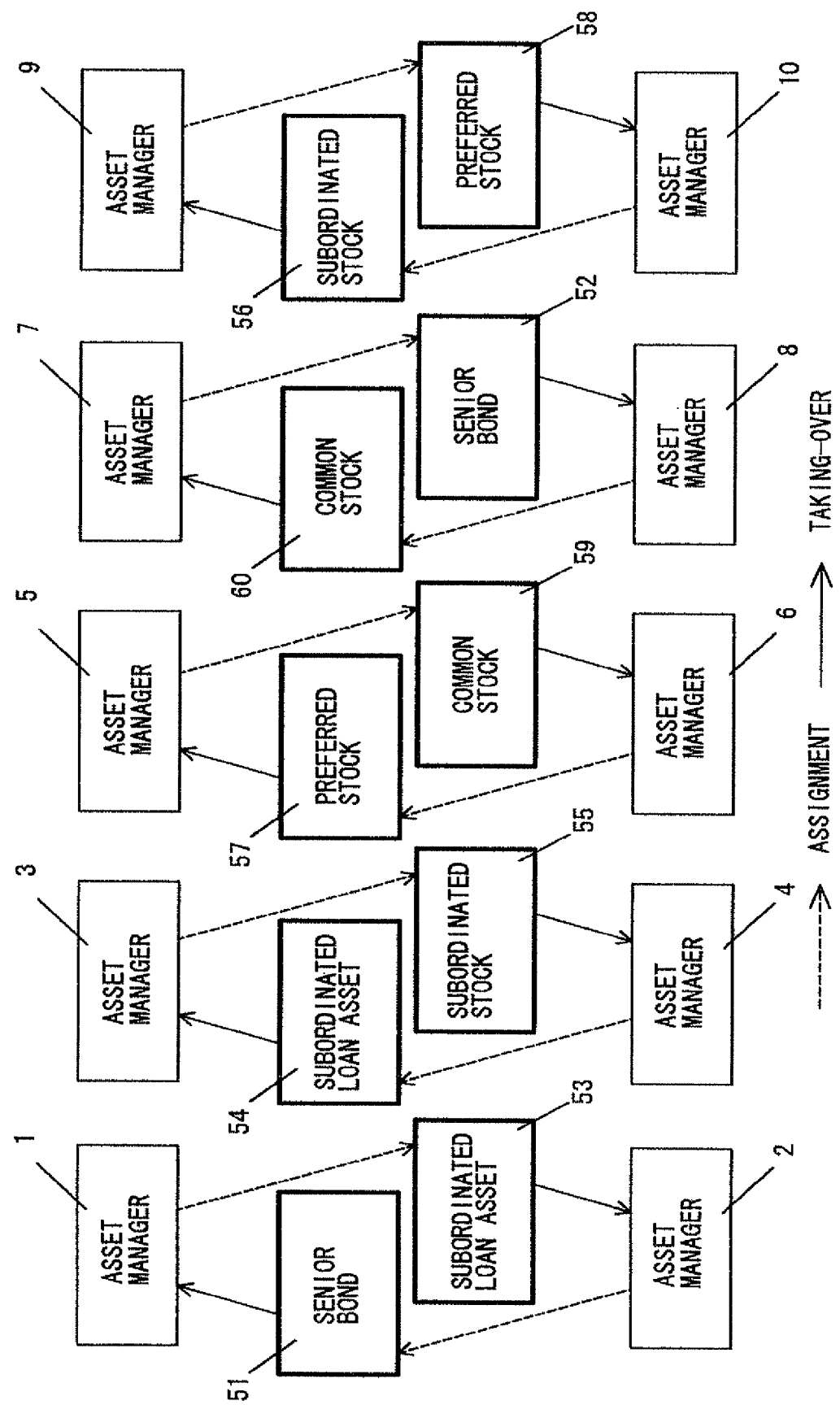
FIG. 6 is another embodiment in accordance with the invention illustrating direct exchanges of asset management products.

FIG. 6 is another embodiment of the direct exchange of asset management products illustrating cases in which financial asset management products with different orders of reimbursement being serviced by an identical capital raiser are exchange items.

Herein, an asset manager 1 was holding a subordinated loan asset 53, while an asset manager 2 was holding a senior bond 51. As a result of completing a direct exchange, the asset manager 1 has been able to take over the senior bond 51 in exchange for assigning the subordinated loan asset 53, while at the same time, the asset manager 2 has been able to take over the subordinated loan asset 53 in exchange for assigning the senior bond 51.

Similarly, an asset manager 3 and an asset manager 4, an asset manager 5 and an asset manager 6, an asset manager 7 and an asset manager 8, and an asset manager 9 and an asset manager 10 have directly exchanged respectively, a subordinated stock 55 and a subordinated loan asset 54, a common stock 59 and a preferred stock 57, a senior bond 52 and a common stock 60, and a preferred stock 58 and a subordinated stock 56.

Figure 7:
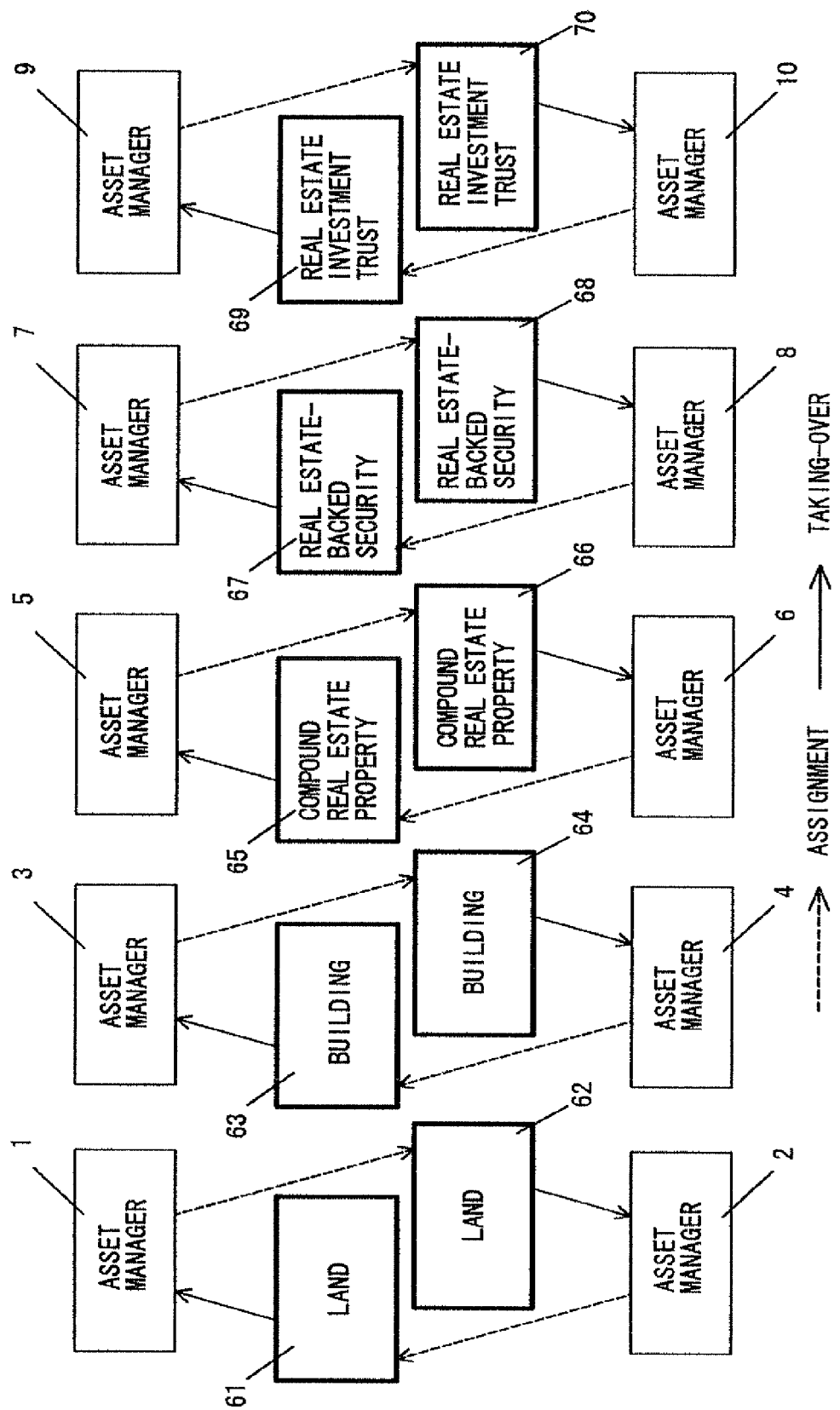
FIG. 7 is another embodiment in accordance with the invention illustrating direct exchanges of asset management products.

FIG. 7 is another embodiment of the direct exchange of asset management products illustrating cases in which the same types of real estate asset management products are exchange items.

Herein, an asset manager 1 was holding land 62, while an asset manager 2 was holding land 61. As a result of completing a direct exchange, the asset manager 1 has been able to take over the land 61 in exchange for assigning the land 62, while at the same time, the asset manager 2 has been able to take over the land 62 in exchange for assigning the land 61.

Similarly, an asset manager 3 and an asset manager 4, an asset manager 5 and an asset manager 6, an asset manager 7 and an asset manager 8, and an asset manager 9 and an asset manager 10 have directly exchanged respectively, a building 64 and a building 63, a compound real estate property 66 and a compound real estate property 65, a real estate-backed security 68 and a real estate-backed security 67, and a real estate investment trust 70 and a real estate investment trust 69.

Figure 8:
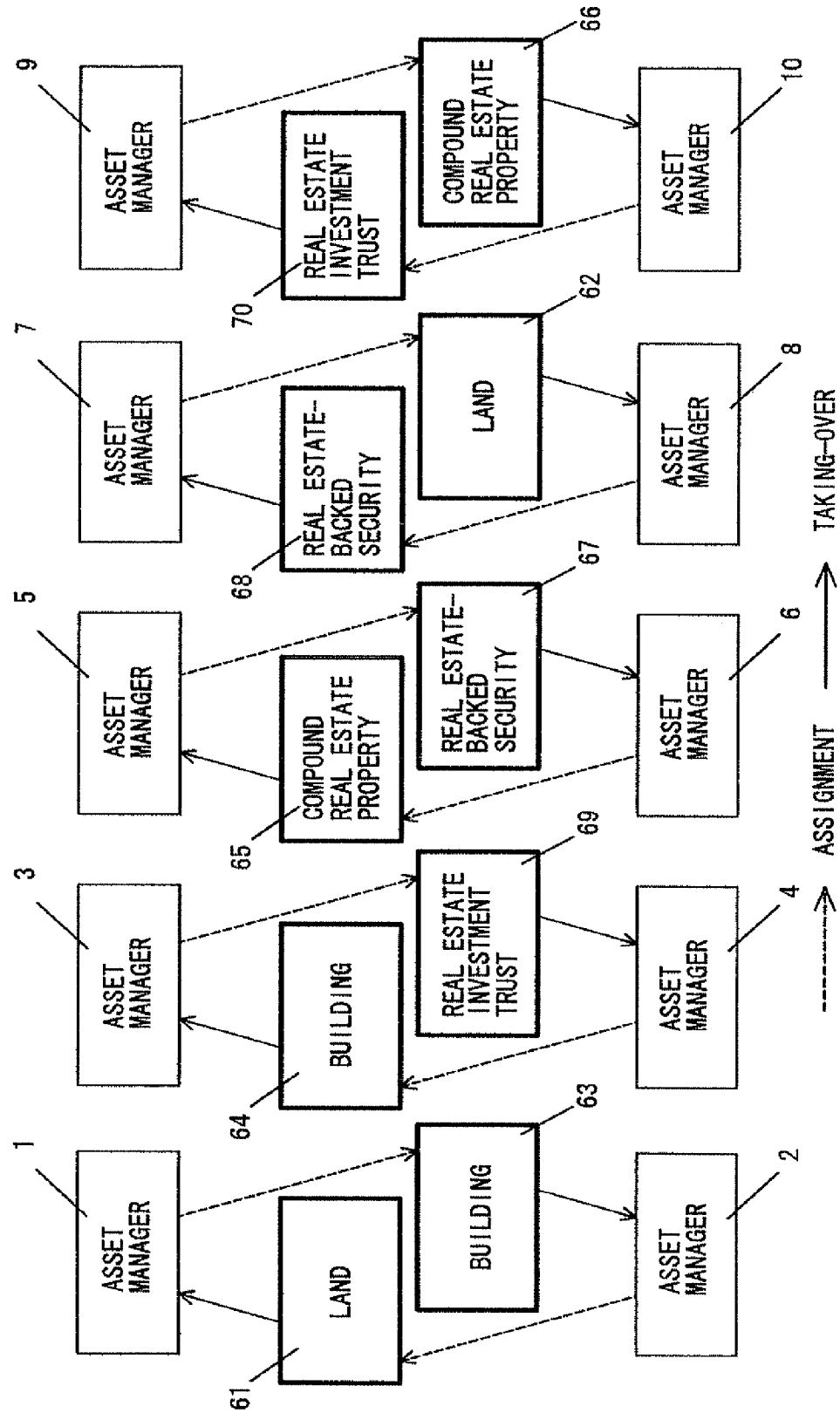
FIG. 8 is another embodiment in accordance with the invention illustrating direct exchanges of asset management products.

FIG. 8 is another embodiment of the direct exchange of asset management products illustrating cases in which different types of real estate asset management products are exchange items.

Herein, an asset manager 1 was holding a building 63, while an asset manager 2 was holding land 61. As a result of completing a direct exchange, the asset manager 1 has been able to take over the land 61 in exchange for assigning the building 63, while at the same time, the asset manager 2 has been able to take over the building 63 in exchange for assigning the land 61.

Similarly, an asset manager 3 and an asset manager 4, an asset manager 5 and an asset manager 6, an asset manager 7 and an asset manager 8, and an asset manager 9 and an asset manager 10 have directly exchanged respectively, a real estate investment trust 69 and a building 64, a real estate-backed security 67 and a compound real estate property 65, land 62 and a real estate-backed security 68, and a compound real estate property 66 and a real estate investment trust 70.

Figure 9:
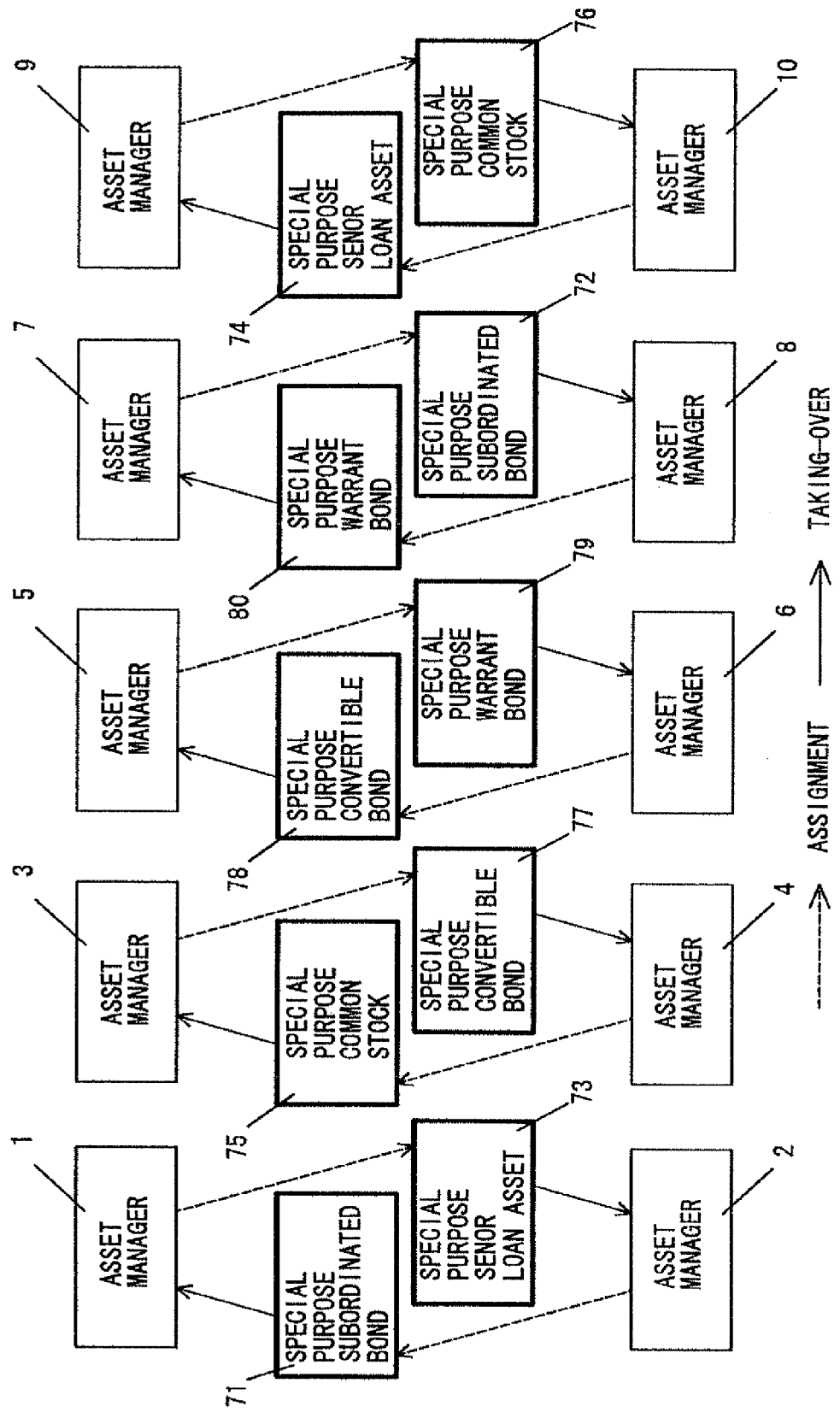
FIG. 9 is another embodiment in accordance with the invention illustrating direct exchanges of asset management products.

FIG. 9 is another embodiment of the direct exchange of asset management products illustrating cases in which different types of real estate-backed products being serviced by an identical special purpose vehicle are exchange items.

Herein, an asset manager 1 was holding a special purpose senior loan asset 73, while an asset manager 2 was holding a special purpose subordinated bond 71. As a result of completing a direct exchange, the asset manager 1 has been able to take over the special purpose subordinated bond 71 in exchange for assigning the special purpose senior loan asset 73, while at the same time, the asset manager 2 has been able to take over the special purpose senior loan asset 73 in exchange for assigning the special purpose subordinated bond 71.

Similarly, an asset manager 3 and an asset manager 4, an asset manager 5 and an asset manager 6, an asset manager 7 and an asset manager 8, and an asset manager 9 and an asset manager 10 have directly exchanged respectively, a special purpose convertible bond 77 and a special purpose common stock 75, a special purpose warrant bond 79 and a special purpose convertible bond 78, a special purpose subordinated bond 72 and a special purpose warrant bond 80, and a special purpose common stock 76 and a special purpose senior loan asset 74.

Figure 10:
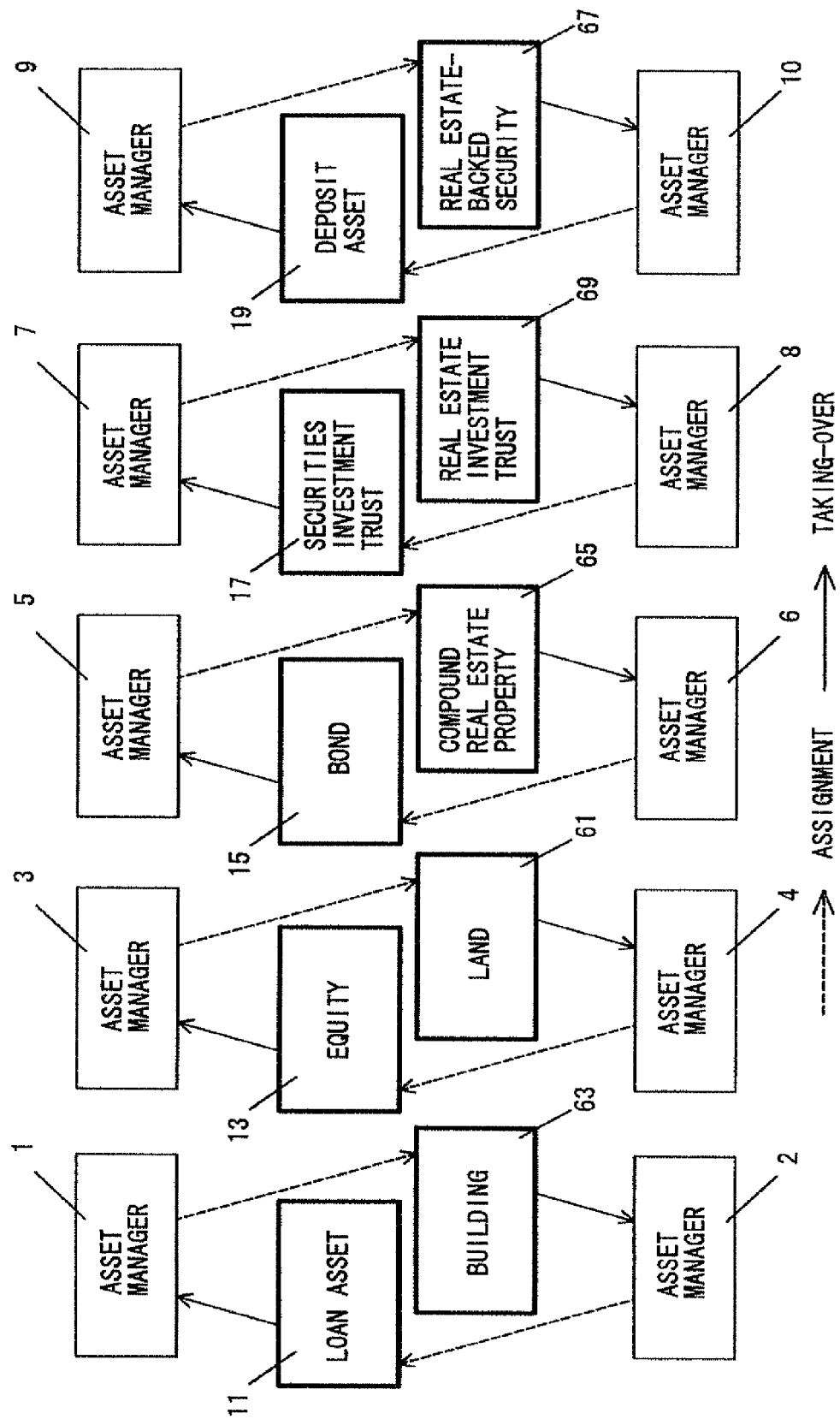
FIG. 10 is another embodiment in accordance with the invention illustrating direct exchanges of asset management products.

FIG. 10 is another embodiment of the direct exchange of asset management products illustrating cases in which different industry products are exchange items.

Herein, an asset manager 1 was holding a building 63, while an asset manager 2 was holding a loan asset 11. As a result of completing a direct exchange, the asset manager 1 has been able to take over the loan asset 11 in exchange for assigning the building 63, while at the same time, the asset manager 2 has been able to take over the building 63 in exchange for assigning the loan asset 11.

Similarly, an asset manager 3 and an asset manager 4, an asset manager 5 and an asset manager 6, an asset manager 7 and an asset manager 8, and an asset manager 9 and an asset manager 10 have directly exchanged respectively, land 61 and an equity 13, a compound real estate property 65 and a bond 15, a real estate investment trust 69 and a securities investment trust 17, and a real estate-backed security 67 and a deposit asset 19.

Figure 11:
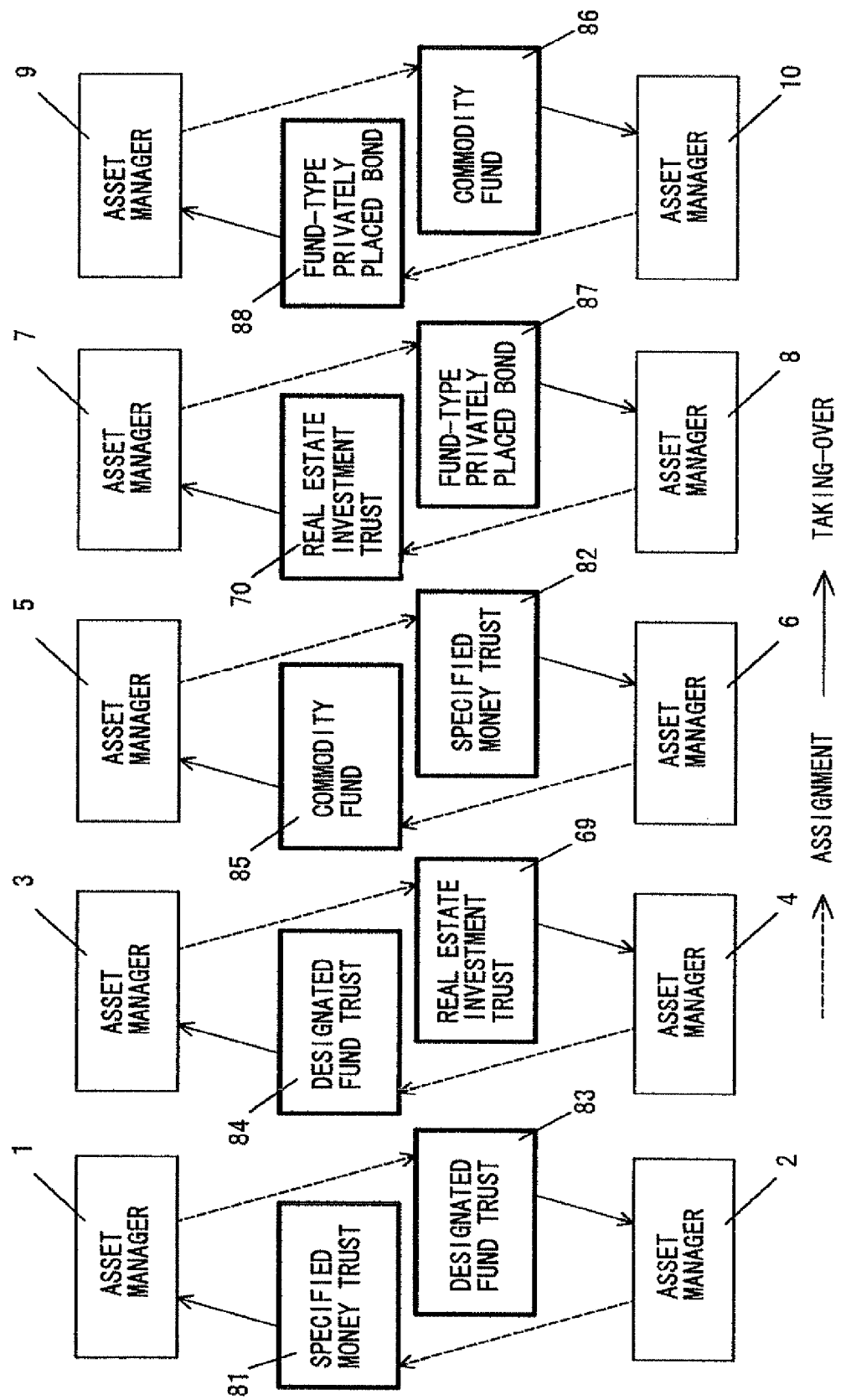
FIG. 11 is another embodiment in accordance with the invention illustrating direct exchanges of asset management products.

FIG. 11 is another embodiment of the direct exchange of asset management products illustrating cases in which fund-type asset management products or investment vehicles of different types or different industries are exchange items.

Herein, an asset manager 1 was holding a designated fund trust 83, while an asset manager 2 was holding a specified money trust 81. As a result of completing a direct exchange, the asset manager 1 has been able to take over the specified money trust 81 in exchange for assigning the designated fund trust 83, while at the same time, the asset manager 2 has been able to take over the designated fund trust 83 in exchange for assigning the specified money trust 81.

Similarly, an asset manager 3 and an asset manager 4, an asset manager 5 and an asset manager 6, an asset manager 7 and an asset manager 8, and an asset manager 9 and an asset manager 10 have directly exchanged respectively, a real estate investment trust 69 and a designated fund trust 84, a specified money trust 82 and a commodity fund 85, a fund-type privately placed bond 87 and a real estate investment trust 70, and a commodity fund 86 and a fund-type privately placed bond 88.

Figure 12:
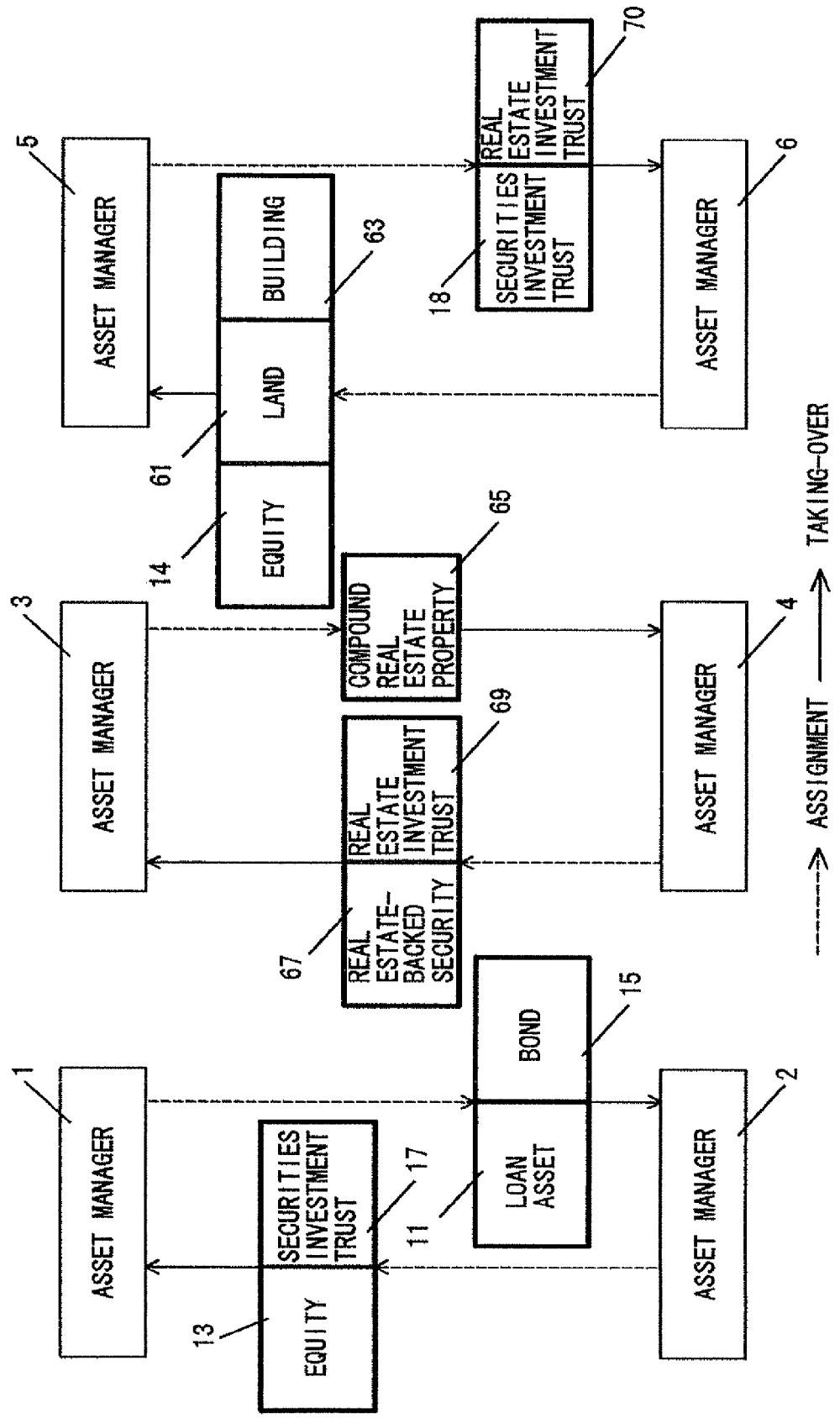
FIG. 12 is another embodiment in accordance with the invention illustrating direct exchanges of asset management products.

FIG. 12 is another embodiment of the direct exchange of asset management products illustrating cases in which products are exchanged by tie-in.

Herein, an asset manager 1 was holding a loan asset 11 and a bond 15, while an asset manager 2 was holding an equity 13 and a securities investment trust 17. As a result of completing a direct exchange, the asset manager 1 has been able to take over 'the equity 13 and the securities investment trust 17' by tie-in in exchange for assigning 'the loan asset 11 and the bond 15' by tie-in, while at the same time, the asset manager 2 has been able to take over 'the loan asset 11 and the bond 15' by tie-in in exchange for assigning 'the equity 13 and the securities investment trust 17' by tie-in.

Similarly, an asset manager 3 and an asset manager 4, and an asset manager 5 and an asset manager 6 have directly exchanged respectively 'a single compound real estate property 65' and 'a tie-in of a real estate-backed security 67 and a real estate investment trust 69,' and 'a tie-in of a securities investment trust 18 and a real estate investment trust 70' and 'a tie-in of an equity 14, land 61 and a building 63.'

Figure 13:
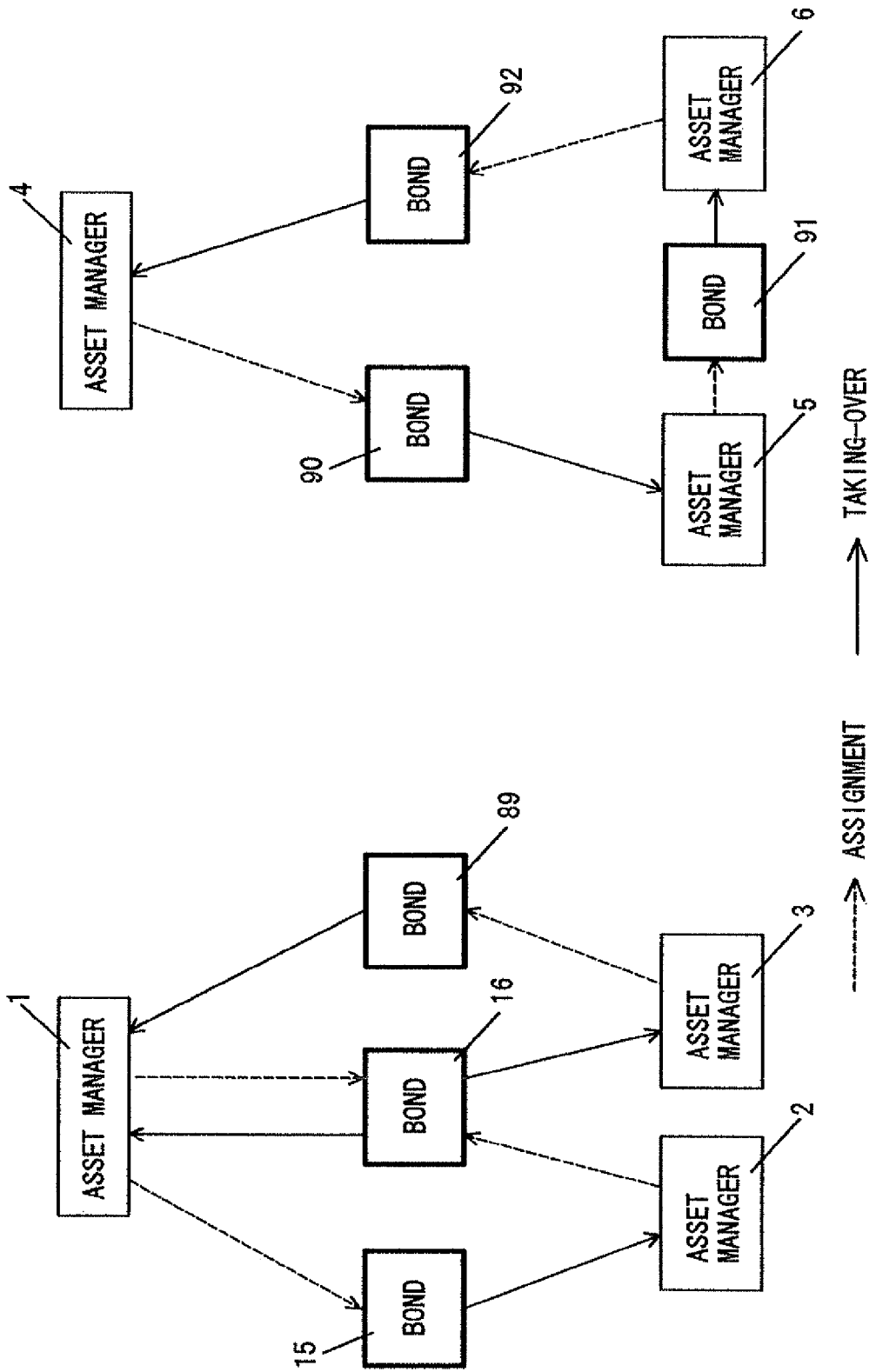
FIG. 13 is another embodiment in accordance with the invention illustrating direct exchanges of asset management products.

FIG. 13 is another embodiment of the direct exchange of asset management products illustrating cases in which products are exchanged among three parties.

In the left view, an asset manager 1 was holding a bond 15, while an asset manager 2 was holding a bond 16. As a result of completing a direct exchange, the asset manager 1 has been able to take over the bond 16 in exchange for assigning the bond 15, while at the same time, the asset manager 2 has been able to take over the bond 15 in exchange for assigning the bond 16.

Next, the asset manager 1, who had taken over the bond 16, has completed a direct exchange with an asset manager 3 that is holding a bond 89. As a result thereof, the asset manager 1 has been able to take over the bond 89 in exchange for assigning the bond 16, while at the same time, the asset manager 3 has been able to take over the bond 16 in exchange for assigning the bond 89.

In the left view, direct exchanges among three parties have been completed through two steps, and yet it is possible to complete them simultaneously in the present embodiment. In the right view, an asset manager 4, an asset manager 5 and an asset manager 6 were respectively holding a bond 90, a bond 91 and a bond 92. As a result of completing a simultaneous direct exchange among the three parties, the asset manager 4 has been able to take over the bond 92 in exchange for assigning the bond 90, the asset manager 5 has been able to take over the bond 90 in exchange for assigning the bond 91, and the asset manager 6 has been able to take over the bond 91 in exchange for assigning the bond 92.

Figure 14:
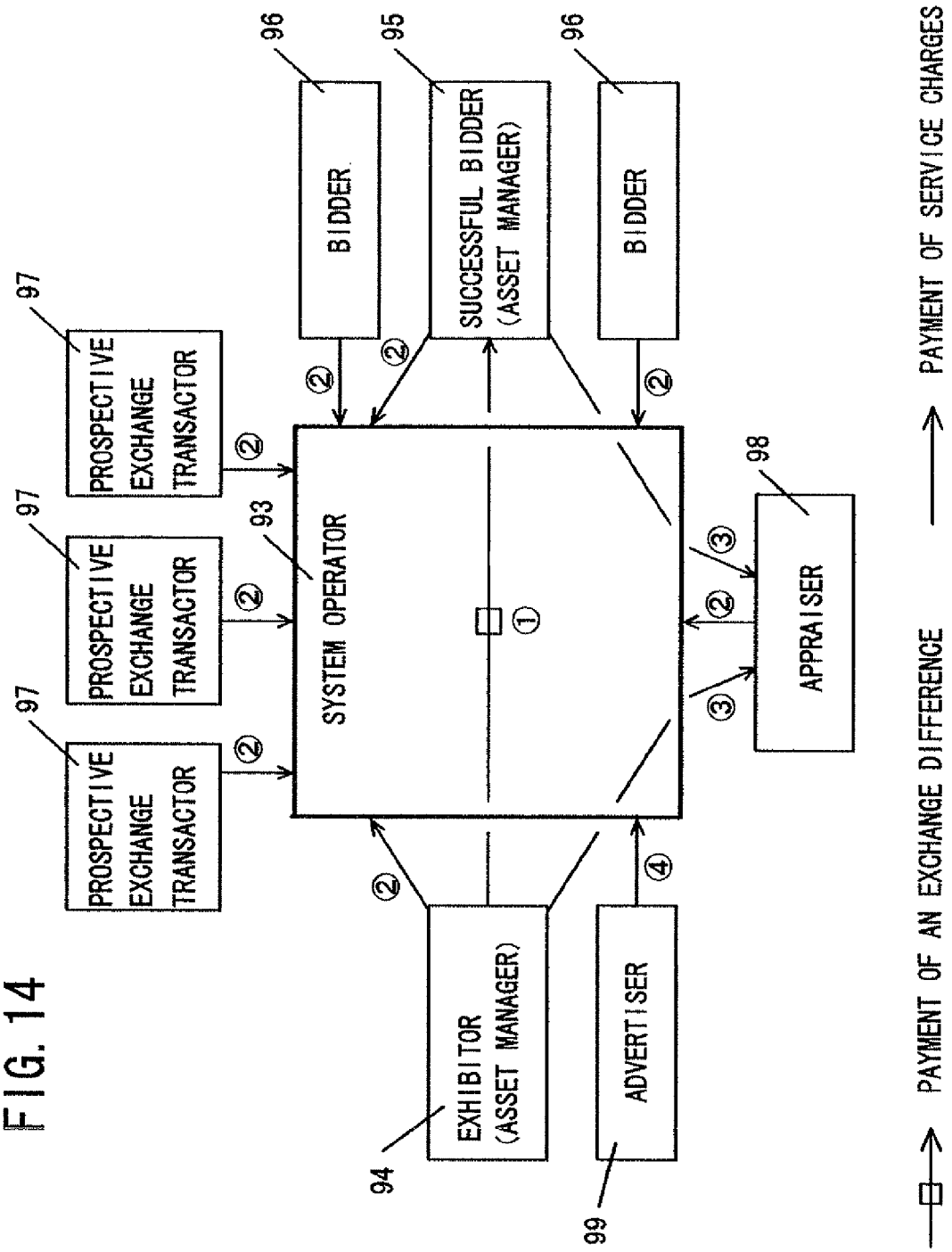
FIG. 14 is a diagram showing an embodiment of the flows of funds and the fee collection scheme in a direct exchange of asset management products.

FIG. 14 is an embodiment of the flows of funds and the fee collection scheme in a direct exchange of asset management products.

In the diagram, ① indicates that, as a result of completing the direct exchange, an exhibitor 94, who is an asset manager, pays an exchange difference to a successful bidder 95, who is also an asset manager.

② indicates that the exhibitor 94, the successful bidder 95, bidders 96, prospective exchange transactors 97 and an appraiser 98 pay service charges, line charges and/or the like to the system operator 93.

③ indicates that the exhibitor 94 and the successful bidder 95 pay appraisal fees to the appraiser 98.

④ indicates that an advertiser 99 pays an advertisement fee for insertion of a banner ad or a pop-up ad to the system operator 93.

Figure 15:
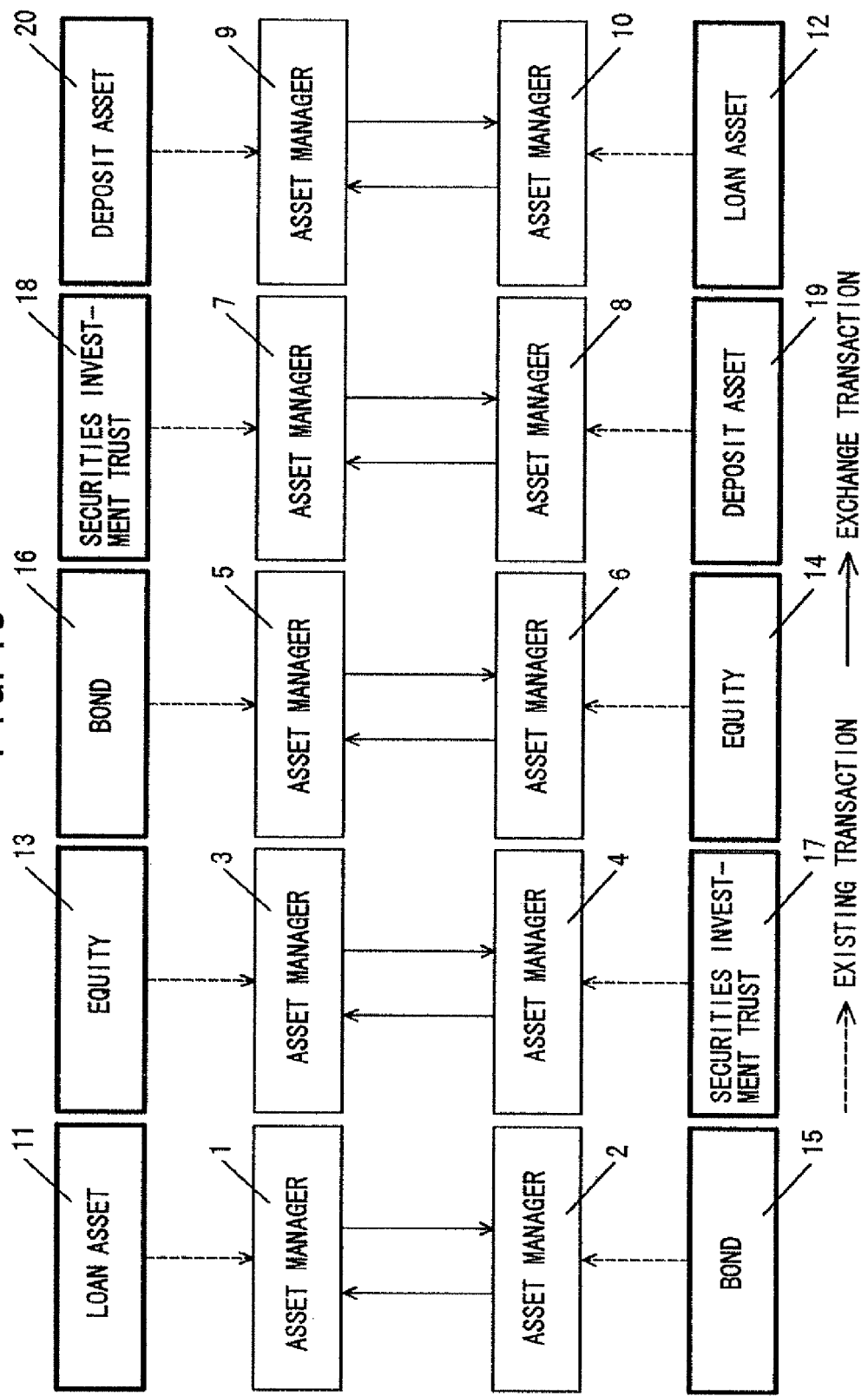
FIG. 15 is another embodiment in accordance with the invention illustrating cash flow exchanges of asset management products.

Next, FIG. 15 is an embodiment of the cash flow exchange of asset management products illustrating cases in which different types of financial asset management products are exchange items.

Herein, an asset manager 1 is holding a loan asset 11, while an asset manager 2 is holding a bond 15. As a result of completing a cash flow exchange, the asset manager 1 has been able to take over the cash inflow arising from the bond 15 in exchange for assigning the cash inflow arising from the loan asset 11, while at the same time, the asset manager 2 has been able to take over the cash inflow arising from the loan asset 11 in exchange for assigning the cash inflow arising from the bond 15.

Similarly, an asset manager 3 and an asset manager 4, an asset manager 5 and an asset manager 6, an asset manager 7 and an asset manager 8, and an asset manager 9 and an asset manager 10 have respectively exchanged a cash inflow arising from an equity 13 and a cash inflow arising from a securities investment trust 17, a cash inflow arising from a bond 16 and a cash inflow arising from an equity 14, a cash inflow arising from a securities investment trust 18 and a cash inflow arising from a deposit asset 19, and a cash inflow arising from a deposit asset 20 and a cash inflow arising from a loan asset 12.

Figure 16:
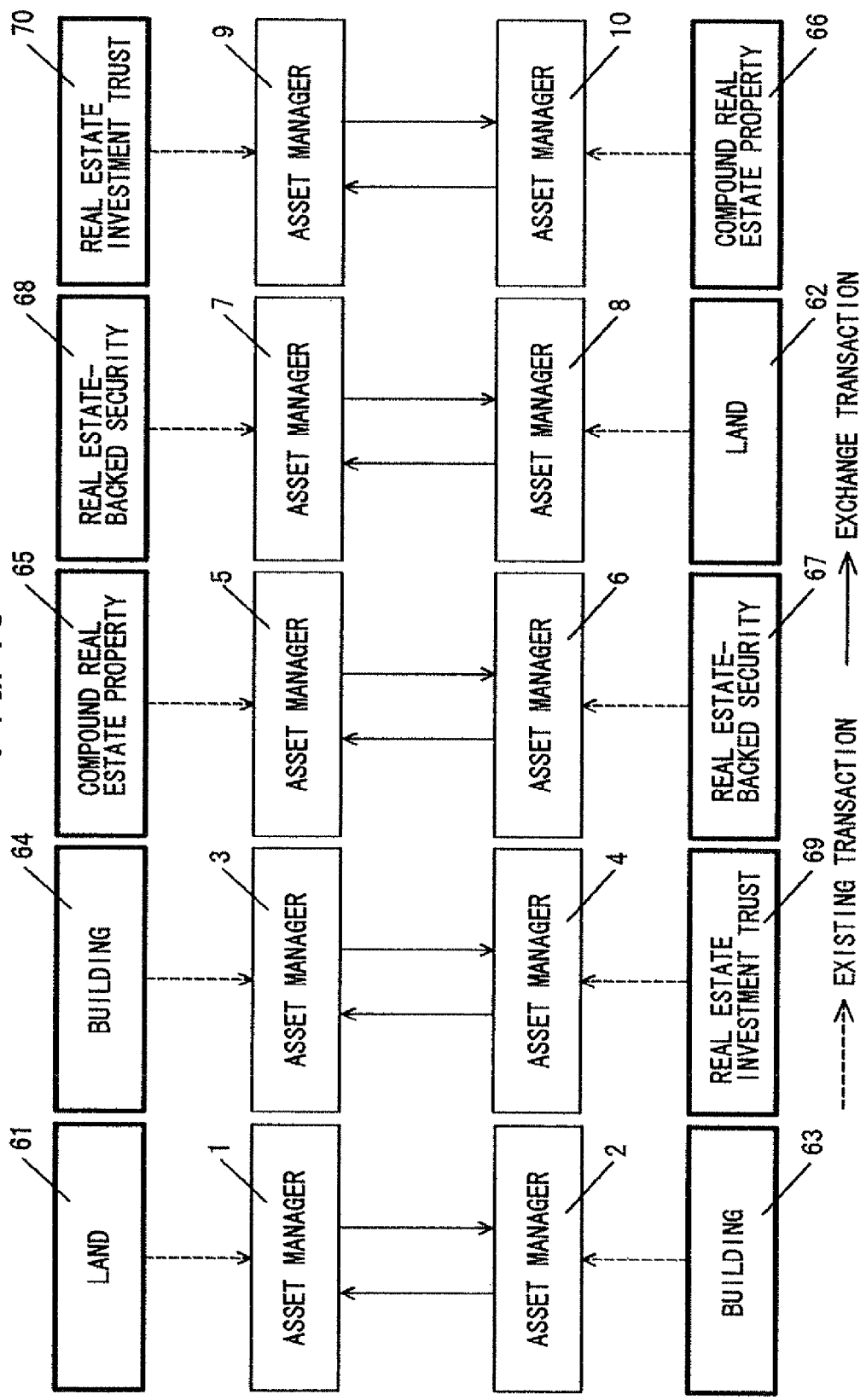
FIG. 16 is another embodiment in accordance with the invention illustrating cash flow exchanges of asset management products.

FIG. 16 is another embodiment of the cash flow exchange of asset management products illustrating cases in which different types of real estate asset management products are exchange items.

Herein, an asset manager 1 is holding land 61, while an asset manager 2 is holding a building 63. As a result of completing a cash flow exchange, the asset manager 1 has been able to take over the cash inflow arising from the building 63 in exchange for assigning the cash inflow arising from the land 61, while at the same time, the asset manager 2 has been able to take over the cash inflow arising from the land 61 in exchange for assigning the cash inflow arising from the building 63.

Similarly, an asset manager 3 and an asset manager 4, an asset manager 5 and an asset manager 6, an asset manager 7 and an asset manager 8, and an asset manager 9 and an asset manager 10 have respectively exchanged a cash inflow arising from a building 64 and a cash inflow arising from a real estate investment trust 69, a cash inflow arising from a compound real estate property 65 and a cash inflow arising from a real estate-backed security 67, a cash inflow arising from a real estate-backed security 68 and a cash inflow arising from land 62, and a cash inflow arising from a real estate investment trust 70 and a cash inflow arising from a compound real estate property 66.

Figure 17:
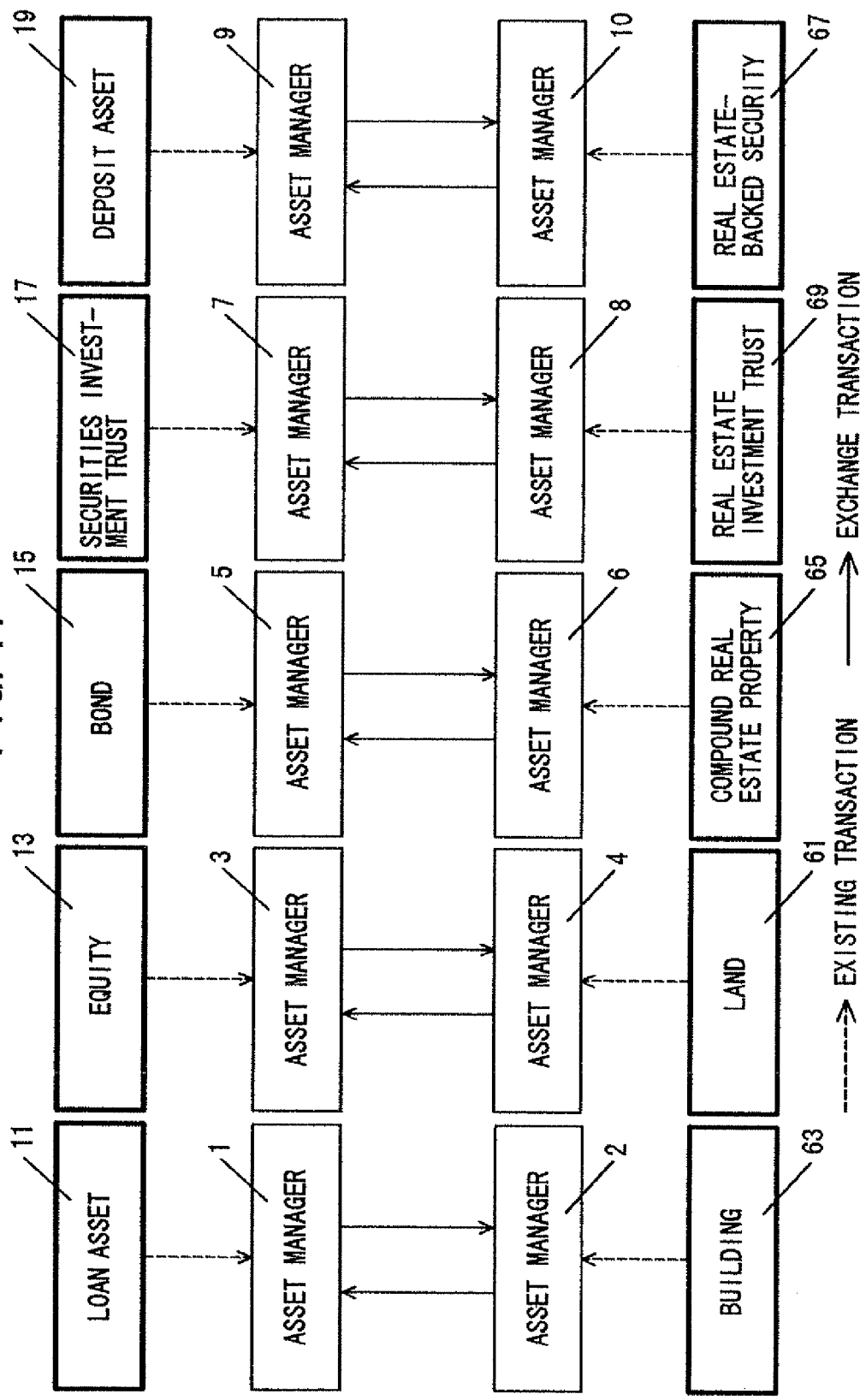
FIG. 17 is another embodiment in accordance with the invention illustrating cash flow exchanges of asset management products.

FIG. 17 is another embodiment of the cash flow exchange of asset management products illustrating cases in which different industry products are exchange items.

Herein, an asset manager 1 is holding a loan asset 11, while an asset manager 2 is holding a building 63. As a result of completing a cash flow exchange, the asset manager 1 has been able to take over the cash inflow arising from the building 63 in exchange for assigning the cash inflow arising from the loan asset 11, while at the same time, the asset manager 2 has been able to take over the cash inflow arising from the loan asset 11 in exchange for assigning the cash inflow arising from the building 63.

Similarly, an asset manager 3 and an asset manager 4, an asset manager 5 and an asset manager 6, an asset manager 7 and an asset manager 8, and an asset manager 9 and an asset manager 10 have respectively exchanged a cash inflow arising from an equity 13 and a cash inflow arising from land 61, a cash inflow arising from a bond 15 and a cash inflow arising from a compound real estate property 65, a cash inflow arising from a securities investment trust 17 and a cash inflow arising from a real estate investment trust 69, and a cash inflow arising from a deposit asset 19 and a cash inflow arising from a real estate-backed security 67.

Figure 18:
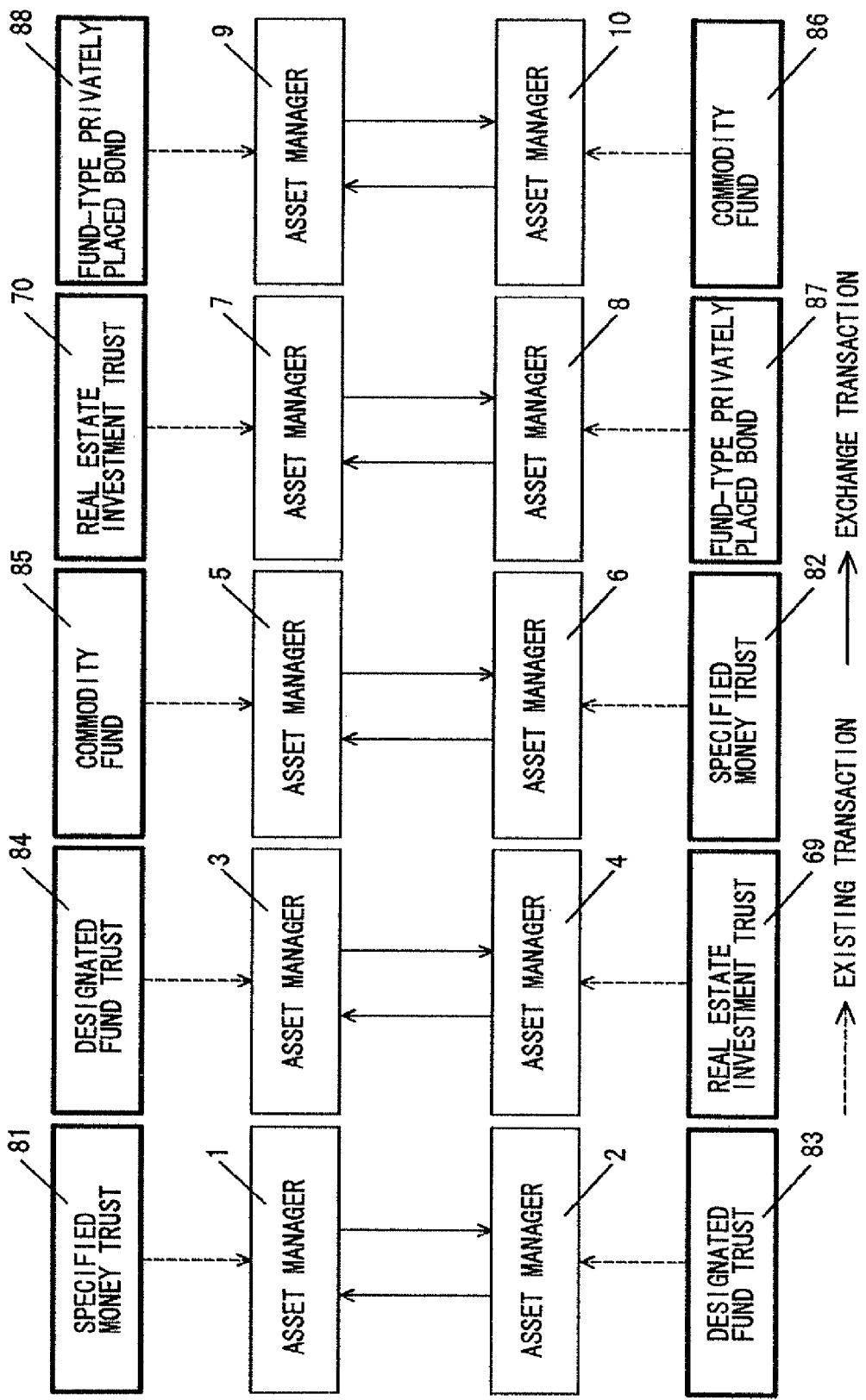
FIG. 18 is another embodiment in accordance with the invention illustrating cash flow exchanges of asset management products.

FIG. 18 is another embodiment of the cash flow exchange of asset management products illustrating cases in which fund-type asset management products or investment vehicles of different types or different industries are exchange items.

Herein, an asset manager 1 is holding a specified money trust 81, while an asset manager 2 is holding a designated fund trust 83. As a result of completing a cash flow exchange, the asset manager 1 has been able to take over the cash inflow arising from the designated fund trust 83 in exchange for assigning the cash inflow arising from the specified money trust 81, while at the same time, the asset manager 2 has been able to take over the cash inflow arising from the specified money trust 81 in exchange for assigning the cash inflow arising from the designated fund trust 83.

Similarly, an asset manager 3 and an asset manager 4, an asset manager 5 and an asset manager 6, an asset manager 7 and an asset manager 8, and an asset manager 9 and an asset manager 10 have respectively exchanged a cash inflow arising from a designated fund trust 84 and a cash inflow arising from a real estate investment trust 69, a cash inflow arising from a commodity fund 85 and a cash inflow arising from a specified money trust 82, a cash inflow arising from a real estate investment trust 70 and a cash inflow arising from a fund-type privately placed bond 87, and a cash inflow arising from a fund-type privately placed bond 88 and a cash inflow arising from a commodity fund 86.

Figure 19:
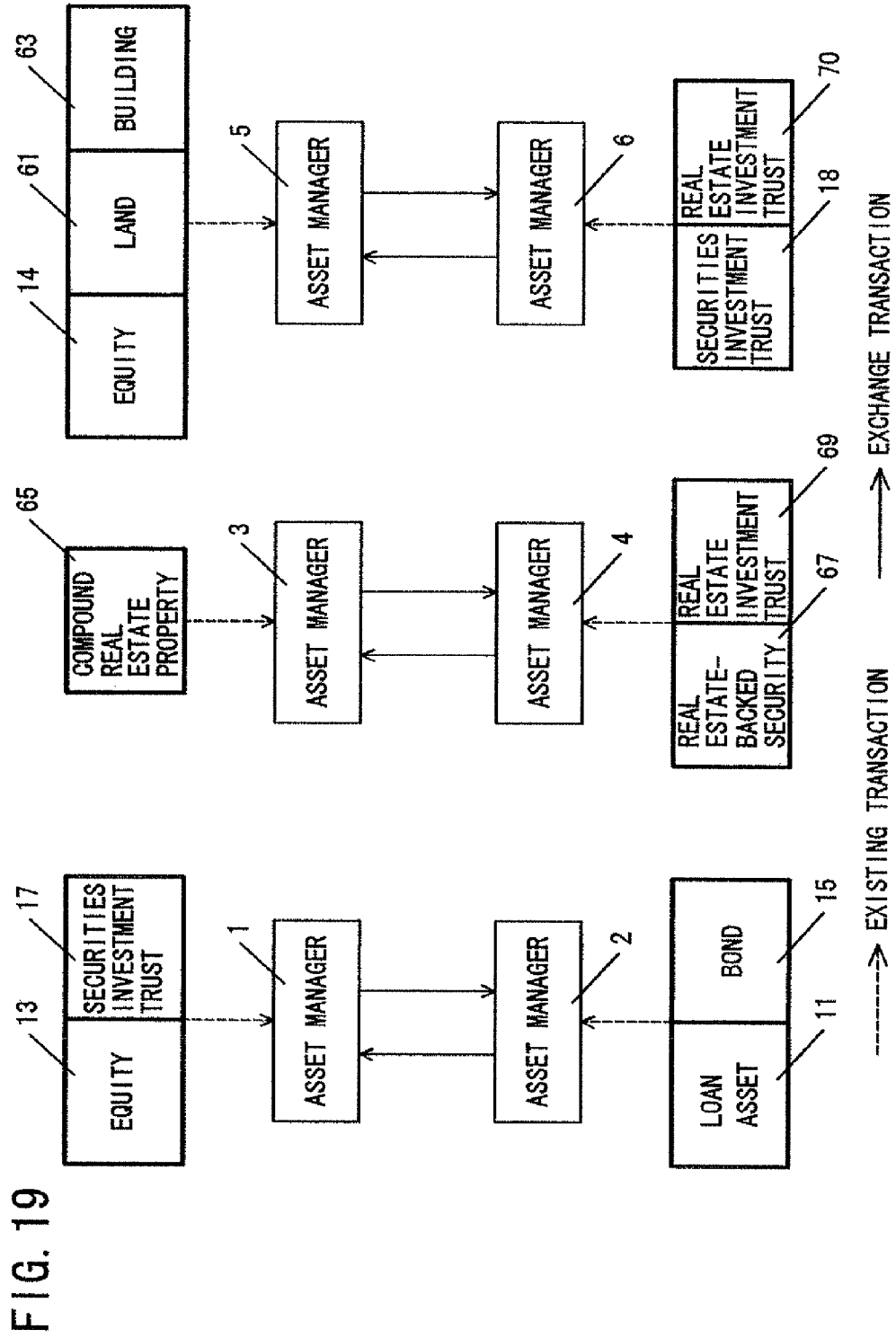
FIG. 19 is another embodiment in accordance with the invention illustrating cash flow exchanges of asset management products.

FIG. 19 is another embodiment of the cash flow exchange of asset management products illustrating cases in which cash flows of products are exchanged by tie-in.

Herein, an asset manager 1 is holding an equity 13 and a securities investment trust 17, while an asset manager 2 is holding a loan asset 11 and a bond 15. As a result of completing a cash flow exchange, the asset manager 1 has been able to take over 'the cash inflows arising from the loan asset 11 and the bond 15' by tie-in in exchange for assigning 'the cash inflows arising from the equity 13 and the securities investment trust 17' by tie-in, while at the same time, the asset manager 2 has been able to take over 'the cash inflows arising from the equity 13 and the securities investment trust 17' by tie-in in exchange for assigning 'the cash inflows arising from the loan asset 11 and the bond 15 by tie-in.'

Similarly, an asset manager 3 and an asset manager 4, and an asset manager 5 and an asset manager 6 have respectively exchanged 'a single cash inflow arising from a compound real estate property 65' and 'a tie-in of cash inflows arising from a real estate-backed security 67 and a real estate investment trust 69,' and 'a tie-in of cash inflows arising from an equity 14, land 61 and a building 63' and 'a tie-in of cash inflows arising from a securities investment trust 18 and a real estate investment trust 70.'

Figure 20:
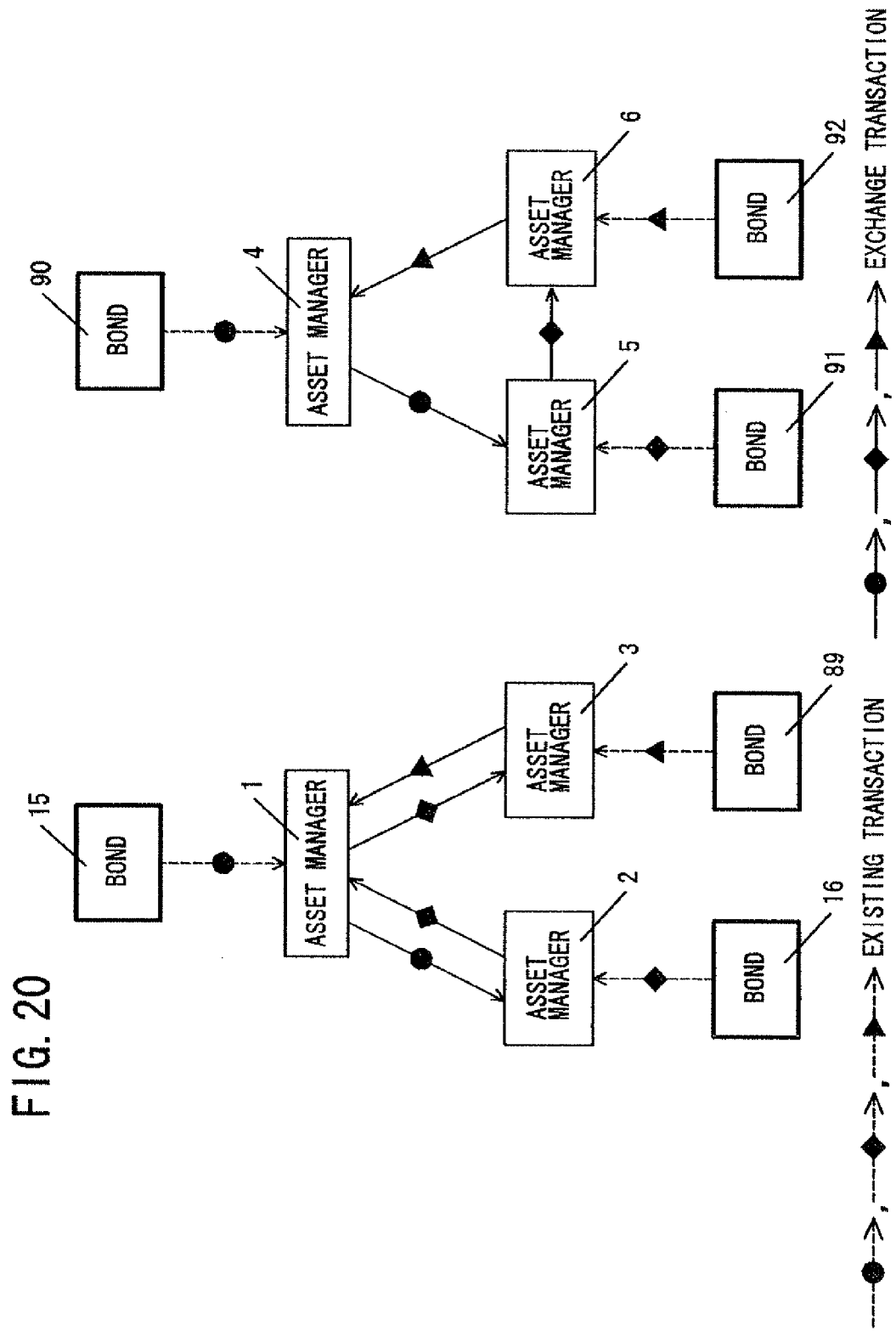
FIG. 20 is another embodiment in accordance with the invention illustrating cash flow exchanges of asset management products.

FIG. 20 is another embodiment of the cash flow exchange of asset management products illustrating cases in which cash flows of products are exchanged among three parties.

In the left view, an asset manager 1 is holding a bond 15, while an asset manager 2 is holding a bond 16. As a result of completing a cash flow exchange, the asset manager 1 has been able to take over the cash inflow arising from the bond 16 in exchange for assigning the cash inflow arising from the bond 15, while at the same time, the asset manager 2 has been able to take over the cash inflow arising from the bond 15 in exchange for assigning the cash inflow arising from the bond 16.

Next, the asset manager 1, who had taken over the cash inflow arising from the bond 16, has completed a cash flow exchange with an asset manager 3 that is holding a bond 89. As a result thereof, the asset manager 1 has been able to take over the cash inflow arising from the bond 89 in exchange for assigning the cash inflow arising from the bond 16, while at the same time, the asset manager 3 has been able to take over the cash inflow arising from the bond 16 in exchange for assigning the cash inflow arising from the bond 89.

In the left view, cash flow exchanges among three parties have been completed through two steps, and yet it is possible to complete them simultaneously in the present embodiment. In the right view, an asset manager 4, an asset manager 5 and an asset manager 6 are respectively holding a bond 90, a bond 91 and a bond 92. As a result of completing a simultaneous exchange of cash flows among the three parties, the asset manager 4 has been able to take over the cash inflow arising from the bond 92 in exchange for assigning the cash inflow arising from the bond 90, the asset manager 5 has been able to take over the cash inflow arising from the bond 90 in exchange for assigning the cash inflow arising from the bond 91, and the asset manager 6 has been able to take over the cash inflow arising from the bond 91 in exchange for assigning the cash inflow arising from the bond 92.

Figure 21:
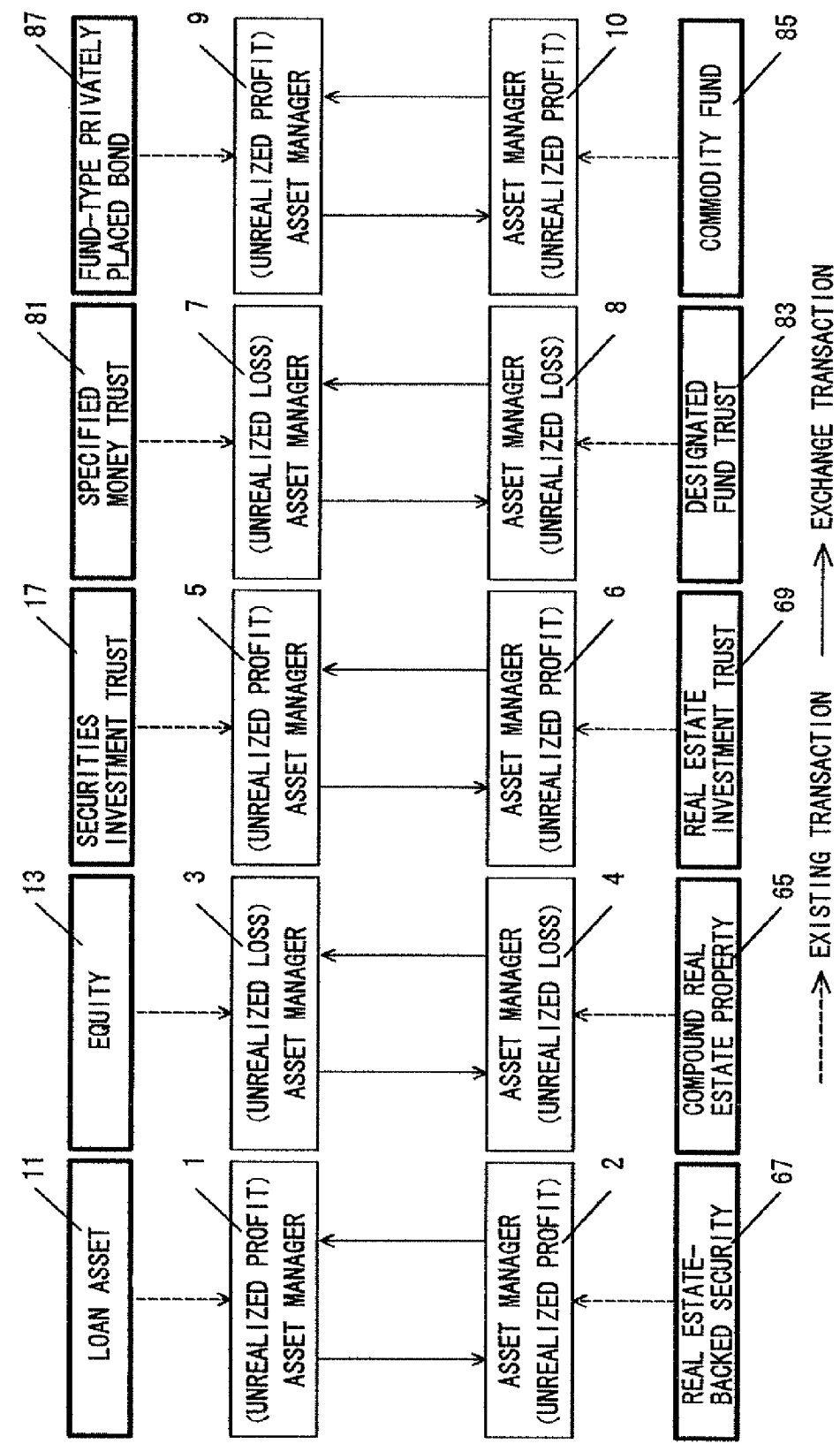
FIG. 21 is another embodiment in accordance with the invention illustrating cash flow exchanges of asset management products.

FIG. 21 is another embodiment of the cash flow exchange of asset management products illustrating cases in which unrealized profits or losses of different type products or different industry products are exchanged.

Herein, an asset manager 1 is holding a loan asset 11, while an asset manager 2 is holding a real estate-backed security 67. As a result of completing a cash flow exchange of unrealized profit parts, the asset manager 1 has been able to take over the unrealized profit of the real estate-backed security 67 in exchange for assigning the unrealized profit of the loan asset 11, while at the same time, the asset manager 2 has been able to take over the unrealized profit of the loan asset 11 in exchange for assigning the unrealized profit of the real estate-backed security 67.

Similarly, through respective cash flow exchanges, an asset manager 3 and an asset manager 4, an asset manager 5 and an asset manager 6, an asset manager 7 and an asset manager 8, and an asset manager 9 and an asset manager 10 have exchanged an unrealized loss of an equity 13 and an unrealized loss of a compound real estate property 65, an unrealized profit of a securities investment trust 17 and an unrealized profit of a real estate investment trust 69, an unrealized loss of a specified money trust 81 and an unrealized loss of a designated fund trust 83, and an unrealized profit of a fund-type privately placed bond 87 and an unrealized profit of a commodity fund 85.

Figure 22:
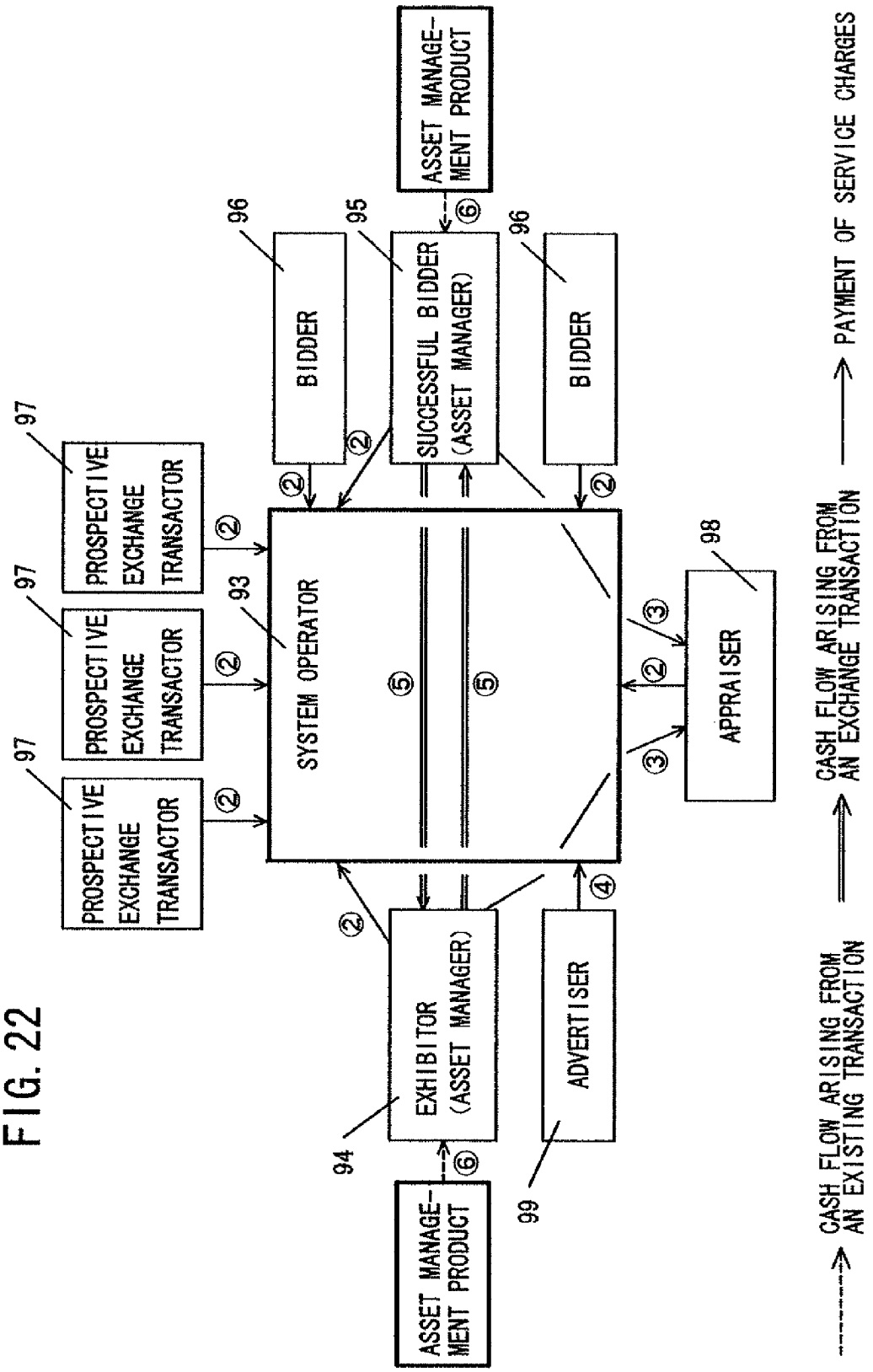
FIG. 22 is a diagram showing an embodiment of the flows of funds and the fee collection scheme in a cash flow exchange of asset management products.

FIG. 22 is an embodiment of the flows of funds and the fee collection scheme in a cash flow exchange of asset management products.

In the diagram, ② indicates that an exhibitor 94, who is an asset manager, a successful bidder 95, who is also an asset manager, bidders 96, prospective exchange transactors 97 and an appraiser 98 pay service charges, line charges and/or the like to the system operator 93.

③ indicates that the exhibitor 94 and the successful bidder 95 pay appraisal fees to the appraiser 98.

④ indicates that an advertiser 99 pays an advertisement fee for insertion of a banner ad or a pop-up ad to the system operator 93.

⑤ indicates that, as a result of completing the cash flow exchange, payment and receipt of an exchange difference and the cash inflows arising from asset management products are executed between the exhibitor 94 and the successful bidder 95.

⑥ indicates the existing cash inflows that the exhibitor 94 and the successful bidder 95 are respectively receiving from the asset management products.

Figure 23:
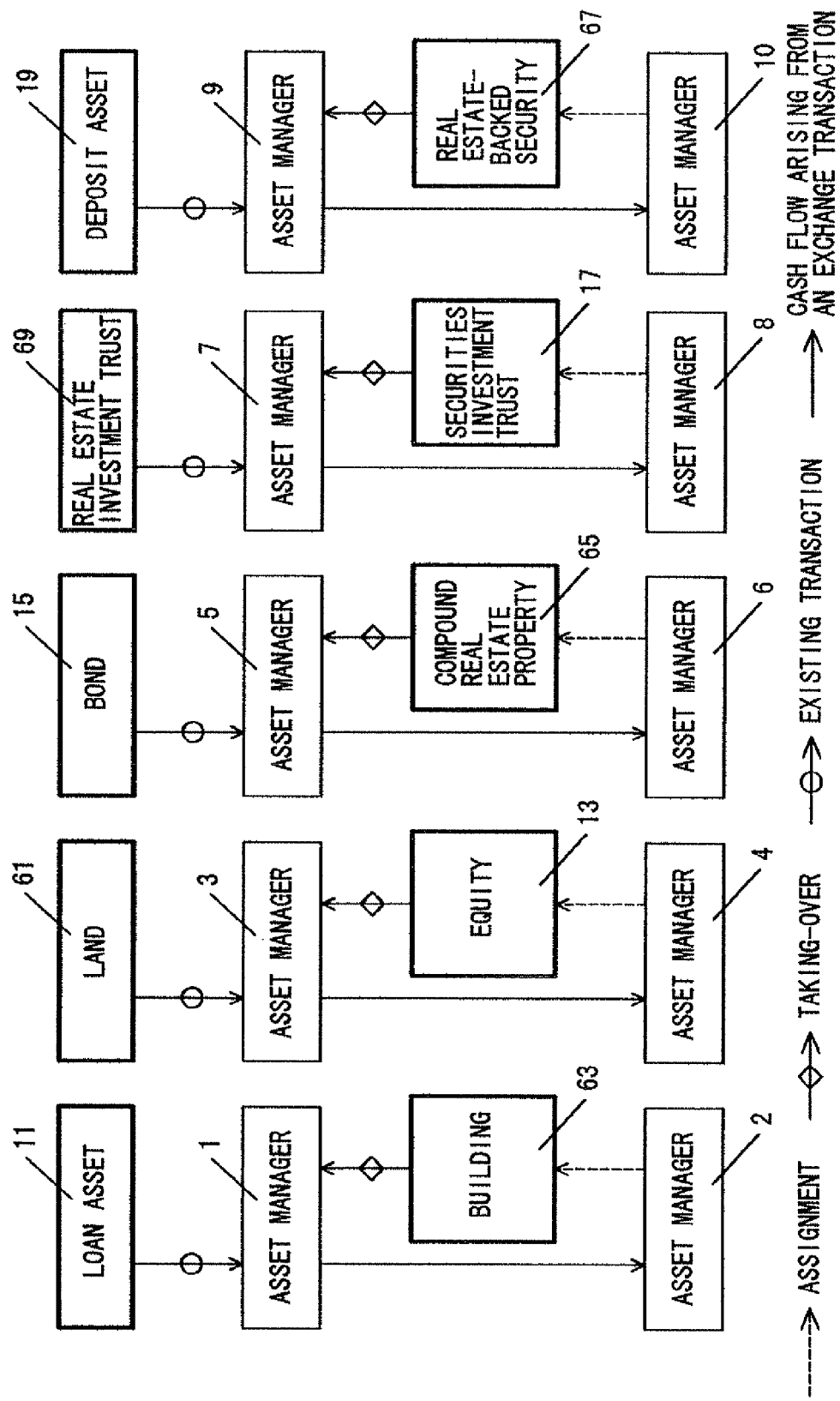
FIG. 23 is another embodiment in accordance with the invention illustrating exchange transactions of asset management products by the compromise method.

Furthermore, FIG. 23 is an embodiment of the exchange transaction of asset management products by the compromise method between the direct exchange and the cash flow exchange illustrating cases in which different industry products are exchange items.

Herein, an asset manager 1 is holding a loan asset 11, while an asset manager 2 was holding a building 63. As a result of completing an exchange by the compromise method between the cash flow exchange and the direct exchange, the asset manager 1 has been able to directly take over the building 63 in exchange for assigning the cash inflow arising from the loan asset 11, while at the same time, the asset manager 2 has been able to take over the cash inflow arising from the loan asset 11 in exchange for directly assigning the building 63.

Similarly, an asset manager 3 and an asset manager 4, an asset manager 5 and an asset manager 6, an asset manager 7 and an asset manager 8, and an asset manager 9 and an asset manager 10 have respectively exchanged by the compromise method between the cash flow exchange and the direct exchange, a cash inflow arising from land 61 and an equity in kind 13, a cash inflow arising from a bond 15 and a compound real estate property in kind 65, a cash inflow arising from a real estate investment trust 69 and a securities investment trust in kind 17, and a cash inflow arising from a deposit asset 19 and a real estate-backed security in kind 67.

Figure 24:
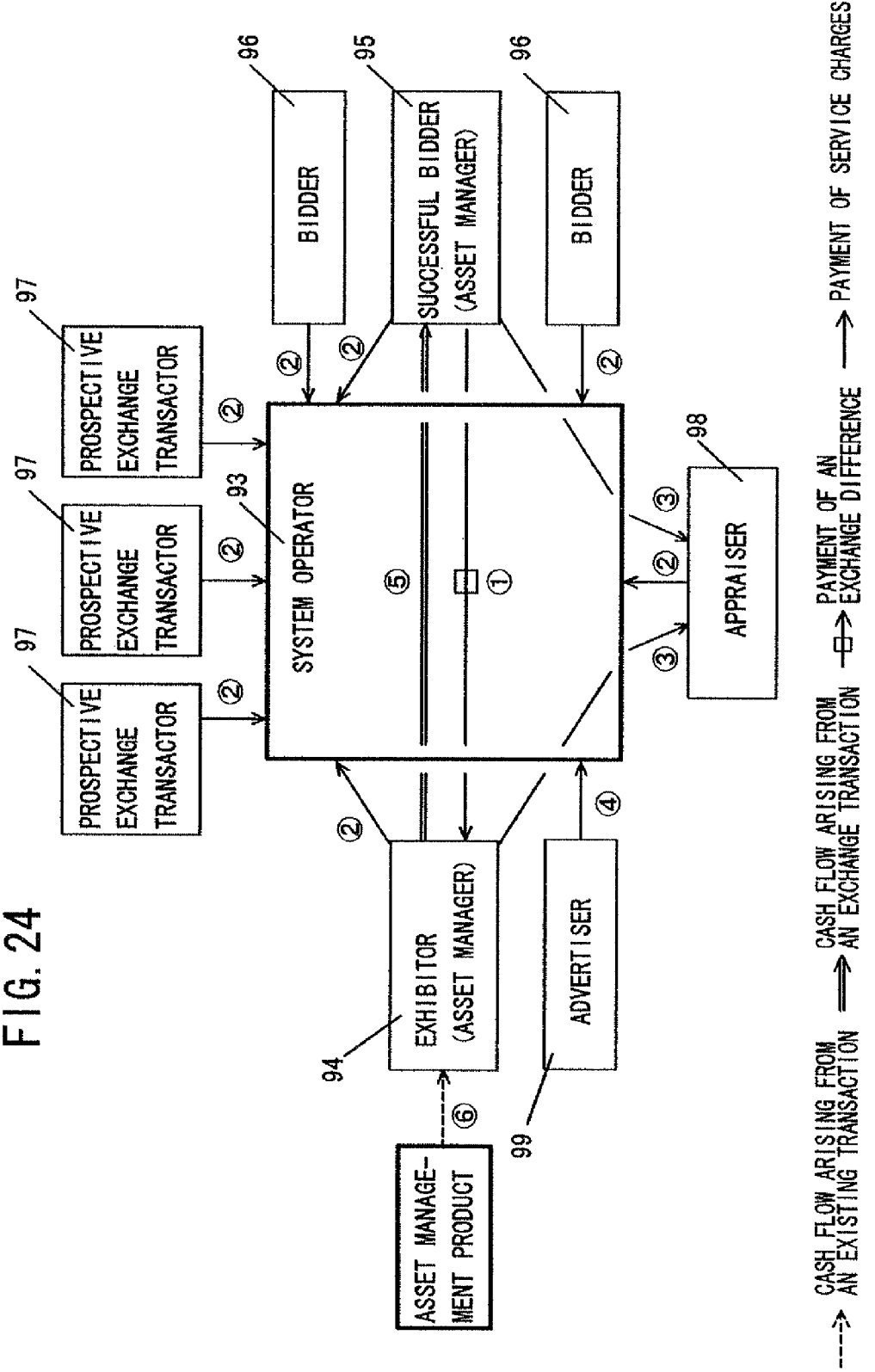
FIG. 24 is a diagram showing an embodiment of the flows of funds and the fee collection scheme in an exchange transaction of asset management products by the compromise method.

FIG. 24 is an embodiment of the flows of funds and the fee collection scheme in an exchange transaction of asset management products by the compromise method between the direct exchange and the cash flow exchange.

In the diagram, ① indicates that, as a result of completing the exchange transaction, a successful bidder 95, who is an asset manager, pays an exchange difference to an exhibitor 94, who is also an asset manager.

② indicates that the exhibitor 94, the successful bidder 95, bidders 96, prospective exchange transactors 97 and an appraiser 98 pay service charges, line charges and/or the like to the system operator 93.

③ indicates that the exhibitor 94 and the successful bidder 95 pay appraisal fees to the appraiser 98.

④ indicates that an advertiser 99 pays an advertisement fee for insertion of a banner ad or a pop-up ad to the system operator 93.

⑤ indicates that, as a result of completing the exchange transaction, the exhibitor 94 provides the successful bidder 95 with the cash inflow arising from an asset management product.

⑥ indicates the existing cash inflow that the exhibitor 94 is receiving from the asset management product.

Figure 25:
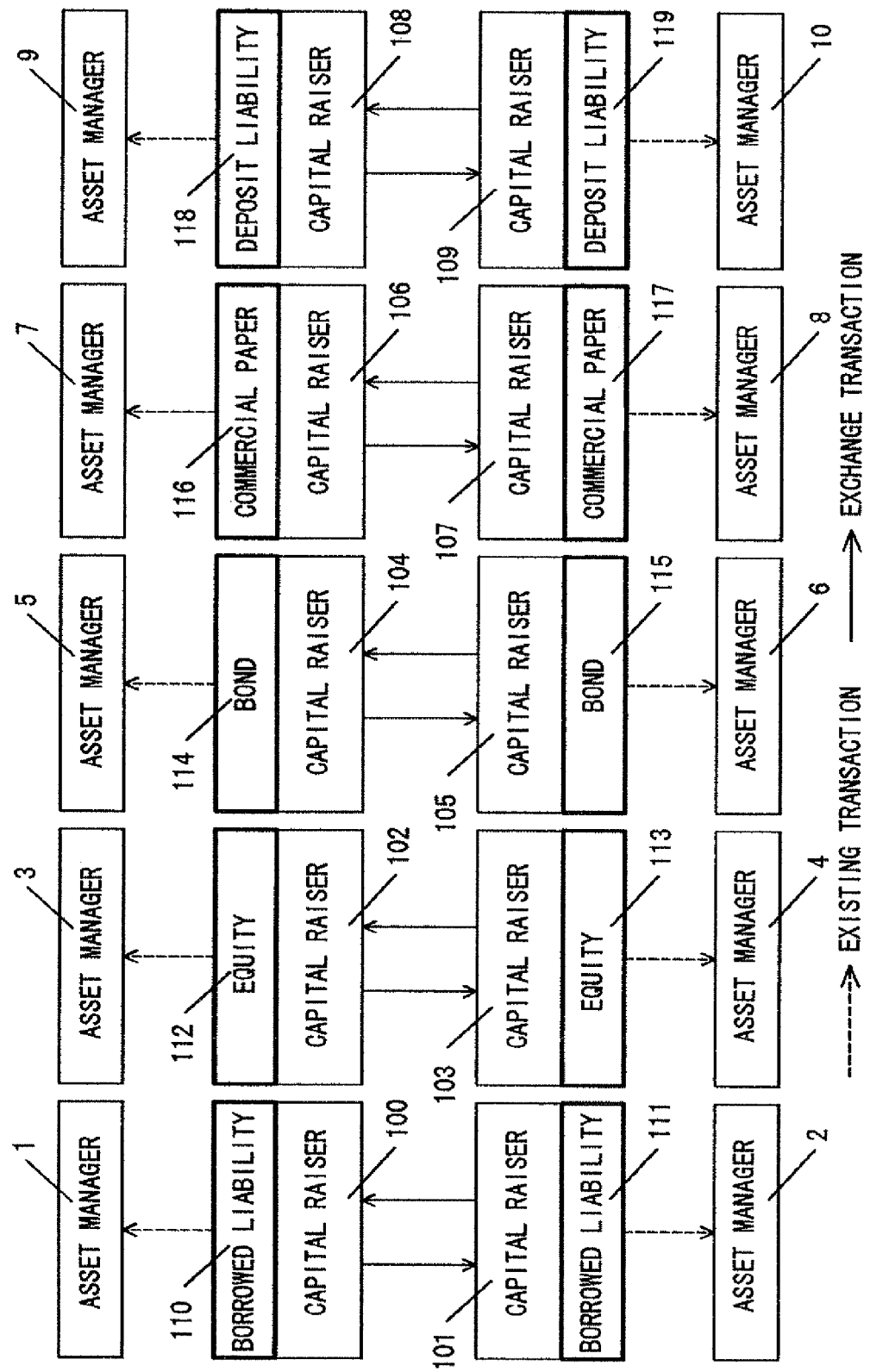
FIG. 25 is another embodiment in accordance with the invention illustrating cash flow exchanges of capital raising products.

Also, FIG. 25 is an embodiment of the cash flow exchange of capital raising products illustrating cases in which the same types of financial capital raising products are exchange items.

Herein, a capital raiser 100 is servicing a borrowed liability 110 from an asset manager 1, while a capital raiser 101 is servicing a borrowed liability 111 from an asset manager 2. As a result of completing a cash flow exchange, the capital raiser 100 has been able to pass on the cash outflow arising from the borrowed liability 110 in exchange for assuming the cash outflow arising from the borrowed liability 111, while at the same time, the capital raiser 101 has been able to pass on the cash outflow arising from the borrowed liability 111 in exchange for assuming the cash outflow arising from the borrowed liability 110.

Similarly, a capital raiser 102 and a capital raiser 103, a capital raiser 104 and a capital raiser 105, a capital raiser 106 and a capital raiser 107, and a capital raiser 108 and a capital raiser 109 have respectively exchanged 'a cash outflow arising from an equity 112 being held by an asset manager 3' and 'a cash outflow arising from an equity 113 being held by an asset manager 4,' 'a cash outflow arising from a bond 114 being held by an asset manager 5' and 'a cash outflow arising from a bond 115 being held by an asset manager 6,' 'a cash outflow arising from a commercial paper 116 being held by an asset manager 7' and 'a cash outflow arising from a commercial paper 117 being held by an asset manager 8,' and 'a cash outflow arising from a deposit liability 118 from an asset manager 9' and 'a cash outflow arising from a deposit liability 119 from an asset manager 10.'

Additionally, in drawings of some embodiments of the present invention, any number of asset managers, depending on the actual product, may be acting as a counterparty for an existing position of a capital raiser that becomes an exchanging party.

Figure 26:
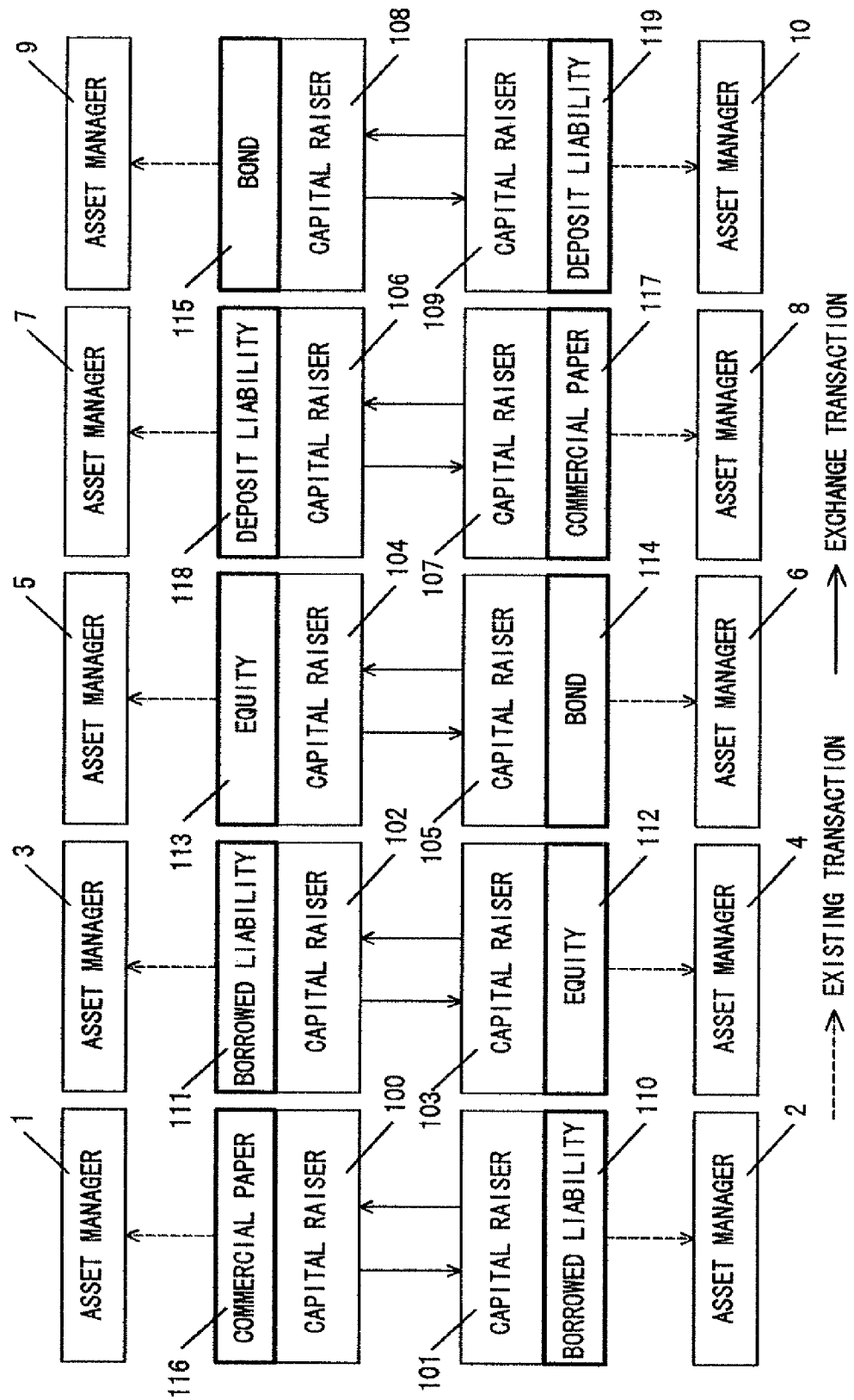
FIG. 26 is another embodiment in accordance with the invention illustrating cash flow exchanges of capital raising products.

FIG. 26 is another embodiment of the cash flow exchange of capital raising products illustrating cases in which different types of financial capital raising products are exchange items.

Herein, a capital raiser 100 is servicing a commercial paper 116 being held by an asset manager 1, while a capital raiser 101 is servicing a borrowed liability 110 from an asset manager 2. As a result of completing a cash flow exchange, the capital raiser 100 has been able to pass on the cash outflow arising from the commercial paper 116 in exchange for assuming the cash outflow arising from the borrowed liability 110, while at the same time, the capital raiser 101 has been able to pass on the cash outflow arising from the borrowed liability 110 in exchange for assuming the cash outflow arising from the commercial paper 116.

Similarly, a capital raiser 102 and a capital raiser 103, a capital raiser 104 and a capital raiser 105, a capital raiser 106 and a capital raiser 107, and a capital raiser 108 and a capital raiser 109 have respectively exchanged 'a cash outflow arising from a borrowed liability 111 from an asset manager 3' and 'a cash outflow arising from an equity 112 being held by an asset manager 4,' 'a cash outflow arising from an equity 113 being held by an asset manager 5' and 'a cash outflow arising from a bond 114 being held by an asset manager 6,' 'a cash outflow arising from a deposit liability 118 from an asset manager 7' and 'a cash outflow arising from a commercial paper 117 being held by an asset manager 8,' and 'a cash outflow arising from a bond 115 being held by an asset manager 9' and 'a cash outflow arising from a deposit liability 119 from an asset manager 10.'

Figure 27:
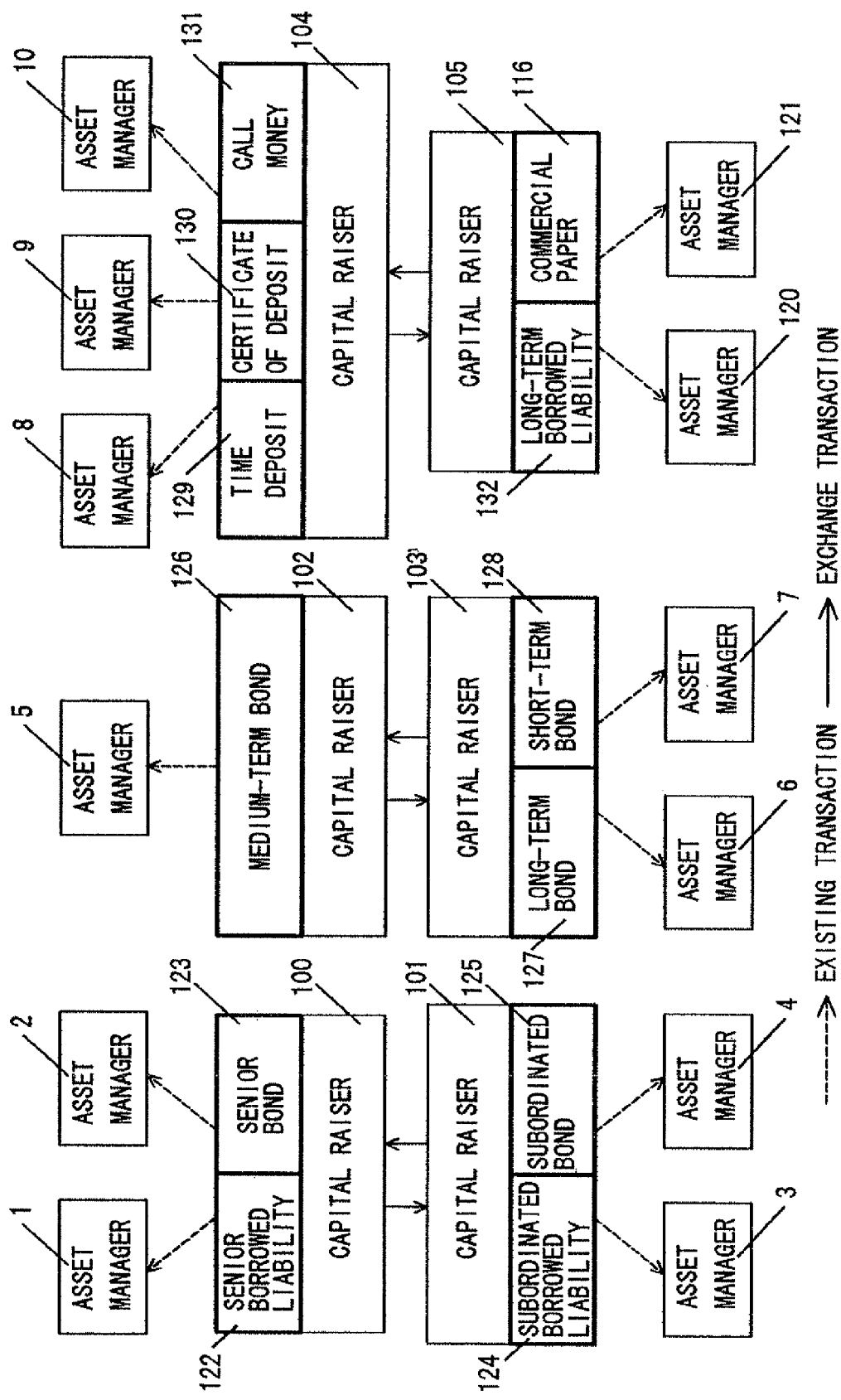
FIG. 27 is another embodiment in accordance with the invention illustrating cash flow exchanges of capital raising products.

FIG. 27 is another embodiment of the cash flow exchange of capital raising products illustrating cases in which cash flows of products are exchanged by tie-in.

Herein, a capital raiser 100 is servicing 'a senior borrowed liability 122 from an asset manager 1 and a senior bond 123 being held by an asset manager 2,' while a capital raiser 101 is servicing 'a subordinated borrowed liability 124 from an asset manager 3 and a subordinated bond 125 being held by an asset manager 4.' As a result of completing a cash flow exchange, the capital raiser 100 has been able to pass on 'the cash outflows arising from the senior borrowed liability 122 and the senior bond 123' by tie-in in exchange for assuming 'the cash outflows arising from the subordinated borrowed liability 124 and the subordinated bond 125' by tie-in, while at the same time, the capital raiser 101 has been able to pass on 'the cash outflows arising from the subordinated borrowed liability 124 and the subordinated bond 125' by tie-in in exchange for assuming 'the cash outflows arising from the senior borrowed liability 122 and the senior bond 123' by tie-in.

Similarly, a capital raiser 102 and a capital raiser 103, and a capital raiser 104 and a capital raiser 105 have respectively exchanged 'a single cash outflow arising from a medium-term bond 126 being held by an asset manager 5' and 'a tie-in of cash outflows arising from a long-term bond 127 being held by an asset manager 6 and a short-term bond 128 being held by an asset manager 7,' and 'a tie-in of cash outflows arising from a time deposit 129 from an asset manager 8, a certificate of deposit 130 from an asset manager 9 and a call money 131 from an asset manager 10' and 'a tie-in of cash outflows arising from a long-term borrowed liability 132 from an asset manager 120 and a commercial paper 116 being held by an asset manager 121.'

Figure 28:
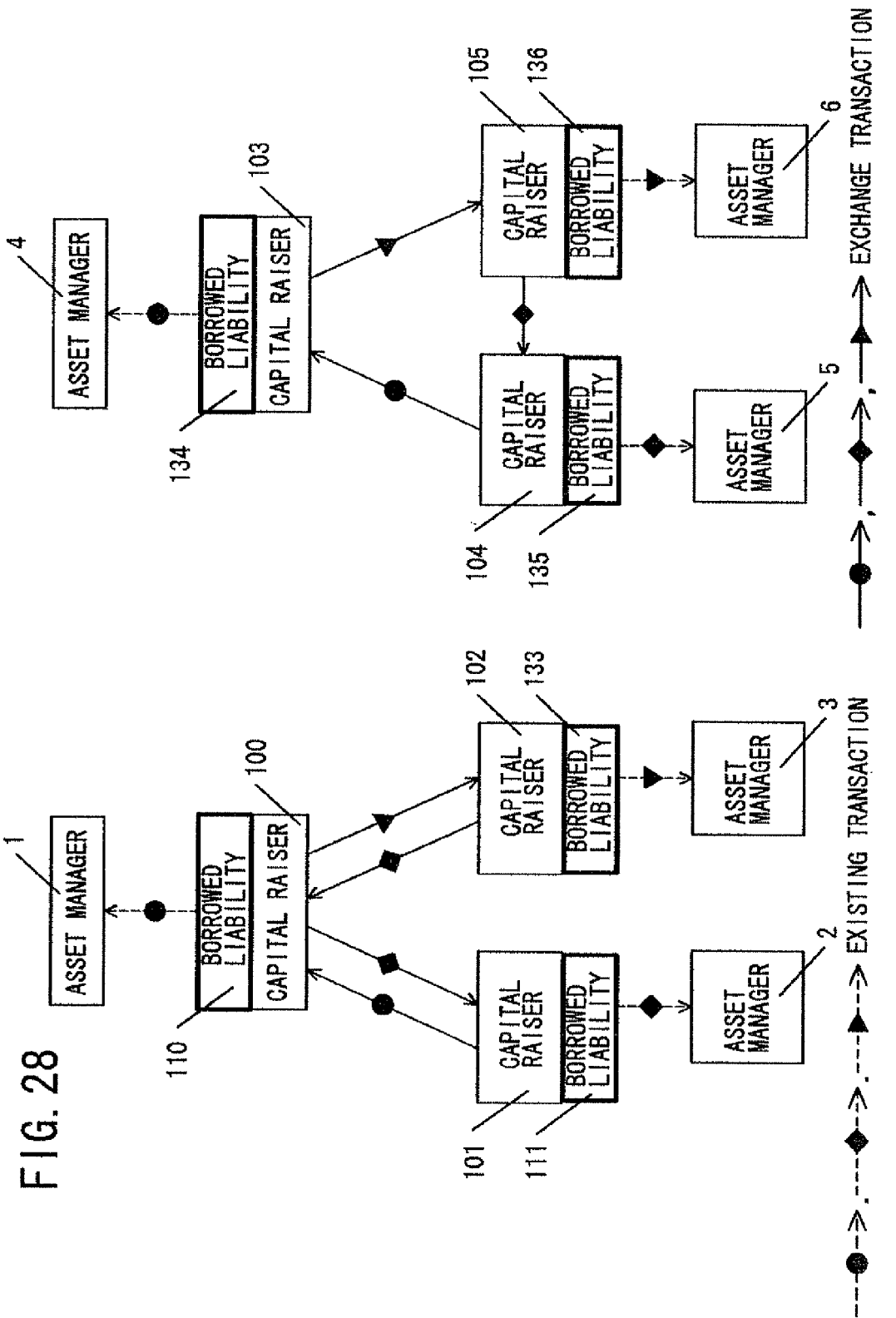
FIG. 28 is another embodiment in accordance with the invention illustrating cash flow exchanges of capital raising products.

FIG. 28 is another embodiment of the cash flow exchange of capital raising products illustrating cases in which cash flows of products are exchanged among three parties.

In the left view, a capital raiser 100 is servicing a borrowed liability 110 from an asset manager 1, while a capital raiser 101 is servicing a borrowed liability 111 from an asset manager 2. As a result of completing a cash flow exchange, the capital raiser 100 has been able to pass on the cash outflow arising from the borrowed liability 110 in exchange for assuming the cash outflow arising from the borrowed liability 111, while at the same time, the capital raiser 101 has been able to pass on the cash outflow arising from the borrowed liability 111 in exchange for assuming the cash outflow arising from the borrowed liability 110.

Next, the capital raiser 100, who had assumed the cash outflow arising from the borrowed liability 111, has completed a cash flow exchange with a capital raiser 102 that is servicing a borrowed liability 133 from an asset manager 3. As a result thereof, the capital raiser 100 has been able to pass on the cash outflow arising from the borrowed liability 111 in exchange for assuming the cash outflow arising from the borrowed liability 133, while at the same time, the capital raiser 102 has been able to pass on the cash outflow arising from the borrowed liability 133 in exchange for assuming the cash outflow arising from the borrowed liability 111.

In the left view, cash flow exchanges among three parties have been completed through two steps, and yet it is possible to complete them simultaneously in the present embodiment. In the right view, a capital raiser 103, a capital raiser 104 and a capital raiser 105 are respectively servicing a borrowed liability 134 from an asset manager 4, a borrowed liability 135 from an asset manager 5 and a borrowed liability 136 from an asset manager 6. As a result of completing a simultaneous exchange of cash flows among the three parties, the capital raiser 103 has been able to pass on the cash outflow arising from the borrowed liability 134 in exchange for assuming the cash outflow arising from the borrowed liability 136, the capital raiser 104 has been able to pass on the cash outflow arising from the borrowed liability 135 in exchange for assuming the cash outflow arising from the borrowed liability 134, and the capital raiser 105 has been able to pass on the cash outflow arising from the borrowed liability 136 in exchange for assuming the cash outflow arising from the borrowed liability 135.

Figure 29:
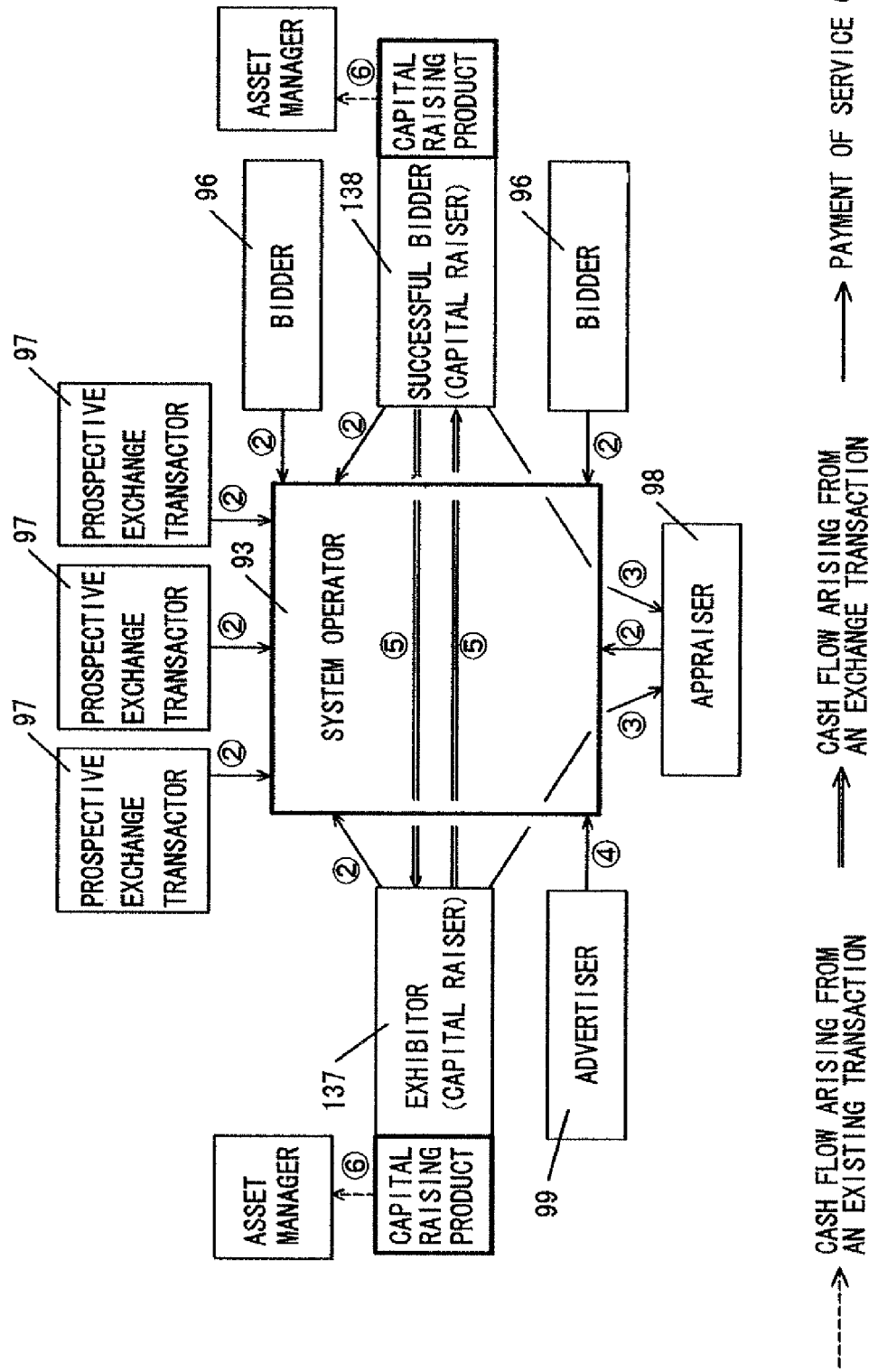
FIG. 29 is a diagram showing an embodiment of the flows of funds and the fee collection scheme in a cash flow exchange of capital raising products.

FIG. 29 is an embodiment of the flows of funds and the fee collection scheme in a cash flow exchange of capital raising products.

In the diagram, ② indicates that an exhibitor 137, who is a capital raiser, a successful bidder 138, who is also a capital raiser, bidders 96, prospective exchange transactors 97 and an appraiser 98 pay service charges, line charges and/or the like to the system operator 93.

③ indicates that the exhibitor 137 and the successful bidder 138 pay appraisal fees to the appraiser 98.

④ indicates that an advertiser 99 pays an advertisement fee for insertion of a banner ad or a pop-up ad to the system operator 93.

⑤ indicates that, as a result of completing the cash flow exchange, payment and receipt of an exchange difference and the cash outflows arising from capital raising products are executed between the exhibitor 137 and the successful bidder 138.

⑥ indicates the existing cash outflows that the exhibitor 137 and the successful bidder 138 are respectively paying to asset managers.

Figure 30:
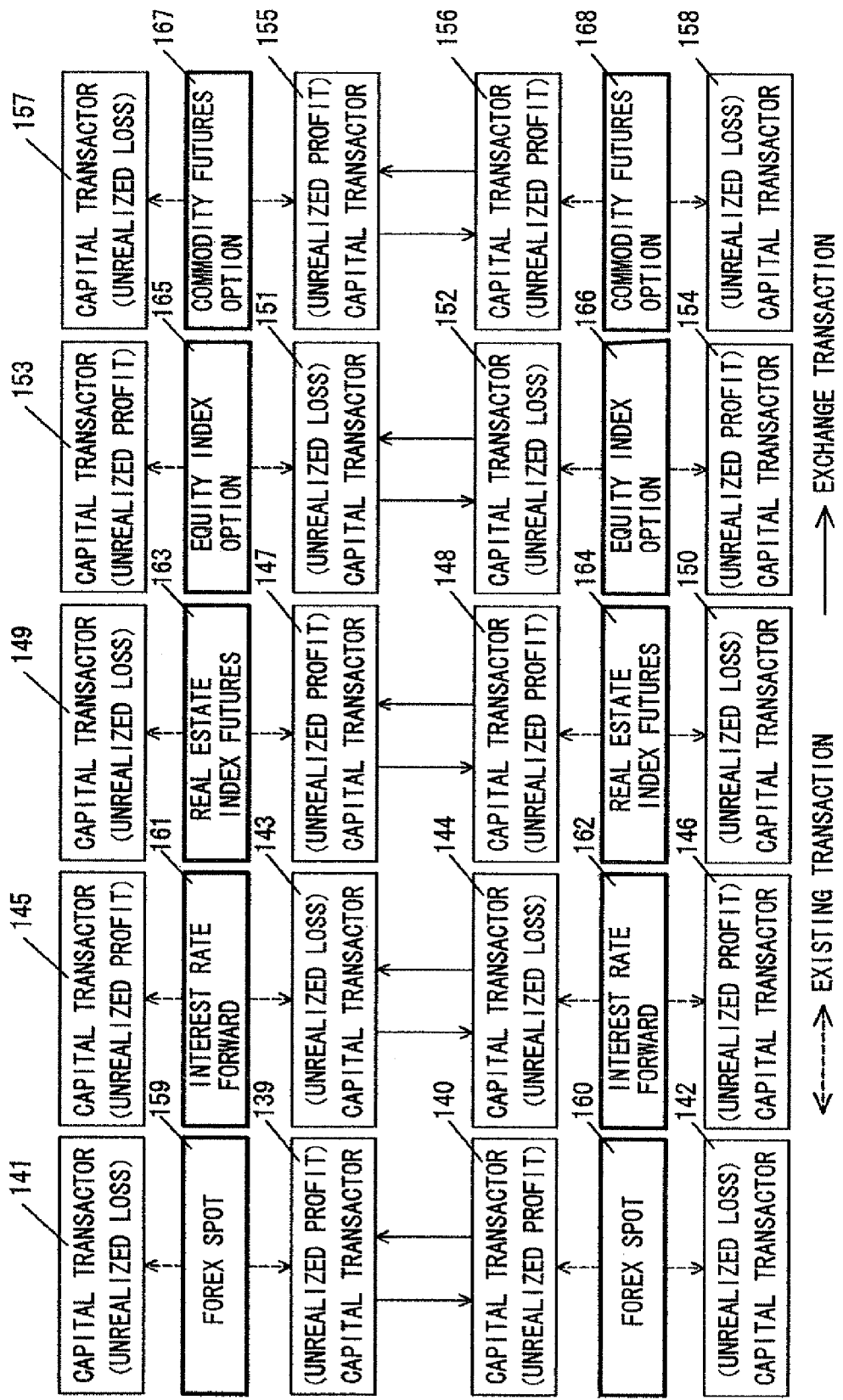
FIG. 30 is another embodiment in accordance with the invention illustrating cash flow exchanges of capital transaction products.

Moreover, FIG. 30 is an embodiment of the cash flow exchange of capital transaction products illustrating cases in which the same types of foreign exchange products, financial derivative products, real estate derivative products or commodity derivative products are exchange items.

Herein, a capital transactor 139 is carrying an unrealized profit of a forex spot transaction 159 with a capital transactor 141, while a capital transactor 140 is carrying an unrealized profit of a forex spot transaction 160 with a capital transactor 142. As a result of completing a cash flow exchange, the capital transactor 139 has been able to take over the unrealized profit of the forex spot transaction 160 in exchange for assigning the unrealized profit of the forex spot transaction 159, while at the same time, the capital transactor 140 has been able to take over the unrealized profit of the forex spot transaction 159 in exchange for assigning the unrealized profit of the forex spot transaction 160.

Similarly, through respective cash flow exchanges, a capital transactor 143 and a capital transactor 144, a capital transactor 147 and a capital transactor 148, a capital transactor 151 and a capital transactor 152, and a capital transactor 155 and a capital transactor 156 have exchanged 'an unrealized loss of an interest rate forward transaction 161 with a capital transactor 145' and 'an unrealized loss of an interest rate forward transaction 162 with a capital transactor 146,' 'an unrealized profit of a real estate index futures transaction 163 with a capital transactor 149' and 'an unrealized profit of a real estate index futures transaction 164 with a capital transactor 150,' 'an unrealized loss of an equity index option transaction 165 with a capital transactor 153' and 'an unrealized loss of an equity index option transaction 166 with a capital transactor 154,' and 'an unrealized profit of a commodity futures option transaction 167 with a capital transactor 157' and 'an unrealized profit of a commodity futures option transaction 168 with a capital transactor 158.'

Additionally, in drawings of some embodiments of the present invention, any number of capital transactors, depending on the actual product, may be acting as a counterparty for an existing position of a capital transactor that becomes an exchanging party. Also, as to products listed in a derivatives exchange or a securities exchange among capital transaction products, although each exchange is acting as a counterparty of a capital transactor, because each capital transactor is substantially carrying an opposite position with one or more other capital transactors through the exchanges, the counterparty shall be described as another capital transactor in each drawing in the embodiments.

Figure 31:
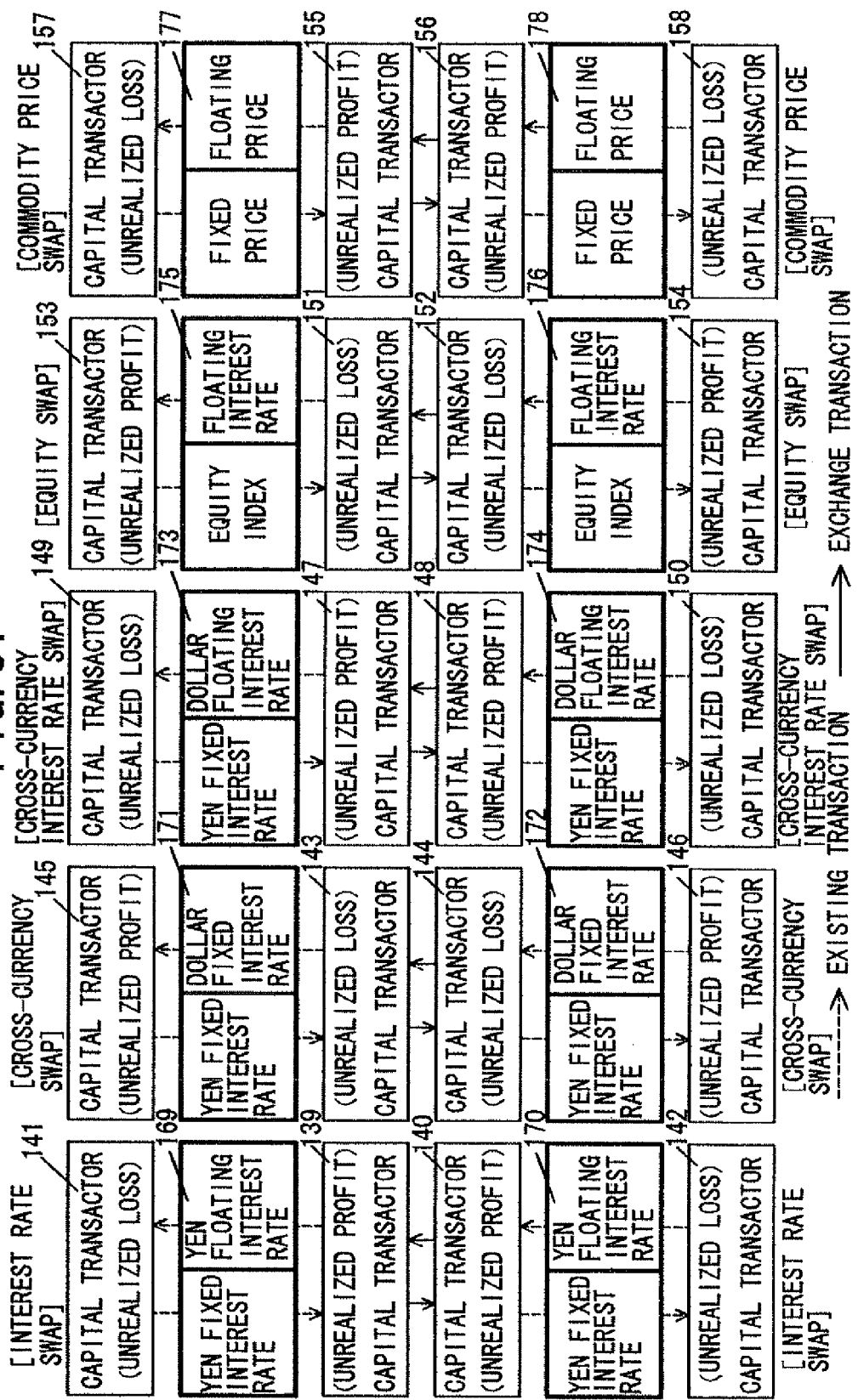
FIG. 31 is another embodiment in accordance with the invention illustrating cash flow exchanges of capital transaction products.

FIG. 31 is another embodiment of the cash flow exchange of capital transaction products illustrating cases in which the same types of swap products are exchange items.

Herein, a capital transactor 139 is carrying an unrealized profit of an interest rate swap transaction 169 with a capital transactor 141, while a capital transactor 140 is carrying an unrealized profit of an interest rate swap transaction 170 with a capital transactor 142. As a result of completing a cash flow exchange, the capital transactor 139 has been able to take over the unrealized profit of the interest rate swap transaction 170 in exchange for assigning the unrealized profit of the interest rate swap transaction 169, while at the same time, the capital transactor 140 has been able to take over the unrealized profit of the interest rate swap transaction 169 in exchange for assigning the unrealized profit of the interest rate swap transaction 170.

Similarly, through respective cash flow exchanges, a capital transactor 143 and a capital transactor 144, a capital transactor 147 and a capital transactor 148, a capital transactor 151 and a capital transactor 152, and a capital transactor 155 and a capital transactor 156 have exchanged 'an unrealized loss of a cross-currency swap transaction 171 with a capital transactor 145' and 'an unrealized loss of a cross-currency swap transaction 172 with a capital transactor 146,' 'an unrealized profit of a cross-currency interest rate swap transaction 173 with a capital transactor 149' and 'an unrealized profit of a cross-currency interest rate swap transaction 174 with a capital transactor 150,' 'an unrealized loss of an equity swap transaction 175 with a capital transactor 153' and 'an unrealized loss of an equity swap transaction 176 with a capital transactor 154,' and 'an unrealized profit of a commodity price swap transaction 177 with a capital transactor 157' and 'an unrealized profit of a commodity price swap transaction 178 with a capital transactor 158.'

Figure 32:
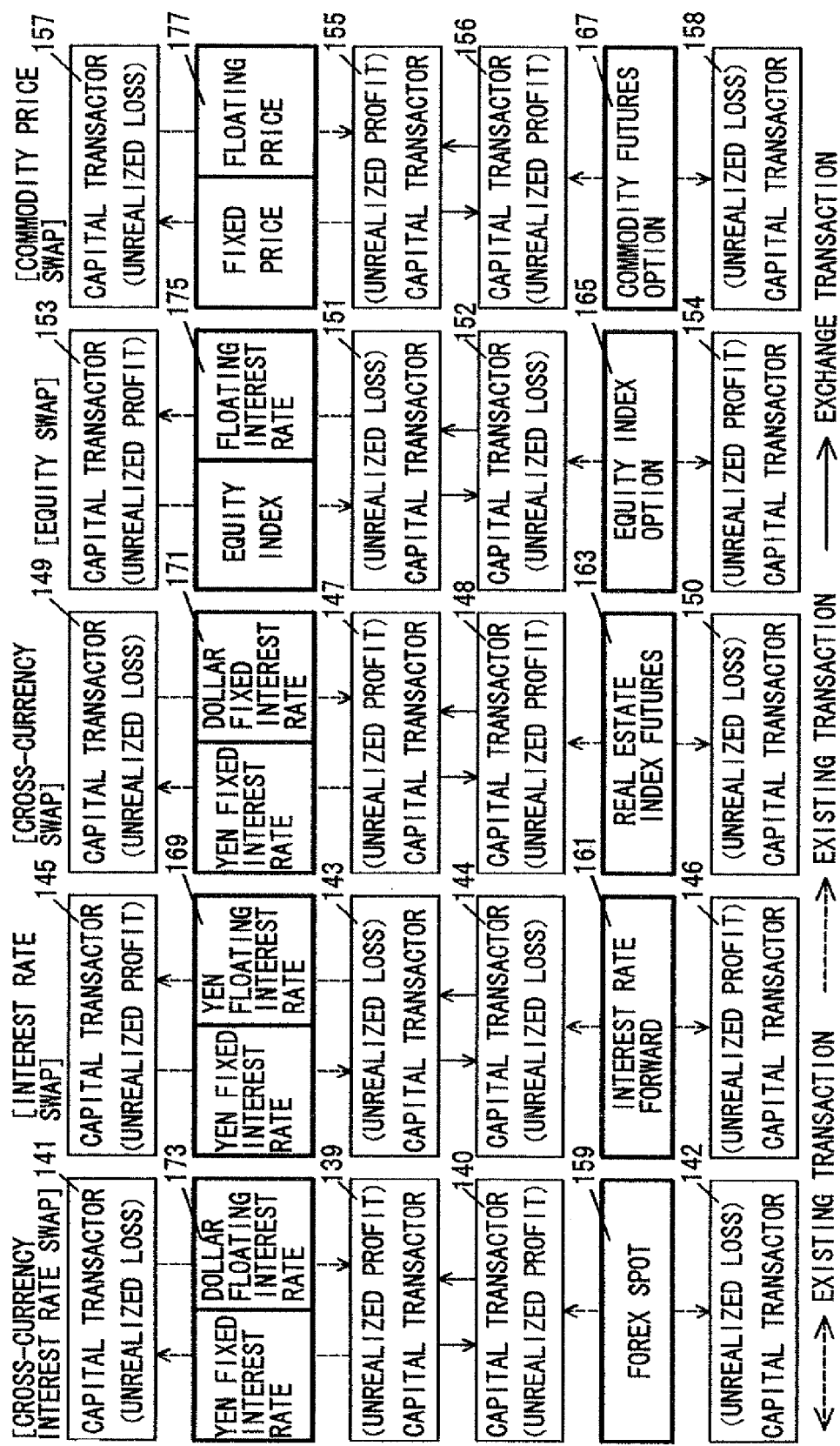
FIG. 32 is another embodiment in accordance with the invention illustrating cash flow exchanges of capital transaction products.

FIG. 32 is another embodiment of the cash flow exchange of capital transaction products illustrating cases in which different type products or different industry products are exchange items.

Herein, a capital transactor 139 is carrying an unrealized profit of a cross-currency interest rate swap transaction 173 with a capital transactor 141, while a capital transactor 140 is carrying an unrealized profit of a forex spot transaction 159 with a capital transactor 142. As a result of completing a cash flow exchange, the capital transactor 139 has been able to take over the unrealized profit of the forex spot transaction 159 in exchange for assigning the unrealized profit of the cross-currency interest rate swap transaction 173, while at the same time, the capital transactor 140 has been able to take over the unrealized profit of the cross-currency interest rate swap transaction 173 in exchange for assigning the unrealized profit of the forex spot transaction 159.

Similarly, through respective cash flow exchanges, a capital transactor 143 and a capital transactor 144, a capital transactor 147 and a capital transactor 148, a capital transactor 151 and a capital transactor 152, and a capital transactor 155 and a capital transactor 156 have exchanged 'an unrealized loss of an interest rate swap transaction 169 with a capital transactor 145' and 'an unrealized loss of an interest rate forward transaction 161 with a capital transactor 146,' 'an unrealized profit of a cross-currency swap transaction 171 with a capital transactor 149' and 'an unrealized profit of a real estate index futures transaction 163 with a capital transactor 150,' 'an unrealized loss of an equity swap transaction 175 with a capital transactor 153' and 'an unrealized loss of an equity index option transaction 165 with a capital transactor 154,' and 'an unrealized profit of a commodity price swap transaction 177 with a capital transactor 157' and 'an unrealized profit of a commodity futures option transaction 167 with a capital transactor 158.'

Figure 33:
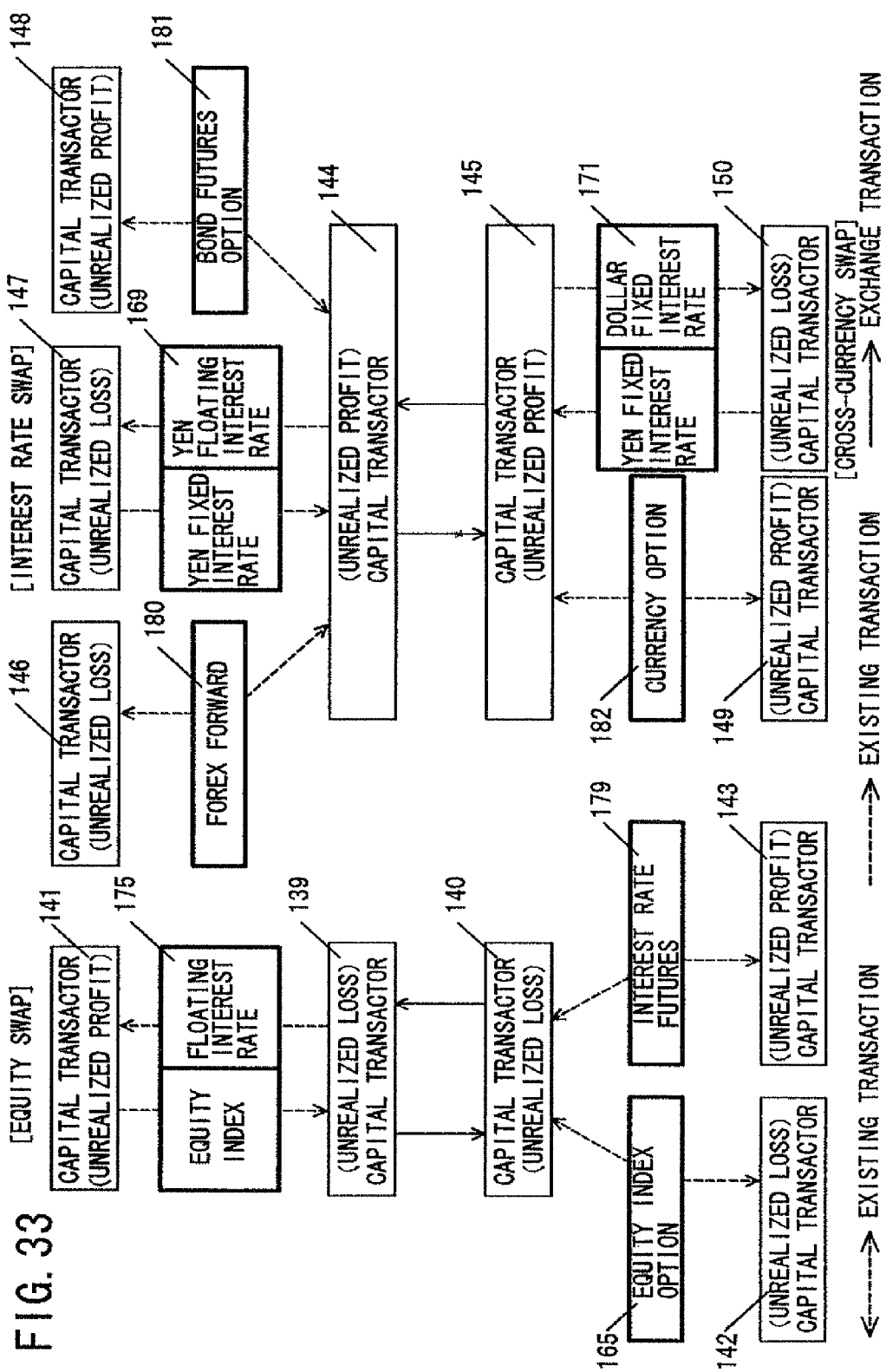
FIG. 33 is another embodiment in accordance with the invention illustrating cash flow exchanges of capital transaction products.

FIG. 33 is another embodiment of the cash flow exchange of capital transaction products illustrating cases in which cash flows of products are exchanged by tie-in.

In the left view, a capital transactor 139 is carrying 'an unrealized loss of an equity swap transaction 175 with a capital transactor 141,' while a capital transactor 140 is carrying 'an unrealized profit of an equity index option transaction 165 with a capital transactor 142 and an unrealized loss of an interest rate futures transaction 179 with a capital transactor 143' to have an unrealized loss on a net basis. As a result of completing a cash flow exchange, the capital transactor 139 has assumed 'the unrealized profit of the equity index option transaction 165 and the unrealized loss of the interest rate futures transaction 179' by tie-in in exchange for passing on 'the unrealized loss of the equity swap transaction 175,' while at the same time, the capital transactor 140 has assumed 'the unrealized loss of the equity swap transaction 175' in exchange for passing on 'the unrealized profit of the equity index option transaction 165 and the unrealized loss of the interest rate futures transaction 179' by tie-in.

In the right view, a capital transactor 144 is carrying 'an unrealized profit of a forex forward transaction 180 with a capital transactor 146, an unrealized profit of an interest rate swap transaction 169 with a capital transactor 147, and an unrealized loss of a bond futures option transaction 181 with a capital transactor 148' to have an unrealized profit on a net basis, while a capital transactor 145 is carrying 'an unrealized loss of a currency option transaction 182 with a capital transactor 149 and an unrealized profit of a cross-currency swap transaction 171 with a capital transactor 150' to have an unrealized profit on a net basis. As a result of completing a cash flow exchange, the capital transactor 144 has taken over 'the unrealized loss of the currency option transaction 182 and the unrealized profit of the cross-currency swap transaction 171' by tie-in in exchange for assigning 'the unrealized profit of the forex forward transaction 180, the unrealized profit of the interest rate swap transaction 169, and the unrealized loss of the bond futures option transaction 181' by tie-in, while at the same time, the capital transactor 145 has taken over 'the unrealized profit of the forex forward transaction 180, the unrealized profit of the interest rate swap transaction 169, and the unrealized loss of the bond futures option transaction 181' by tie-in in exchange for assigning 'the unrealized loss of the currency option transaction 182 and the unrealized profit of the cross-currency swap transaction 171' by tie-in.

Figure 34:
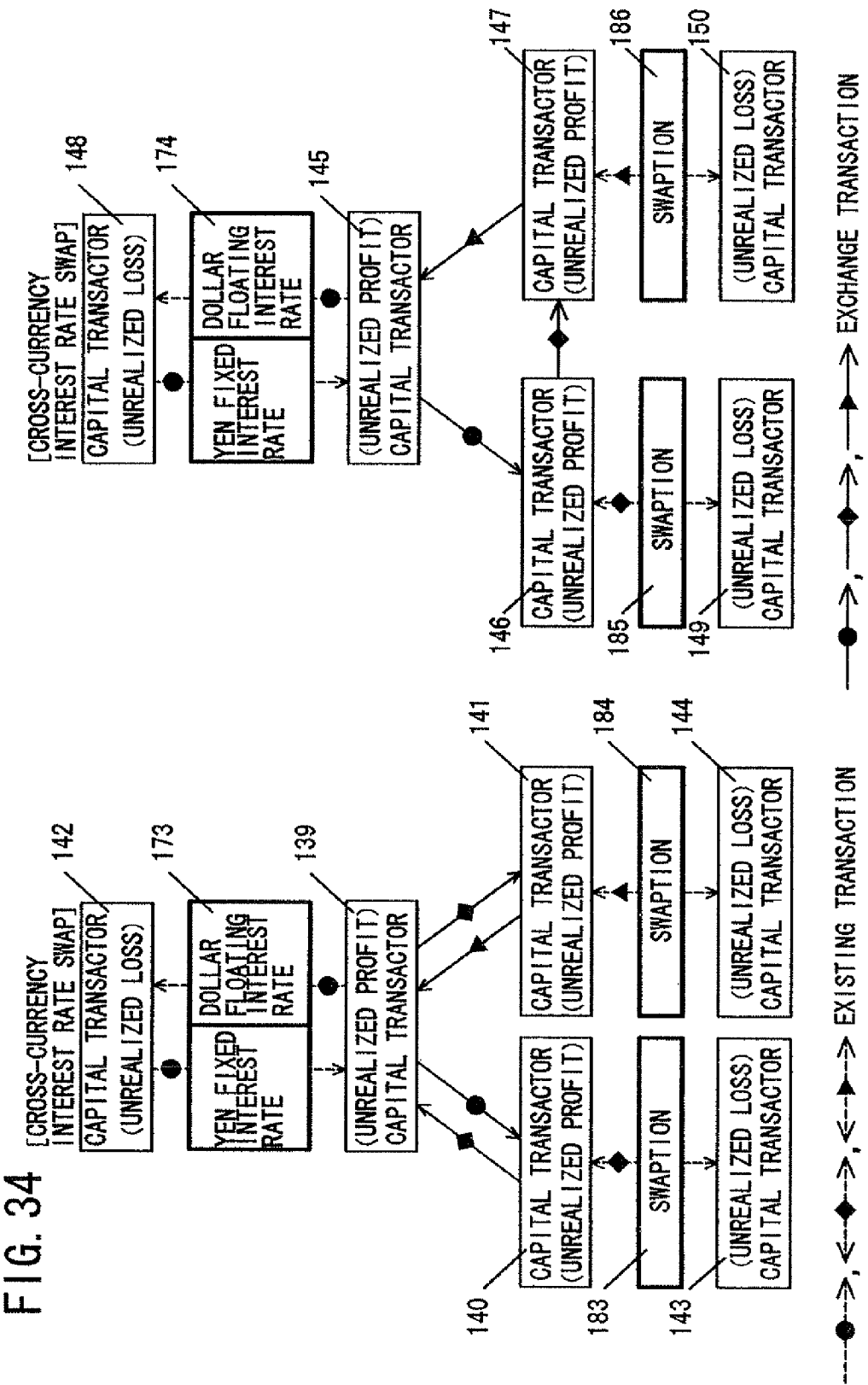
FIG. 34 is another embodiment in accordance with the invention illustrating cash flow exchanges of capital transaction products.

FIG. 34 is another embodiment of the cash flow exchange of capital transaction products illustrating cases in which cash flows of products are exchanged among three parties.

In the left view, a capital transactor 139 is carrying an unrealized profit of a cross-currency interest rate swap transaction 173 with a capital transactor 142, while a capital transactor 140 is carrying an unrealized profit of a swaption transaction 183 with a capital transactor 143. As a result of completing a cash flow exchange, the capital transactor 139 has been able to take over the unrealized profit of the swaption transaction 183 in exchange for assigning the unrealized profit of the cross-currency interest rate swap transaction 173, while at the same time, the capital transactor 140 has been able to take over the unrealized profit of the cross-currency interest rate swap transaction 173 in exchange for assigning the unrealized profit of the swaption transaction 183.

Next, the capital transactor 139, who had taken over the unrealized profit of the swaption transaction 183, has completed a cash flow exchange with a capital transactor 141 that is carrying an unrealized profit of the swaption transaction 184. As a result thereof, the capital transactor 139 has been able to take over the unrealized profit of the swaption transaction 184 in exchange for assigning the unrealized profit of the swaption transaction 183, while at the same time, the capital transactor 141 has been able to take over the unrealized profit of the swaption transaction 183 in exchange for assigning the unrealized profit of the swaption transaction 184.

In the left view, cash flow exchanges among three parties have been completed through two steps, and yet it is possible to complete them simultaneously in the present embodiment. In the right view, a capital transactor 145, a capital transactor 146, and a capital transactor 147 are respectively carrying an unrealized profit of a cross-currency interest rate swap transaction 174 with a capital transactor 148, an unrealized profit of a swaption transaction 185 with a capital transactor 149, and an unrealized profit of a swaption transaction 186 with a capital transactor 150. As a result of completing a simultaneous exchange of cash flows among the three parties, the capital transactor 145 has been able to take over the unrealized profit of the swaption transaction 186 in exchange for assigning the unrealized profit of the cross-currency interest rate swap transaction 174, the capital transactor 146 has been able to take over the unrealized profit of the cross-currency interest rate swap transaction 174 in exchange for assigning the unrealized profit of the swaption transaction 185, and the capital transactor 147 has been able to take over the unrealized profit of the swaption transaction 185 in exchange for assigning the unrealized profit of the swaption transaction 186.

Figure 35:
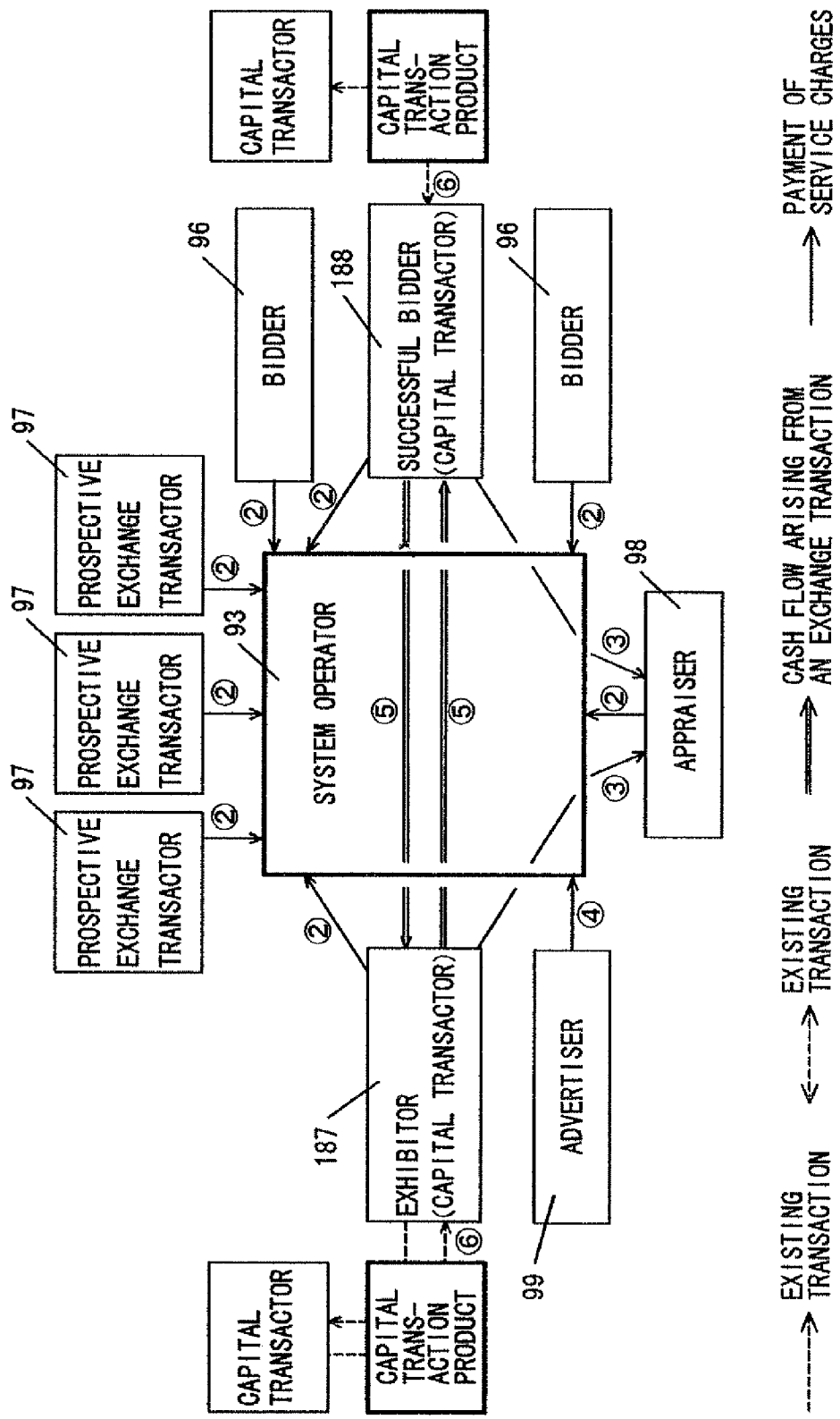
FIG. 35 is a diagram showing an embodiment of the flows of funds and the fee collection scheme in a cash flow exchange of capital transaction products.

FIG. 35 is an embodiment of the flows of funds and the fee collection scheme in a cash flow exchange of capital transaction products.

In the diagram, ② indicates that an exhibitor 187, who is a capital transactor, a successful bidder 188, who is also a capital transactor, bidders 96, prospective exchange transactors 97 and an appraiser 98 pay service charges, line charges and/or the like to the system operator 93.

③ indicates that the exhibitor 187 and the successful bidder 188 pay appraisal fees to the appraiser 98.

④ indicates that an advertiser 99 pays an advertisement fee for insertion of a banner ad or a pop-up ad to the system operator 93.

⑤ indicates that, as a result of completing the cash flow exchange, payment and receipt of an exchange difference and the cash flows arising from capital transaction products are executed between the exhibitor 187 and the successful bidder 188.

⑥ indicates the existing positions that the exhibitor 187 and the successful bidder 188 are respectively carrying vis-à-vis other capital transactors.

Figure 36:
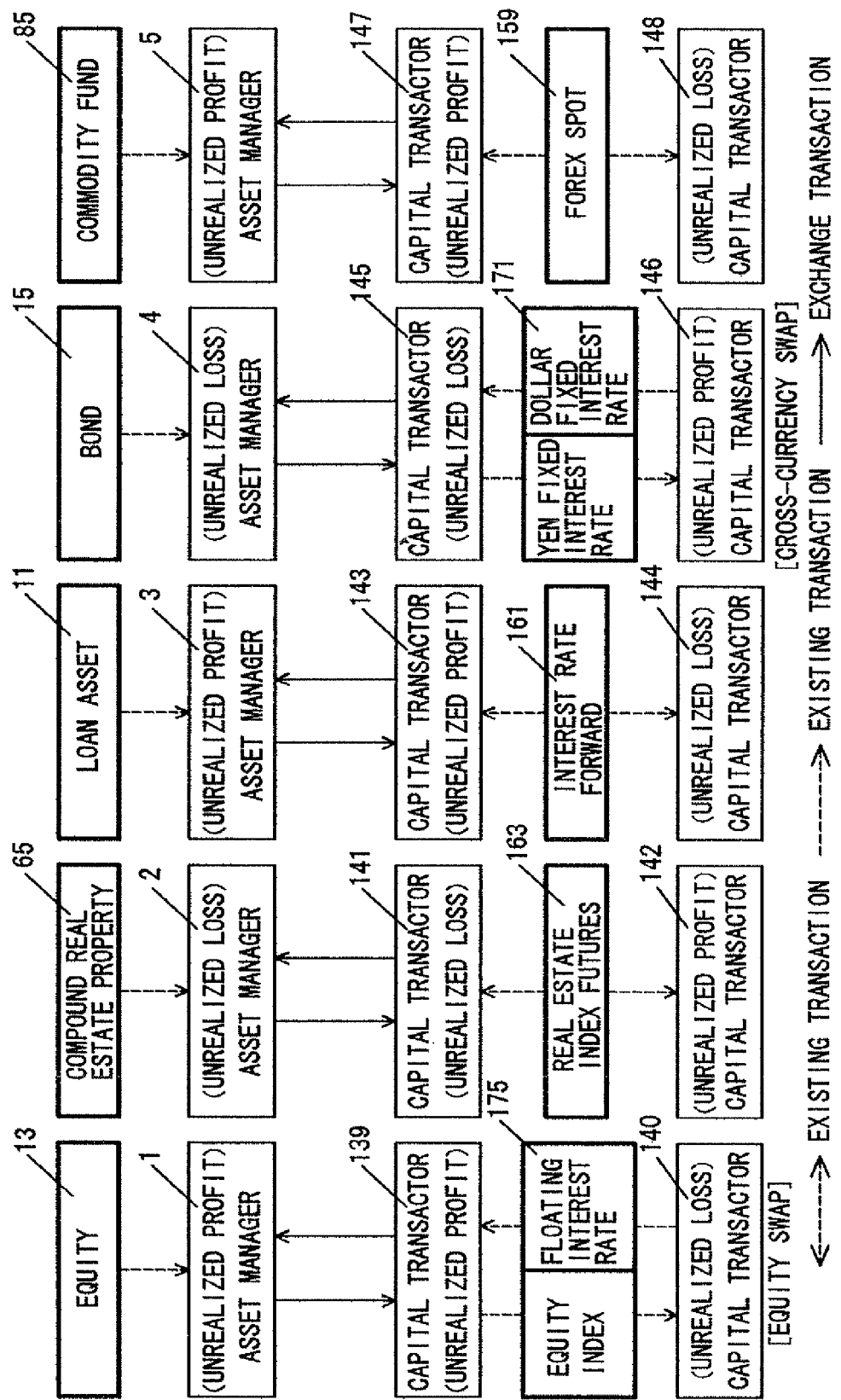
FIG. 36 is another embodiment in accordance with the invention illustrating cash flow exchanges between asset management products and capital transaction products.

Next, FIG. 36 is an embodiment of the cash flow exchange between asset management products and capital transaction products illustrating cases in which unrealized profits or losses of different type products or different industry products are exchanged.

Herein, an asset manager 1 is holding an unrealized profit of an equity 13, while a capital transactor 139 is carrying an unrealized profit of an equity swap transaction 175 with a capital transactor 140. As a result of completing a cash flow exchange, the asset manager 1 has been able to take over the unrealized profit of the equity swap transaction 175 in exchange for assigning the unrealized profit of the equity 13, while at the same time, the capital transactor 139 has been able to take over the unrealized profit of the equity 13 in exchange for assigning the unrealized profit of the equity swap transaction 175.

Similarly, through respective cash flow exchanges, an asset manager 2 and a capital transactor 141, an asset manager 3 and a capital transactor 143, an asset manager 4 and a capital transactor 145, and an asset manager 5 and a capital transactor 147 have exchanged 'an unrealized loss of a compound real estate property 65' and 'an unrealized loss of a real estate index futures transaction 163 with a capital transactor 142,' 'an unrealized profit of a loan asset 11' and 'an unrealized profit of an interest rate forward transaction 161 with a capital transactor 144,' 'an unrealized loss of a bond 15' and 'an unrealized loss of a cross-currency swap transaction 171 with a capital transactor 146,' and 'an unrealized profit of a commodity fund 85' and 'an unrealized profit of a forex spot transaction 159 with a capital transactor 148.'

Figure 37:
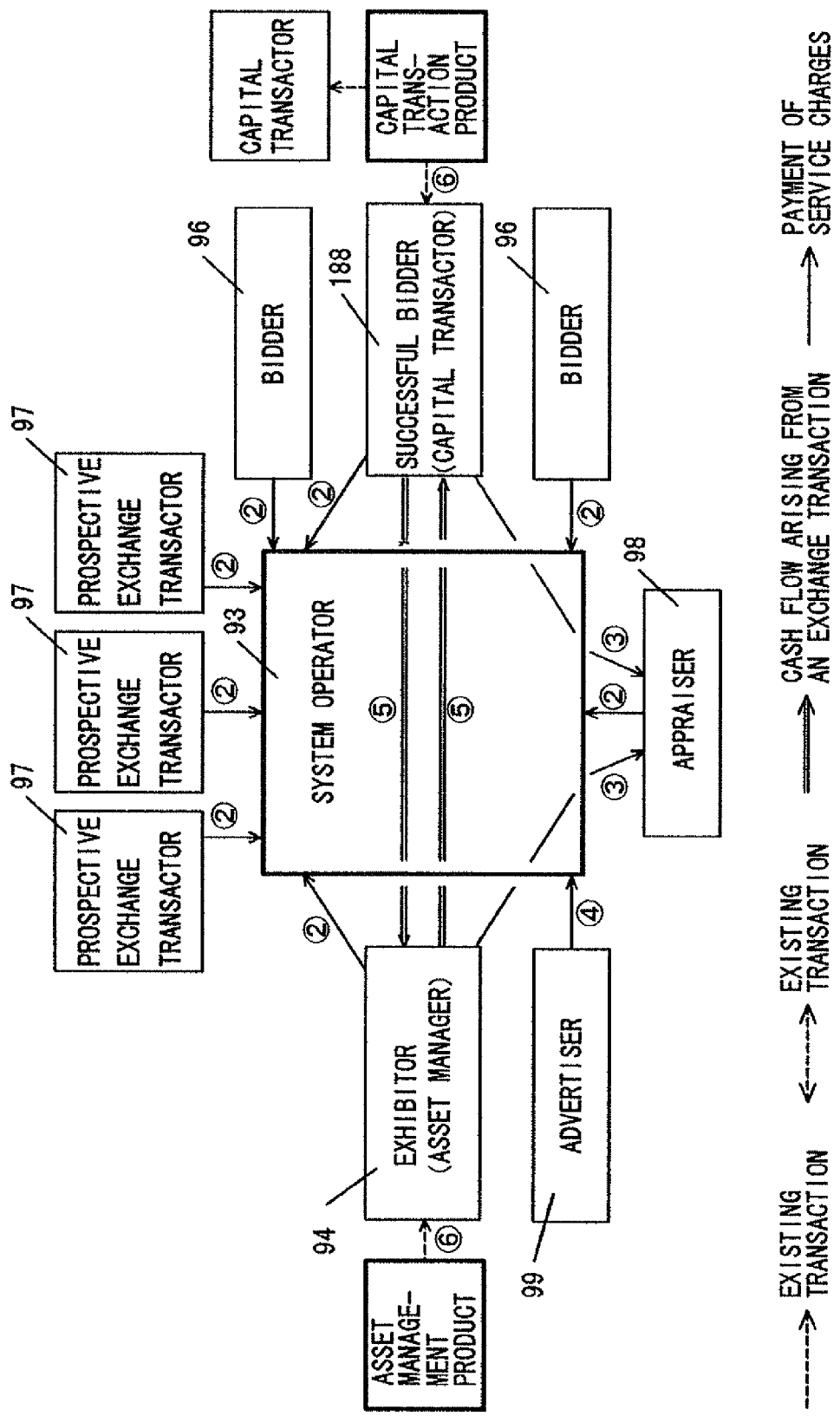
FIG. 37 is a diagram showing an embodiment of the flows of funds and the fee collection scheme in a cash flow exchange between an asset management product and a capital transaction product.

FIG. 37 is an embodiment of the flows of funds and the fee collection scheme in a cash flow exchange between an asset management product and a capital transaction product on the basis of their unrealized profits or losses.

In the diagram, ② indicates that an exhibitor 94, who is an asset manager, a successful bidder 188, who is a capital transactor, bidders 96, prospective exchange transactors 97 and an appraiser 98 pay service charges, line charges and/or the like to the system operator 93.

③ indicates that the exhibitor 94 and the successful bidder 188 pay appraisal fees to the appraiser 98.

④ indicates that an advertiser 99 pays an advertisement fee for insertion of a banner ad or a pop-up ad to the system operator 93.

⑤ indicates that, as a result of completing the cash flow exchange, payment and receipt of an exchange difference and the cash flows are executed between the exhibitor 94 and the successful bidder 188.

⑥ indicates the existing cash inflow that the exhibitor 94 is receiving from an asset management product and the existing position that the successful bidder 188 is carrying vis-à-vis another capital transactor.

Figure 38:
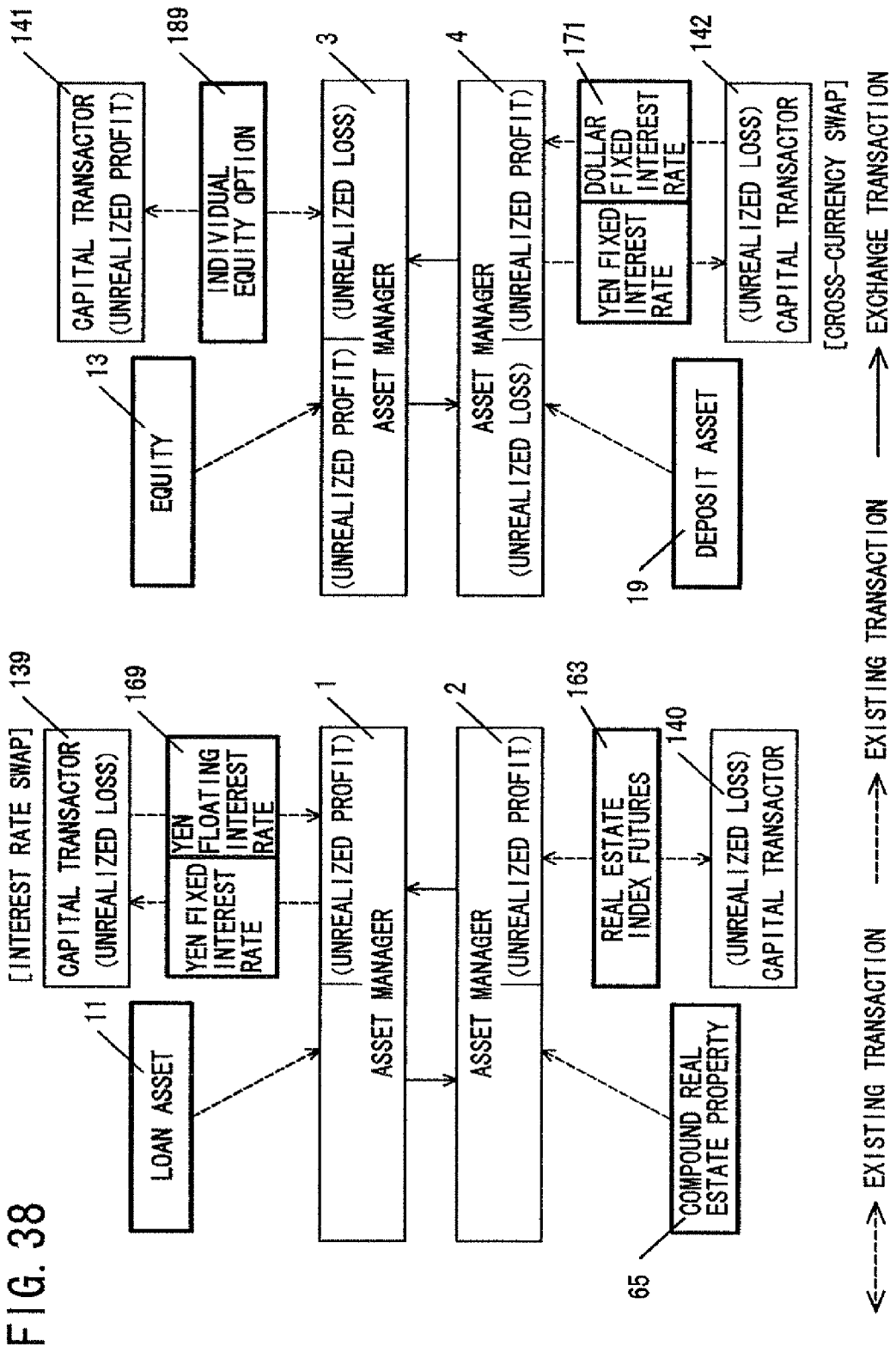
FIG. 38 is another embodiment in accordance with the invention illustrating exchange transactions by tie-in of asset management products and capital transaction products.

Furthermore, FIG. 38 is an embodiment of the cash flow exchange by tie-in of an asset management product and a capital transaction product illustrating cases in which asset managers exchange by tie-in an asset management product as a whole or an unrealized profit or loss thereof, and an unrealized profit or loss of a capital transaction product.

In the left view, an asset manager 1 is holding a loan asset 11 and is carrying an unrealized profit of an interest rate swap transaction 169 with a capital transactor 139, while an asset manager 2 is holding a compound real estate property 65 and is carrying an unrealized profit of a real estate index futures transaction 163 with a capital transactor 140. As a result of completing a cash flow exchange, the asset manager 1 has been able to take over 'the cash inflow arising from the compound real estate property 65 and the unrealized profit of the real estate index futures transaction 163' by tie-in in exchange for assigning 'the cash inflow arising from the loan asset 11 and the unrealized profit of the interest rate swap transaction 169' by tie-in, while at the same time, the asset manager 2 has been able to take over 'the cash inflow arising from the loan asset 11 and the unrealized profit of the interest rate swap transaction 169' by tie-in in exchange for assigning 'the cash inflow arising from the compound real estate property 65 and the unrealized profit of the real estate index futures transaction 163' by tie-in.

In the right view, an asset manager 3 is holding an unrealized profit of an equity 13 and is carrying an unrealized loss of an individual equity option transaction 189 with a capital transactor 141, while an asset manager 4 is holding an unrealized loss of a deposit asset 19 and is carrying an unrealized profit of a cross-currency swap transaction 171 with a capital transactor 142. As a result of completing a cash flow exchange, the asset manager 3 has assumed 'the unrealized loss of the deposit asset 19 and the unrealized profit of the cross-currency swap transaction 171' by tie-in in exchange for passing on 'the unrealized profit of the equity 13 and the unrealized loss of the individual equity option transaction 189' by tie-in, while at the same time, the asset manager 4 has assumed 'the unrealized profit of the equity 13 and the unrealized loss of the individual equity option transaction 189' by tie-in in exchange for passing on 'the unrealized loss of the deposit asset 19 and the unrealized profit of the cross-currency swap transaction 171' by tie-in.

Figure 39:
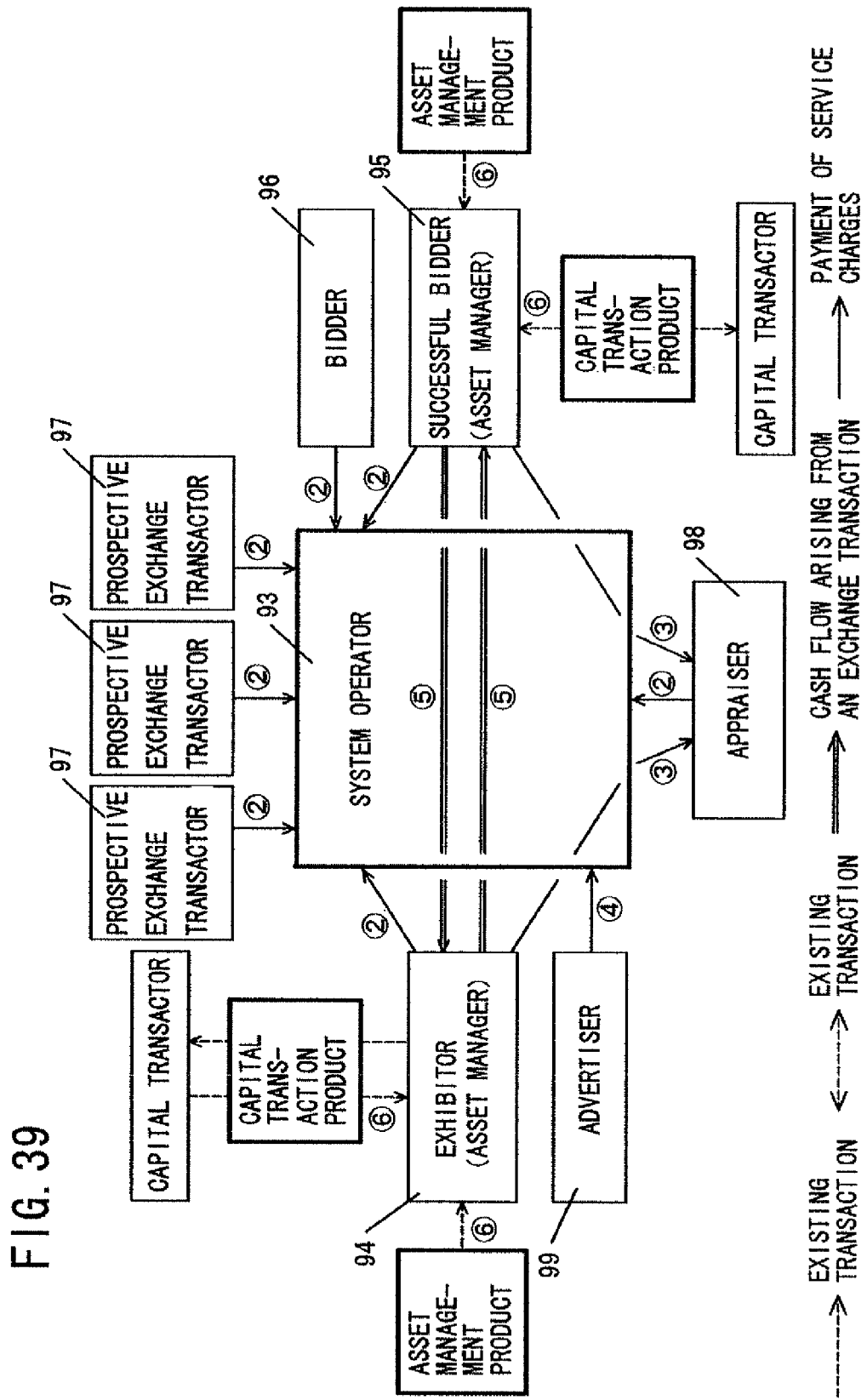
FIG. 39 is a diagram showing an embodiment of the flows of funds and the fee collection scheme in an exchange transaction by tie-in of an asset management product and a capital transaction product.

FIG. 39 is an embodiment of the flows of funds and the fee collection scheme in a cash flow exchange by tie-in of an asset management product and a capital transaction product.

In the diagram, ② indicates that an exhibitor 94, who is an asset manager, a successful bidder 95, who is also an asset manager, a bidder 96, prospective exchange transactors 97 and an appraiser 98 pay service charges, line charges and/or the like to the system operator 93.

③ indicates that the exhibitor 94 and the successful bidder 95 pay appraisal fees to the appraiser 98.

④ indicates that an advertiser 99 pays an advertisement fee for insertion of a banner ad or a pop-up ad to the system operator 93.

⑤ indicates that, as a result of completing the cash flow exchange, payment and receipt of an exchange difference and the cash flows are executed between the exhibitor 94 and the successful bidder 95.

⑥ indicates the existing cash inflows that the exhibitor 94 and the successful bidder 95 are respectively receiving from asset management products and the existing positions that they are respectively carrying vis-à-vis other capital transactors.

Figure 40:
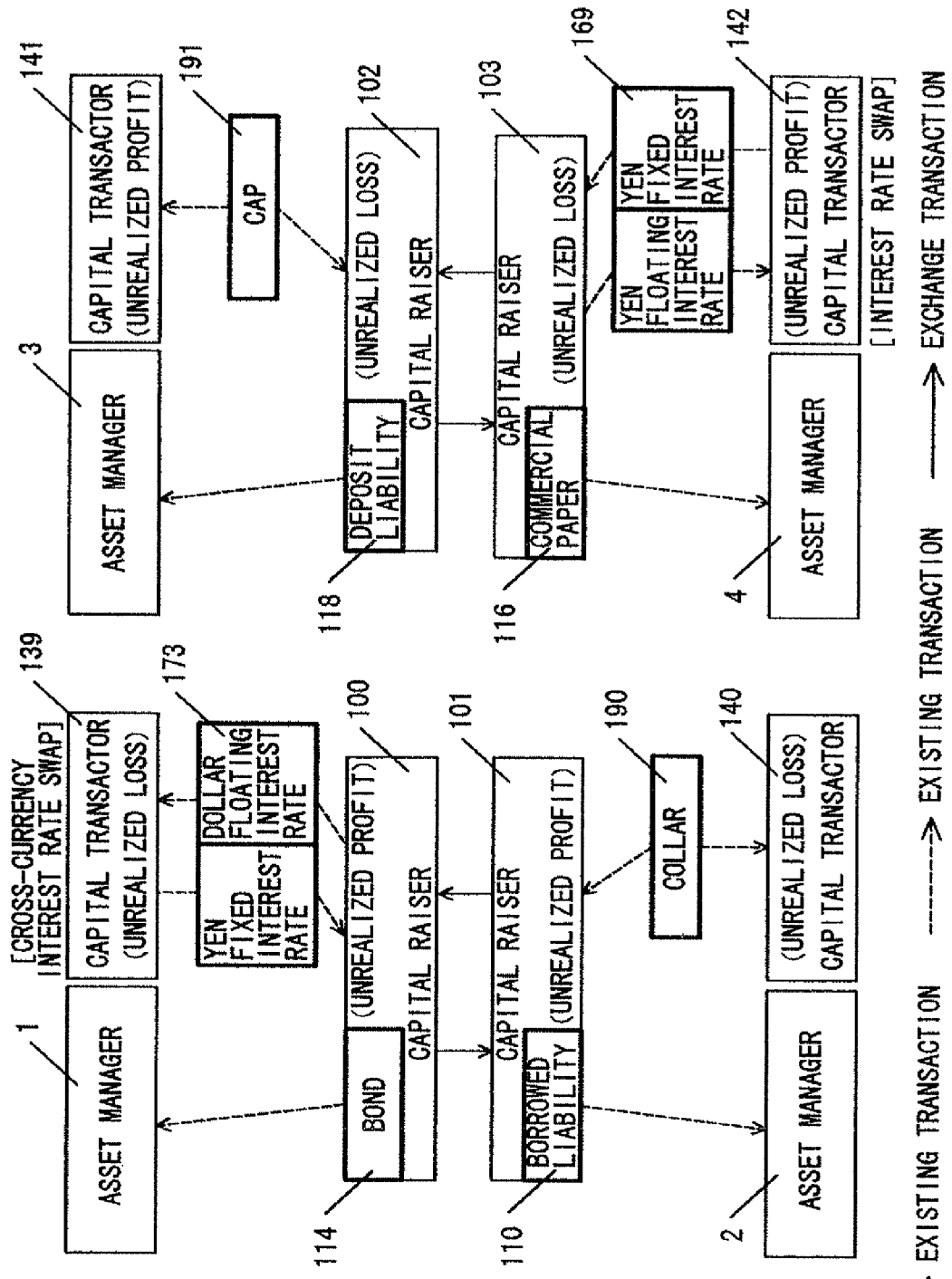
FIG. 40 is another embodiment in accordance with the invention illustrating exchange transactions by tie-in of capital raising products and capital transaction products.

Also, FIG. 40 is an embodiment of the cash flow exchange by tie-in of a capital raising product and a capital transaction product illustrating cases in which capital raisers exchange by tie-in a capital raising product and an unrealized profit or loss of a capital transaction product.

In the left view, a capital raiser 100 is servicing a bond 114 being held by an asset manager 1 and is carrying an unrealized profit of a cross-currency interest rate swap transaction 173 with a capital transactor 139, while a capital raiser 101 is servicing a borrowed liability 110 from an asset manager 2 and is carrying an unrealized profit of a collar transaction 190 with a capital transactor 140. As a result of completing a cash flow exchange, the capital raiser 100 has been able to pass on the cash outflow arising from the bond 114 and take over the unrealized profit of the collar transaction 190 in exchange for assuming the cash outflow arising from the borrowed liability 110 and assigning the unrealized profit of the cross-currency interest rate swap transaction 173, while at the same time, the capital raiser 101 has been able to pass on the cash outflow arising from the borrowed liability 110 and take over the unrealized profit of the cross-currency interest rate swap transaction 173 in exchange for assuming the cash outflow arising from the bond 114 and assigning the unrealized profit of the collar transaction 190.

In the right view, a capital raiser 102 is servicing a deposit liability 118 from an asset manager 3 and is carrying an unrealized loss of a cap transaction 191 with a capital transactor 141, while a capital raiser 103 is servicing a commercial paper 116 being held by an asset manager 4 and is carrying an unrealized loss of an interest rate swap transaction 169 with a capital transactor 142. As a result of completing a cash flow exchange, the capital raiser 102 has passed on the cash outflow arising from the deposit liability 118 and assumed the unrealized loss of the interest rate swap transaction 169 in exchange for assuming the cash outflow arising from the commercial paper 116 and passing on the unrealized loss of the cap transaction 191, while at the same time, the capital raiser 103 has passed on the cash outflow arising from the commercial paper 116 and assumed the unrealized loss of the cap transaction 191 in exchange for assuming the cash outflow arising from the deposit liability 118 and passing on the unrealized loss of the interest rate swap transaction 169.

Figure 41:
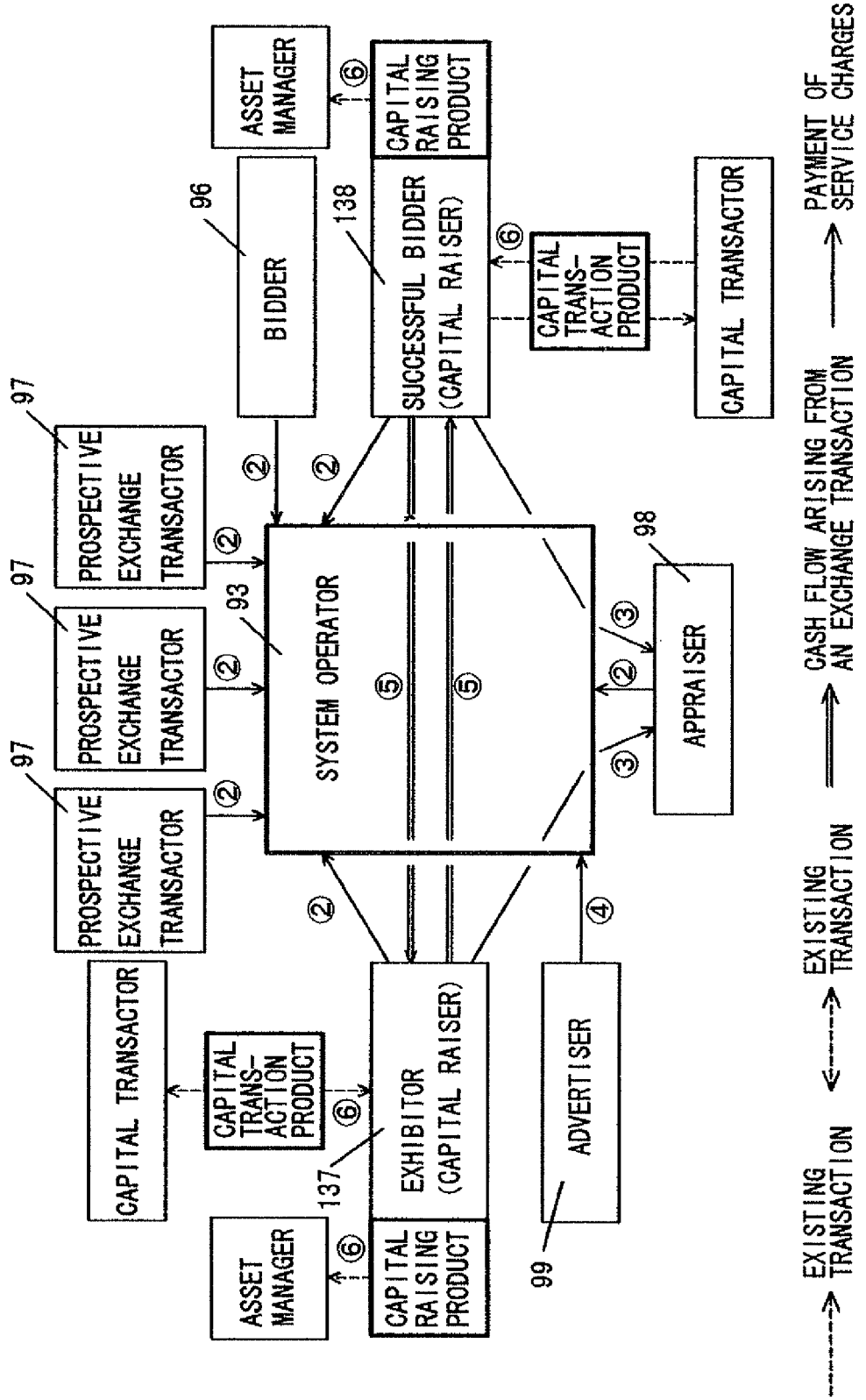
FIG. 41 is a diagram showing an embodiment of the flows of funds and the fee collection scheme in an exchange transaction by tie-in of a capital raising product and a capital transaction product.

FIG. 41 is an embodiment of the flows of funds and the fee collection scheme in a cash flow exchange by tie-in of a capital raising product and a capital transaction product.

In the diagram, ② indicates that an exhibitor 137, who is a capital raiser, a successful bidder 138, who is also a capital raiser, a bidder 96, prospective exchange transactors 97 and an appraiser 98 pay service charges, line charges and/or the like to the system operator 93.

③ indicates that the exhibitor 137 and the successful bidder 138 pay appraisal fees to the appraiser 98.

④ indicates that an advertiser 99 pays an advertisement fee for insertion of a banner ad or a pop-up ad to the system operator 93.

⑤ indicates that, as a result of completing the cash flow exchange, payment and receipt of an exchange difference and the cash flows are executed between the exhibitor 137 and the successful bidder 138.

⑥ indicates the existing cash outflows that the exhibitor 137 and the successful bidder 138 are respectively paying to asset managers and the existing positions that they are respectively carrying vis-à-vis other capital transactors.

Figure 42:
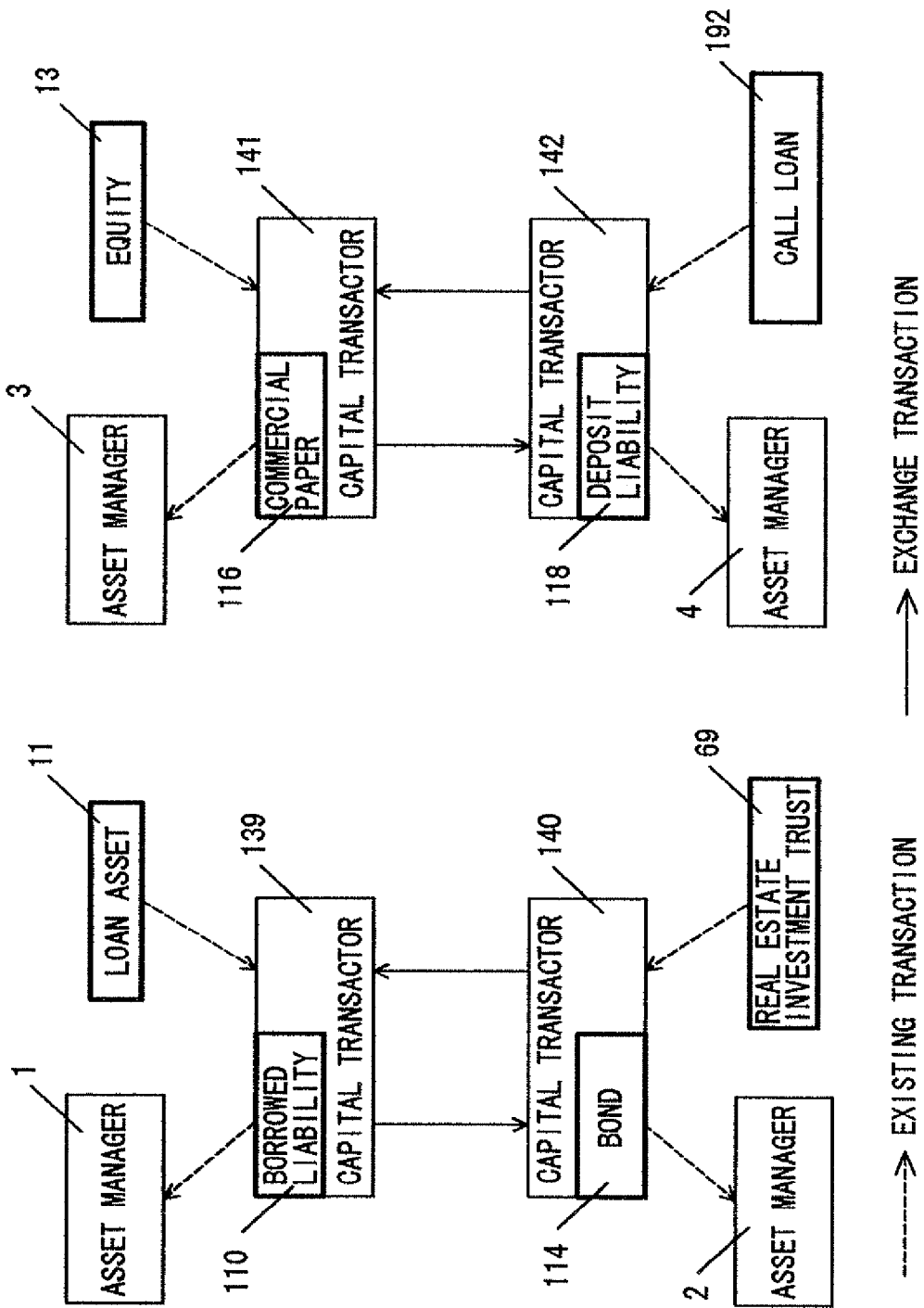
FIG. 42 is another embodiment in accordance with the invention illustrating exchange transactions by tie-in of asset management products and capital raising products.

Moreover, FIG. 42 is an embodiment of the cash flow exchange by tie-in of an asset management product and a capital raising product illustrating cases in which capital transactors exchange by tie-in a capital raising product and an asset management product as a whole.

In the left view, a capital transactor 139 is servicing a borrowed liability 110 from an asset manager 1 and is holding a loan asset 11, while a capital transactor 140 is servicing a bond 114 being held by an asset manager 2 and is holding a real estate investment trust 69. As a result of completing a cash flow exchange, the capital transactor 139 has been able to pass on the cash outflow arising from the borrowed liability 110 and take over the cash inflow arising from the real estate investment trust 69 in exchange for assuming the cash outflow arising from the bond 114 and assigning the cash inflow arising from the loan asset 11, while at the same time, the capital transactor 140 has been able to pass on the cash outflow arising from the bond 114 and take over the cash inflow arising from the loan asset 11 in exchange for assuming the cash outflow arising from the borrowed liability 110 and assigning the cash inflow arising from the real estate investment trust 69.

In the right view, a capital transactor 141 is servicing a commercial paper 116 being held by an asset manager 3 and is holding an equity 13, while a capital transactor 142 is servicing a deposit liability 118 from an asset manager 4 and is holding a call loan 192. As a result of completing a cash flow exchange, the capital transactor 141 has been able to pass on the cash outflow arising from the commercial paper 116 and take over the cash inflow arising from the call loan 192 in exchange for assuming the cash outflow arising from the deposit liability 118 and assigning the cash inflow arising from the equity 13, while at the same time, the capital transactor 142 has been able to pass on the cash outflow arising from the deposit liability 118 and take over the cash inflow arising from the equity 13 in exchange for assuming the cash outflow arising from the commercial paper 116 and assigning the cash inflow arising from the call loan 192.

Figure 43:
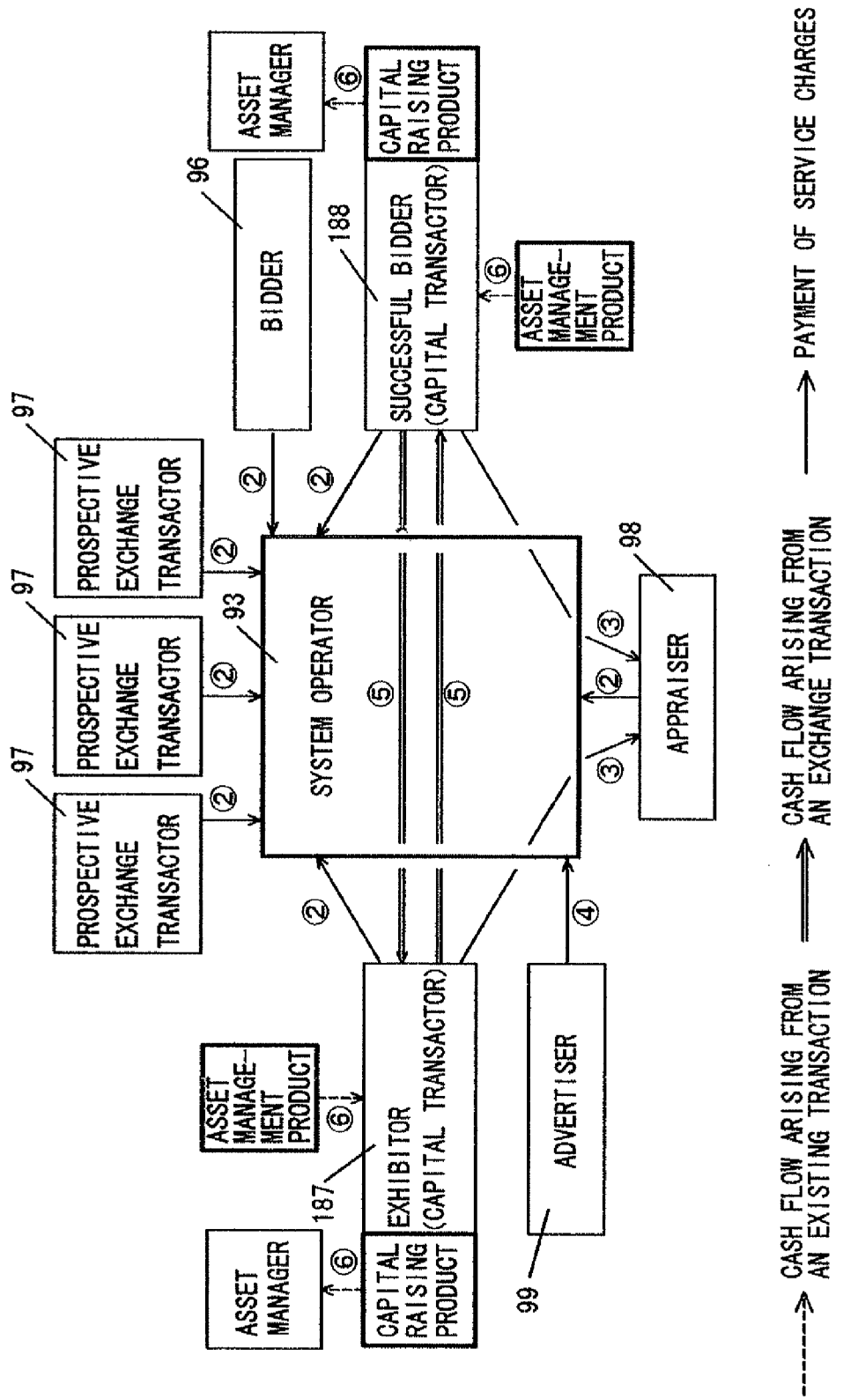
FIG. 43 is a diagram showing an embodiment of the flows of funds and the fee collection scheme in an exchange transaction by tie-in of an asset management product and a capital raising product.

FIG. 43 is an embodiment of the flows of funds and the fee collection scheme in a cash flow exchange by tie-in of an asset management product and a capital raising product.

In the diagram, ② indicates that an exhibitor 187, who is a capital transactor, a successful bidder 188, who is also a capital transactor, a bidder 96, prospective exchange transactors 97 and an appraiser 98 pay service charges, line charges and/or the like to the system operator 93.

③ indicates that the exhibitor 187 and the successful bidder 188 pay appraisal fees to the appraiser 98.

④ indicates that an advertiser 99 pays an advertisement fee for insertion of a banner ad or a pop-up ad to the system operator 93.

⑤ indicates that, as a result of completing the cash flow exchange, payment and receipt of an exchange difference and the cash flows are executed between the exhibitor 187 and the successful bidder 188.

⑥ indicates the existing cash outflows that the exhibitor 187 and the successful bidder 188 are respectively paying to asset managers and the existing cash inflows that they are respectively receiving from asset management products.

Figure 44:
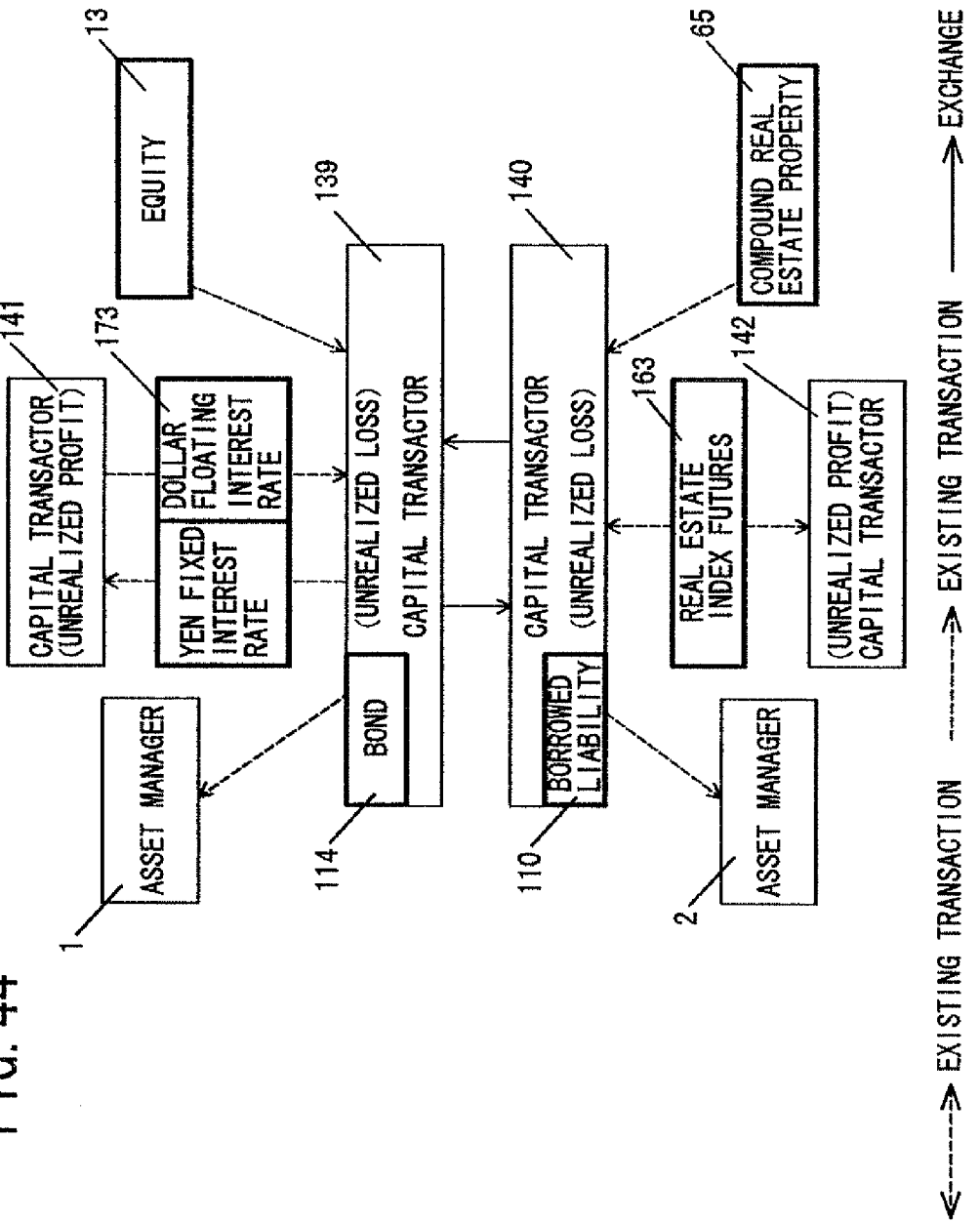
FIG. 44 is another embodiment in accordance with the invention illustrating an exchange transaction by tie-in of an asset management product, a capital raising product and a capital transaction product.

Next, FIG. 44 is an embodiment of the cash flow exchange by tie-in of an asset management product, a capital raising product and a capital transaction product illustrating a case in which capital transactors exchange by tie-in an asset management product as a whole, a capital raising product and an unrealized profit or loss of a capital transaction product.

Herein, a capital transactor 139 is servicing a bond 114 being held by an asset manager 1, is carrying an unrealized loss of a cross-currency interest rate swap transaction 173 with a capital transactor 141 and is holding an equity 13, while a capital transactor 140 is servicing a borrowed liability 110 from an asset manager 2, is carrying an unrealized loss of a real estate index futures transaction 163 with a capital transactor 142 and is holding a compound real estate property 65.

As a result of completing a cash flow exchange, the capital transactor 139 has 'passed on the cash outflow arising from the bond 114, assumed the unrealized loss of the real estate index futures transaction 163 and taken over the cash inflow arising from the compound real estate property 65' in exchange for 'assuming the cash outflow arising from the borrowed liability 110, passing on the unrealized loss of the cross-currency interest rate swap transaction 173 and assigning the cash inflow arising from the equity 13,' while at the same time, the capital transactor 140 has 'passed on the cash outflow arising from the borrowed liability 110, assumed the unrealized loss of the cross-currency interest rate swap transaction 173 and taken over the cash inflow arising from the equity 13' in exchange for 'assuming the cash outflow arising from the bond 114, passing on the unrealized loss of the real estate index futures transaction 163 and assigning the cash inflow arising from the compound real estate property 65.'

Figure 45:
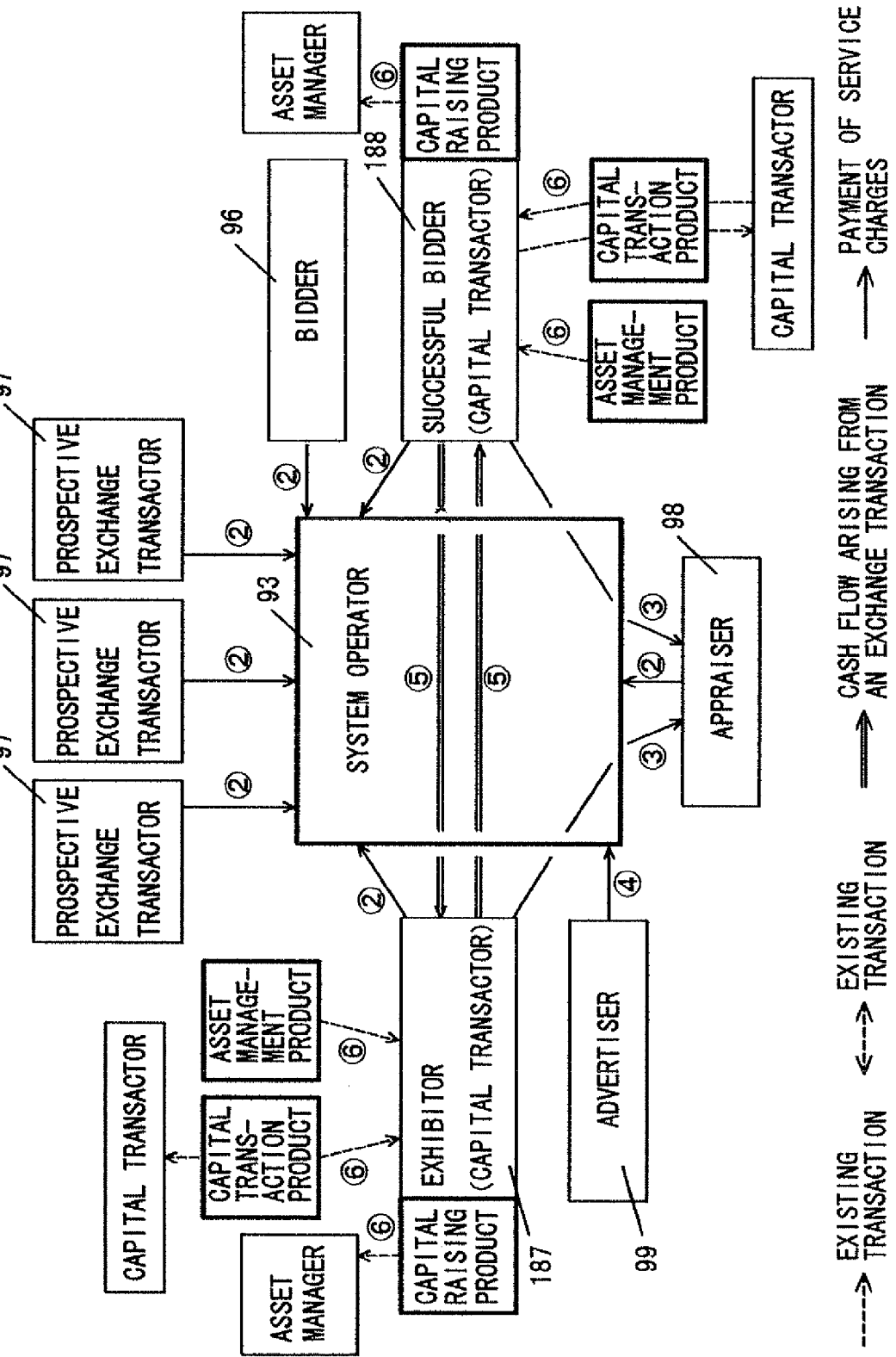
FIG. 45 is a diagram showing an embodiment of the flows of funds and the fee collection scheme in an exchange transaction by tie-in of an asset management product, a capital raising product and a capital transaction product.

FIG. 45 is an embodiment of the flows of funds and the fee collection scheme in a cash flow exchange by tie-in of an asset management product, a capital raising product and a capital transaction product.

In the diagram, ② indicates that an exhibitor 187, who is a capital transactor, a successful bidder 188, who is also a capital transactor, a bidder 96, prospective exchange transactors 97, and an appraiser 98 pay service charges, line charges and/or the like to the system operator 93.

③ indicates that the exhibitor 187 and the successful bidder 188 pay appraisal fees to the appraiser 98.

④ indicates that an advertiser 99 pays an advertisement fee for insertion of a banner ad or a pop-up ad to the system operator 93.

⑤ indicates that, as a result of completing the cash flow exchange, payment and receipt of an exchange difference and the cash flows are executed between the exhibitor 187 and the successful bidder 188.

⑥ indicates the existing cash outflows that the exhibitor 187 and the successful bidder 188 are respectively paying to asset managers, the existing positions that they are respectively carrying vis-à-vis other capital transactors, and the existing cash inflows that they are respectively receiving from asset management products.

Figure 46:
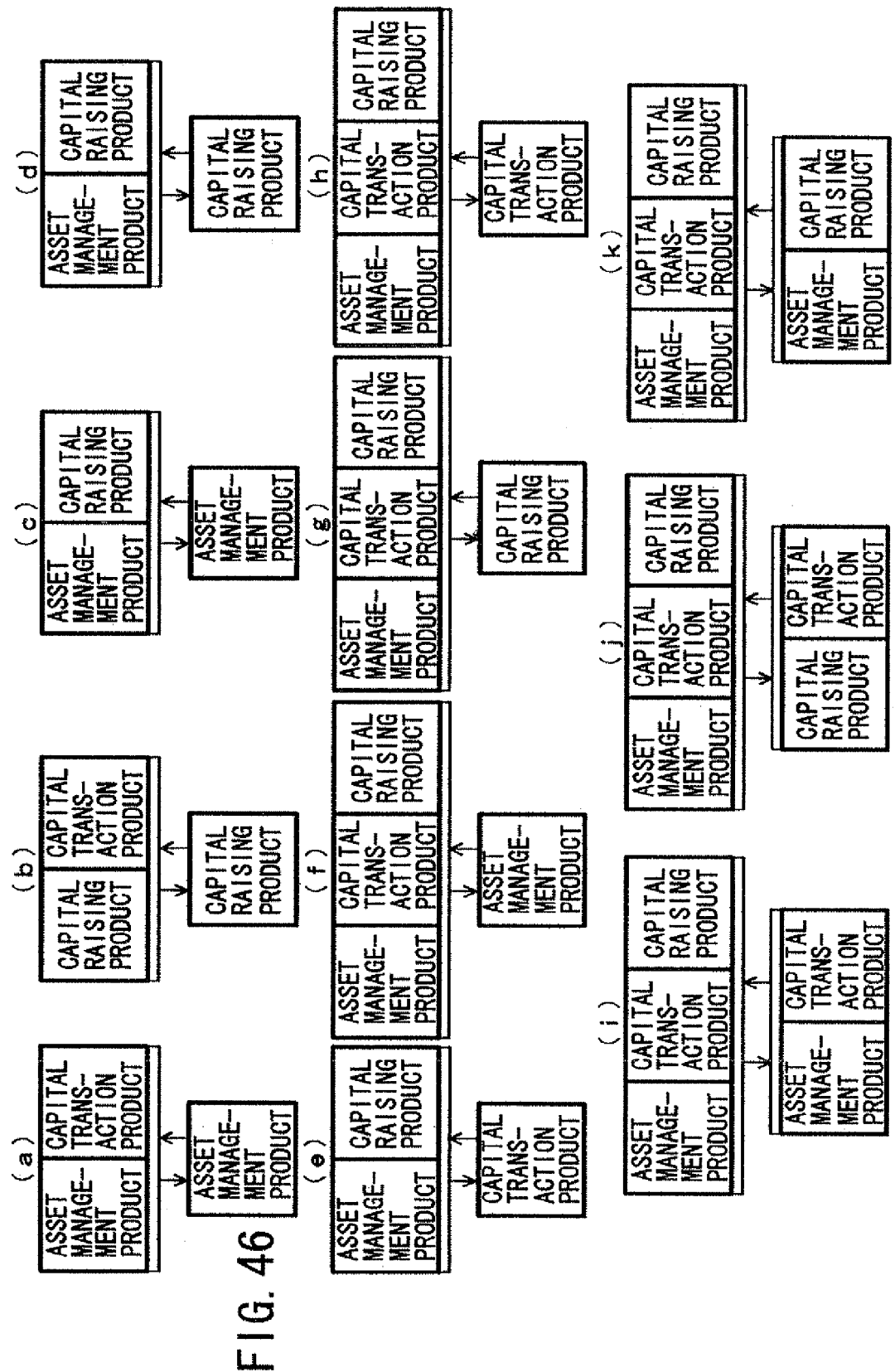
FIG. 46 is another embodiment in accordance with the invention illustrating exchange transactions on a net basis.

Furthermore, FIG. 46 shows main transaction styles of the case in which an exchange transaction is performed on a net basis by one of various combinations of the direct exchange of asset management products, the cash flow exchange of asset management products, the cash flow exchange of capital raising products and the cash flow exchange of capital transaction products.

In the diagram, (a) indicates that 'a tie-in of an asset management product and a capital transaction product' is exchanged for 'an asset management product.'

(b) indicates that 'a tie-in of a capital raising product and a capital transaction product' is exchanged for 'a capital raising product.'

(c) indicates that 'a tie-in of an asset management product and a capital raising product' is exchanged for 'an asset management product.'

(d) indicates that 'a tie-in of an asset management product and a capital raising product' is exchanged for 'a capital raising product.'

(e) indicates that 'a tie-in of an asset management product and a capital raising product' is exchanged for 'a capital transaction product.'

(f) indicates that 'a tie-in of an asset management product, a capital transaction product and a capital raising product' is exchanged for 'an asset management product.'

(g) indicates that 'a tie-in of an asset management product, a capital transaction product and a capital raising product' is exchanged for 'a capital raising product.'

(h) indicates that 'a tie-in of an asset management product, a capital transaction product and a capital raising product' is exchanged for 'a capital transaction product.'

(i) indicates that 'a tie-in of an asset management product, a capital transaction product and a capital raising product' is exchanged for 'a tie-in of an asset management product and a capital transaction product.'

(j) indicates that 'a tie-in of an asset management product, a capital transaction product and a capital raising product' is exchanged for 'a tie-in of a capital raising product and a capital transaction product.'

(k) indicates that 'a tie-in of an asset management product, a capital transaction product and a capital raising product' is exchanged for 'a tie-in of an asset management product and a capital raising product.'

Now, the information technology side of the above-described embodiments will be explained in more detail by using a block diagram of FIG. 47:

First, the present system is arranged on the Internet 193, and comprises an exchange transaction site for financial and related instruments 194 (hereinafter referred to as the site 194) providing various exchange transaction markets for financial instruments and/or quasi-financial instruments, and a plurality of client terminals 195 for performing various exchange transactions for the purpose of asset management, capital raising and/or capital transactions in said markets.

Those who use the client terminals 195 are asset managers, capital raisers, capital transactors and/or others, and the system users, by accessing said site 194 from their own client terminals 195, can complete various exchange transactions on a matching basis and execute various business accompanying the exchange transactions.

The present site 194 is for sequentially processing orders of various desired exchange products from the client terminals 195, for sequentially executing the settlement and administration business related to the exchange transactions, and for appropriately distributing to the client terminals 195 the various data necessary for the exchange transactions, and comprises at least one exchange transaction server for financial and related instruments 196 (hereinafter referred to as the server 196), a support terminal 197, a client information database 198, an exchange transaction database 199, a contract management database 200, a settlement management database 201, an appraiser information database 202, and a bus for connecting them.

Additionally, the present system uses ISO15022 for the electronic message format, ISO6166 for the securities identification numbering system, and ISO 9362 for the financial institution identification numbering system, as well as, for example, Financial Information eXchange (FIX) for the protocol and eXtensible Markup Language (XML) for the description language of electronic messages, so that jobs from execution to transaction confirmation and settlement of various exchange transactions can be electronically processed in a seamless manner 24 hours a day both domestically and abroad.

The present server 196 works by the execution of at least one central processing unit in at least one workstation and in conjunction with at least one program stored in memory, and/or with the like, and is equipped to function as a WWW server and/or a database server. The former is a web management function, via the Internet 193, for managing access from client terminals 195 to perform authentication processing, for providing the client terminals 195 with various web pages that appear on screens and that users interface with, and for exchanging information with the client terminals 195. And the latter is a database management function for accessing the client information database 198, the exchange transaction database 199, the contract management database 200, the settlement management database 201 and/or the appraiser information database 202, for searching for data on the databases, for reading out the data and for writing data to the databases. Moreover, these databases are stored in the memory or on at least one hard disc device in the workstation, and/or in the like.

The support terminal 197 is a terminal with which the system operator manages the present server 196 and the databases. Using the support terminal 197, the operator can monitor implementation status of exchange transactions and business accompanying the exchange transactions on all the client terminals 195, and can exchange messages with each client terminal 195 utilizing an e-mail function of the support terminal 197.

The client terminal 195 is a device such as a personal computer, a mobile telephone equipped with a liquid crystal display, a personal digital assistant and/or a pager, and comprises a control unit 203, a display unit 204, an input unit 205, a communication unit 206 and the like. The control unit 203 comprises a processor, memory and the like, and stores operation programs, including a browser, for exchange transactions. The display unit 204 and the input unit 205 respectively display and input various data and instructions, and the communication unit 206 communicates with other devices on the Internet 193. Moreover, utilizing e-mail functions of the client terminals 195, the users can exchange messages with the operator and with other client terminals 195.

The exchange transaction database 199 stores names and issues, types and attributes, terms and conditions, and/or the like of asset management products, capital raising products and/or capital transaction products to be objects of exchange transactions, and also stores, by product, details of exchange orders, results of matching, and/or information on events related to exchange transactions before their expires such as exercise of various rights and fulfillment of various obligations, together with their histories.

The contract management database 200 stores various agreements in which digital signatures have been entered as well as electronic master agreements that are models thereof, various prospectuses in which digital signatures have been entered as well as electronic master prospectuses that are models thereof, various reports and disclosures respectively to the authorities and to the general public in which digital signatures have been entered as well as electronic master reports and disclosures that are models thereof, and/or the like, and also stores various data generated in accordance with the progress of document preparation processing, together with their histories.

The settlement management database 201 stores funds account numbers, securities account numbers and/or the like of users of the present system, and also stores various data generated in accordance with the progress of inter-account funds transfer processing and/or inter-account securities transfer processing between and among the users, together with their histories.

The appraiser information database 202 stores self-introduction materials containing profiles and appraisal fee scales of appraisers collected from themselves, and also stores various reference and/or proposal data that appraisers prepare with respect to individual exchange items.

The profiles may include the information on ownership structure, associated companies and human resources of the appraisers.

Moreover, the client information database 198 stores the following information:

(a) Individual names and/or corporate names of users of the present system, individual section names in case of the latter, contact information including e-mail addresses, IDs and passwords;

(b) Credit ratings, stock ratings, various financial statements and/or various financial variables of exchange transactors;

(c) Asset management policies and objectives in the case in which the exchange transactors are asset managers, capital raising policies and objectives in the case in which they are capital raisers, and/or capital transaction policies and objectives in the case in which they are capital transactors;

(d) Types and attributes of appraisers that exchange transactors may desire to utilize; and/or (e) Types and attributes of reference data and/or proposal data that exchange transactors may desire to receive.

Additionally, said ID is a code number or user name allocated to each user, while said password is authentication information that is required when a user accesses the present server 196. The present server 196 identifies an accessing user by an ID, and authenticates the accessing user by the combination of the ID and the password.

Now, the methods of matching demands to exchange according to the present system include an auction mode and a negotiation mode.

The auction mode is utilized in cases in which an asset manager, a capital raiser or a capital transactor to be a counterparty of an exchange transaction is not originally specified and orders are matched basically according to the principle of balance of supply and demand, and/or in cases in which, although the name of the exhibiting party and its act of exhibition are originally disclosed, the bidding party is not originally specified and orders are matched on the basis of provisional terms basically according to the principle of balance of supply and demand. The auction mode is effective on occasions on which an exchange item is a well-recognized product. Additionally, as used in the present embodiment, the former auction mode shall be referred to as the 'matching method with both sides unspecified,' while the latter auction mode shall be referred to as the 'matching method with a single side specified.'

On the other hand, the negotiation mode is utilized in cases in which a counterparty of the exchange transaction is originally specified or selected and orders are matched under an environment in which the principle of balance of supply and demand does not act directly. The mode is effective on occasions on which an exchange item is a tie-in of a plurality of products, or is a capital raising product or capital transaction product with a complicated cash flow. Additionally, as used in the present embodiment, the negotiation mode shall be referred to as the 'matching method with both sides specified.'

In the case of the 'matching method with a single side specified,' a prospective exchange transactor that desires to make an exhibition (hereinafter referred to as an exhibitor) first starts up the operation program stored in the control unit 203 of his or her client terminal 195 to establish a session with the present site 194. Next, the present server 196 sends a top page for login to the client terminal 195 of the exhibitor, who inputs an ID and a password in the page and sends it to the present server 196.

Then, the present server 196, having received the page, accesses the client information database 198 and determines whether or not the combination of the ID and the password is stored therein. If it is stored therein, the present server 196 sends the exhibitor a menu page on which he or she can choose to participate in an exchange transaction, to negotiate on an exchange transaction, to inquire about his or her agreement, to inquire about his or her funds account, to inquire about his or her securities account, to peruse appraiser data, to view market information, or to report his or her event. Here, the exhibitor chooses to participate in an exchange transaction, and then the present server 196 sends the exhibitor an order placement page for inputting details of an exchange order.

Next, the exhibitor, having received the order placement page, inputs or specifies therein a name or issue, a type and attribute, terms and conditions, and a desired offer value of the asset management product, capital raising product or capital transaction product that he or she desires to offer (hereinafter referred to as the exhibition product), and a desired offer volume in the case in which the exhibition product is a unit price product, as well as a name or issue, a type and attribute, terms and conditions, and a desired procurement value of the asset management product, capital raising product or capital transaction product that he or she desires to procure through the auction (hereinafter referred to as the bidding product), and a desired procurement volume in the case in which the bidding product is a unit price product. The exhibitor also inputs or specifies therein a desired exchange period, acceptable creditworthiness of his or her exchanging counterparties, various requests to the exchanging counterparties, and/or a desired exhibition period as well as acceptability of an automatic extension or an early termination of the exhibition, and further specifies therein, as a provisional term, the disparity between the desired offer value and the desired procurement value, i.e. the desired amount of exchange difference. After confirming the contents of the order, the exhibitor sends the page to the present server 196. Additionally, the provisional term, which may be an indication of a specific uniform value or of a range with an upper and/or lower limit, may be arbitrarily decided by the exhibitor.

The present server 196 receives the exchange order from the exhibitor, stores it in an exhibition list on the exchange transaction database 199, and then sends the exhibitor an order confirmation page for reporting the stored contents thereto, on which the exhibitor confirms the contents of his or her order.

Here, the present server 196 accesses the client information database 198, searches attribute information on users of the present system stored therein such as policies and objectives on asset management, capital raising or capital transactions, industries, credit ratings, stock ratings and financial data, and specifies prospective exchange transactors that are in line with said exchange order of the exhibitor. Then, the system operator prepares a preliminary prospectus based on the contents of the exchange order, converts it into an electronic document format or the like, and then distributes it simultaneously to the specified prospective exchange transactors via the support terminal 197. Additionally, in the case in which narrowing-down of distribution destinations is unnecessary, the operator distributes the preliminary prospectus to all the prospective exchange transactors.

Next, a prospective exchange transactor that has received the preliminary prospectus, has confirmed that the exhibition product is his or her desired procurement product while the bidding product is his or her desired offer product, and then has decided to participate in the bidding (hereinafter referred to as a bidder), on his or her own order placement page, specifies both the products, and also inputs or specifies various requests to the exhibitor, whether it is a limit order or an order without limit, his or her bidding volume in the case in which the bidding product is a unit price product, and his or her desired amount of exchange difference vis-à-vis the provisional term in case of a limit order. After confirming the contents of the order, the bidder sends the page to the present server 196.

Thereafter, the present server 196 receives the exchange order from the bidder, stores it in a bidding list on the exchange transaction database 199, and then sends the bidder an order confirmation page for reporting the stored contents thereto, on which the bidder confirms the contents of his or her order.

Additionally, the exchange difference referred to in this context does not mean the individual sums that successful bidders respectively pay to or receive from the exhibitor at the stage where the exchange transactions have been completed, but the total sum that the successful bidding side as a whole pays to or receives from the exhibitor. Thus, in the case in which a plurality of successful bidders are involved, the finally fixed amount of the exchange difference is prorated according to the respective successful bid volumes of the successful bidders, and then the prorated amounts are respectively paid to or received from the exhibitor. Incidentally, the desired amount of exchange difference that a bidder specifies may be at levels that do not take the provisional term into account, but in general, the more the desired amount is in line with the provisional term, the more likely the bid will be successful.

The present server 196 matches an exchange demand of an exhibitor to an exchange demand of a bidder by executing processing as described below:

First, concerning orders without limit from bidders, the server 196 makes successful all the desired offer volumes of the bidders within the desired procurement volume of the exhibitor. Also, concerning limit orders from bidders, the server 196 extracts therefrom the orders whose desired amounts of exchange difference are within the range of the provisional term of the exchange difference, and the orders whose desired amounts of exchange difference are beyond the range of the provisional term because they are even more favorable to the exhibitor than the provisional term, and makes them successful in the order of how much the desired amounts of exchange difference favor the exhibitor.

Next, the present server 196 stores the contents of the successful bids in the exchange transaction database 199 and, based on the data, updates the remaining volumes on the exhibition list and on the bidding list. Then, at the stage where successful bid volumes of the bidding product have been accumulated to reach the desired procurement volume of the exhibitor, the present server 196 sets as a fixed term the desired amount of exchange difference that most favors a bidder out of those of the successful bid orders, thereby completing the exchange transaction.

At the point when the exchange transaction has been completed, the system operator prepares, by amending said preliminary prospectus, successful bid notices that describe the details of the successful bids including the fixed amount of exchange difference. It sends the successful bid notices to the exhibitor and the successful bidder or bidders via the support terminal 197, and the respective parties finally confirm this, whereby the transaction confirmation ends. On this occasion, if a plurality of successful bidders are involved, the fixed amount of exchange difference is prorated according to the respective successful bid volumes of the successful bidders, and then the prorated amounts are respectively reported to the successful bidders. Also, if the exhibition product is a unit price product, the exhibition volume is prorated according to the respective successful bid volumes of the successful bidders regarding the bidding product, and then the prorated volumes are respectively reported to the successful bidders.

Thereafter, if an appraiser is not utilized, the successful bid notice functions as the final prospectus, while if an appraiser is utilized, through the due diligence of the completed exchange products and the appraisal of the fixed amount of exchange difference by the appraiser, the successful bid notice is amended into the final prospectus.

Additionally, the above describes an exchange transaction that finally sets as a uniform numerical value the amount of exchange difference between an exhibiting party and one or more successful bidding parties. However, if both an exhibition product and a bidding product are unit price products, a style in which, for example, an exchange ratio of volume between the products is predetermined, and then amounts of exchange differences vary, successful bidder by successful bidder, at each matching to make successful bids in the order of how much the orders favor the exhibitor, may also be employed.

In the case of the 'matching method with both sides unspecified,' a prospective exchange transactor specifies or inputs, in said order placement page, a name or issue, a type and attribute, terms and conditions, and a desired offer value of the asset management product, capital raising product or capital transaction product that he or she desires to offer, and a desired offer volume in the case in which the desired offer product is a unit price product, as well as a name or issue, a type and attribute, terms and conditions, and a desired procurement value of the asset management product, capital raising product or capital transaction product that he or she desires to procure, and a desired procurement volume in the case in which the desired procurement product is a unit price product. The prospective exchange transactor also specifies or inputs therein an exchange ratio in the case in which both the desired offer product and the desired procurement product are unit price products, a desired exchange period, various requests to exchanging counterparties, whether it is a limit order or an order without limit, and a term of validity of the order as well as acceptability of an automatic extension or an early termination of the term, and further specifies therein in case of a limit order, the disparity between the desired offer value and the desired procurement value, i.e. the desired amount of exchange difference. After confirming the contents of the order, the prospective exchange transactor sends the page to the present server 196.

The present server 196 receives the order from the prospective exchange transactor, and stores it in an exchange order list on the exchange transaction database 199. Then, the server 196 sends the prospective exchange transactor an order confirmation page for reporting the stored contents thereto, on which the prospective exchange transactor confirms the contents of his or her order.

The present server 196 matches opposite exchange demands by executing processing as described below:

First, whether they are limit orders or orders without limit, the server 196 matches exchange orders, stored in the exchange order list, in which the desired offer product and the desired procurement product in one order are respectively the desired procurement product and the desired offer product in the other order. Also, in the case in which both the products are unit price products, the server 196 matches exchange orders that agree with each other not only in the offer vis-à-vis the procurement, but also in the exchange ratio.

Next, in the case in which the stored exchange orders are orders without limit, the server 196 matches one order to as many other orders as possible so that the desired procurement volumes and desired offer volumes of the latter orders respectively correspond to the desired offer volume and desired procurement volume of the former order. Also, in the case in which the stored exchange orders are limit orders, the server 196 extracts exchange orders whose desired amounts of exchange difference most favor exchanging counterparties, determines whether or not an exchange transaction can be completed, and if the exchange transaction can be completed, completes it between both the orders. Also, if there is divergence between desired amounts of exchange difference and thus an exchange transaction cannot be directly completed, the server 196 may regard an intermediate amount as a completed amount of exchange difference.

Next, the present server 196 stores the contents of the completed transactions in the exchange transaction database 199 and, based on the data, updates the remaining volumes on the exchange order list. That is, if exchange transaction of the entire volumes is completed, the server 196 deletes both the exchange orders from the exchange order list, while if exchange transaction is partially completed, the server 196 continues to carry the remaining volumes on the pertinent exchange orders on the exchange order list.

Also, at the point when an exchange transaction has been completed, the present server 196 sends each exchange completer via the support terminal 197, a respective contract notice that describes details of the exchange products including the completed amount of exchange difference, on which each party finally confirms the details, thereby ending its transaction confirmation.

Now, in the case of the negotiation mode, i.e. the previously described 'matching method with both sides specified,' an asset manager, capital raiser or capital transactor (hereinafter referred to as a requesting party) that desires an exchange transaction with a specific user of the present system, chooses to negotiate on an exchange transaction on said menu page, and then the present server 196 sends the requesting party a transaction negotiation page in which details of his or her transaction negotiation are to be input.

Next, the requesting party, having received the transaction negotiation page, specifies or inputs therein information for specifying one asset manager, capital raiser or capital transactor to be a negotiating counterparty (hereinafter referred to as a requested party) or information for narrowing down requested parties to a specific plurality of persons based on their industry, credit rating, stock rating, financial data and/or the like. Furthermore, the requesting party specifies or inputs therein, as specific conditions that he or she desires from the requested party, a name or issue, a type and attribute, terms and conditions, and a desired offer value of his or her desired offer product, and a desired offer volume in the case in which the product is a unit price product, as well as a name or issue, a type and attribute, terms and conditions, and a desired procurement value of the desired procurement product, and a desired procurement volume in the case in which the product is a unit price product, a desired exchange period, various requests to the requested party, and/or the disparity between the desired offer value and the desired procurement value, i.e. the desired amount of exchange difference, and sends the page to the present server 196.

In the case in which the requesting party has individually specified one requested party, the present server 196, having received the transaction negotiation page from the requesting party, adds the ID of the requesting party to the e-mail address of the requested party, and sends the page thereto. On the other hand, in the case in which the requesting party has specified conditions concerning selection of requested parties, the present server 196, based on information such as industries, credit ratings, stock ratings and/or financial data of users of the present system stored in the client information database 198, adds the ID of the requesting party to the e-mail addresses of all the users satisfying said conditions, and distributes the transaction negotiation page thereto. Also, in the case in which the requesting party desires to select a requested party individually out of candidates satisfying said conditions, the present server 196 feeds back names of all the candidates to the requesting party, causes it to select a requested party, and then sends the transaction negotiation page to the requested party.

Next, the requested party, having received the transaction negotiation page, confirms the contents of the proposal from the requesting party, selects completion, non-completion or negotiation as a stance thereon, and then returns the page to the requesting party.

If the requested party chooses not to complete the transaction out of the choices, the exchange transaction is obviously not completed. On the other hand, if the requested party chooses to complete the transaction, the present server 196 as well as the requesting party is notified of the completion of the exchange transaction. Moreover, if the requested party chooses to negotiate, he or she can counterpropose the name or issue, the type and attribute, the terms and conditions, and the desired offer value of his or her desired offer product, and the desired offer volume in the case in which the product is a unit price product, as well as the name or issue, the type and attribute, the terms and conditions, and the desired procurement value of the desired procurement product, and the desired procurement volume in the case in which the product is a unit price product, the desired exchange period, and/or the desired amount of the exchange difference. At this point, the requested party (hereinafter referred to as the new requesting party) converts the received transaction negotiation page into the page for reply, revises the desired exchange conditions on this page, and then returns it as a new proposal to the requesting party (hereinafter referred to as the new requested party). In this way, the new requested party and the new requesting party search for a point of contact for a negotiated exchange transaction.

Additionally, in the above-described embodiment, the present server 196 is involved in the process until the point of contact between both the parties is established. It is also possible, however, that the requesting party begins transaction negotiation directly with the requested party utilizing an e-mail function, and both the parties or either of them notifies the server 196 only of their transaction result.

The contract management database 200 stores electronic master agreements by product for direct exchanges of asset management products, general cash flow exchanges of asset management products, cash flow exchanges of asset management products on the basis of their unrealized profits, cash flow exchanges of asset management products on the basis of their unrealized losses, exchange transactions of asset management products by the comprise method between the direct exchange and the cash flow exchange, cash flow exchanges of capital raising products, cash flow exchanges of capital transaction products on the basis of their unrealized profits, cash flow exchanges of capital transaction products on the basis of their unrealized losses, cash flow exchanges between asset management products and capital transaction products on the basis of their unrealized profits, cash flow exchanges between asset management products and capital transaction products on the basis of their unrealized losses, various exchange transactions by tie-in, which are applied styles of the above-described exchange transactions, and/or assignment to third parties and premature cancellation of exchange agreements.

The electronic master agreement referred to in this context means an electronic document prepared by combining input data that has described items and conditions (hereinafter respectively referred to as general items and general conditions) commonly used in each transaction style or in each type and attribute of a transaction product, with an electronic form. Moreover, an electronic form means electronic data converted from an ordinary paper-based form for a contract, and consists of a field in which detailed contents of an agreement and addresses and names of contracting parties are to be input and a field in which digital signatures of the contracting parties are to be entered.

In the electronic master agreement in accordance with the present system, although general items and general conditions are input in predetermined writing frames in an electronic form, a field in which items and conditions that vary according to individual exchange agreements (hereinafter respectively referred to as additional items and additional conditions) are to be input, and a field in which an exchange transactor and the system operator to be contracting parties are to input their addresses and names and enter their digital signatures, are left blank.

In a letter of intent in accordance with the present embodiment, at the stage where transaction confirmation is finalized, the present server 196 accesses the exchange transaction database 199, reads out additional items and additional conditions of the pertinent products stored therein such as the name or issue, the terms and conditions, the exchange period, the completed exchange values, the completed exchange volumes in the case of unit price products, the amount of exchange difference, the schedule until the entry into the exchange agreement, the method of the due diligence of the products as well as the appraisal of the transaction values, the information regarding the appraiser in charge of the due diligence and appraisal, and/or the term of validity of the letter of intent, and writes them to blank fields of said electronic master agreement.

Thereafter, in an exchange transaction completed by the auction mode, in the blank fields of a letter of intent between the operator and an exhibitor and a letter of intent between the operator and a successful bidder, the respective parties input their addresses and names and enter their digital signatures, whereby both the letters come into force. In practice, via the support terminal 197, the present server 196 sends an exhibitor and a successful bidder respective letters of intent to which additional items and additional conditions have been written and in which the operator has entered its signature. Next, respectively, the exhibitor and the successful bidder enter their signatures and return the letters of intent to the present server 196, and the server 196 stores them in the contract management database 200.

On the other hand, in an exchange transaction completed by the negotiation mode, in the blank fields of a letter of intent between exchange completers, the respective parties input their addresses and names and enter their digital signatures, whereby the letter comes into force. In practice, via the support terminal 197, the present server 196 sends one exchange completer a letter of intent to which additional items and additional conditions have been written, and the exchange completer having received it, enters his or her digital signature and returns it to the server 196. Next, the present server 196 sends it to the other exchange completer, and the exchange completer having received it, enters his or her digital signature and returns it to the server 196. Then, the present server 196 stores the signed letter of intent in the contract management database 200.

The letter of intent is amended to be used as the exchange agreement, which is the final agreement between the parties. That is, based on the result of due diligence and/or appraisal, the system operator amends additional items and additional conditions input in blank fields of the electronic master agreement, and then the parties input their addresses and names and enter their digital signatures in the amended agreement, whereby the agreement comes into force. Then, the present server 196 stores the signed agreement in the contract management database 200.

Incidentally, the procedure during an exchange period in a case in which a contracting party assigns his or her exchange agreement to a third party, or in a case in which a contracting party cancels his or her exchange agreement may be similarly executed by using an electronic master agreement for assignment or cancellation. Also, in a direct exchange between non-securities such as deposit assets other than certificates of deposit, loan assets, land, buildings or compound real estate properties, if it is technically difficult to involve a conduit such as a special purpose vehicle, a trust or a partnership to divide the assets into small lots, the offerer finds it necessary to assign his or her existing contract on the non-security to the procurer. The assignment procedure on such an occasion may also be executed by using the above-described electronic master agreement.

In the contract management database 200, in addition to a letter of intent and an exchange agreement themselves, various data generated from the beginning of preparation of a letter of intent until signing on an exchange agreement is finalized, such as an identifier allocated to each agreement, a digital signature, and history data of procedures performed by the contracting parties and the present server 196, are sequentially stored in accordance with the progress of agreement processing. Thus, the originality of a document can be confirmed by comparing the document before a digital signature is entered and the document after it is entered.

Also, a digital signature to be entered in a letter of intent or exchange agreement is prepared by using a secret key existing, for example, in an IC card held by an exchanging party or inside his or her client terminal 195. Thus, a signer can be authenticated if the entered digital signature is decoded and verified.

Additionally, an exchanging party can confirm at any time his or her own letter of intent or exchange agreement stored in the contract management database 200 by choosing to inquire about his or her agreement on said menu page.

The contract management database 200 may also store electronic master prospectuses for exchange transactions that are required to deliver prospectuses, on which general items and general conditions corresponding to each style of transaction or each type and attribute of a transaction product are described. At the stage where a preliminary prospectus is to be delivered, the present server 196 accesses the exchange transaction database 199, and reads out additional items and additional conditions stored therein such as a name or issue, terms and conditions of the desired offer product, a name or issue, terms and conditions of the desired procurement product, acceptable creditworthiness of exchanging counterparties, a desired exhibition period as well as acceptability of an automatic extension or an early termination of the exhibition, desired exchange values (i.e. provisional terms), desired exchange volumes in case of unit price products, and/or a desired exchange period. Then, the server 196 writes them to blank fields of said electronic master prospectus, and sends the prospectus to the exhibitor.

Next, the exhibitor receives the prospectus, inputs his or her address and name and enters his or her digital signature in the blank fields thereon, and returns the prospectus to the present server 196. Then, the server 196 enters an identifier of the exhibitor in electronic mail addresses of system users that the server 196 has specified or in electronic mail addresses of unspecified system users, distributes the electronic preliminary prospectus to the addresses, and then stores the prospectus in the contract management database 200. On the other hand, concerning an exchange transaction for which the system operator is obliged to deliver a prospectus, the operator itself inputs its address and name and enters its digital signature therein, and then distributes the electronic preliminary prospectus to the pertinent system users.

At the stage where the terms of the exchange transaction have been fixed, the present server 196 amends part of the additional conditions on the electronic preliminary prospectus to prepare a successful bid notice or an electronic final prospectus. Then, the server 196 causes the exhibitor to enter his or her digital signature or the server 196 enters a digital signature of its own, and distributes the notice or the prospectus to the pertinent system users.

Incidentally, a user of the present system can confirm at any time electronic prospectuses stored in the contract management database 200 by choosing to inquire about his or her agreement using the previously described function therefor on said menu page. Thus, as a method of delivering a prospectus, other than the above-described distribution, there is a method in which the system operator notifies the pertinent system users via the support terminal 197 only that the prospectus has been issued, and the system users, having been notified to that effect, actively access the contract management database 200 and download the prepared electronic preliminary or final prospectus.

The contract management database 200 may also store electronic master reports and electronic master disclosures for exchange transactions respectively required to be reported to the authorities and to be disclosed to the general public, on which general items and general conditions corresponding to each style of transaction or each type and attribute of a transaction product, and each reporting or disclosing destination, are described. At the stage where signing on an exchange agreement is finalized, the present server 196 accesses the exchange transaction database 199, reads out additional items and additional conditions stored therein such as names or issues, terms and conditions of the pertinent products, the exchange period, completed exchange values, completed exchange volumes in case of unit price products, the amount of exchange difference, information on the due diligence and appraisal, writes them to blank fields of said electronic master report or disclosure, and sends it to the exchanging parties.

Then, the exchanging party receives the report or disclosure, inputs his or her address and name and enters his or her digital signature in the blank fields thereon, and returns the report or disclosure to the present server 196. Next, the server 196 enters an identifier of the exchanging party in electronic mail addresses of the authorities or the mass media that the exchanging party has specified, and sends the report or disclosure to the addresses. Thereafter, the server 196 stores it in the contract management database 200. On the other hand, concerning an exchange transaction that the system operator is obliged to report or disclose, the operator itself inputs its address and name and enters its digital signature therein, and then sends the report or disclosure to the authorities or the mass media.

Additionally, an exchanging party can confirm at any time report documents or disclosure documents of his or her own stored in the contract management database 200 by choosing to inquire about his or her agreement on said menu page.

Besides, the present server 196 may also execute similar processing in the case in which a new obligation to report or disclose has developed in accordance with the occurrence of an event between exchanging parties such as payment and receipt of cash flows, exercise of various rights such as jus disponendi, and fulfillment of various obligations. Also, at the time of the occurrence of the above-described events or at other times, the operator may send an exchanging party a questionnaire or the like via the support terminal 197, and realizes communication with him or her in order to inspect whether or not said party is in compliance with his or her exchange agreement, with laws governing said prospectus, report or disclosure, and/or with other related laws and regulations.

The settlement management database 201 stores information such as funds account numbers, payment and receipt histories and funds account balances of users of the present system, i.e. exchanging parties, prospective exchange transactors who desire to participate in exchange transactions depending on the market levels, and/or advertisers who place advertisements related to exchange transactions in the system.

If a user chooses to inquire about his or her funds account on the above-described menu page, the present server 196 accesses the settlement management database 201, and sends his or her client terminal 195 a funds account confirmation page on which the present funds account balance and the payment and receipt history of the user are recorded. Additionally, the system operator as well has a funds account of its own and hence a funds account number, and uses it for payment and receipt of money between the account and the funds accounts of users.

Payment and receipt, between exchanging parties, of cash flows that arise from the completion till the expiry of an exchange transaction are executed through inter-account funds transfers in the present system. The present server 196 accesses the exchange transaction database 199 in a predetermined cycle, and recognizes payment and receipt dates of cash flows of completed exchange products stored therein. Then, via the support terminal 197, for example, one day before the pertinent date, the server 196 sends the client terminal 195 of each exchanging party a funds settlement notice that notifies the party that the inter-account funds transfer will be executed.

Additionally, in an exchange transaction in accordance with the present embodiment, an exchanging party may be a payer or a recipient depending on the actual cash flow. In an exchange transaction completed by the auction mode, for the purpose of maintaining the anonymity of exchanging parties, the system operator becomes the recipient if an exchanging party is a payer, and the payer if an exchanging party is a recipient. On the other hand, in an exchange transaction completed by the negotiation mode, one exchanging party is a payer, while the other is a recipient and thus the operator does not intermediate directly.

The individual name and/or corporate name and funds account number of a payer or a recipient, identifier of an exchange agreement, amount payable or amount receivable, execution date of the funds settlement, and the like are indicated on the funds settlement notice. Then, the payer or the recipient notifies the present server 196 that this funds settlement information has been confirmed.

Next, in accordance with the funds settlement information, the present server 196 executes the inter-account funds transfer that transfers the predetermined amount of money from the payer's funds account to the recipient's funds account. Then, the server 196 updates the information such as funds account balances and payment and receipt histories of the payer and the recipient stored in the settlement management database 201 to reflect the transfer of money.

In the present system, the inter-account funds transfer that uses the funds settlement notice is executed in the following transfers of money as well. However, if payment and receipt of cash flows and/or various service charges concerning a completed exchange product coincide with one another in timing between a payer and a recipient, the operator may write to the funds settlement notice an amount found by offsetting them, and execute the inter-account funds transfer on a net amount basis.

(a) During an exchange period, the operator may charge an exchanging party an additional margin or refund an excess margin to the party due to an increase or decrease in exposure to credit risk between the exchanging parties. In these cases, the operator transfers money between the exchanging party and the operator or between the exchanging parties by the above-described inter-account funds transfer;

(b) Service charges and line charges that the operator receives from exchanging parties;

(c) Line charges that the operator receives from prospective exchange transactors and/or appraisers;

(d) Advertisement fees that the operator receives from advertisers;

(e) Appraisal fees that appraisers receive from exchanging parties; and/or (f) Payment and receipt of a cash flow that accrues at the point when an event occurs as described above during an exchange period, that is, when an exchanging party exercises various rights or fulfills various obligations concerning an exchange transaction. Additionally, by choosing to report his or her event on the menu page, an exchanging party notifies the operator that he or she has exercised his or her right or has fulfilled his or her obligation.

Incidentally, if the object products of a direct exchange of asset management products are securities such as bonds, equities, beneficiary securities, certificates of deposit, or commercial papers, a necessity for executing securities settlement for transferring the actuals arises after the completion of the exchange transaction. Thus, with a view to the securities settlement, the settlement management database 201 in the present embodiment also stores information such as securities account numbers, securities transfer histories and securities account balances of exchange completers and prospective exchange transactors.

If each of these system users chooses to inquire about his or her securities account on the above-described menu page, the present server 196 accesses the settlement management database 201, and sends his or her client terminal 195 a securities account confirmation page on which his or her present securities account balance and securities transfer history are recorded. Additionally, the system operator as well has a securities account of its own and hence a securities account number, and uses it for delivery and receipt of securities between the account and the securities accounts of users.

Deliveries and receipts, between exchanging parties, of securities that arise from the completion till the expiry of an exchange transaction are executed through inter-account securities transfers in the present system. However, in an exchange transaction completed by the auction mode, the system operator becomes the assignee of securities if an exchanging party is an assignor, and becomes the assignor of securities if an exchanging party is an assignee. On the other hand, in an exchange transaction completed by the negotiation mode, if one exchanging party is an assignor of securities, the other is an assignee, while if one exchanging party is an assignee of securities, the other is an assignor, and thus the operator does not intermediate directly. Additionally, object securities of inter-account securities transfers may be immobilized securities or dematerialized securities.

At the stage where signing on an exchange agreement is finalized, via the support terminal 197, the present server 196 sends the client terminal 195 of the exchanging party a securities settlement notice that notifies him or her that the inter-account securities transfer will be executed. The individual name and/or corporate name and securities account number of the exchanging party, identifier of the exchange agreement, volume of securities to be transferred, execution date of the securities settlement, and the like are indicated on the securities settlement notice. Then, the exchanging party notifies the present server 196 that he or she has confirmed the securities settlement information.

Next, in accordance with the securities settlement information, the present server 196 executes the inter-account securities transfer for transferring the predetermined volumes of the securities respectively from the securities account of one exchanging party to that of the other exchanging party, and from the securities account of the other exchanging party to that of the former exchanging party. Then, the server 196 updates the information such as securities account balances and securities transfer histories of both the parties stored in the settlement management database 201 to reflect the transfers of the securities.

Additionally, during an exchange period, the operator may charge an exchanging party an additional margin or refund an excess margin to the party. If securities are used instead of this margin, the present server 196 transfers the object securities between the exchanging party and the operator or between the exchanging parties by the above-mentioned inter-account securities transfer. Also, if, instead of money, securities with equal value are used in the settlement of exchange difference as well, the present server 196 executes a similar inter-account securities transfer.

Now, distribution and receipt of materials that are utilized on occasions on which, for example, prospective exchange transactors select appraisers, are executed as described below:

First, using a form such as a text or an electronic document format, appraisers send the present server 196 their self-introduction materials containing their profiles and appraisal fee scales, and reference and/or proposal data related to individual exchange items. Next, upon receiving these materials or data, the present server 196 sequentially stores them in the appraiser information database 202 together with the dates and times of receipt.

Then, the present server 196 searches the client information database 198, compares the types and attributes of data, stored in the database, that each prospective exchange transactor desires to receive with those of said data related to appraisers that the server 196 has actually received, and specifies target prospective exchange transactors to whom it distributes the self-introduction materials and/or reference/proposal data at this time. Based on the results of this search, using a form such as a text or an electronic document format, it simultaneously distributes these data to the client terminals 195 of the pertinent prospective exchange transactors. Then, the prospective exchange transactors having received the data, may use the data as factors in selecting their appraisers.

Also, a prospective exchange transactor can peruse at any time various data stored in the appraiser information database 202 by choosing to peruse appraiser data on said menu page.

Since the appraiser information database 202 may also store information on the ownership structure, associated companies and human resources of appraisers, the system operator can at any time recognize statuses of conflicts of interest existing between a prospective exchange transactor and an appraiser that he or she desires to utilize, or between a prospective exchange transactor and an appraiser that his or her exchanging counterparty desires to utilize, and then feed back such statuses to parties that will be affected thereby.

Additionally, communication and exchange of various data between a prospective exchange transactor and an appraiser is executed by utilizing an e-mail function that each client terminal 195 is equipped with, by utilizing a hypertext link between the present site 194 and a web site that the appraiser may build separately from the present site 194, and/or by the like.

The present server 196 accesses the exchange transaction database 199 in a predetermined cycle and sequentially executes accumulation and statistical processing of various data stored therein, and the system users can peruse the data from their client terminals 195.

If a user chooses to view market information on the above-described menu page, the present server 196 processes market statuses of various exchange transaction products that have been subjected to accumulation and statistical processing, i.e. names and issues, types and attributes, terms and conditions, completed exchange values, completed exchange volumes in case of unit price products, amounts of exchange differences, and exchange periods, as well as details and provisional terms of exchange transactions currently under bidding, bidding statuses of prospective exchange transactors, and/or outlines of exchange transactions scheduled to be auctioned afterwards, into lists and/or graphs to prepare market information for market conditions pages, and sends the pages to the user.

Such information allows prospective exchange transactors to grasp market levels and balance of supply and demand of various exchange transactions, and enables appraisers to appropriately distribute self-introduction materials and/or reference/proposal data that they prepare with respect to exchange transactions.

Besides the configuration in which the present server 196 and the client terminals 195 are connected via the Internet 193, there are a configuration in which they are connected via a computer network that utilizes a dedicated communications line, a configuration in which they are connected via a computer network that utilizes other communications lines, a configuration in which they are connected via a computer network on which wireless communications can be performed, and/or the like.

In addition, the present server 196 and the client terminals 195 may be configured so that the server 196 and broadcast receiving terminals of the users transmit and receive information via a broadcast network of a wireless broadcast or a wired broadcast, whereby they can utilize the present system. For example, data prepared in the present server 196 is converted to data for broadcast in a predetermined broadcast server, is transmitted via electric waves or a communications line to broadcast receiving terminals equipped with predetermined tuners, and is decoded in the tuners, whereby the users can utilize the data. Also, the users can transmit data that they desire to transmit, via the electric waves or the communications line from the broadcast receiving terminals, to the present server 196 through the broadcast server or directly.

Moreover, in the present embodiment, the present server 196 and the like may be configured by distributing storage media storing a program for executing the above-described operations such as a magneto-optical disc, a digital versatile disc read-only memory, a compact disc read-only memory or a flexible disk cartridge, and then installing the program in a computer.

Besides, by the methods of matching demands to exchange that have been described above targeting financial instruments and/or quasi-financial instruments, the present embodiment also makes it possible to implement exchange transactions of various producer goods including commodity products such as precious metals, nonferrous metals, energy-related products and primary industry products, as well as various consumer goods including objects of art and objects of virtu.

Figure 47:
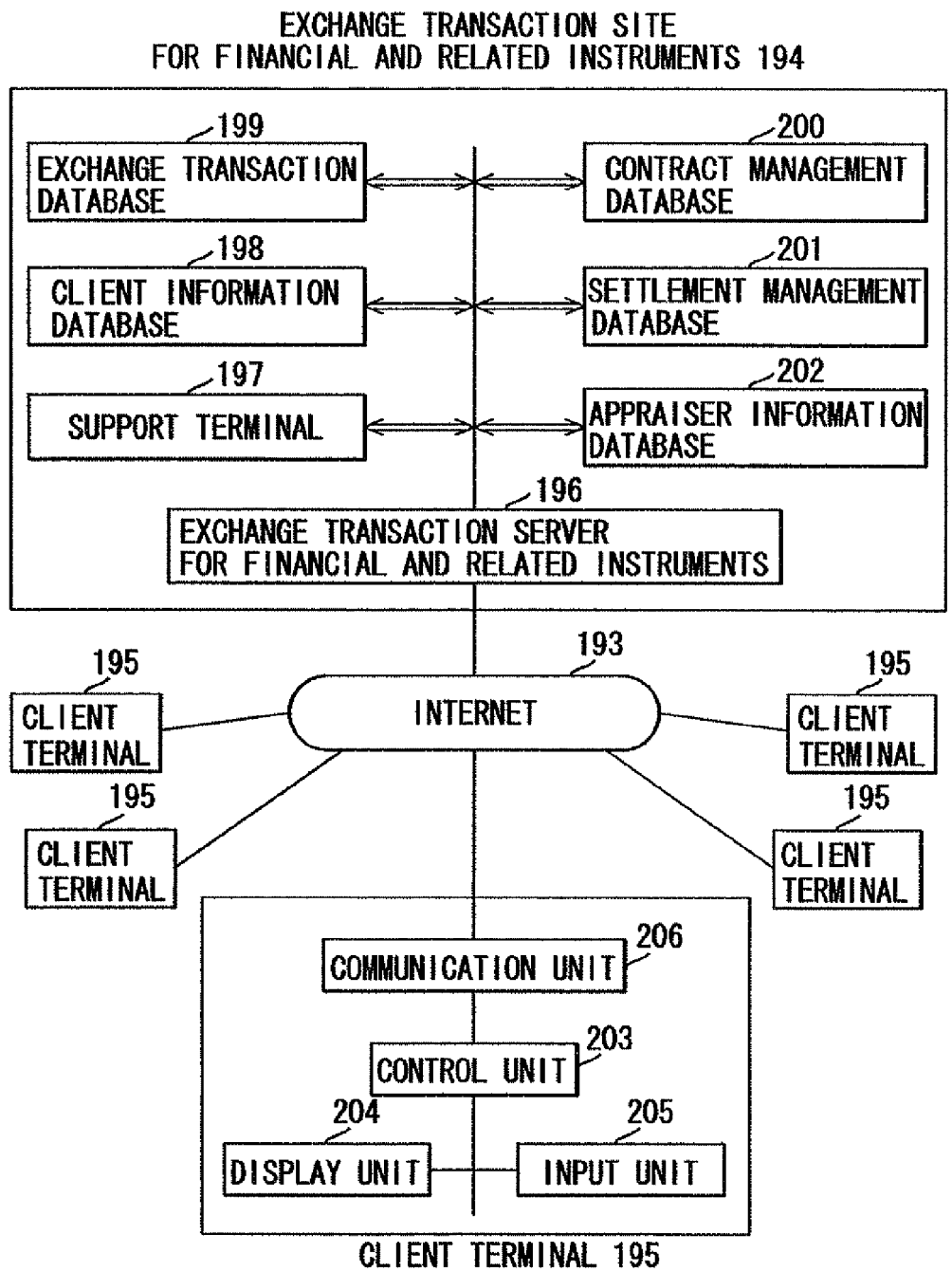
FIG. 47 is a block diagram showing another embodiment in accordance with the invention.

Now, the exchange transaction server for financial and related instruments 196, the client terminals 195 and the support terminal 197 of FIG. 47 can be implemented in any way known to persons skilled in the art. One such example is given in FIG. 48.

Figure 48:
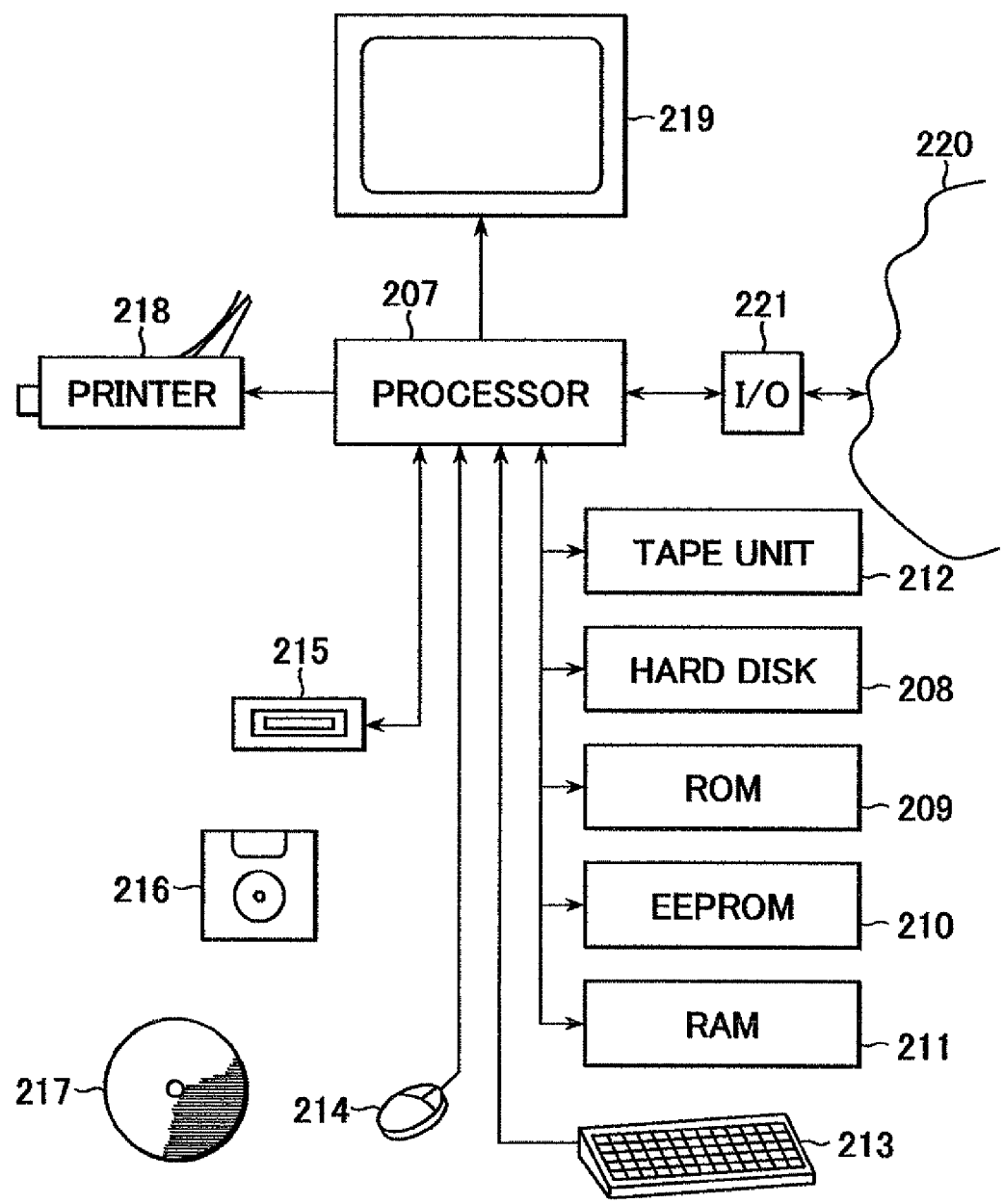
FIG. 48 is a diagram showing an embodiment of a configuration.

The arrangement of FIG. 48 comprises a processor 207 for carrying out arithmetic operations. The processor 207 is connected to a plurality of memory components including a hard disk 208, read only memory (ROM) 209, electrically erasable and programmable read only memory (EEPROM) 210 and random access memory (RAM) 211 as well as a tape unit 212. Not all of these memory types need necessarily be provided. Additionally, these memory components need not be located physically close to the processor 207, but may be located remote from the processor 207.

Also, the processor 207 is connected to means for inputting instructions, data and the like, by a user, like a keyboard 213 and a mouse 214. Other input means such as a touch screen, a track ball and/or a voice converter, known to persons skilled in the art, may also be provided.

Moreover, a reading unit 215 connected to the processor 207 is provided. The reading unit 215 is arranged to read out data from and possibly write data to a data carrier like a flexible disk cartridge 216 or a compact disc read-only memory 217. Other data carriers may be tapes, digital versatile discs and the like as is known to persons skilled in the art.

Furthermore, the processor 207 is connected to a printer 218 for printing output data on paper as well as to a display 219, for instance, a monitor or liquid crystal display screen, or any other type of display known to persons skilled in the art.

Besides, the processor 207 may be connected to a communication network 220, for instance, a public switched telephone network (PSTN), a local area network (LAN), a wide area network (WAN), the Internet, etc. by means of I/O means 221. The processor 207 may be arranged to communicate with other communication arrangements through the network 220.

Incidentally, the processor 207 may be implemented as a stand alone system, or as a plurality of parallel operating processors, each arranged to carry out subtasks of a larger computer program, or as one or more main processors with several subprocessors. Parts of the functionality of the present embodiment may even be carried out by remote processors communicating with the processor 207 through the network 220.

Advantages in Embodiments of the Invention

Now, although advantages that some embodiments of the present invention bring about, itemized and listed by subject, will be described in the following, in order that the advantages will be better understood, schemes of the exchange transactions in accordance with some embodiments will also be described. However, the present invention is a server for supporting an exchange transaction, and thus it is intended that the schemes therefor not be limited to those that will be hereinafter described:

1. In a present embodiment, new styles of arbitrage transactions can be performed through exchange transactions in asset management, capital raising and/or capital transactions.

(1) First, a present embodiment enables a new style of arbitrage transaction through a direct exchange of an asset management product.

As an example, if an asset manager A forecasts that the value of an asset management product b will increase in the future more than will the value of an asset management product a that the asset manager A is holding, in order to attain a higher yield on investment, the asset manager A attempts to dispose of the asset management product a to turn it into cash and then attempts to use the cash to acquire the asset management product b itself or a product equivalent to the asset management product b. On the other hand, if an asset manager B forecasts that the value of the asset management product a will increase in the future more than will the value of the asset management product b that the asset manager B is holding, in order to attain a higher yield on investment, the asset manager B attempts to dispose of the asset management product b to turn it into cash and then attempts to use the cash to acquire the asset management product a itself or a product equivalent to the asset management product a.

By allowing asset managers that have mutually opposing views on the market, i.e. the asset manager A, who desires to take over the ownership of the asset management product b in exchange for assigning the ownership of the asset management product a, and the asset manager B, who desires to take over the ownership of the asset management product a in exchange for assigning the ownership of the asset management product b, to directly exchange the actuals, a present embodiment enables both the asset managers to perform their respective arbitrage transactions.

(2) Next, a present embodiment enables a new style of arbitrage transaction through a cash flow exchange of an asset management product. That is, an asset manager can substantially dispose of an asset management product that it desires to dispose of, while at the same time it can substantially acquire an asset management product that it desires to acquire not only by directly exchanging the actuals of the asset management products, but also by exchanging their cash flows while continuing the holding.

Cash flow exchanges of asset management products in accordance with a present embodiment comprise, for example, the following transaction styles:

(a) A style in which, on the premise that an asset management product that generally has maturity such as a loan asset, a bond, a commercial paper, a deposit asset of a certain category, a fund-type asset management product of a certain category, and an investment vehicle of a certain category will mature as it does, the cash inflow during the remaining period of the product, i.e. the cash flow of the principal and fruits is exchanged.

(b) A style in which, a period shorter than the remaining period of said product, which generally has maturity, is specified and then the cash inflow during the specified period, i.e. the cash flow of only the fruits is exchanged.

(c) A style in which, on the premise that the jus disponendi will be exercised with respect to said product, which generally has maturity, the cash inflow of a period until the disposal of the product, i.e. the cash flow of the principal and fruits is exchanged. In this transaction style, when an exchange is completed, the jus disponendi of a pertinent product is also exchanged.

(d) A style in which, on the premise that the jus disponendi will be exercised with respect to an asset management product that generally does not have maturity such as land, a building, a compound real estate property, an equity, a deposit asset of a certain category, a fund-type asset management product of a certain category, and an investment vehicle of a certain category, the cash inflow of a period until the disposal of the product, i.e. the cash flow of the principal and fruits is exchanged. In this transaction style, when an exchange is completed, the jus disponendi of a pertinent product is also exchanged.

(e) A style in which, a period is specified with respect to said product, which generally does not have maturity, and then the cash inflow during the specified period, i.e. the cash flow of only the fruits is exchanged.

Among the above-described transaction styles, in (c) and (d), which involve exercise of a jus disponendi, in the case in which an assignee of the cash flow of a pertinent product exercises the jus disponendi of the product during the exchange period, since the person that executes this act of disposal in the market is the nominal holder of the product, who is an assignor of the cash flow, the assignor temporarily receives the disposal amount and then pays the amount to the assignee, who is the substantial owner of the product, and thus the transaction regarding the product comes to an end.

On the other hand, (a), (b) and (e), which do not involve exercise of a jus disponendi, are effective in, for example, a case in which an asset manager currently hesitates, for reasons as described below, to dispose of an actual of an asset management product that the asset manager is holding, and yet desires to enjoy the cash flow of an asset management product that another asset manager is holding:

① The asset manager currently hesitates, from the viewpoint of a business policy with respect to a capital raiser, to dispose of the loan asset, bond or commercial paper that the asset manager is holding.

② The asset manager currently hesitates to dispose of an equity that it is holding because it desires to keep the voting right granted thereto.

③ The asset manager currently hesitates to assign a deposit asset that it is holding because the perfection of a security interest is complicated.

④ The asset manager currently hesitates to dispose of land, a building or a compound real estate property that it is holding because a hypothec has already been established therefor.

⑤ The asset manager currently hesitates to dispose of a fund-type asset management product that the asset manager is holding because its liquidity is low.

⑥ The asset manager currently hesitates, from the viewpoint of a business policy with respect to a party entrusted with asset management or an administrative entity, or for such a reason as a cost or clerical procedure required for the reestablishment, to dispose of an investment vehicle that the asset manager is holding.

Incidentally, herein, depending upon the length of remaining periods of pertinent exchange items, the length of periods until the exercise of various rights or the fulfillment of various obligations accompanying pertinent exchange items, or the like, even after the payment and receipt of a cash flow arising from one product comes to an end, the payment and receipt of a cash flow arising from the other product may continue. Consequently, the last date of payment and receipt of a cash flow arising from one product that finalizes the payment and receipt later than does the other product, may be set as the last date of the exchange transaction. Additionally, the date on which each of various exchange transactions opens shall be referred to as the beginning of the period, the date on which it closes shall be referred to as the end of the period, and the period between the two dates, both inclusive, shall be referred to as the exchange period or the period before expiry.

(3) Furthermore, a present embodiment enables a new style of arbitrage transaction through a cash flow exchange of an unrealized profit part of an asset management product. That is, the cash flow exchange of an asset management product in accordance with a present embodiment includes not only the exchange transaction on the basis of an appraisal value of a whole product, but also an exchange transaction on the basis of an appraisal value of only an unrealized profit part of a product.

As an example, it is assumed that an appraisal value of an asset management product c that an asset manager C is holding is 1000, which consists of a book value of 800 and an unrealized profit of 200. On the other hand, it is assumed that an appraisal value of an asset management product d that an asset manager D is holding is 1500, which consists of a book value of 1300 and an unrealized profit of 200. The asset manager C forecasts that the unrealized profit of the asset management product d will increase in the future more than will the unrealized profit of the asset management product c, while the asset manager D forecasts that the unrealized profit of the asset management product c will increase in the future more than will the unrealized profit of the asset management product d. In this case, a present embodiment makes it possible to perform an exchange transaction between the asset manager C and the asset manager D with respect to the unrealized profit parts.

The asset manager C takes over the jus disponendi of the whole asset management product d and the ownership of the unrealized profit part of the asset management product d in exchange for assigning the jus disponendi of the whole asset management product c and the ownership of unrealized profit part of the asset management product c, while at the same time, the asset manager D takes over the jus disponendi of the whole asset management product c and the ownership of the unrealized profit part of the asset management product c in exchange for assigning the jus disponendi of the whole asset management product d and the ownership of unrealized profit part of the asset management product d. On this occasion, the ownership of the book value part of the asset management product c continues to belong to the asset manager C, while the ownership of the book value part of the asset management product d continues to belong to the asset manager D.

That is, the asset manager C secures a value equivalent to the book value of the asset management product c and then can take a market risk of the increase or decrease in the unrealized profit of the asset management product d, while the asset manager D secures a value equivalent to the book value of the asset management product d and then can take a market risk of the increase or decrease in the unrealized profit of the asset management product c. Additionally, it is possible to cause the cash flow of the fruit part of the asset management product c to continue to belong to the asset manager C, while causing the cash flow of the fruit part of the asset management product d to continue to belong to the asset manager D.

During the exchange period, if the asset manager C exercises the jus disponendi to dispose of the asset management product d, out of the disposal value, the cash flow for the book value part, which is owned by the asset manager D, belongs to the asset manager D, while the cash flow for the unrealized profit part, which is owned by the asset manager C, belongs to the asset manager C. Also, if the unrealized profit of the asset management product d had turned into an unrealized loss at the time of the disposal, a value equivalent to the unrealized loss out of the disposal value belongs to the asset manager C. That is, the asset manager C pays the asset manager D the value equivalent to the unrealized loss, whereby the unrealized loss turns into a realized loss, and thus the asset manager D can secure the value equivalent to the book value.

On the other hand, if the asset manager D exercises the jus disponendi to dispose of the asset management product c, out of the disposal value, the cash flow for the book value part, which is owned by the asset manager C, belongs to the asset manager C, while the cash flow for the unrealized profit part, which is owned by the asset manager D, belongs to the asset manager D. Also, if the unrealized profit of the asset management product c had turned into an unrealized loss at the time of the disposal, a value equivalent to the unrealized loss out of the disposal value belongs to the asset manager D. That is, the asset manager D pays the asset manager C the value equivalent to the unrealized loss, whereby the unrealized loss turns into a realized loss, and thus the asset manager C can secure the value equivalent to the book value.

(4) Also, a present embodiment enables a new style of arbitrage transaction through a cash flow exchange of an unrealized loss part of an asset management product. That is, in a present embodiment, by deeming that an unrealized loss is a negative unrealized profit, an unrealized loss part of an asset management product can be exchanged.

As an example, it is assumed that an appraisal value of an asset management product e that an asset manager E is holding is 1000, which consists of a book value of 1200 and an unrealized loss of 200. On the other hand, it is assumed that an appraisal value of an asset management product f that an asset manager F is holding is 1500, which consists of a book value of 1700 and an unrealized loss of 200. The asset manager E forecasts that the unrealized loss of the asset management product f will decrease in the future more than will the unrealized loss of the asset management product e, and in some cases, the asset management product f will turn to carry an unrealized profit, while the asset manager F forecasts that the unrealized loss of the asset management product e will decrease in the future more than will the unrealized loss of the asset management product f, and in some cases, the asset management product e will turn to carry an unrealized profit. In this case, a present embodiment makes it possible to perform an exchange transaction between the asset manager E and the asset manager F with respect to the unrealized loss parts.

The asset manager E takes over the jus disponendi of the whole asset management product f and assumes the unrealized loss of the asset management product f in exchange for assigning the jus disponendi of the whole asset management product e and passing on the unrealized loss of the asset management product e, while at the same time, the asset manager F takes over the jus disponendi of the whole asset management product e and assumes the unrealized loss of the asset management product e in exchange for assigning the jus disponendi of the whole asset management product f and passing on the unrealized loss of the asset management product f.

In this way, the unrealized losses have been respectively transferred to the counterparties, and thus it can be deemed, from the viewpoint of an exchange transaction, that the asset manager E, has recovered a value equivalent to the book value of the asset management product e, while the asset manager F has recovered a value equivalent to the book value of the asset management product f. That is, the asset manager E secures a value equivalent to the book value of the asset management product e and then can take a market risk of the increase or decrease in the unrealized loss of the asset management product f, while the asset manager F secures a value equivalent to the book value of the asset management product f and then can take a market risk of the increase or decrease in the unrealized loss of the asset management product e. Additionally, it is possible to cause the cash flow of the fruit part of the asset management product e to continue to belong to the asset manager E, while causing the cash flow of the fruit part of the asset management product f to continue to belong to the asset manager F.

During the exchange period, if the asset manager E exercises the jus disponendi to dispose of the asset management product f, conceptually out of the disposal value, the cash flow for the book value part, which is owned by the asset manager F, belongs to the asset manager F, while the cash flow for the unrealized loss part, which is owned by the asset manager E, belongs to the asset manager E. That is, the asset manager E pays the asset manager F the value equivalent to the unrealized loss, whereby the unrealized loss turns into a realized loss, and thus the asset manager F can secure the value equivalent to the book value. Also, if the unrealized loss of the asset management product f had turned into an unrealized profit at the time of the disposal, the asset manager E can enjoy the realized profit.

On the other hand, if the asset manager F exercises the jus disponendi to dispose of the asset management product e, conceptually out of the disposal value, the cash flow for the book value part, which is owned by the asset manager E, belongs to the asset manager E, while the cash flow for the unrealized loss part, which is owned by the asset manager F, belongs to the asset manager F. That is, the asset manager F pays the asset manager E the value equivalent to the unrealized loss, whereby the unrealized loss turns into a realized loss, and thus the asset manager E can secure the value equivalent to the book value. Also, if the unrealized loss of the asset management product e had turned into an unrealized profit at the time of the disposal, the asset manager F can enjoy the realized profit.

Additionally, as used herein, the term 'unrealized profit or loss in a cash flow exchange' shall basically mean an amount found by deducting 'the book value or acquisition value in accounting of a product being held' from 'the appraisal value of the whole product.' However, in, for example, a case in which an exchange transactor desires to avoid the disclosure for confidentiality, the amount may be found by deducting 'the book value or acquisition value of a product being held on the basis of the exchange transactor's own declaration' from 'the appraisal value of the whole product.' That is, herein, an unrealized profit or loss shall not necessarily mean a numerical value in accounting.

(5) Moreover, a present embodiment enables a new style of arbitrage transaction of a short selling product through a cash flow exchange of an unrealized profit or loss part. That is, the exchange transaction of an unrealized profit or loss in accordance with a present embodiment also covers a position of an asset management product that is sold short.

As an example, it is assumed that an unrealized profit of an asset management product g that an asset manager G has sold short is 200 and the calculation ground is that the selling value is 1000 and the appraisal value is 800. On the other hand, it is assumed that an unrealized profit of an asset management product h that an asset manager H has sold short is also 200 and the calculation ground is that the selling value is 1300 and the appraisal value is 1100. The asset manager G forecasts that the appraisal value of the asset management product h will decrease in the future more than will the appraisal value of the asset management product g, that is, the unrealized profit of the asset management product h will increase in the future more than will the unrealized profit of the asset management product g, while on the other hand, the asset manager H forecasts that the appraisal value of the asset management product g will decrease in the future more than will the appraisal value of the asset management product h, that is, the unrealized profit of the asset management product g will increase in the future more than will the unrealized profit of the asset management product h. In this case, a present embodiment makes it possible to perform an exchange transaction between the asset manager G and the asset manager H with respect to the unrealized profits.

The asset manager G takes over the repurchasing right of the asset management product h and the ownership of the unrealized profit of the asset management product h in exchange for assigning the repurchasing right of the asset management product g and the ownership of the unrealized profit of the asset management product g, while at the same time, the asset manager H takes over the repurchasing right of the asset management product g and the ownership of the unrealized profit of the asset management product g in exchange for assigning the repurchasing right of the asset management product h and the ownership of the unrealized profit of the asset management product h. On this occasion, the asset manager G has the selling value of the asset management product h fixed and then can take a market risk of the increase or decrease in the unrealized profit of the asset management product h, while the asset manager H has the selling value of the asset management product g fixed and then can take a market risk of the increase or decrease in the unrealized profit of the asset management product g.

During the exchange period, if the asset manager G exercises the right to repurchase the asset management product h, the cash flow for the realized profit of the asset management product h belongs to the asset manager G, while if the asset manager H exercises the right to repurchase the asset management product g, the cash flow for the realized profit of the asset management product g belongs to the asset manager H. Also, if the unrealized profit had turned into an unrealized loss at the time of repurchasing the asset management product h, the realized loss belongs to the asset manager G, while if the unrealized profit had turned into an unrealized loss at the time of repurchasing the asset management product g, the realized loss belongs to the asset manager H.

(6) Besides, as an example, it is assumed that an unrealized loss of an asset management product i that an asset manager I has sold short is 200 and the calculation ground is that the selling value is 1000 and the appraisal value is 1200. On the other hand, it is assumed that an unrealized loss of an asset management product j that an asset manager J has sold short is also 200 and the calculation ground is that the selling value is 1300 and the appraisal value is 1500. The asset manager I forecasts that the appraisal value of the asset management product j will decrease in the future more than will the appraisal value of the asset management product i, that is, the unrealized loss of the asset management product j will decrease in the future more than will the unrealized loss of the asset management product I, and in some cases, the asset management product j will turn to carry an unrealized profit. On the other hand, the asset manager J forecasts that the appraisal value of the asset management product i will decrease in the future more than will the appraisal value of the asset management product j, that is, the unrealized loss of the asset management product i will decrease in the future more than will the unrealized loss of the asset management product j, and in some cases, the asset management product i will turn to carry an unrealized profit. In this case, a present embodiment makes it possible to perform an exchange transaction between the asset manager I and the asset manager J with respect to the unrealized losses, The asset manager I takes over the repurchasing right of the asset management product j and assumes the unrealized loss of the asset management product j in exchange for assigning the repurchasing right of the asset management product i and passing on the unrealized loss of the asset management product i, while at the same time, the asset manager J takes over the repurchasing right of the asset management product i and assumes the unrealized loss of the asset management product i in exchange for assigning the repurchasing right of the asset management product j and passing on the unrealized loss of the asset management product j. On this occasion, the asset manager I has the selling value of the asset management product j fixed and then can take a market risk of the increase or decrease in the unrealized loss of the asset management product j, while the asset manager J has the selling value of the asset management product i fixed and then can take a market risk of the increase or decrease in the unrealized loss of the asset management product i.

During the exchange period, if the asset manager I exercises the right to repurchase the asset management product j, the realized loss of the asset management product j belongs to the asset manager I, while if the asset manager J exercises the right to repurchase the asset management product i, the realized loss of the asset management product i belongs to the asset manager J. However, if the unrealized loss had turned into an unrealized profit at the time of the repurchase of the asset management product j, the asset manager I can enjoy the realized profit, while if the unrealized loss had turned into an unrealized profit at the time of the repurchase of the asset management product i, the asset manager J can enjoy the realized profit.

As used herein, the term 'unrealized profit or loss in a cash flow exchange of a short selling product' shall basically mean an amount found by deducting 'the appraisal value of the product' from 'the selling value of the product in accounting.' However, in, for example, a case in which an exchange transactor desires to avoid the disclosure for confidentiality, the amount may be found by deducting 'the appraisal value of the product' from 'the selling value of the product on the basis of the exchange transactor's own declaration.' That is, herein, an unrealized profit or loss of a short selling product shall not necessarily mean a numerical value in accounting.

(7) Furthermore, a present embodiment enables a new type of arbitrage transaction between an asset manager that desires to directly exchange a product and an asset manager that desires to exchange a cash flow of a product. That is, the exchange transactions of asset management products in accordance with a present embodiment include a compromise method between the direct exchange and the cash flow exchange.

As an example, if an asset manager K forecasts that the value of an asset management product l will increase in the future more than will the value of an asset management product k that the asset manager K is holding, and thus desires a direct exchange between the asset management product k and the asset management product l, while an asset manager L forecasts that the value of the asset management product k will increase in the future more than will the value of the asset management product l that the asset manager L is holding, and thus desires a cash flow exchange between the asset management product k and the asset management product l, it is possible in a present embodiment to utilize a compromise method between the direct exchange and the cash flow exchange.

The asset manager K takes over the right to receive the cash flow arising from the asset management product l in exchange for assigning the actual of the asset management product k, while at the same time, the asset manager L takes over the actual of the asset management product k in exchange for assigning the right to receive the cash flow arising from the asset management product l, whereby both the asset managers can find a compromise point.

(8) Also, a present embodiment enables a new style of arbitrage transaction through a cash flow exchange of a capital raising product. That is, since an asset manager acquires a capital raising product as an asset management product after selecting the credit risk of the product and/or the name of the capital raiser, the capital raiser generally finds it difficult to directly exchange the position with another capital raiser. However, a capital raiser in accordance with a present embodiment can enjoy a similar economic effect to that of a direct exchange by exchanging a cash flow of a capital raising product that the capital raiser is servicing for a cash flow of a capital raising product that another capital raiser is servicing.

As an example, if a capital raiser M forecasts that the appraisal value of the position of a capital raising product n will decrease in the future more than will the appraisal value of the position of a capital raising product m that the capital raiser M is servicing, while a capital raiser N forecasts that the appraisal value of the position of the capital raising product m will decrease in the future more than will the appraisal value of the position of the capital raising product n that the capital raiser N is servicing, both the capital raisers may attempt to attain lower funding costs by exchanging their respective positions. Alternatively, if the capital raiser M desires the position of the capital raising product n while the capital raiser N desires the position of the capital raising product m due to a difference in product characteristics such as presence or absence of maturity, length of a remaining period, presence or absence of premature redemption, and/or the nature of principal and fruits, both the capital raisers may attempt to create more favorable positions by exchanging their respective positions.

By allowing the capital raisers, who have directly opposite demands, i.e. the capital raiser M, who desires to pass on the obligation to pay the cash outflow arising from the capital raising product m in exchange for assuming the obligation to pay the cash outflow arising from the capital raising product n, and the capital raiser N, who desires to pass on the obligation to pay the cash outflow arising from the capital raising product n in exchange for assuming the obligation to pay the cash outflow arising from the capital raising product m, to exchange the cash outflows, a present embodiment enables both the capital raisers to perform their respective arbitrage transactions. Additionally on this occasion, in the case of products that allow premature redemption or retirement by a repurchase, the rights to prematurely redeem the products or to retire the products by a repurchase are also exchanged.

Cash flow exchanges of capital raising products in accordance with a present embodiment comprise, for example, the following transaction styles:

(a) A style in which, on the premise that a capital raising product that generally has maturity such as a borrowed liability, a bond, a commercial paper, and a deposit liability of a certain category will mature as it does, the cash outflow during the remaining period of the product, i.e. the cash flow of the principal and fruits is exchanged.

(b) A style in which, a period shorter than the remaining period of said product, which generally has maturity, is specified and then the cash outflow during the specified period, i.e. the cash flow of only the fruits is exchanged.

(c) A style in which, on the premise that said product, which generally has maturity, will be prematurely redeemed or be retired by a repurchase, the cash outflow of a period until the lapse of the product, i.e. the cash flow of the principal and fruits is exchanged.

(d) A style in which, on the premise that a capital raising product that generally does not have maturity such as a deposit liability of a certain category and an equity will be retired by a repurchase or be canceled, the cash outflow of a period until the lapse of the product, i.e. the cash flow of the principal and fruits is exchanged.

(e) A style in which, a period is specified with respect to said product, which generally does not have maturity, and then the cash outflow during the specified period, i.e. the cash flow of only the fruits is exchanged.

Among the above-described transaction styles, in (c) and (d), which involve premature redemption, cancellation, or retirement by a repurchase, in the case in which a transferee of the cash flow of a pertinent product exercises during the exchange period a right to prematurely redeem or cancel the product or retire the product by a repurchase, since the person that executes this act of dissolution in the market is the nominal capital raiser servicing the product, who is a transferor of the cash flow, the transferor temporarily pays the redemption amount or the repurchase amount and then receives the amount from the transferee, who is the substantial capital raiser servicing the product, and thus the transaction regarding the product comes to an end.

Additionally, as used herein, the term 'premature redemption' shall mean repaying, canceling or redeeming a capital raising product having maturity at a predetermined value ahead of the maturity, while the term 'retirement by a repurchase' shall mean repurchasing a capital raising product at a circulation value or the like to lapse it regardless of the presence or absence of maturity.

(9) Moreover, a present embodiment enables a new style of arbitrage transaction through a cash flow exchange of a capital transaction product. That is, with respect to capital transaction products such as foreign exchange products, forward products, futures products, option products and swap products, since a capital transactor mutually creates an opposite position directly with a counterparty or indirectly through a derivatives exchange or a securities exchange, the capital transactor generally finds it difficult to directly exchange the position with another capital transactor. However, a capital transactor in accordance with a present embodiment can enjoy a similar economic effect to that of a direct exchange by exchanging a cash flow of a capital transaction product that the capital transactor is carrying for a cash flow of a capital transaction product that another capital transactor is carrying.

A capital transaction product requires no initial investment or an extremely small amount of initial investment compared with an underlying product, and enables a net settlement or fixing of a profit or loss by a closing transaction. Even if an underlying product is delivered, since the underlying product already has a liquid trading market, a purchase or sale thereof in the market enables the capital transactor to create a state that is substantially not different from that of the net settlement. That is, the asset value of a capital transaction product resides in its unrealized profit while the liability value thereof resides in its unrealized loss, and thus a cash flow exchange of a capital transaction product in accordance with a present embodiment is an exchange transaction on the basis of the appraisal value of an unrealized profit or loss.

As an example, it is assumed that the appraisal value of the unrealized profit of a capital transaction product o that a capital transactor O is carrying is 200, while on the other hand, the appraisal value of the unrealized profit of a capital transaction product p that a capital transactor P is carrying is also 200. The capital transactor O forecasts that the unrealized profit of the capital transaction product p will increase in the future more than will the unrealized profit of the capital transaction product o, while the capital transactor P forecasts that the unrealized profit of the capital transaction product o will increase in the future more than will the unrealized profit of the capital transaction product p. In this case, a present embodiment makes it possible to perform an exchange transaction between the capital transactor O and the capital transactor P.

The capital transactor O takes over the position of the capital transaction product p in exchange for assigning the position of the capital transaction product o, while at the same time, the capital transactor P takes over the position of the capital transaction product o in exchange for assigning the position of the capital transaction product p. On this occasion, rights and obligations accompanying the position of the capital transaction product o are transferred to the capital transactor P, while rights and obligations accompanying the position of the capital transaction product p are transferred to the capital transactor O. The capital transactor O can take a market risk of the increase or decrease in the unrealized profit of the capital transaction product p, while the capital transactor P can take a market risk of the increase or decrease in the unrealized profit of the capital transaction product o.

During the exchange period, if the capital transactor P exercises an assigned right and thus realizes the unrealized profit of the capital transaction product o, or if the capital transactor P fulfills a transferred obligation and thus the unrealized profit of the capital transaction product o is realized, the capital transactor P can enjoy the realized profit. On the other hand, if the capital transactor O exercises an assigned right and thus realizes the unrealized profit of the capital transaction product p, or if the capital transactor O fulfills a transferred obligation and thus the unrealized profit of the capital transaction product p is realized, the capital transactor O can enjoy the realized profit. Also, if the unrealized profit of the capital transaction product o had turned into an unrealized loss at the time of the exercise of the right or the fulfillment of the obligation by the capital transactor P, the realized loss belongs to the capital transactor P, while if the unrealized profit of the capital transaction product p had turned into an unrealized loss at the time of the exercise of the right or the fulfillment of the obligation by the capital transactor O, the realized loss belongs to the capital transactor O.

(10) Besides, as an example, it is assumed that the appraisal value of the unrealized loss of a capital transaction product q that a capital transactor Q is carrying is 200, while on the other hand, the appraisal value of the unrealized loss of a capital transaction product r that a capital transactor R is carrying is also 200. The capital transactor Q forecasts that the unrealized loss of the capital transaction product r will decrease in the future more than will the unrealized loss of the capital transaction product q, and in some cases, the capital transaction product r will turn to carry an unrealized profit, while the capital transactor R forecasts that the unrealized loss of the capital transaction product q will decrease in the future more than will the unrealized loss of the capital transaction product r, and in some cases, the capital transaction product q will turn to carry an unrealized profit. In this case, a present embodiment makes it possible to perform an exchange transaction between the capital transactor Q and the capital transactor R.

The capital transactor Q assumes the position of the capital transaction product r in exchange for passing on the position of the capital transaction product q, while at the same time, the capital transactor R assumes the position of the capital transaction product q in exchange for passing on the position of the capital transaction product r. On this occasion, rights and obligations accompanying the position of the capital transaction product q are transferred to the capital transactor R, while rights and obligations accompanying the position of the capital transaction product r are transferred to the capital transactor Q. The capital transactor Q can take a market risk of the increase or decrease in the unrealized loss of the capital transaction product r, while the capital transactor R can take a market risk of the increase or decrease in the unrealized loss of the capital transaction product q.

During the exchange period, if the capital transactor R exercises an assigned right and thus realizes the unrealized loss of the capital transaction product q, or if the capital transactor R fulfills a transferred obligation and thus the unrealized loss of the capital transaction product q is realized, the realized loss belongs to the capital transactor R. On the other hand, if the capital transactor Q exercises an assigned right and thus realizes the unrealized loss of the capital transaction product r, or if the capital transactor Q fulfills a transferred obligation and thus the unrealized loss of the capital transaction product r is realized, the realized loss belongs to the capital transactor Q. However, if the unrealized loss of the capital transaction q had turned into an unrealized profit at the time of the exercise of the right or the fulfillment of the obligation by the capital transactor R, the capital transactor R can enjoy the realized profit, while if the unrealized loss of the capital transaction r had turned into an unrealized profit at the time of the exercise of the right or the fulfillment of the obligation by the capital transactor Q, the capital transactor Q can enjoy the realized profit.

(11) Furthermore, a present embodiment makes it possible to perform a new type of arbitrage transaction through a cash flow exchange between an asset management product and a capital transaction product on the basis of their unrealized profits or losses. That is, in a present embodiment, by jointly utilizing the exchange methodology of an unrealized profit or loss portion of an asset management product and the exchange methodology of a capital transaction product on the basis of an unrealized profit or loss, the unrealized profit or loss portion of an asset management product and the unrealized profit or loss of a capital transaction product can be exchanged.

As an example, it is assumed that an appraisal value of an asset management product s that an asset manager S is holding is 1000, which consists of a book value of 800 and an unrealized profit of 200. On the other hand, it is assumed that the appraisal value of the unrealized profit of a capital transaction product t that a capital transactor T is carrying is 200. The asset manager S forecasts that the unrealized profit of the capital transaction product t will increase in the future more than will the unrealized profit of the asset management product s, while the capital transactor T forecasts that the unrealized profit of the asset management product s will increase in the future more than will the unrealized profit of the capital transaction product t. In this case, a present embodiment makes it possible to perform an exchange transaction between the asset manager S and the capital transactor T on the basis of their unrealized profits.

The asset manager S takes over the position of the capital transaction product t and the unrealized profit thereof in exchange for assigning the jus disponendi of the whole asset management product s and the ownership of unrealized profit part of the asset management product s, while at the same time, the capital transactor T takes over the jus disponendi of the whole asset management product s and the ownership of the unrealized profit part of the asset management product s in exchange for assigning the position of the capital transaction product t and the unrealized profit thereof. On this occasion, the ownership of the book value part of the asset management product s and the cash flow of the fruit part thereof continue to belong to the asset manager S, while rights and obligations accompanying the position of the capital transaction product t are transferred to the asset manager S. That is, the asset manager S secures a value equivalent to the book value of the asset management product s and then can take a market risk of the increase or decrease in the unrealized profit of the capital transaction product t, while the capital transactor T can take a market risk of the increase or decrease in the unrealized profit of the asset management product s.

During the exchange period, if the asset manager S exercises an assigned right and thus realizes the unrealized profit of the capital transaction product t, or if the asset manager S fulfills a transferred obligation and thus the unrealized profit of the capital transaction product t is realized, the asset manager S can enjoy the realized profit. Also, if the unrealized profit of the capital transaction product t had turned into an unrealized loss at the time of the exercise of the right or the fulfillment of the obligation by the asset manager S, the realized loss belongs to the asset manager S.

On the other hand, if the capital transactor T exercises the jus disponendi to dispose of the asset management product s, out of the disposal value, the cash flow for the book value part, which is owned by the asset manager S, belongs to the asset manager 5, while the cash flow for the unrealized profit part, which is owned by the capital transactor T, belongs to the capital transactor T. Also, if the unrealized profit of the asset management product s had turned into an unrealized loss at the time of the disposal, a value equivalent to the unrealized loss out of the disposal value belongs to the capital transactor T. That is, the capital transactor T pays the asset manager S the value equivalent to the unrealized loss, whereby the unrealized loss turns into a realized loss, and thus the asset manager S can secure the value equivalent to the book value.

(12) Besides, as an example, it is assumed that an appraisal value of an asset management product u that an asset manager U is holding is 1000, which consists of a book value of 1200 and an unrealized loss of 200. On the other hand, it is assumed that the appraisal value of the unrealized loss of a capital transaction product v that a capital transactor V is carrying is 200. The asset manager U forecasts that the unrealized loss of the capital transaction product v will decrease in the future more than will the unrealized loss of the asset management product u, and in some cases, the capital transaction product v will turn to carry an unrealized profit, while the capital transactor V forecasts that the unrealized loss of the asset management product u will decrease in the future more than will the unrealized loss of the capital transaction product v, and in some cases, the asset management product u will turn to carry an unrealized profit. In this case, a present embodiment makes it possible to perform an exchange transaction between the asset manager U and the capital transactor V on the basis of their unrealized losses.

The asset manager U assumes the position of the capital transaction product v and the unrealized loss thereof in exchange for assigning the jus disponendi of the whole asset management product u and passing on the unrealized loss of the asset management product u, while at the same time, the capital transactor V takes over the jus disponendi of the whole asset management product u and assumes the unrealized loss of the asset management product u in exchange for passing on the position of the capital transaction product v and the unrealized loss thereof. On this occasion, the cash flow of the fruit part of the asset management product u continues to belong to the asset manager U, while rights and obligations accompanying the position of the capital transaction product v are transferred to the asset manager U.

In this way, the unrealized losses have been respectively transferred to the counterparties, and thus it can be deemed, from the viewpoint of an exchange transaction, that the asset manager U has recovered a value equivalent to the book value of the asset management product u while the capital transactor V has recovered a value equivalent to zero regarding the capital transaction product v. That is, the asset manager U secures a value equivalent to the book value of the asset management product u and then can take a market risk of the increase or decrease in the unrealized loss of the capital transaction product v, while the capital transactor V can take a market risk of the increase or decrease in the unrealized loss of the asset management product u.

During the exchange period, if the asset manager U exercises an assigned right and thus realizes the unrealized loss of the capital transaction product v, or if the asset manager U fulfills a transferred obligation and thus the unrealized loss of the capital transaction product v is realized, the realized loss belongs to the asset manager U. However, if the unrealized loss of the capital transaction product v had turned into an unrealized profit at the time of the exercise of the right or the fulfillment of the obligation by the asset manager U, the asset manager U can enjoy the realized profit.

On the other hand, if the capital transactor V exercises the jus disponendi to dispose of the asset management product u, conceptually out of the disposal value, the cash flow for the book value part, which is owned by the asset manager U, belongs to the asset manager U, while the cash flow for the unrealized loss part, which is owned by the capital transactor V, belongs to the capital transactor V. That is, the capital transactor V pays the asset manager U the value equivalent to the unrealized loss, whereby the unrealized loss turns into a realized loss, and thus the asset manager U can secure the value equivalent to the book value. Also, if the unrealized loss of the asset management product u had turned into an unrealized profit at the time of the disposal, the capital transactor V can enjoy the realized profit.

(13) In a present embodiment, by repeating the arbitrage transactions as described above, an asset manager, a capital raiser and/or a capital transactor can continue to advantage its position step by step. That is, if it can appraise the position of its exchanging counterparty more properly than the counterparty and can establish a more appropriate view than the counterparty on future changes in the value of the position, by repeating exchange transactions, it can continue step by step to attain higher yields on investment in asset management products, lower funding costs in capital raising products, and/or larger transaction profits or more advantageous contract conditions in capital transaction products. Moreover, if an exchange transaction in accordance with the present system is also utilized in an arbitrage transaction with a conventional financial or quasi-financial market, a similar economic effect can be enjoyed.

2. Now, exchange transactions of asset management products, capital raising products and/or capital transaction products in accordance with a present embodiment improve certainty, transparency, immediacy, economy and efficiency of transactions by the following provided characteristics.

(1) First, some products from among capital transaction products that are traded over-the-counter and bonds are already transacted domestically and abroad 24 hours a day, while some products from among capital transaction products that are listed and equities are gradually realizing transactions beyond the confines of national borders and/or session hours thanks to the development of information technology and the alliances and mergers of exchanges in various countries. A present embodiment keeps pace with this worldwide trend and makes it possible to complete exchange transactions of asset management products, capital raising products and/or capital transaction products domestically and abroad 24 hours a day, thereby providing immediacy for arbitrage transactions with various over-the-counter products and various listed products.

(2) Next, since a present embodiment provides, during the process until signing of an exchange contract, an appraiser that does not have conflicts of interest with exchanging parties and performs due diligence of completed exchange products and appraisals of completed exchange values, it can be confirmed that an appraisal value of a position exhibited or bid by an exchanging party is considered fair, and that a completed exchange product does not contain a legal, ethical, economic, physical or environmental problem, whereby the transparency of the transaction itself increases.

(3) Also, various settlements and administrations arising from the completion of a conventional financial transaction and/or a conventional quasi-financial transaction, through their historical circumstances, use different systems according to the type of product or the specific transaction market and thus it is hard to unite the systems, which are not appropriate for customers who desire to transact various kinds of products. Accordingly, with a view to facilitating an arbitrage transaction with a conventional financial and/or quasi-financial instrument, a present embodiment has concentrated the settlement and administration functions after the completion of an exchange transaction, such as transaction confirmation, preparation or assignment of a contract, settlement of an exchange difference, delivery and receipt of actuals, payment and receipt of cash flows, provision of tools for risk management or cash flow management, inspection of legal or regulatory compliance, credit enhancement, preservation and recovery of credits, and/or the like.

(4) Furthermore, in a present embodiment, there is not only a case in which one prospective exchange transactor and another prospective exchange transactor are matched, but also a case in which one prospective exchange transactor and a plurality of prospective exchange transactors are matched as well as a case in which a plurality of prospective exchange transactors and another plurality of prospective exchange transactors are matched. That is, by allowing a simultaneous exchange transaction among three or more users, certainty, immediacy and efficiency of the completion of an exchange increase.

3. Next, a present embodiment makes it possible, in switching an asset management position, a capital raising position and/or a capital transaction position, to save a brokerage fee, a contract or cancellation fee, a redemption fee, an underwriting and selling fee, an intermediation fee and/or other expenses payable to an intermediary for dissolving an existing position and for creating a new position.

Additionally, as used in this context, the term 'intermediary' shall mean a conventional financial institution and/or a conventional realtor in a transaction of an individual, a corporation and/or the like, as well as a broker in a transaction between financial institutions, between realtors and/or between the like. Also, the above-described fees and/or expenses shall include a fee equivalent and/or an expense equivalent that the intermediary substantially collects through its proprietary transaction with an asset manager, a capital raiser and/or a capital transactor as its counterparty.

(1) If an asset manager replaces an asset management product that the asset manager is holding with another asset management product, conventionally, the asset manager has had to pay a selling fee, a cancellation fee, a redemption fee, a brokerage and intermediation fee and/or other expenses to an intermediary and/or the like in order to sell, cancel or redeem the former product, and then has had to pay afresh a buying fee, a contract fee, a brokerage and intermediation fee and/or other expenses to an intermediary and/or the like in order to purchase or enter into a contract for the latter product.

In a present embodiment, since various fees and/or other expenses that accrue at the time of disposal or lapse of the former product and at the time of acquisition of the latter product can be saved by an exchange transaction, the asset manger can attain a higher yield on investment.

Furthermore, since it is possible to switch a plurality of asset management products by tie-in, various fees and/or other expenses involved in reestablishing an asset portfolio can be saved. For example, respectively, if the macroeconomy is considered to be in a recession period, a demand for reestablishing a portfolio to shift to interest rate products such as loan assets and bonds arises, if it is considered to be in a transition period to economic recovery, a demand for replacing assets with equities, equity investment trusts and the like arises, and if it is considered to be in an overheating economic period accompanying growing concern about inflation, a demand for replacing assets with real estate asset management products, commodity funds and the like arises. In a present embodiment, at these junctures of the economy when views on the market mingle with one another, it is possible to efficiently change the asset allocation of an entire portfolio by exchanging various asset management products by tie-in.

(2) If an asset manager securitizes a loan asset, real estate or the like that the asset manager is holding, it is a general methodology that the asset manager assigns the asset to a special purpose vehicle directly or after turning it into beneficiary rights in trust and then the SPV issues asset backed securities to investors. With this mechanism, a trust fee, an underwriting and selling fee, a brokerage and intermediation fee, a cost or fee for credit enhancement or liquidity enhancement, an administration and collection fee of an assigned asset, and/or other expenses accrue, which causes a reduction in the value of the assigned asset. Also, if said asset manager, who was originally the holder of the asset, acquires a new asset with the after-securitization assignment proceeds, the asset manager has had to pay afresh a buying fee, a contract fee, a brokerage and intermediation fee and/or other expenses to an intermediary.

In a present embodiment, since assignment of an existing asset and acquisition of a new asset can be simultaneously executed by an exchange transaction, an asset manager can save various fees and/or other expenses and thus can attain a higher yield on investment.

(3) If a capital raiser replaces a capital raising product that the capital raiser is servicing with another capital raising product, conventionally, the capital raiser has had to pay a redemption fee, a cancellation fee, a buying fee and/or other expenses to an intermediary and/or the like in order to repay early, redeem prematurely or cancel early the former product, or to retire by a repurchase of the former product, and then has had to pay afresh a contract fee, an underwriting and selling fee and/or other expenses involved in capital raising to an intermediary and/or the like in order to create a position of the latter product.

In a present embodiment, since various fees and/or other expenses that accrue at the time of dissolution of the position of the former product and at the time of creation of the position of the latter product can be saved by an exchange transaction, the capital raiser can attain a lower funding cost. Furthermore, since it is possible to switch a plurality of capital raising products by tie-in, various fees and/or other expenses involved in reestablishing a liability portfolio can be saved.

(4) If a capital transactor replaces a capital transaction product that the capital transactor is carrying with another capital transaction product, conventionally, the capital transactor has had to pay a cancellation fee, a brokerage and intermediation fee and/or other expenses to an intermediary and/or the like in order to close the transaction of, exercise the right of or cancel the former product, or after having awaited the exercise of the right of or the arrival of the expiry of the former product, and then has had to pay afresh a contract fee, a brokerage and intermediation fee and/or other expenses to an intermediary and/or the like in order to create a position of the latter product.

In a present embodiment, since various fees and/or other expenses that accrue at the time of dissolution of the position of the former product and at the time of creation of the position of the latter product can be saved by an exchange transaction, the capital transactor can attain a more transaction profit or more advantageous contract conditions. Furthermore, since it is possible to switch a plurality of capital transaction products by tie-in, various fees and/or other expenses involved in reestablishing a portfolio can be saved.

4. Furthermore, since a present embodiment makes it unnecessary to create a new position after having awaited the dissolution of an existing position in switching asset management positions, capital raising positions and/or capital transaction positions, the time for the switch can be saved and thus market risks during the time can be avoided.

(1) If an asset manager replaces an asset management product that the asset manager is holding with another asset management product, conventionally, the asset manager has had to turn the former position into a cash position by selling, canceling or redeeming the former product or by awaiting the maturity of the former product, and then purchase or enter into a contract for the latter product.

In a present embodiment, since the time that is generated between the disposal or lapse of the former product and the acquisition of the latter product can be saved by an exchange transaction, market risks that market levels may change during the time can be avoided.

Furthermore, since it is possible to switch a plurality of asset management products by tie-in, compared with the case in which the products are individually switched, market risks associated with the reestablishment of an asset portfolio are reduced. For example, at junctures of the economy when views on the market mingle with one another, it is possible to promptly change the asset allocation of an entire portfolio by exchanging various asset management products by tie-in.

If an asset management product to switch is large, in many cases, an asset manager in person has lowered its market value in the course of disposing of the held product in the market, which has resulted in an unfavorable average disposal value at the stage where the disposal is completed. On the other hand, in many cases, an asset manager in person has raised a market value in the course of acquiring a desired product in the market, which has resulted in an unfavorable average acquisition value at the stage where the acquisition is completed. In a present embodiment, since an asset manager switches positions by an exchange transaction, the asset manager can avoid a result such that its act of disposal and/or act of acquisition affects the supply-demand balance of the market and thus decreases a yield on investment.

(2) If a capital raiser replaces a capital raising product that the capital raiser is servicing with another capital raising product, conventionally, the capital raiser has had to lapse the position of the former product by repaying early, redeeming prematurely or canceling early the former product, retiring by a repurchase thereof, or awaiting the maturity thereof, and then create afresh the position of the latter product.

In a present embodiment, since the time that is generated between the dissolution of the former product and the creation of the latter product can be saved by an exchange transaction, market risks that market levels may change during the time can be avoided. Furthermore, since it is possible to switch a plurality of capital raising products by tie-in, compared with the case in which the products are individually switched, market risks associated with the reestablishment of a liability portfolio are reduced.

If a capital raising product to switch is large, a capital raiser in person, at the stage where the capital raiser has performed capital raising afresh, has raised future funding costs for the next time onward in many cases. In a present embodiment, since a capital raiser switches positions by an exchange transaction, the capital raiser can avoid a result such that its act of replacement affects the supply-demand balance of the market and thus increases a funding cost.

(3) If a capital transactor replaces a capital transaction product that the capital transactor is carrying with another capital transaction product, conventionally, the capital transactor has had to lapse the position of the former product by closing the transaction of, exercising the right of or canceling the former product, or by awaiting the exercise of the right of or the arrival of the expiry of the former product, and then create afresh the position of the latter product.

In a present embodiment, since the time that is generated between the dissolution of the former product and the creation of the latter product can be saved by an exchange transaction, market risks that market levels may change during the time can be avoided. Furthermore, since it is possible to switch a plurality of capital transaction products by tie-in, compared with the case in which the products are individually switched, market risks associated with the reestablishment of a portfolio are reduced.

If a capital transaction product to switch is large, in many cases, a capital transactor in person has affected its market value in the course of dissolving the carried product in the market, which has resulted in an unfavorable average dissolution value at the stage where the dissolution is completed. Also, in many cases, a capital transactor in person has affected a market value in the course of creating a desired position in the market as well, which has resulted in an unfavorable average creation value at the stage where the creation is completed. In a present embodiment, since a capital transactor switches positions by an exchange transaction, the capital transactor can avoid a result such that its act of dissolution and/or act of creation affects the supply-demand balance of the market and thus decreases a transaction profit or disadvantages contract conditions.

5. Also, a present embodiment makes it possible to switch an entire asset portfolio comprising asset management products and capital transaction products by an exchange transaction of an investment vehicle itself such as a specified money trust, a designated fund trust, a managed securities trust, an equity in an investment subsidiary, a fund-type privately placed bond and/or the like. Unlike the case in which constituent products are individually switched, an exchange transaction of an investment vehicle can save various fees and/or other expenses involved in the full-scale reestablishment of an asset portfolio and reduce the time required therefor, thereby reducing market risks.

6. Moreover, in a present embodiment, the efficiency of asset/liability management improves. That is, a present embodiment makes it possible to reduce market risks, since exchanging variously an asset management product, a capital raising product and/or a capital transaction product by tie-in, as well as combining variously the direct exchange or the cash flow exchange of asset management products, the cash flow exchange of capital raising products and the cash flow exchange of capital transaction products, can save various fees and/or other expenses involved in reestablishing the composition of assets, liabilities and capital on a balance sheet, and can reduce the time required for the reestablishment. The following combinations exemplify exchange transactions for the asset/liability management in accordance with a present embodiment:

(a) An exchange transaction between 'a tie-in of an asset management product and a capital transaction product' and 'an asset management product;'
(b) An exchange transaction between 'a tie-in of a capital raising product and a capital transaction product' and 'a capital raising product;'
(c) An exchange transaction between 'a tie-in of an asset management product and a capital raising product' and 'an asset management product;'
(d) An exchange transaction between 'a tie-in of an asset management product and a capital raising product' and 'a capital raising product;'
(e) An exchange transaction between 'a tie-in of an asset management product and a capital raising product' and 'a capital transaction product;'
(f) An exchange transaction between 'a tie-in of an asset management product, a capital transaction product and a capital raising product' and 'an asset management product;'
(g) An exchange transaction between 'a tie-in of an asset management product, a capital transaction product and a capital raising product' and 'a capital raising product;'
(h) An exchange transaction between 'a tie-in of an asset management product, a capital transaction product and a capital raising product' and 'a capital transaction product;'
(i) An exchange transaction between 'a tie-in of an asset management product, a capital transaction product and a capital raising product' and 'a tie-in of an asset management product and a capital transaction product;'
(j) An exchange transaction between 'a tie-in of an asset management product, a capital transaction product and a capital raising product' and 'a tie-in of a capital raising product and a capital transaction product;' and
(k) An exchange transaction between 'a tie-in of an asset management product, a capital transaction product and a capital raising product' and 'a tie-in of an asset management product and a capital raising product,'

7. Next, a present embodiment provides substantial secondary markets for illiquid products. That is, liquidity can be substantially improved by switching positions of asset management products, capital raising products and/or capital transaction products through exchange transactions.

(1) With respect to asset management products, since their transaction markets are largely segmented into markets for financial asset management products and markets for real estate asset management products, and the markets are further segmented by each product, due to the imbalance between demands to dispose and demands to acquire, the products have tended to have insufficient liquidity. Regarding bonds issued by corporations, equities issued by small and medium-sized companies, private equities, loan assets, land, buildings and the like, even if it is attempted to acquire and afterwards dispose of them, since their market values are controlled low, there has been a strong tendency that forced disposal decreases their yields on investment. In a present embodiment, since asset management products can be directly exchanged not only between and among same type products, but also between and among different type products as well as between and among different industry products, there is wider choice, whereby the imbalance between demands to dispose and demands to acquire is corrected, and thus it is possible to dispose of products without decreasing their yields on investment.

Also, even if it is currently difficult, due to a business strategy, a management strategy, or troublesomeness or costs of administrative procedures, to dispose of an asset management product being held, a present embodiment can substantially improve its liquidity by using a cash flow exchange in the same way as by using a direct exchange.

(2) Basically, capital raising products are not equipped with liquidity except for those containing an early repayment clause or a premature redemption clause, and thus there has been a strong tendency that forced dissolution of a position increases funding costs. In a present embodiment, since a capital raising product substantially obtains liquidity by exchanging a cash outflow arising from a position that a capital raiser is servicing with a cash outflow arising from a position that another capital raiser is servicing, it is possible for a capital raiser to dissolve a position without increasing its funding cost.

(3) Basically, capital transaction products are not equipped with liquidity except for some foreign exchange products, futures products and futures option products. Regarding capital transaction products related to non-key currencies, various forward products, various over-the-counter option products, various swap products, various hybrid products and the like, there has been a strong tendency that forced dissolution of a position decreases a transaction profit or disadvantages cancellation conditions. In a present embodiment, capital transaction products substantially obtain liquidity since cash flows arising from their positions are exchanged not only between and among same type products, but also between and among different type products as well as between and among different industry products, it is possible to dissolve the positions without decreasing their transaction profits or disadvantaging their cancellation conditions.

8. Moreover, a present embodiment exerts its effect in strengthening and weakening of control over a business as well as acquisition and divestment of a business.

(1) In the case in which an asset manager desires to strengthen control over a specific capital raiser following a review of its management strategy, if the asset manager, through a direct exchange in accordance with a present embodiment, takes over 'equities with voting rights issued by the capital raiser that another asset manger is already holding' in exchange for assigning 'any asset management product that the former asset manager is already holding,' the former asset manager can efficiently strengthen the control over the capital raiser without breaking its liquidity on hand.

(2) In the case in which an asset manager desires to weaken control over a specific capital raiser following a review of its management strategy, if the asset manager, through a direct exchange in accordance with a present embodiment, takes over 'any asset management product that another asset manager is already holding' in exchange for assigning 'equities with voting rights issued by the capital raiser that the former asset manger is already holding,' the former asset manager can efficiently weaken the control over the capital raiser without affecting its liquidity on hand.

(3) Following respective reviews of management strategy, if an asset manager W is planning to strengthen control over a capital raiser Y and weaken control over a capital raiser Z, while to the contrary, an asset manager X is planning to strengthen control over the capital raiser Z and weaken control over the capital raiser Y, both the asset managers can simultaneously accomplish their respective objectives through a direct exchange in accordance with a present embodiment.

That is, if the asset manager W takes over 'equities with voting rights issued by the capital raiser Y that the asset manger X is already holding' in exchange for assigning 'equities with voting rights issued by the capital raiser Z that the asset manager W is already holding,' while at the same time, the asset manager X takes over 'the equities with the voting rights issued by the capital raiser Z that the asset manager W is already holding' in exchange for assigning 'the equities with the voting rights issued by the capital raiser Y that the asset manager X is already holding,' the respective asset managers, without affecting their liquidities on hand, can efficiently realize the strengthening as well as the weakening of control over the capital raiser Y, and the weakening as well as the strengthening of control over the capital raiser Z.

(4) In the case in which an asset manager desires to acquire a specific capital raiser following a review of its management strategy, if the asset manager, through a direct exchange in accordance with a present embodiment, takes over 'equities with voting rights issued by the capital raiser that another asset manger is already holding' in exchange for assigning 'any asset management product that the former asset manager is already holding,' the former asset manager can efficiently acquire the capital raiser without breaking its liquidity on hand.

(5) In the case in which an asset manager desires to divest of a specific subsidiary following a review of its management strategy, if the asset manager, through a direct exchange in accordance with a present embodiment, takes over 'any asset management product that another asset manager is already holding' in exchange for assigning 'equities with voting rights issued by the subsidiary that the former asset manger is already holding,' the former asset manager can efficiently divest of the subsidiary without affecting its liquidity on hand.

(6) Following respective reviews of management strategy, if an asset manager (A) is planning to divest of its own subsidiary (C) and acquire a subsidiary (D) of an asset manager (B), while the asset manager (B) is planning to divest of its own subsidiary (D) and acquire the subsidiary (C) of the asset manager (A), both the asset managers can simultaneously accomplish their respective objectives through a direct exchange in accordance with a present embodiment.

That is, if the asset manager (A) takes over 'equities with voting rights issued by the subsidiary (D) of the asset manager (B)' in exchange for assigning 'equities with voting rights issued by its own subsidiary (C),' while at the same time, the asset manager (B) takes over 'the equities with the voting rights issued by the subsidiary (C) of the asset manager (A)' in exchange for assigning 'the equities with the voting rights issued by its own subsidiary (C),' the respective asset managers, without affecting their liquidities on hand, can efficiently realize the acquisition and the divestment of the subsidiary (D) as well as the divestment and the acquisition of the subsidiary (C).

9. Also, a present embodiment exerts its effect in commencement, strengthening, weakening and unwinding of cross-equityholding as well as acquisition and disposal of an entity's own equities.

(1) In the case in which a capital transactor (E) and a capital transactor (F) have agreed on their cross-equityholding from their viewpoints of management strategy, if the capital transactor (E), through a direct exchange in accordance with a present embodiment, takes over 'equities with voting rights issued by the capital transactor (F) that another asset manager is already holding' in exchange for assigning 'any asset management product that the capital transactor (E) is already holding,' while similarly, the capital transactor (F) takes over 'equities with voting rights issued by the capital transactor (E) that another asset manager is already holding' in exchange for assigning 'any asset management product that the capital transactor (F) is already holding,' the capital transactors can efficiently cross-hold each other's equities without breaking their liquidities on hand.

Moreover, through a similar exchange transaction, it is also possible to strengthen cross-equityholding.

(2) In the case in which a capital transactor (G) and a capital transactor (H) have agreed on weakening their cross-equityholding from their viewpoints of management strategy, if the capital transactor (G), through a direct exchange in accordance with a present embodiment, takes over 'any asset management product that another asset manager is already holding' in exchange for assigning 'equities with voting rights issued by the capital transactor (H) that the capital transactor (G) is already holding,' while similarly, the capital transactor (H) takes over 'any asset management product that another asset manager is already holding' in exchange for assigning 'equities with voting rights issued by the capital transactor (G) that the capital transactor (H) is already holding,' the capital transactors can efficiently weaken their cross-equityholding without affecting their liquidities on hand.

Moreover, through a similar exchange transaction, it is also possible to unwind their cross-equityholding.

(3) In the case in which a capital transactor (I) is planning to repurchase its own equities for the purpose of measures for the equity prices, assistance to its society of equity-owning employees, introduction of its equity option system or the like, if the capital transactor (I), through a direct exchange in accordance with a present embodiment, takes over 'equities with voting rights issued by itself that an asset manager is already holding' in exchange for assigning to the asset manager 'any asset management product that the capital transactor (I) is already holding,' the capital transactor (I) can acquire its own equities without breaking its liquidity on hand, thereby enjoying the same effect as that of the repurchase thereof from the secondary market.

Moreover, through an opposite exchange transaction, it is also possible to dispose of own equities that have been politically held.

(4) If a capital transactor (J) and a capital transactor (K) have agreed on unwinding their cross-equityholding from their viewpoints of management strategy and are respectively planning to repurchase their own equities for the purpose of measures for their equity prices, operations of societies of equity-owning employees, introduction of equity option systems or the like, both the parties can simultaneously accomplish the respective objectives through a direct exchange in accordance with a present embodiment. That is, if the capital transactor (J) takes over 'equities with voting rights issued by itself that the capital transactor (K) is already holding' in exchange for assigning 'equities with voting rights issued by the capital transactor (K) that the capital transactor (J) is already holding,' while at the same time, the capital transactor (K) takes over 'the equities with the voting rights issued by itself that the capital transactor (J) is already holding' in exchange for assigning 'the equities with the voting rights issued by the capital transactor (J) that the capital transactor (K) is already holding,' the capital transactors can efficiently accomplish the unwinding of their cross-equityholding and the acquisition of their own equities without affecting their liquidities on hand, thereby enjoying the same effect as that of the release and repurchase thereof in the secondary market.

10. Moreover, a present embodiment enables leveling of future cash flows by concentrating or dispersing cash inflows or cash outflows through various exchange transactions.

(1) In the case in which an asset manager forecasts, for example, that medium term cash inflows will be too low compared with short term cash inflows and long term cash inflows, if the asset manager, through a direct exchange of asset management products in accordance with a present embodiment, takes over 'a medium term asset management product that another asset manager is holding' in exchange for assigning 'a short term asset management product that the former asset manager is holding,' as well as takes over 'another medium term asset management product that another asset manager is holding' in exchange for assigning 'a long term asset management product that the former asset manager is holding,' the former asset manager can shift part of the short term and long term cash inflows to the medium term, thereby leveling the cash inflows over the short to long terms.

Also, the former asset manager may as well, through a cash flow exchange of asset management products in accordance with a present embodiment, take over 'a cash inflow arising from a medium term asset management product that another asset manager is holding' in exchange for assigning 'a cash inflow arising from a short term asset management product that the former asset manager is holding,' as well as take over 'a cash inflow arising from another medium term asset management product that another asset manager is holding' in exchange for assigning 'a cash inflow arising from a long term asset management product that the former asset manager is holding,' whereby a similar economic effect can be expected.

(2) To the contrary, in the case in which an asset manager forecasts, for example, that short term cash inflows and long term cash inflows will be too low compared with medium term cash inflows, if the asset manager, through a direct exchange of asset management products in accordance with a present embodiment, takes over 'a short term asset management product that another asset manager is holding' in exchange for assigning 'a medium term asset management product that the former asset manager is holding,' as well as takes over 'a long term asset management product that another asset manager is holding' in exchange for assigning 'another medium term asset management product that the former asset manager is holding,' the former asset manager can shift part of the medium term cash inflows to the short term and long term, thereby leveling the cash inflows over the short to long terms.

Also, the former asset manager may as well, through a cash flow exchange of asset management products in accordance with a present embodiment, take over 'a cash inflow arising from a short term asset management product that another asset manager is holding' in exchange for assigning 'a cash inflow arising from a medium term asset management product that the former asset manager is holding,' as well as take over 'a cash inflow arising from a long term asset management product that another asset manager is holding' in exchange for assigning 'a cash inflow arising from another medium asset management product that the former asset manager is holding,' whereby a similar economic effect can be expected.

(3) In the case in which a capital raiser forecasts, for example, that short term cash outflows and long term cash outflows will be too high compared with medium term cash outflows, if the capital raiser, through a cash flow exchange of capital raising products in accordance with a present embodiment, passes on 'a cash outflow arising from a short term capital raising product that the capital raiser is servicing' in exchange for assuming 'a cash outflow arising from a medium term capital raising product that another capital raiser is servicing,' as well as passes on 'a cash outflow arising from a long term capital raising product that the former capital raiser is servicing' in exchange for assuming 'a cash outflow arising from another medium term capital raising product that another capital raiser is servicing,' the former capital raiser can shift part of the short term and long term cash outflows to the medium term, thereby leveling the cash outflows over the short to long terms, (4) To the contrary, in the case in which a capital raiser forecasts, for example, that medium term cash outflows will be too high compared with short term cash outflows and long term cash outflows, if the capital raiser, through a cash flow exchange of capital raising products in accordance with a present embodiment, passes on 'a cash outflow arising from a medium term capital raising product that the capital raiser is servicing' in exchange for assuming 'a cash outflow arising from a short term capital raising product that another capital raiser is servicing,' as well as passes on 'a cash outflow arising from another medium term capital raising product that the former capital raiser is servicing' in exchange for assuming 'a cash outflow arising from a long term capital raising product that another capital raiser is servicing,' the former capital raiser can shift part of the medium term cash outflows to the short term and long term, thereby leveling the cash outflows over the short to long terms.

11. Next, a present embodiment enables fixing of a gain by a substantial closing transaction of an identical asset management product through a direct exchange. That is, in a present embodiment, by performing a direct exchange two times with a specific asset management product as a medium, an economic effect equivalent to the acquisition and disposal is created with respect to the specific product, whereby an asset manager can fix a capital gain.

If an asset manager (L) forecasts that the value of an asset management product (m) will increase in the future more than will the value of an asset management product (l) that the asset manager (L) is holding, while an asset manager (M) forecasts that the value of the asset management product (l) will increase in the future more than will the value of the asset management product (m) that the asset manager (M) is holding, an exchange transaction is completed in a present embodiment. As a result thereof, the asset manager (L), who has acquired the asset management product (m), may attempt to dispose of the asset management product (m) if the value of the asset management product (m) afterwards increases in a market move as the asset manager (L) forecast. However, if the conventional transaction market has a problem of liquidity or the like and if on the other hand, it can be forecast that the value of a different asset management product (n) will increase in the future, the best choice for the asset manager (L) is to perform another exchange transaction with an asset manager (N) that is holding the asset management product (n). Moreover, if the asset manager (N), from a different view on the market than the asset manager (L), forecasts that the value of the asset management product (m) will further increase in the future, an exchange transaction of the asset management product (m) and the asset management product (n) is completed in a present embodiment between the asset manager (L) and the asset manager (N). At this point in time, it can be deemed that the asset manager (L) has disposed of the asset management product (m) acquired from the asset manager (M) by a substantial closing transaction, and thus can fix a capital gain with respect to the asset management product (m).

12. Furthermore, a present embodiment enables fixing of a gain of a fruit part of an asset management product and/or a capital raising product through a cash flow exchange. That is, in the case in which a capital transactor simultaneously has a position of an asset management product and a position of a capital raising product, through a cash flow exchange of an asset management product and/or a capital raising product in accordance with a present embodiment, the capital transactor can fix an income gain for a specific period.

(1) If a cash inflow arising from an asset management product that a capital transactor is holding is exchanged for a cash inflow arising from another asset management product of the same remaining period as that of a capital raising product that the capital transactor is servicing, a cash outflow arising from the capital raising product and the cash inflow arising from the after-exchange asset management product are offset, and thus the capital transactor can fix the income gain for said period under the situation in which the former is lower than the latter.

(2) To the contrary, if a cash outflow arising from a capital raising product that a capital transactor is servicing is exchanged for a cash outflow arising from another capital raising product of the same remaining period as that of an asset management product that the capital transactor is holding, a cash inflow arising from the asset management product and the cash outflow arising from the after-exchange capital raising product are offset, and thus the capital transactor can fix the income gain for said period under the situation in which the former is higher than the latter.

(3) If a cash inflow arising from an asset management product that a capital transactor is holding is exchanged for a cash inflow arising from another asset management product for a specific period, while a cash outflow arising from a capital raising product that the capital transactor is servicing is exchanged for a cash outflow arising from another capital raising product for the same period, the cash inflow arising from the after-exchange asset management product and the cash outflow arising from the after-exchange capital raising product are offset, and thus the capital transactor can fix the income gain for said period under the situation in which the former is higher than the latter.

(4) Also, a present embodiment enables fixing of a gain of a fruit part through a cash flow exchange on the basis of an unrealized profit or loss. That is, in the case in which a capital transactor is holding a plurality of unrealized profits or losses of asset management products or is carrying a plurality of unrealized profits or losses of capital transaction products, if these positions are exchanged in a present embodiment for positions of a plurality of swap products, the capital transactor can fix an income gain for a specific period.

First, the capital transactor, through a cash flow exchange, exchanges 'an unrealized profit or loss of an asset management product that the capital transactor is holding' or 'an unrealized profit or loss of a capital transaction product that the capital transactor is carrying' for 'an unrealized profit or loss of a swap product for receiving a fixed fruit and paying a floating fruit for a specific remaining period that another capital transactor is carrying.' Next, if the former capital transactor, through another cash flow exchange, exchanges 'an unrealized profit or loss of another asset management product that the capital transactor is holding' or 'an unrealized profit or loss of another capital transaction product that the capital transactor is carrying' for 'an unrealized profit or loss of another swap product for paying a fixed fruit and receiving a floating fruit that another capital transactor is carrying and which has the same principal amount and remaining period as those of the above-described swap product,' the former capital transactor can fix an income gain for the period in the following cases:

(a) Cases in which the floating fruits of both the swap products are offset, while the fixed fruit of the former is more than the fixed fruit of the latter;

(b) Cases in which the fixed fruits of both the swap products are offset, while the floating fruit of the former is less than the floating fruit of the latter;

(c) Cases in which the fixed fruit of the former is more than the fixed fruit of the latter, while the floating fruit of the former is less than the floating fruit of the latter;

(d) Cases in which the floating fruit of the former is more than the floating fruit of the latter, while by a larger difference than that between the floating fruits, the fixed fruit of the former is more than the fixed fruit of the latter; and (e) Cases in which the fixed fruit of the former is less than the fixed fruit of the latter, while by a larger difference than that between the fixed fruits, the floating fruit of the former is less than the floating fruit of the latter.

13. Moreover, a present embodiment makes it possible to efficiently change the application of a capital transaction product.

(1) In the case in which an asset manager finds it unnecessary to keep a capital transaction product that has been used for the purpose of hedging 'a position of an asset management product that the asset manager has held' following its disposal or lapse of the asset management product, if the asset manager, through a cash flow exchange in accordance with a present embodiment, assumes from another person 'a position of a capital transaction product that can be used for trading' in exchange for passing on 'the position of the capital transaction product for hedging that the asset manager has used,' the asset manager can promptly shift a capital transaction product from hedge application to trading application.

(2) To the contrary, in the case in which an asset manager finds it necessary to hedge a newly created position of an asset management product, if the asset manager, through a cash flow exchange in accordance with a present embodiment, assumes from another person 'a position of a capital transaction product that can be used for hedging' in exchange for passing on 'a position of a capital transaction product for trading that the asset manager has separately carried,' the asset manager can promptly shift a capital transaction product from trading application to hedging application.

(3) In the case in which a capital raiser finds it unnecessary to keep a capital transaction product that has been used for the purpose of hedging 'a position of a capital raising product that the capital raiser has serviced' following a lapse or passing-on of the capital raising product, if the capital raiser, through a cash flow exchange in accordance with a present embodiment, assumes from another person 'a position of a capital transaction product that can be used for trading' in exchange for passing on 'the position of the capital transaction product for hedging that the capital raiser has used,' the capital raiser can promptly shift a capital transaction product from hedge application to trading application.

(4) To the contrary, in the case in which a capital raiser finds it necessary to hedge a newly created position of a capital raising product, if the capital raiser, through a cash flow exchange in accordance with a present embodiment, assumes from another person 'a position of a capital transaction product that can be used for hedging' in exchange for passing on 'a position of a capital transaction product for trading that the capital raiser has separately carried,' the capital raiser can promptly shift a capital transaction product from trading application to hedging application.

14. Next, a present embodiment provides a new methodology of asset management with respect to credit accommodation.

(1) In the case in which an asset manager, following a review of its asset management policy or objective and regarding an asset management product that the asset manager is holding in relation to a specific capital raiser, accepts a lower yield on investment while desiring to take a lower credit risk by the degree of the lower yield, or to the contrary, desires to pursue a higher yield on investment while accepting a higher credit risk by the degree of the higher yield, if the asset manager, through a direct exchange or a cash flow exchange in accordance with a present embodiment, switches the asset management product with one of senior loan assets, senior bonds, subordinated loan assets, subordinated bonds, preferred stocks, common stocks, subordinated stocks and the like that the capital raiser is servicing, the asset manager can efficiently change an order of reimbursement without affecting its liquidity on hand. Also, the asset manager may as well perform a direct exchange or a cash flow exchange between an asset management product that is serviced by another capital raiser which associates a credit risk of similar degree and an asset management product from among the above-described product group that is serviced by the former capital raiser, thereby substantially changing an order of reimbursement.

(2) In the case in which an asset manager has established a credit line to a specific capital raiser following establishment of its asset management policy or objective, if the asset manager, through a direct exchange or a cash flow exchange in accordance with a present embodiment, takes over 'a credit risk product such as a loan asset, a bond, a commercial paper, a deposit asset or the like that another asset manager is already holding in relation to the capital raiser' in exchange for assigning 'any asset management product that the former asset manager is already holding,' the former asset manager can efficiently commence credit accommodation for the capital raiser without breaking its liquidity on hand.

Moreover, a similar exchange transaction enables the extension of credit accommodation.

(3) In the case in which an asset manager has lowered a credit line to a specific capital raiser following a review of its asset management policy or objective, if the asset manager, through a direct exchange or a cash flow exchange in accordance with a present embodiment, takes over 'any asset management product that another asset manager is already holding' in exchange for assigning 'a credit risk product that the former asset manager is already holding in relation to the capital raiser,' the former asset manager can efficiently reduce the credit accommodation for the capital raiser without affecting its liquidity on hand.

Moreover, a similar exchange transaction enables the suspension of credit accommodation.

15. Furthermore, a present embodiment provides a new methodology of asset management with respect to selection of a party to be entrusted with asset management within a fund-type asset management product.

(1) In the case in which an asset manager desires to concentrate investment management institutions within fund-type asset management products that the asset manager is holding such as securities investment trusts, real estate investment trusts, commodity funds, loan trusts, money trusts and/or the like on a specific investment trust management company, trust bank or the like based on its good performance or reputation, if the asset manager, through a direct exchange or a cash flow exchange in accordance with a present embodiment, takes over 'fund-type asset management products of the specific investment management institution to select that other asset managers are holding' in exchange for assigning 'the fund-type asset management products of the investment management institutions to exclude that said asset manager is holding,' the asset manager can efficiently concentrate investment management institutions on the specific institution without affecting its liquidity on hand.

(2) In the case in which an asset manager, following a review of its policy or objective of asset allocation, desires to disperse investment management roles within a fund-type asset management product that the asset manager is holding, into other investment trust management companies, trust banks and the like, if the asset manager, through a direct exchange or a cash flow exchange in accordance with a present embodiment, takes over 'fund-type asset management products of various investment management institutions that other asset managers are holding' in exchange for assigning 'the fund-type asset management product of the specific investment management institution that said asset manager is holding,' the asset manager can efficiently disperse investment management roles without affecting its liquidity on hand.

16. Also, a present embodiment provides a new methodology of asset management with respect to selection of a party to be entrusted with asset management within an investment vehicle.

(1) In the case in which an asset manager, following establishment of its policy or objective of entrustment with asset management, has appointed a specific investment-advisory company, insurance company, trust bank or the like as an investment management institution within an investment vehicle, if the asset manager, through a direct exchange or a cash flow exchange in accordance with a present embodiment, takes over 'an investment vehicle that another asset manager is holding within which the specific investment management institution favored by the former asset manager is in charge of its asset management' in exchange for assigning 'any asset management product that the former asset manager is already holding,' the former asset manager can efficiently commence its entrustment to the specific institution without establishing the portfolio from a cash position.

(2) In the case in which an asset manager, following a review of its policy or objective of entrustment with asset management, desires to concentrate investment management institutions within investment vehicles that the asset manager is holding on a specific investment-advisory company, insurance company, trust bank or the like, if the asset manager, through a direct exchange or a cash flow exchange in accordance with a present embodiment, takes over 'investment vehicles that other asset managers are holding within which the specific investment management institution to select is in charge of their asset management' in exchange for assigning 'the investment vehicles that said asset manager is holding within which the investment management institutions to exclude are in charge of their asset management,' the asset manager can efficiently concentrate investment management institutions on the specific institution without liquidating the portfolios into cash positions.

(3) In the case in which an asset manager, following a review of its policy or objective of entrustment with asset management, desires to open investment management roles within an investment vehicle that the asset manager is holding to other investment-advisory companies, insurance companies, trust banks and the like, if the asset manager, through a direct exchange or a cash flow exchange in accordance with a present embodiment, takes over 'investment vehicles that other asset managers are holding within which various investment management institutions are in charge of their asset management' in exchange for assigning 'the investment vehicle that said asset manager is holding within which the specific investment management institutions are in charge of its asset management,' the asset manager can efficiently open investment management roles without liquidating the portfolio into a cash position.

(4) In the case in which an asset manager, following a review of its policy or objective of entrustment with asset management, desires to dismiss a specific investment management institution within an investment vehicle that the asset manager is holding, if the asset manager, through a direct exchange or a cash flow exchange in accordance with a present embodiment, takes over 'any asset management product that another asset manager is holding' in exchange for assigning 'the investment vehicle that said asset manager is holding within which the investment management institution is in charge of its asset management,' the asset manager can efficiently suspend the entrustment with asset management without liquidating the portfolio back into a cash position.

17. Moreover, a present embodiment provides a new methodology of asset management with respect to real estate asset management products.

That is, in the case in which an asset manager desires to acquire all of the land in a specific region or the whole of a specific compound real estate property for the purpose of future development or redevelopment thereof, through a direct exchange in accordance with a present embodiment, if the asset manager takes over 'all the land that individual landowners are holding in the region' or 'all the properties that individual sectional owners are holding in the compound real estate property' in exchange for assigning 'any asset management products that the asset manager is holding,' or if the asset manager takes over 'the total amount of real estate-backed securities or the total amount of real estate investment trusts that are securitized products of the object real estate' in exchange for assigning 'any asset management products that the asset manager is holding,' the asset manager can directly or indirectly acquire all of the land in the specific region or the whole of the specific compound real estate property without breaking its liquidity on hand.

18. Furthermore, a present embodiment makes it possible to perform a simultaneous exchange transaction among three or more users with respect to the direct exchange and the cash flow exchange of asset management products, the cash flow exchange of capital raising products and/or the cash flow exchange of capital transaction products.

(1) It is assumed that an asset manager (O), an asset manager (P) and an asset manager (Q) respectively desire to dispose of an asset management product (o) that the asset manager (O) is holding, an asset management product (p) that the asset manager (P) is holding and an asset management product (q) that the asset manager (Q) is holding. In this case, if the asset manager (O), the asset manager (P) and the asset manager (Q) respectively desire to acquire the asset management product (p), the asset management product (q) and the asset management product (o) and thus desires to dispose and desires to acquire circulate among the three parties, the system operator can simultaneously complete the direct exchanges of the asset management products among the asset manager (O), the asset manager (P) and the asset manager (Q). Also, a present embodiment enables a simultaneous direct exchange of asset management products if desires to dispose and desires to acquire circulate among four or more asset managers as well.

(2) It is assumed that an asset manager (R), an asset manager (S) and an asset manager (T) respectively desire to assign a cash inflow arising from an asset management product (r) that the asset manager (R) is holding, a cash inflow arising from an asset management product (s) that the asset manager (S) is holding and a cash inflow arising from an asset management product (t) that the asset manager (T) is holding. In this case, if the asset manager (R), the asset manager (S) and the asset manager (T) respectively desire to take over the cash inflow arising from the asset management product (s), the cash inflow arising from the asset management product (t) and the cash inflow arising from the asset management product (r) and thus desires to assign and desires to take-over circulate among the three parties, the system operator can simultaneously complete the cash flow exchanges of the asset management products among the asset manager (R), the asset manager (S) and the asset manager (T). Also, a present embodiment enables a simultaneous cash flow exchange of asset management products if desires to assign and desires to take-over circulate among four or more asset managers as well.

(3) It is assumed that a capital raiser (U), a capital raiser (V) and a capital raiser (W) respectively desire to pass on a cash outflow arising from a capital raising product (u) that the capital raiser (U) is servicing, a cash outflow arising from a capital raising product (v) that the capital raiser (V) is servicing and a cash outflow arising from a capital raising product (w) that the capital raiser (W) is servicing. In this case, if the capital raiser (U), the capital raiser (V) and the capital raiser (W) respectively desire to assume the cash outflow arising from the capital raising product (v), the cash outflow arising from the capital raising product (w) and the cash outflow arising from the capital raising product (u) and thus desires to pass-on and desires to assume circulate among the three parties, the system operator can simultaneously complete the cash flow exchanges of the capital raising products among the capital raiser (U), the capital raiser (V) and the capital raiser (W). Also, a present embodiment enables a simultaneous cash flow exchange of capital raising products if desires to pass-on and desires to assume circulate among four or more capital raisers as well.

(4) It is assumed that a capital transactor (X), a capital transactor (Y) and a capital transactor (Z) respectively desire to pass on an unrealized profit/loss of a capital transaction product (x) that the capital transactor (X) is carrying, an unrealized profit/loss of a capital transaction product (y) that the capital transactor (Y) is carrying and an unrealized profit/loss of a capital transaction product (z) that the capital transactor (Z) is carrying. In this case, if the capital transactor (X), the capital transactor (Y) and the capital transactor (Z) respectively desire to assume the unrealized profit/loss of the capital transaction product (y), the unrealized profit/loss of the capital transaction product (z) and the unrealized profit/loss of the capital transaction product (x) and thus desires to pass-on and desires to assume circulate among the three parties, the system operator can simultaneously complete the cash flow exchanges of the capital transaction products among the capital transactor (X), the capital transactor (Y) and the capital transactor (Z). Also, a present embodiment enables a simultaneous cash flow exchange of capital transaction products if desires to pass-on and desires to assume circulate among four or more capital transactors as well.

(5) Also, a present embodiment enables a simultaneous exchange transaction among three or more users in an exchange by tie-in of asset management products, an exchange by tie-in of capital raising products, an exchange by tie-in of capital transaction products, an exchange by tie-in of an asset management product and a capital transaction product, an exchange by tie-in of a capital raising product and a capital transaction product, an exchange by tie-in of an asset management product and a capital raising product, and/or an exchange by tie-in of an asset management product, a capital raising product and a capital transaction product.

Now, the technical features of the previously described embodiments will be summarized as follows:

(1) A computer-readable storage medium storing an exchange transaction program for financial and/or related instruments is characterized in that one or more exchange transaction markets for at least one of financial instruments and quasi-financial instruments are thereby created via at least one computer network and users can thereby complete exchange transactions between themselves.

(2) The computer-readable storage medium may be characterized in that said exchange transaction program enables exchange transactions in at least one computer and a plurality of user terminals connected to said computer network that comprise: (a) first transmission means by which a terminal of a prospective exchange transactor of at least one of said financial instruments and quasi-financial instruments sends an exchange order to the computer; (b) first receiving means by which the computer receives the exchange order sent from the terminal of the prospective exchange transactor by the first transmission means; (c) first storage means by which the computer stores the exchange order of the prospective exchange transactor received by the first receiving means; (d) disclosure means by which the computer discloses the exchange order to terminals of specified or unspecified potential exchanging counterparties of the prospective exchange transactor; (e) second transmission means by which one or more of the terminals of the potential exchanging counterparties send the computer their exchange orders targeting the prospective exchange transaction based on the exchange order disclosed by the computer with said disclosure means; (f) second receiving means by which the computer receives the exchange orders sent from the terminals of the potential exchanging counterparties by the second transmission means; (g) second storage means by which the computer stores the exchange orders of the potential exchanging counterparties received by the second receiving means; (h) matching means by which the computer compares the exchange order of said prospective exchange transactor and the exchange orders of the potential exchanging counterparties respectively stored by the first and the second storage means to determine whether or not their conditions match; (i) updating means by which, if the computer determines with said matching means that their conditions match, the computer completes the exchange transactions between the respective exchange orders and updates the exchange orders respectively stored by the first and the second storage means; and (j) notifying means by which the computer notifies the terminal of the prospective exchange transactor and the terminals of the potential exchanging counterparties of the respective transaction results brought about by said matching means.

(3) The computer-readable storage medium may be characterized in that said exchange transaction program enables exchange transactions in at least one computer and a plurality of user terminals connected to said computer network that comprise: (a) transmission means by which two or more of the user terminals send the computer exchange orders of at least one of said financial instruments and quasi-financial instruments; (b) receiving means by which the computer receives the exchange orders sent from the user terminals by said transmission means; (c) storage means by which the computer stores the exchange orders received by said receiving means; (d) matching means by which the computer compares the exchange orders stored by said storage means to determine whether or not their conditions match; (e) updating means by which, if the computer determines with said matching means that their conditions match, the computer completes the exchange transactions between the exchange orders and updates the respective exchange orders stored by said storage means; and (f) notifying means by which the computer notifies said user terminals of the respective transaction results brought about by said matching means.

(4) The computer-readable storage medium may be characterized in that said exchange transaction program enables exchange transactions in at least one computer and a plurality of user terminals connected to said computer network that comprise: (a) transmission means by which a terminal of a prospective initiating exchanger who desires a negotiated exchange transaction of at least one of said financial instruments and quasi-financial instruments sends a request for the negotiated exchange transaction to a terminal of at least one potential exchanging counterparty; (b) first receiving means by which a terminal of a potential exchanging counterparty receives the request for the negotiated exchange transaction sent from the terminal of the prospective initiating exchanger by said transmission means; (c) returning means by which the terminal of the potential exchanging counterparty returns a decision of acceptance, rejection or negotiation with respect to the request for the negotiated exchange transaction received by the first receiving means, to the terminal of the prospective initiating exchanger; (d) second receiving means by which the terminal of the prospective initiating exchanger receives the decision returned from the terminal of the potential exchanging counterparty by said returning means; and (e) notifying means by which at least one of the terminal of the prospective initiating exchanger and the terminal of the potential exchanging counterparty notifies said computer of the result of completion or non-completion of the negotiated exchange transaction.

(5) The computer-readable storage medium may be characterized in that said exchange transaction program enables negotiated exchange transactions in at least one computer and a plurality of user terminals connected to said computer network that further comprise: (a) transmission means by which the terminal of said prospective initiating exchanger sends the computer a request for a negotiated exchange transaction of at least one of said financial instruments and quasi-financial instruments; (b) receiving means by which the computer receives the request for the negotiated exchange transaction sent from the terminal of the prospective initiating exchanger by said transmission means; (c) specifying means by which the computer specifies at least one potential exchanging counterparty who matches the request for the negotiated exchange transaction received by said receiving means; and (d) notifying means by which the computer notifies the terminal of the prospective initiating exchanger of contact information on the potential exchanging counterparty or counterparties specified by said specifying means.

(6) The computer-readable storage medium may be characterized in that object products of said exchange transactions are any one or more financial asset management products selected from the group consisting of loan assets, bonds, commercial papers, deposit assets, equities, subscription certificates, depository receipts and beneficiary securities.

(7) The computer-readable storage medium may be characterized in that object products of said exchange transactions are any one or more real estate asset management products selected from the group consisting of land, buildings, compound real estate properties, condominiums, real estate-backed securities and real estate investment trusts.

(8) The computer-readable storage medium may be characterized in that object products of said exchange transactions are any one or more capital raising products selected from the group consisting of borrowed liabilities, bonds, commercial papers, deposit liabilities, equities and subscription certificates.

(9) The computer-readable storage medium may be characterized in that object products of said exchange transactions are any one or more capital transaction products selected from the group consisting of foreign exchange products, interest rate derivative products, equity derivative products, real estate derivative products, commodity derivative products, hybrid derivative products, forward products, futures products, option products and swap products.

(10) A computer system for supporting exchange transactions of at least one of financial instruments and quasi-financial instruments between customers selected from the group consisting of asset managers, capital raisers and capital transactors is characterized in that the system comprises: (a) at least one computer equipped to function as a web server and a database server; (b) a plurality of user terminals of said customers; (c) at least one computer network connecting said computer and said user terminals; (d) one or more exchange transaction databases storing data regarding said exchange transactions; and (e) any one or more other databases selected from the group consisting of: (i) one or more contract management databases storing data regarding at least one of exchange agreements, prospectuses, reports and disclosures; (ii) one or more settlement management databases storing data regarding at least one of funds settlement and securities settlement; (iii) one or more appraiser information databases storing at least one of self-introduction materials of one or more appraisers and reference/proposal data for said exchange transactions; and (iv) one or more client information databases storing data regarding users of said system, and the system is arranged to enable at least one of an auction mode and a negotiation mode, the auction mode for directly matching exchange orders according to the principle of balance of supply and demand, and the negotiation mode for providing communication channels between said customers so that the customers can directly negotiate with one another to complete said exchange transactions.

(11) The exchange transaction system may be characterized in that the system further comprises: (a) first transmission means by which a terminal of a prospective exchange transactor of at least one of said financial instruments and quasi-financial instruments sends an exchange order to said computer; (b) first receiving means by which the computer receives the exchange order sent from the terminal of the prospective exchange transactor by the first transmission means; (c) first storage means by which the computer stores the exchange order of the prospective exchange transactor received by the first receiving means; (d) disclosure means by which the computer discloses the exchange order to terminals of specified or unspecified potential exchanging counterparties of the prospective exchange transactor; (e) second transmission means by which one or more of the terminals of the potential exchanging counterparties send the computer their exchange orders targeting the prospective exchange transaction based on the exchange order disclosed by the computer with said disclosure means; (f) second receiving means by which the computer receives the exchange orders sent from the terminals of the potential exchanging counterparties by the second transmission means; (g) second storage means by which the computer stores the exchange orders of the potential exchanging counterparties received by the second receiving means; (h) matching means by which the computer compares the exchange order of said prospective exchange transactor and the exchange orders of the potential exchanging counterparties respectively stored by the first and the second storage means to determine whether or not their conditions match; (i) updating means by which, if the computer determines with said matching means that their conditions match, the computer completes the exchange transactions between the respective exchange orders and updates the exchange orders respectively stored by the first and the second storage means; and (j) notifying means by which the computer notifies the terminal of the prospective exchange transactor and the terminals of the potential exchanging counterparties of the respective transaction results brought about by said matching means.

(12) The exchange transaction system may be characterized in that the system further comprises: (a) transmission means by which two or more of said user terminals send said computer exchange orders of at least one of said financial instruments and quasi-financial instruments; (b) receiving means by which the computer receives the exchange orders sent from the user terminals by said transmission means; (c) storage means by which the computer stores the exchange orders received by said receiving means; (d) matching means by which the computer compares the exchange orders stored by said storage means to determine whether or not their conditions match; (e) updating means by which, if the computer determines with said matching means that their conditions match, the computer completes the exchange transactions between the exchange orders and updates the respective exchange orders stored by said storage means; and (f) notifying means by which the computer notifies said user terminals of the respective transaction results brought about by said matching means.

(13) The exchange transaction system may be characterized in that the system further comprises: (a) transmission means by which a terminal of a prospective initiating exchanger who desires a negotiated exchange transaction of at least one of said financial instruments and quasi-financial instruments sends a request for the negotiated exchange transaction to a terminal of at least one potential exchanging counterparty; (b) first receiving means by which a terminal of a potential exchanging counterparty receives the request for the negotiated exchange transaction sent from the terminal of the prospective initiating exchanger by said transmission means; (c) returning means by which the terminal of the potential exchanging counterparty returns a decision of acceptance, rejection or negotiation with respect to the request for the negotiated exchange transaction received by the first receiving means, to the terminal of the prospective initiating exchanger; (d) second receiving means by which the terminal of the prospective initiating exchanger receives the decision returned from the terminal of the potential exchanging counterparty by said returning means; and (e) notifying means by which at least one of the terminal of the prospective initiating exchanger and the terminal of the potential exchanging counterparty notifies said computer of the result of completion or non-completion of the negotiated exchange transaction.

(14) The exchange transaction system may be characterized in that the system further comprises: (a) transmission means by which the terminal of said prospective initiating exchanger sends said computer a request for a negotiated exchange transaction of at least one of said financial instruments and quasi-financial instruments; (b) receiving means by which the computer receives the request for the negotiated exchange transaction sent from the terminal of the prospective initiating exchanger by said transmission means; (c) specifying means by which the computer specifies at least one potential exchanging counterparty who matches the request for the negotiated exchange transaction received by said receiving means; and (d) notifying means by which the computer notifies the terminal of the prospective initiating exchanger of contact information on the potential exchanging counterparty or counterparties specified by said specifying means.

(15) The exchange transaction system may be characterized in that said exchange transaction is a direct exchange of asset management products.

(16) The exchange transaction system may be characterized in that said exchange transaction is a cash flow exchange of asset management products.

(17) The exchange transaction system may be characterized in that said exchange transaction is a cash flow exchange of asset management products on the basis of their unrealized profits and/or losses.

(18) The exchange transaction system may be characterized in that asset management products can be exchanged by a compromise method between said direct exchange and said cash flow exchange.

(19) The exchange transaction system may be characterized in that said exchange transaction is a cash flow exchange of capital raising products.

(20) The exchange transaction system may be characterized in that said exchange transaction is a cash flow exchange of capital transaction products.

(21) The exchange transaction system may be characterized in that a cash flow exchange between an asset management product and a capital transaction product can thereby be performed.

(22) The exchange transaction system may be characterized in that object products of said exchange transactions are any one or more financial asset management products selected from the group consisting of loan assets, bonds, commercial papers, deposit assets, equities, subscription certificates, depository receipts and beneficiary securities.

(23) The exchange transaction system may be characterized in that object products of said exchange transactions are any one or more real estate asset management products selected from the group consisting of land, buildings, compound real estate properties, condominiums, real estate-backed securities and real estate investment trusts.

(24) The exchange transaction system may be characterized in that object products of said exchange transactions are any one or more capital raising products selected from the group consisting of borrowed liabilities, bonds, commercial papers, deposit liabilities, equities and subscription certificates.

(25) The exchange transaction system may be characterized in that object products of said exchange transactions are any one or more capital transaction products selected from the group consisting of foreign exchange products, interest rate derivative products, equity derivative products, real estate derivative products, commodity derivative products, hybrid derivative products, forward products, futures products, option products and swap products.

(26) The exchange transaction system may be characterized in that any one or more exchange transactions from among those between same type products, those between different type products and those between different industry products can thereby be completed.

As used herein, the term 'same type products' shall mean products of an equal type such as 'equity' and 'equity,' the term 'different type products' shall mean products of different types such as 'equity' and 'bond,' and the term 'different industry products' shall mean products of different industries such as 'equity' and 'land.'

(27) The exchange transaction system may be characterized in that an exchange transaction by tie-in of a plurality of products can thereby be completed.

(28) The exchange transaction system may be characterized in that a simultaneous exchange transaction among three or more users can thereby be completed.

As used herein, the term 'simultaneous exchange transaction among three or more users' shall mean the following two transaction styles:

(a) Exchange transactions that are simultaneously completed in the case in which one prospective exchange transactor and a plurality of prospective exchange transactors are matched, or in the case in which a plurality of prospective exchange transactors and another plurality of prospective exchange transactors are matched.

(b) Exchange transactions that are simultaneously completed in the case in which desires to offer and desires to procure circulate among three or more prospective exchange transactors, such as the case in which prospective exchange transactors X, Y and Z desire to offer products x, y and z respectively, and at the same time, the prospective exchange transactors X, Y, and Z desire to procure the products y, z and x respectively.

(29) The exchange transaction system may be characterized in that asset/liability management can be performed by various combinations of the direct exchange of asset management products, the cash flow exchange of asset management products, the cash flow exchange of capital raising products and the cash flow exchange of capital transaction products.

(30) The exchange transaction system may be characterized in that exchange transactions of said instruments can thereby be completed domestically and abroad 24 hours a day beyond the confines of national borders and/or session hours.

(31) The exchange transaction system may be characterized in that a function of due diligence of an exchange transaction product and/or a function of appraisal of an exchange transaction value is thereby performed.

(32) The exchange transaction system may be characterized in that settlement and administration functions after completion of an exchange transaction, such as transaction confirmation, signing or assignment of a contract, settlement of an exchange difference, delivery and receipt of actuals, payment and receipt of cash flows, inspection of legal or regulatory compliance, and/or the like, are thereby concentrated.

(33) The exchange transaction system may be characterized in that any one or more transactions from among a transaction regarding control of a business, a transaction regarding cross-equityholding, a transaction regarding own equities, concentration of equities in real estate, a change in order of reimbursement, a transaction regarding credit accommodation, an exchange of portfolios, and a transaction regarding selection of a party to be entrusted with asset management, can be performed through said direct exchange and/or said cash flow exchange of asset management products.

As used herein, the term 'transaction regarding control of a business' shall mean strengthening and/or weakening of control over a business as well as acquisition and/or divestment of a business, the term 'transaction regarding cross-equityholding' shall mean commencement, strengthening, weakening and/or unwinding of cross-equityholding, and the term 'transaction regarding own equities' shall mean acquisition and/or disposal of an entity's own equities.

Also, as used herein, the term 'transaction regarding credit accommodation' shall mean commencement, extension, reduction and/or suspension of credit accommodation.

Moreover, as used herein, the term 'transaction regarding selection of a party to be entrusted with asset management' shall mean, within fund-type asset management products and/or investment vehicles, appointment, concentration, diversification and/or discharge of an investment management institution. Additionally, the term 'fund-type asset management product' shall mean any asset management product that is generally set up and managed for many and unspecific asset managers and shall include a securities investment trust, a real estate investment trust, a commodity fund, a loan trust, and/or a money trust in a narrow sense. Also, the term 'investment vehicle' shall mean any asset management product that is generally set up and utilized by a specific asset manager for the purpose of book value separation, fruits policy, outsourcing of asset management, and/or the like and shall include a specified money trust, a designated fund trust, a managed securities trust, an equity in an investment subsidiary, and/or a fund-type privately placed bond.

(34) An exchange transaction method for products is characterized in that one or more exchange transaction markets for at least one product are thereby created via at least one computer network and users can thereby complete exchange transactions between themselves.

(35) The exchange transaction method may be characterized in that the method over a system including at least one computer and a plurality of user terminals connected to said computer network comprises: (a) a first transmission step in which a terminal of a prospective exchange transactor of at least one product sends an exchange order to the computer; (b) a first receiving step in which the computer receives the exchange order sent from the terminal of the prospective exchange transactor in the first transmission step; (c) a first storage step in which the computer stores the exchange order of the prospective exchange transactor received in the first receiving step; (d) a disclosure step in which the computer discloses the exchange order to terminals of specified or unspecified potential exchanging counterparties of the prospective exchange transactor; (e) a second transmission step in which one or more of the terminals of the potential exchanging counterparties send the computer their exchange orders targeting the prospective exchange transaction based on the exchange order disclosed by the computer in said disclosure step; (f) a second receiving step in which the computer receives the exchange orders sent from the terminals of the potential exchanging counterparties in the second transmission step; (g) a second storage step in which the computer stores the exchange orders of the potential exchanging counterparties received in the second receiving step; (h) a matching step in which the computer compares the exchange order of said prospective exchange transactor and the exchange orders of the potential exchanging counterparties respectively stored in the first and the second storage steps to determine whether or not their conditions match; (i) an updating step in which, if the computer determines in said matching step that their conditions match, the computer completes the exchange transactions between the respective exchange orders and updates the exchange orders respectively stored in the first and the second storage steps; and (j) a notifying step in which the computer notifies the terminal of the prospective exchange transactor and the terminals of the potential exchanging counterparties of the respective transaction results brought about in said matching step.

(36) The exchange transaction method may be characterized in that the method over a system including at least one computer and a plurality of user terminals connected to said computer network comprises: (a) a transmission step in which two or more of the user terminals send the computer exchange orders of at least one product; (b) a receiving step in which the computer receives the exchange orders sent from the user terminals in said transmission step; (c) a storage step in which the computer stores the exchange orders received in said receiving step; (d) a matching step in which the computer compares the exchange orders stored in said storage step to determine whether or not their conditions match; (e) an updating step in which, if the computer determines in said matching step that their conditions match, the computer completes the exchange transactions between the exchange orders and updates the respective exchange orders stored in said storage step; and (f) a notifying step in which the computer notifies said user terminals of the respective transaction results brought about in said matching step.

(37) The exchange transaction method may be characterized in that the method over a system including at least one computer and a plurality of user terminals connected to said computer network comprises: (a) a transmission step in which a terminal of a prospective initiating exchanger who desires a negotiated exchange transaction of at least one product sends a request for the negotiated exchange transaction to a terminal of at least one potential exchanging counterparty; (b) a first receiving step in which a terminal of a potential exchanging counterparty receives the request for the negotiated exchange transaction sent from the terminal of the prospective initiating exchanger in said transmission step; (c) a returning step in which the terminal of the potential exchanging counterparty returns a decision of acceptance, rejection or negotiation with respect to the request for the negotiated exchange transaction received in the first receiving step, to the terminal of the prospective initiating exchanger; (d) a second receiving step in which the terminal of the prospective initiating exchanger receives the decision returned from the terminal of the potential exchanging counterparty in said returning step; and (e) a notifying step in which at least one of the terminal of the prospective initiating exchanger and the terminal of the potential exchanging counterparty notifies said computer of the result of completion or non-completion of the negotiated exchange transaction.

(38) The exchange transaction method may be characterized in that the method over a system including at least one computer and a plurality of user terminals connected to said computer network further comprises prior to said steps: (a) a transmission step in which the terminal of said prospective initiating exchanger sends the computer a request for a negotiated exchange transaction of at least one product; (b) a receiving step in which the computer receives the request for the negotiated exchange transaction sent from the terminal of the prospective initiating exchanger in said transmission step; (c) a specifying step in which the computer specifies at least one potential exchanging counterparty who matches the request for the negotiated exchange transaction received in said receiving step; and (d) a notifying step in which the computer notifies the terminal of the prospective initiating exchanger of contact information on the potential exchanging counterparty or counterparties specified in said specifying step.

The computer-readable storage medium storing an exchange transaction program for financial and/or related instruments, the exchange transaction system for financial and/or related instruments, and the exchange transaction method for products in accordance with some embodiments of the present invention create one or more exchange transaction markets for at least one of financial instruments, quasi-financial instruments and other products via at least one computer network and can mutually match a demand to dissolve a position and a demand to create a position of customers including asset managers, capital raisers and/or capital transactors.

Moreover, the computer-readable storage medium storing an exchange transaction program for financial and/or related instruments, the exchange transaction system for financial and/or related instruments, and the exchange transaction method for products in accordance with some embodiments of the present invention offer an environment in which an act of dissolution and an act of creation can be simultaneously performed and thus enable a customer to save fees payable to an intermediary or the like, eliminate the time lag between an act of dissolution and an act of creation and thus make it possible to minimize market risks between the acts, and establish a marketplace for cross-transactions which transcends excessively segmented transaction markets and thus make it possible to improve the liquidity of respective products.

Furthermore, an embodiment of the present invention enables new types of arbitrage transactions and leveling of cash flows, increases efficiency of reestablishment of portfolios and asset/liability management, and provides new methodologies of asset management regarding control of businesses, cross-equityholding, credit accommodation, selection of parties to be entrusted with asset management, and/or the like.

The invention claimed is:

1. A transaction server for supporting transactions executed by a plurality of client terminals of a plurality of users,
  wherein:
    said transaction server is connected to each of said plurality of client terminals;
    said transactions are exchange transactions;
    the transaction server is connected to an exchange transaction database that stores data regarding the exchange transactions;
    a user exchange order x is stored in the exchange transaction database,
    the user exchange order x being sent from a client terminal of a user X that desires to perform an exchange transaction, and having order information specified by the client terminal that includes a desired exchange difference XA minus XB, of the user X, arithmetically determined from:
  a desired offer value XA of an exchange object A serving as a desired offer item of the user X, and
  a desired procurement value XB of an exchange object B serving as a desired procurement item of the user X;
    a user exchange order y is stored in the exchange transaction database,
    the user exchange order y being sent from a client terminal of a user Y that desires to perform an exchange transaction, and having order information specified by the client terminal that includes a desired exchange difference YA minus YB, of the user Y, arithmetically determined from:
  a desired procurement value YA of the exchange object A serving as a desired procurement item of the user Y, and
  a desired offer value YB of the exchange object B serving as a desired offer item of the user Y;

the transaction server compares the user exchange order x and the user exchange order y as objects of matching in the exchange transaction database, and
  determines whether or not a match exists between the desired exchange difference XA minus XB and the desired exchange difference YA minus YB, to thereby execute the exchange transaction between the user exchange order x and the user exchange order y; and
  the transaction server deletes the user exchange order x and the user exchange order y from the objects of matching in the exchange transaction database in a case where it is determined that the match exists, to thereby execute the exchange transaction.

2. The transaction server according to claim 1,
wherein the transaction server executes an exchange transaction between said user exchange order x and said user exchange order y at an intermediate value between said desired exchange difference XA minus XB and said desired exchange difference YA minus YB in a case where it is determined that said match does not exist between the desired exchange difference XA minus XB and the desired exchange difference YA minus YB; and
deletes the user exchange order x and the user exchange order y from the objects of matching in the exchange transaction database.

3. The transaction server according to claim 1,
wherein the transaction server:
receives a request, for a negotiated exchange transaction, sent from a client terminal of a prospective initiating exchanger that takes an option for the negotiated exchange transaction;
sends the received request to a client terminal of a potential exchanging counterparty specified in the request; and
receives information that the negotiated exchange transaction has been completed in a case where the negotiated exchange transaction has been completed between the client terminal of the prospective initiating exchanger and the client terminal of the potential exchanging counterparty,
said information being sent from the client terminal of the prospective initiating exchanger or the client terminal of the potential exchanging counterparty.

4. The transaction server according to claim 1,
wherein:
the transaction server is connected to a settlement management database that stores information including account numbers and account balances of said users, as well as an account number and an account balance of the present system operator;
settlement information, on an exchange difference subject to a completed exchange transaction, is also stored in said exchange transaction database;
the transaction server reads settlement information from the exchange transaction database; and
the transaction server updates, based on the settlement information, at least an account balance for an account number of a payer of an exchange difference and an account balance for an account number of a recipient of the exchange difference in the settlement management database,
to thereby execute: an inter-account transfer that transfers the exchange difference from an account of the payer to an account of the system operator, and an inter-account transfer that transfers the exchange difference from an account of the system operator to an account of the recipient.

5. The transaction server according to claim 1, wherein:
the transaction server is connected to a settlement management database that stores information including account numbers and account balances of said users;
settlement information, on an exchange difference subject to a completed exchange transaction, is also stored in said exchange transaction database;
the transaction server reads settlement information from the exchange transaction database; and
the transaction server updates, based on the settlement information, an account balance for an account number of a payer of an exchange difference and an account balance for an account number of a recipient of the exchange difference in the settlement management database,
to thereby execute an inter-account transfer that transfers the exchange difference from an account of the payer to an account of the recipient.

6. The transaction server according to claim 1, wherein:
the transaction server is connected to a settlement management database that stores information including account numbers and account balances of said users, as well as an account number and an account balance of the present system operator;
settlement information, on an exchange object subject to a completed exchange transaction, is also stored in said exchange transaction database;
the transaction server reads settlement information from the exchange transaction database; and
the transaction server updates, based on the settlement information, at least an account balance for an account number of an assignor of an exchange object and an account balance for an account number of an assignee of the exchange object in the settlement management database,
to thereby execute: an inter-account transfer that transfers the exchange object from an account of the assignor to an account of the system operator, and an inter-account transfer that transfers the exchange object from an account of the system operator to an account of the assignee.

7. The transaction server according to claim 1, wherein:
the transaction server is connected to a settlement management database that stores information including account numbers and account balances of said users;
settlement information, on an exchange object subject to a completed exchange transaction, is also stored in said exchange transaction database;
the transaction server reads settlement information from the exchange transaction database; and
the transaction server updates, based on the settlement information, an account balance for an account number of an assignor of an exchange object and an account balance for an account number of an assignee of the exchange object in the settlement management database,
to thereby execute an inter-account transfer that transfers the exchange object from an account of the assignor to an account of the assignee.

8. The transaction server according to claim 1, wherein:
the transaction server is connected to a settlement management database that stores information including account numbers and account balances of said users;
settlement information, on exchange objects subject to a completed exchange transaction, is also stored in said exchange transaction database;
the transaction server reads, from the exchange transaction database, settlement information on:
an exchange object x to transfer from an exchanging party A that has completed an exchange transaction, to an exchanging party B that is an exchanging counterparty of the exchanging party A, and
an exchange object y to transfer from the exchanging party B to the exchanging party A; and
the transaction server updates, based on the settlement information, an account balance for an account number of the exchanging party A and an account balance for an account number of the exchanging party B in the settlement management database,
to thereby execute: an inter-account transfer that transfers the exchange object x from an account of the exchanging party A to an account of the exchanging party B, and an inter-account transfer that transfers the exchange object y from an account of the exchanging party B to an account of the exchanging party A.

9. The transaction server according to claim 8, wherein said settlement management database comprises one or more databases.

10. The transaction server according to claim 1, wherein said exchange transaction database comprises one or more databases.

11. The transaction server according to claim 1, comprising one or more computers.

12. The transaction server according to claim 1, wherein each of said exchange object A and said exchange object B is one or more selected from: a financial asset management product, a real estate asset management product, an asset management product, a capital raising product, a capital transaction product, a financial instrument, a quasi-financial instrument, a precious metal, a nonferrous metal, a metal, an energy-related product, a primary industry product, an object of art, an object of virtu, a commodity product, a product, producer goods, consumer goods, and goods.

13. The transaction server according to claim 1, wherein each of said exchange object A and said exchange object B is one or more selected from: an actual of an asset management product, cash flow of an asset management product, an unrealized profit of an asset management product, an unrealized loss of an asset management product, cash flow of a capital raising product, an unrealized profit of a capital transaction product, and an unrealized loss of a capital transaction product.

14. The transaction server according to claim 1, comprising:
means for storing said user exchange order x in said exchange transaction database;
means for storing said user exchange order y in the exchange transaction database;
means for:
comparing the user exchange order x and the user exchange order y as objects of matching in the exchange transaction database, and
determining whether or not said match exists between the desired exchange difference XA minus XB and the desired exchange difference YA minus YB, to thereby execute said exchange transaction between the user exchange order x and the user exchange order y; and
means for deleting the user exchange order x and the user exchange order y from the objects of matching in the exchange transaction database in a case where it is determined that the match exists, to thereby execute the exchange transaction.

15. The transaction server according to claim 1, wherein:
the transaction server is equipped with a central processing unit and a memory,
the memory stores said exchange transaction database, and the transaction server comprises:
means for storing said user exchange order x in the exchange transaction database in the memory;
means for storing said user exchange order y in the exchange transaction database in the memory;
means for:
comparing, by the central processing unit, the user exchange order x and the user exchange order y as objects of matching in the exchange transaction database, and
determining, by the central processing unit, whether or not said match exists between the desired exchange difference XA minus XB and the desired exchange difference YA minus YB, to thereby execute said exchange transaction between the user exchange order x and the user exchange order y; and
means for deleting, by the central processing unit, the user exchange order x and the user exchange order y from the objects of matching in the exchange transaction database in a case where it is determined by the central processing unit that the match exists, to thereby execute the exchange transaction.

16. A transaction server for supporting transactions executed by a plurality of client terminals of a plurality of users,
wherein:
said transaction server is connected to each of said plurality of client terminals;
said transactions are exchange transactions;
the transaction server is connected to an exchange transaction database that stores data regarding the exchange transactions;
a user exchange order x is stored in the exchange transaction database,
the user exchange order x being sent from a client terminal of a user X that desires to perform an exchange transaction, and having order information specified by the client terminal that includes:
a desired offer value XA of an exchange object A serving as a desired offer item of the user X, and
a desired procurement value XB of an exchange object B serving as a desired procurement item of the user X;
a user exchange order y is stored the exchange transaction database,
the user exchange order y being sent from a client terminal of a user Y that desires to perform an exchange transaction, and having order information specified by the client terminal that includes:
a desired procurement value YA of the exchange object A serving as a desired procurement item of the user Y, and
a desired offer value YB of the exchange object B serving as a desired offer item of the user Y;
the transaction server compares the user exchange order x and the user exchange order y as objects of matching in the exchange transaction database, and
determines whether or not a match exists between: the desired offer value XA minus the desired procurement value XB and the desired procurement value YA minus the desired offer value YB, to thereby execute the exchange transaction between the user exchange order x and the user exchange order y; and
the transaction server deletes the user exchange order x and the user exchange order y from the objects of matching in the exchange transaction database in a case where it is determined that the match exists, to thereby execute the exchange transaction.

17. A transaction server for supporting transactions executed by a plurality of client terminals of a plurality of users,
wherein:
said transaction server is connected to each of said plurality of client terminals;
said transactions are exchange transactions;
the transaction server is connected to an exchange transaction database that stores data regarding the exchange transactions;
a user exchange order x is stored in the exchange transaction database,
the user exchange order x being sent from a client terminal of a user X that desires to perform an exchange transaction, and having order information specified by the client terminal that includes a desired exchange difference range, of the user X, arithmetically determined from:
a desired offer value XA of an exchange object A serving as a desired offer item of the user X, and
a desired procurement value XB of an exchange object B serving as a desired procurement item of the user X;
a user exchange order y is stored in the exchange transaction database,
the user exchange order y being sent from a client terminal of a user Y that desires to perform an exchange transaction, and having order information specified by the client terminal that includes a desired exchange difference YA minus YB, of the user Y, arithmetically determined from:
a desired procurement value YA of the exchange object A serving as a desired procurement item of the user Y, and
a desired offer value YB of the exchange object B serving as a desired offer item of the user Y;
a user exchange order z is stored in the exchange transaction database,
the user exchange order z being sent from a client terminal of a user Z that desires to perform an exchange transaction, and having order information specified by the client terminal that includes a desired exchange difference ZA minus ZB, of the user Z, arithmetically determined from:
a desired procurement value ZA of the exchange object A serving as a desired procurement item of the user Z, and
a desired offer value ZB of the exchange object B serving as a desired offer item of the user Z;
the transaction server compares the user exchange order x, the user exchange order y and the user exchange order z as objects of matching in the exchange transaction database; and
determines, in a case where each of the desired exchange difference YA minus YB and the desired exchange difference ZA minus ZB falls within said desired exchange difference range,
which of the desired exchange difference YA minus YB and the desired exchange difference ZA minus ZB is more favorable to the user X, to thereby execute an exchange transaction between the user exchange order x, and either the user exchange order y or the user exchange order z; and
the transaction server deletes the user exchange order x and the user exchange order y from the objects of matching in the exchange transaction database in a case where it is determined that the desired exchange difference YA minus YB is more favorable to the user X than is the desired exchange difference ZA minus ZB, to thereby execute the exchange transaction between the user exchange order x and the user exchange order y.

* * * * *